United States Patent
Luzhnica et al.

(10) Patent No.: US 11,516,158 B1
(45) Date of Patent: Nov. 29, 2022

(54) NEURAL NETWORK-FACILITATED LINGUISTICALLY COMPLEX MESSAGE GENERATION SYSTEMS AND METHODS

(71) Applicant: LeadIQ, Inc., San Francisco, CA (US)

(72) Inventors: Enxhell Luzhnica, Suhareke (XK); Clement Chang Ming Goh, Singapore (SG); Pinxi Tan, Singapore (SG); Shao Hwee Chua, Singapore (SG); Yon-Lu Goh, Singapore (SG)

(73) Assignee: LeadIQ, Inc., San Francisco, CA (US)

( * ) Notice: Subject to any disclaimer, the term of this patent is extended or adjusted under 35 U.S.C. 154(b) by 0 days.

(21) Appl. No.: 17/725,433

(22) Filed: Apr. 20, 2022

(51) Int. Cl.
| | | |
|---|---|---|
| *H04L 51/02* | (2022.01) | |
| *G06N 3/04* | (2006.01) | |
| *G06F 40/253* | (2020.01) | |
| *G06F 40/35* | (2020.01) | |

(52) U.S. Cl.
CPC ............ *H04L 51/02* (2013.01); *G06F 40/253* (2020.01); *G06F 40/35* (2020.01); *G06N 3/0454* (2013.01)

(58) Field of Classification Search
CPC ....... H04L 51/02; G06F 40/253; G06F 40/35; G06N 3/0454
See application file for complete search history.

(56) References Cited

U.S. PATENT DOCUMENTS

| | | |
|---|---|---|
| 9,454,760 B2 | 9/2016 | Klemm |
| 9,934,515 B1 | 4/2018 | Anderson |
| 10,049,106 B2 | 8/2018 | Goyal |
| 10,091,140 B2 | 10/2018 | Galley |

(Continued)

FOREIGN PATENT DOCUMENTS

| | | |
|---|---|---|
| WO | 2019242001 | 12/2019 |
| WO | 2020068234 | 4/2020 |

OTHER PUBLICATIONS

Brown et al., "Language Models are Few-Shot Learners," initially published May 28, 2020. Retrieved from the Internet: arxiv.org/abs/2005.14165.

(Continued)

*Primary Examiner* — Kevin Ky
(74) *Attorney, Agent, or Firm* — Transformative Legal LLC; Len S. Smith; Denise M. Brown

(57) ABSTRACT

Provided are methods and systems for automated or semi-automated generation of complex messages. Provided systems include neural network(s) that are trained with at least an initial training set including message records having specific characteristics, such as size and form characteristics, and recognize certain user inputted content as "instructional prompts." The neural network(s) use the instructional prompts, training set, and other prompts to generate a distribution of semantic element options for each semantic element the system determines to include in system drafted message(s). The system selects from among such options to generate a plurality of draft messages which are presented to users for evaluation, editing, or transmission, with the instructional prompts treated as priority content. The systems and methods include mechanisms for reviewing and changing the instructional prompts based on factors that can include the content of the system-generated draft messages before further iterations to enhance the accuracy of future messages.

20 Claims, 26 Drawing Sheets

(56) References Cited

U.S. PATENT DOCUMENTS

| | | | |
|---|---|---|---|
| 10,241,999 | B2 | 3/2019 | Chakra |
| 10,496,920 | B2 | 12/2019 | Deselaers |
| 10,601,739 | B2 | 3/2020 | Patil |
| 10,681,739 | B2 | 6/2020 | Gage |
| 10,929,469 | B2 | 2/2021 | Kirk |
| 11,030,515 | B2 | 6/2021 | Kaufmann |
| 11,055,497 | B2 | 7/2021 | Noh |
| 11,157,693 | B2 | 10/2021 | Srinivasan |
| 11,216,510 | B2 | 1/2022 | Jiang |
| 11,321,580 | B1 * | 5/2022 | Walczak .............. G06N 3/0454 |
| 2018/0005112 | A1 | 1/2018 | Iso-Sipila |
| 2018/0189628 | A1 * | 7/2018 | Kaufmann .............. H04L 51/56 |
| 2018/0211156 | A1 * | 7/2018 | Guan .................. G06N 3/0454 |
| 2018/0329884 | A1 | 11/2018 | Xiong |
| 2018/0367475 | A1 | 12/2018 | Galley |
| 2019/0005024 | A1 | 1/2019 | Somech |
| 2019/0087455 | A1 * | 3/2019 | He ........................ G06F 40/295 |
| 2019/0213601 | A1 | 7/2019 | Hackman |
| 2019/0286712 | A1 | 9/2019 | Terry |
| 2020/0042613 | A1 | 2/2020 | Jiang |
| 2020/0090812 | A1 * | 3/2020 | Condie .................. G06N 3/088 |
| 2020/0134018 | A1 | 4/2020 | Laxman |
| 2020/0151259 | A1 * | 5/2020 | Smith .................... G06N 3/006 |
| 2020/0151555 | A1 * | 5/2020 | Kozhaya .................. G06N 3/08 |
| 2020/0202194 | A1 | 6/2020 | Wu |
| 2020/0244607 | A1 | 7/2020 | Govande |
| 2020/0258509 | A1 * | 8/2020 | Bharadwaj .............. G10L 15/22 |
| 2020/0272938 | A1 * | 8/2020 | Desmond ............. G06N 3/0454 |
| 2020/0355391 | A1 * | 11/2020 | Wenzel ................ G06N 3/0454 |
| 2020/0372396 | A1 * | 11/2020 | Kozhaya ................ G06N 3/084 |
| 2021/0012688 | A1 | 1/2021 | Lee |
| 2021/0097979 | A1 * | 4/2021 | Roorda .................. G06N 20/00 |
| 2021/0126881 | A1 | 4/2021 | Ball |
| 2021/0285671 | A1 * | 9/2021 | Du ........................ G05B 15/02 |
| 2022/0122157 | A1 * | 4/2022 | Ross .................. G01C 21/1656 |
| 2022/0147602 | A1 * | 5/2022 | Streit ...................... H04L 9/008 |

OTHER PUBLICATIONS

Keshkar et al., "CTRL: A Conditional Transformer Language Model for Controllable Generation," Sep. 20, 2019. Retrieved from the Internet: https://arxiv.org/abs/1909.05858.

Perrigo, "An Artificial Intelligence Helped Write This Play. It May Contain Racism." Aug. 24, 2021. Retrieved from the Internet: https://time.com/6092078/artificial-intelligence-play/.

Naughton, J., "The Truth About Artificial Intelligence? It Isn't That Honest." The Guardian. Oct. 2, 2021. Retrieved from the Internet: https://www.theguardian.com/commentisfree/2021/oct/02/the-truth-about-artificial-intelligence-it-isnt-that-honest.

Zellers et al., "Defending Against Neural Fake News," May 29, 2019. Retrieved from the Internet: arxiv.org/pdf/1905.12616.

Hyperwrite [online]. Oct. 4, 2021. [retrieved on Apr. 18, 2022]. Retrieved from the Internet: https://hyperwriteai.com /othersideai.com.

Lavender [online]. Apr. 2022. [retrieved on Apr. 20, 2022]. Retrieved from the Internet: https://www.lavender.ai/.

* cited by examiner

| 711 Name |
|---|

712
Meanings and origins of "Len"
Meaning: lion strength. Len as a boy's name is of English and Old German origin, and the meaning of Len is "lion strength".

714
Meanings and origins of "Smith"
Smith dates back to the Anglo-Saxon era and derives from the occupation of 'smith', from the Old English 'Smid', which means to hit or to strike, and was used to describe someone who worked with metal (a blacksmith for example).

| 715 Company Facts |
|---|

716
Mindtickle is the market-leading sales readiness platform, helping revenue leaders at world-class companies like Johnson &Johnson, Splunk, and Wipro, be ready to grow revenue by increasing knowledge, understanding ideal sales behaviors, and adapting to change. Dozens of Fortune 500 and Forbes Global 2000 companies use Mindtickle to define excellence...

718
Mindtickle is recognized as a market leader by top industry analysts and is ranked by G2 as both the #1 enterprise software product and #5 sales software product.

FIGURE 10

552 – Location
Facts About Toronto Ontario

☐ It's the only city in Canada with seven major-league sports teams .... 1010

☐ In 2016, two capybaras escaped from the High Park Zoo .... 1012

☐ The Toronto Islands weren't always islands .... 1014

☐ Toronto has over 10 million trees. 1016

☐ Toronto is the "most multicultural city in the world" with over 200 different ethnic origins, and 50% of the population born elsewhere. 1018

552

NEURAL NETWORK-FACILITATED LINGUISTICALLY COMPLEX MESSAGE GENERATION SYSTEMS AND METHODS

FIELD OF THE INVENTION

The invention primarily relates to computer systems comprising neural network(s) adapted to generate linguistically complex messages efficiently and effectively and methods employing the use of such systems, messages generated by such methods/systems, and the like.

BACKGROUND OF THE INVENTION

Communication is one of the most fundamental human activities. There are a large, varied, and increasing number of communication forms and practices available to modern workers, including text messaging, social media posting, and email, to name only a few. The amount of email, alone, transmitted in the modern era is staggering. According to Statista ("Number of sent and received e-mails per day worldwide from 2017 to 2015"), over 300 billion emails were transmitted in 2020 (statista.com statistics/456500/daily-number-of-e-mails-worldwide/). Many of such emails are work-related. Reportedly, an average worker spends 28 percent of their work week on email, more than 11 hours a week. With the average person sending and receiving 124 work emails every day, or 620 emails every week, workers spend an average of 1.1 minutes on each email. Hackeling, E. "How Much Time are You Spending on Email." Published on Front Page. Apr. 17, 2020. Others estimate that average time per email runs to 3 minutes, 5 minutes, or longer. According to HubSpot (blog.hubspot.com/sales/average-email-open-rate-benchmark), less than 20% of sales-related emails are typically opened and less than 10% of links provided in such emails are acted on.

A significant number of attempts to improve on communication systems, such as email generation systems, have been proposed, and some actually developed, though the type of systems commercially available remain very limited in the amount of assistance that they provide users. Early attempts at such systems required human-intensive data tagging methods, generation and use of rigid templates, and the like. With the development of artificial intelligence methods and tools, such as neural networks, there has been some progress in the development of fully automated or nearly fully automated messaging. However, successful commercial embodiments of such systems are primarily limited to very short messages, such as chat bots. Another area of focus, at least in patent literature, is on systems that aid a user to reply to an incoming message or series of messages. In contrast, nearly none of the art has focused to date on the development of messages that initiate communications, such as aiding users in the development of so-called "cold call" email campaigns.

A tremendous amount of research is being put into the development of artificial intelligence systems (albeit not all of it focused on language interpretation or generation). According to the Bipartisan Policy Center, the US Federal Government spent an estimated 5 billion dollars in AI-related research in 2019. The Verge reports that between 1998 and 2018 there was a 300% increase in the publication of peer-reviewed articles on artificial intelligence. According to IPlytics, the United States had nearly 280,000 patent applications directed to artificial intelligence systems/methods as of March 2019.

The patent literature is replete with longstanding attempts to propose or develop message generating systems. An early example of such a system is described in U.S. Pat. No. 9,454,760, which describes formulation of responses to messages, storage of responses, and conditional embellishment of such responses. Some of these systems provide for selection of messages from a variety of system-generated options (see, e.g., US 2020/0042613). US 2019/0286712 describes a template-based message system, where templates are modified for new conversations, and select fields are populated for transmission. US 2019/0213601 describes a system for generating customer-related messages, reviewing for quality standards, modifying messages where necessary, and transmitting the modified messages. US 2020/0134018 describes systems in which a variety of message elements ("triggers") are classified in at least some messages, whereas other messages include rules-based structures, such as greetings, confirmations, and reminders. US 2018/0367475 describes systems in which conversational context data is used to generate messages (use of incoming messages as context to generate replies may similarly be an element in other patent disclosures). U.S. Pat. No. 10,241,999 describes systems that include data regarding a recipient's interests, employing a linguistic engine to generate words/phrases associated with the interests and personality of the recipient, to evaluate such messages, modify some of the messages, and display the modified messages to a user, in cases recommending changes to message(s) to a user. U.S. Pat. No. 9,454,760 describes message-generating systems including embellishment of messages using extraneous content/sources. US 2020/0134018 describes a tagged data message system comprising semantic extraction of elements and use of templates for generating responses according to certain schedules. U.S. Pat. No. 10,681,739 describes a system that analyzes message context data including time, location, subject, and prior conversations, determining a predicted scenario, and retrieving/providing suggested message content, which a user can adjust, and then message is sent, and prediction engine of the system updated. U.S. Pat. No. 10,929,469 describes a method for content subject suggestions comprising extracting text within an email body of an email, displayed through an email creation interface, generating a set of n-grams, identifying features of n-grams within the set of n-grams, utilizing classifiers, trained using a training set of email body text and email subjects, to assign probabilities to the n-grams within the set of n-grams based upon the features, a probability specifying a strength of an n-gram in relation to a user preference of the user for an email subject derived from the n-gram, identifying a set of target n-grams from the set of n-grams based upon the set of target n-grams having assigned probabilities exceeding a threshold; identifying a single common theme amongst a plurality of target n-grams within the set of target n-grams, wherein the plurality of target n-grams comprises a first target n-gram associated with the single common theme and a second target n-gram associated with the single common theme, wherein the first target n-gram is different than the second target n-gram; responsive to identifying the single common theme, generating an email subject suggestion based upon the single common theme; and providing the email subject suggestion through the email creation interface. A somewhat similar system/approach is described in U.S. Pat. No. 10,091,140. U.S. Pat. No. 10,601,739 also discloses systems with several of the features described in the systems of this paragraph and other elements for message generation.

Other patent disclosures are directed to the use of neural networks for generating messages or other documents. U.S. Pat. No. 11,216,510, for example, describes computer-implemented methods for suggesting a message using a neural network through receiving text of an incomplete message entered by a user; obtaining word embeddings for the text of the incomplete message, wherein a word embedding represents a corresponding word in a first vector space; processing the word embeddings with the neural network to compute an input message feature vector, wherein the input message feature vector represents the incomplete message in a second vector space; obtaining a set of designated messages, wherein each designated message is associated with a designated message feature vector, and a designated message feature vector represents a corresponding designated message in the second vector space; computing a similarity score for each designated message of the set of designated messages by processing the input message feature vector and the designated message feature vectors, wherein a first similarity score for a first designated message is computed using the input message feature vector and a first designated message feature vector corresponding to the first designated message; selecting the first designated message from the set of designated messages using the first similarity score; presenting the first designated message to the user; receiving a selection of the first designated message from the user; determining a response by processing the selection of the first designated message; and transmitting the response to the user. U.S. Pat. No. 11,157,693 describes a digital medium environment for rewriting input text in a writing style of a target author, implemented by at least one computing device, the method comprising receiving input text and an indication of the target author for which the input text is to be stylized; determining, by the at least one computing device, the writing style of the target author; rewriting, by the at least one computing device, the input text in the writing style of the target author using a language model trained with a corpus of text written in a language of the input text and with a corpus of text associated with the target author, the language model being trained by: separating the corpus of text written in the language of the input text into individual sentences and masking a subset of words in each of the individual sentences; and causing the language model to predict, for each word in the masked subset of words, an original value of the word based on at least one preceding word in the corresponding one of the individual sentences; and outputting, by the at least one computing device, the rewritten input text. US 2021/0126881 describes a customized message suggestion system/method with user embedding vectors where a message may be suggested to a user participating in a conversation using one or more neural networks where the suggested message is adapted to the preferences or communication style of the user. The suggested message may be adapted to the user with a user embedding vector that represents the preferences or communication style of the user in a vector space. To suggest a message to the user, a conversation feature vector may be computed by processing the text the conversation with a neural network. A context score may be computed for one or more designated messages, where the context score is computed by processing the user embedding vector, the conversation feature vector, and a designated message feature vector with a neural network. A designated message may be selected as a suggested message for the user using the context scores. The suggestion may then be presented to the user. US 2018/0005112 describes an artificial neural network with side input for language modelling and prediction comprising a processor and an interface configured to receive one or more input sequence items; wherein the processor is configured to: implement an artificial neural network; and generate one or more predicted next items in a sequence of items using the artificial neural network by providing an input sequence item received at the at least one input interface and a side input as inputs to the artificial neural network, wherein the side input is configured to maintain a record of input sequence items received at the input interface. U.S. Pat. No. 11,055,497 describes natural language generation of sentence sequences from textual data with paragraph generation model by a method including receiving a plurality of pieces of textual data comprising structured data from one or more databases; generating a sentence ID sequence including one or more sentence IDs from the plurality of pieces of textual data using a paragraph generation model; and generating a sentence corresponding to each of the one or more sentence IDs included in the generated sentence ID sequence, from the sentence ID sequence and the plurality of pieces of textual data, wherein the paragraph generation model is a model trained by using training data, the training data comprising a pair of previously collected pieces of textual data of a paragraph, as an input, and a sentence ID sequence obtained based on the previously collected pieces of textual data of the paragraph, as an output, and wherein sentence ID sequences included in the training data are obtained by: classifying sentences included in previously collected paragraphs into clusters based on a similarity between sentence vectors corresponding to the sentences; assigning a same sentence ID to sentences classified into a same cluster; and generating a sentence ID sequence comprising sentence IDs assigned to sentences included in each paragraph. U.S. Pat. No. 11,030,515 describes methods for determining semantically diverse responses for providing as suggestions for inclusion in electronic communications including identifying a candidate set of responses for consideration for inclusion in a reply to a transmitted electronic communication directed to a user, each of the responses of the candidate set including one or more tokens and being determined based on content of the electronic communication; selecting a first response, of the responses of the candidate set, for inclusion in a selected set; generating a first embedding over a neural network response encoder model based on applying the first response as input to the neural network response encoder model, the first embedding encoding semantic information of the first response; generating a second embedding over the neural network response encoder model based on applying a second response, of the responses of the candidate set, as input to the neural network response encoder model, the second embedding encoding semantic information of the second response; subsequent to generating the first embedding and the second embedding: calculating a measure between the first embedding and the second embedding; determining, based on the measure, whether the second response satisfies a difference criterion relative to the first response; in response to determining that the second response satisfies the difference criterion, selecting the second response for inclusion in the selected set; and providing the responses of the selected set for display in an interface rendered by a client device of the user, the interface enabling selection of any one of the responses of the selected set for inclusion in a reply electronic communication that is a reply by the user to the electronic communication. WO2020068234 describes an automated content editor comprising a neural network having been trained to compute a change representation from pairs, each pair comprising a representation of a first version of a content item and a second version of the content item, and for each of the change representations, predict an updated content item from the change representation and the first version of the content item and a processor configured to receive an input content item and to compute an updated version of the input content item according to a change representation, using the neural network. U.S. Pat. No. 9,934,515 describes a content recommendation system using a neural network language model comprising obtaining a sequence of tokens that represent a user history for a user, the sequence of tokens including one or more first tokens and one or more second tokens, each of the one or more first tokens being associated with a respective media item presented to the user and each of the one or more second tokens being associated with a respective action performed by the user; obtaining a target output for the sequence of tokens, the target output identifying a next token subsequent to the last token in the sequence of tokens; processing the sequence of tokens using a neural network having a plurality of weighting values, the neural network being configured to: process each token in the sequence of tokens in accordance with the weighting values to predict, after processing a last token in the sequence of tokens, an output token that is the next token subsequent to the last token in the sequence of tokens; and determining an error value between the target output and the output token generated by the neural network. U.S. Pat. No. 10,496,920 describes systems/methods for enhanced communication assistance with deep learning comprising receiving a first communication provided by a user; providing, by the one or more computing devices, a first set of sequential communication data descriptive of the first communication provided by the user for input into a machine-learned communication assistance model that comprises a detection portion that comprises a first recurrent neural network and a replacement portion that comprises a second recurrent neural network; receiving, by the one or more computing devices, one or more indications that respectively identify one or more problematic statements included in the first communication, the one or more indications output by the first recurrent neural network of the detection portion of the machine-learned communication assistance model; receiving, by the one or more computing devices, one or more suggested replacement statements to respectively replace the one or more problematic statements, the one or more suggested replacement statements output by the second recurrent neural network of the replacement portion of the machine-learned communication assistance model; and providing, by the one or more computing devices, information regarding the one or more problematic statements for display to the user, wherein providing, by the one or more computing devices, the information regarding the one or more problematic statements for display to the user comprises providing, by the one or more computing devices, the one or more suggested replacement statements for display to the user.

A number of similar patent disclosures focus on the importance of recurring neural networks in the practice of such methods. E.g., WO2019242001 describes methods/systems for generating content comprising receiving original material, obtaining a first word set including at least a word describing the affective feature of the original material; and generating the content by predicting each segment from a respective word in the first word set through a Recurrent Neural Network (RNN), wherein the RNN has been pre-trained by using at least one literary genre including modern poem or wherein the original material comprises at least one of a picture, an audio, a video, and context of a conversation with a chatbot. US 2018/0329884 describes a neural contextual conversation learning system/methods comprising receiving an inquiry string using a recurrent neural network (RNN) encoder-decoder architecture adapted to improve a relevancy of the generated response string by adapting the generated response based on an identified probabilistic latent conversation domain, the apparatus comprising: a first RNN configured to receive the inquiry string as a sequence of vectors x and to encode a sequence of symbols into a fixed length vector representation, vector c; a contextual neural network (CNN) pre-configured for inferring topic distribution from a training set having a plurality of training questions and a plurality of training labels, the CNN configured to: extract, from the sequence of vectors x, one or more word features; generate syntactic features from the one or more word features; and infer semantic representation based on interconnections derived from the training set and the syntactic features to generate a fixed length topic vector representation of a probability distribution in a topic space, the topic space inferred from a concatenated utterance of historical conversation and representative of the identified probabilistic latent conversation domain; and a second RNN used as a RNN contextual decoder for estimating a conditional probability distribution of a plurality of responses, the second RNN configured to: receive the vector c and the fixed length topic vector representation of the probability distribution in the topic space; apply a layered gated-feedback mechanism arranged in a context-attention architecture to recursively apply a transition function to one or more hidden states for each symbol of the vector c to generate a context vector $c_i$ at each step, one or more gates of the context-attention architecture configured to automatically determine which words of the received inquiry string to augment and which to eliminate based on the vector c; for each word of the response string, estimate a conditional probability of a target word $y_i$ defined using at least a decoder state $s_{i-1}$, the context vector $c_i$, and the last generated word $y_{i-1}$; and generate the response string based at least on selecting each target word $y_i$ having a greatest conditional probability. U.S. Pat. No. 10,049,106 describes natural language generation through character-based recurrent neural networks with finite-state prior knowledge comprising building a target background model using words occurring in training data, the target background model being adaptable to accept subsequences of an input semantic representation, the training data includes training pairs, each training pair including a semantic representation and a corresponding reference sequence in a natural language; receiving human-generated utterances in the form of speech or text; predicting a current dialog state of a natural language dialog between a virtual agent and a user, based on the utterances; generating a semantic representation of a next utterance, based on the current dialog state, the semantic representation including a sequence of characters; and generating a target sequence in a natural language from the semantic representation, comprising: after generating the semantic representation, adapting the target background model to form an adapted background model, which accepts all subsequences of the semantic representation; representing the semantic representation as a sequence of character embeddings; with an encoder, encoding the character embeddings to generate a set of character representations; and with a decoder, generating a target sequence of characters, based on the set of character representations, wherein at a plurality of time steps, a next character in the target sequence is a function of a previously generated character of the target sequence and the adapted background model; and outputting the target sequence.

A number of patent disclosures focus on chatbot systems, virtual assistants, and other short message/reply-based systems (see, e.g., the above-referenced US '613 publication, US 2020/0244607). Such systems can provide recommended messages to users (see, e.g., US 2021/012688 and US 2020/0202194). US 2019/0005024, for example, describes a virtual assistant providing enhanced communication session services comprising a system that receives content that is exchanged within a communication session (CS), wherein the content includes one or more natural language expressions that encode a portion of a conversation carried out by a plurality of users participating in the CS; determining one or more content features based on the content and one or more natural language models, wherein the one or more content features indicate one or more intended semantics of the one or more natural language expressions; determining a relevance of the content based on the content features, a user-interest model for a first user of the plurality of users, and a content-relevance model for the first user; identifying one or more portions of the content based on the relevance of the content and one or more relevance thresholds, wherein the one or more identified portions of the content are likely relevant to the first user; and generating a summary of the CS based on the one or more likely relevant portions of the content. Such messages described in any of these types of systems are not linguistically complex and, accordingly, have been capable of being generated with earlier generation artificial intelligence/neural network systems with some success, particularly in terms of responses to customer inquiries. This is also reflected in the widespread commercial use of such systems in recent years but leading organizations.

The use of neural networks has advanced in recent years, such that neural networks have been employed to the drafting of large documents, including full articles. The GPT-3 system, from OpenAI, for example, has received significant attention for its capabilities in word prediction, among other functions (see, e.g., Brown et al., "Language Models are Few-Shot Learners," initially published May 28, 2020, available at 1larxiv.org/abs/2005.14165). Other advanced language models have also been developed for text development functions (see, e.g., Keshkar et al., "CTRL: A Conditional Transformer Language Model for Controllable Generation," Sep. 20, 2019, available at arxiv.org/abs/2005.14165). However, despite the impressive capabilities of such newer systems, there remains a well-known "truthfulness" problem and other types of reliability problems with the use of neural networks for preparing such materials, rendering the reliability of artificial intelligence methods for the generation of such content unreliable (see, e.g., Perrigo, "An Artificial Intelligence Helped Write This Play. It May Contain Racism." Time.com, Aug. 24, 2021, and Naughton, J., "The Truth About Artificial Intelligence? It Isn't That Honest." The Guardian. Oct. 2, 2021).

One approach to deal with this issue, particularly in connection with "fake news" generated increasingly by artificial intelligence ("AI") models, is Grover, an AI model developed by R. Zellers et al. of AI2/UW Allen School (grover.allenai.org) (see also (arxiv.org/pdf/1905.12616.pdf). The team at Grover reports that the "the best way to detect neural fake news [generated by an AI content generator] is to use a model that is also a generator." However, Grover does not, for example, do a sufficient job at generating messages even with message-related prompt data (unpublished results of some of the inventors), evidencing that a variety of factors impact the performance of such neural network based systems including general natural language capabilities of the model, amount of specific training the model has received, the model's training related to prompts, the nature of the training data and the output, and the model's training in terms of message output.

Organizations that have made available artificial intelligence message drafting tools, such as Copy.ai, regie.ai, flowrite.com, lavender.ai, and Hyperwrite (hyperwritea-i.com/othersideai.com) generate different types of content from various inputs. None of these platforms appear to have achieved widespread success yet in terms of regular use by organizations that seriously rely on communications for achieving organizational goals, such as sales. While the specific workings of these platforms do not appear published, certain features and limitations of each system is apparent from use made available to the public.

Copy.ai does not appear to have the capability of generating personalized output, and, accordingly, the messages it generates would not likely be consistently effective in personal communications, such as would result in influencing sales practices, hiring, and the like.

Hyperwrite provides an artificial intelligence writing system that allows users to input and to either generate a sentence of a paragraph of text in response to such a prompt. The system includes the ability to select from two tones (formal and informal). Several different draft paragraphs are presented to the user via an interface and the user is provided the opportunity to rate the paragraph or sentence or edit one or more of the paragraphs or sentences. At least initial uses of the Hyperwrite system indicates that while some results are impressive, it may have difficulty dealing with certain inputs and possibly in terms of truthfulness of output (adding content to the output that far exceeds the scope of the input), consistent with other AI platforms presently available. Hyperwrite also does not generate complete messages, but only paragraphs or sentences. While the simplicity of the Hyperwrite platform may be attractive for certain users, its lack of controls, different types of prompt inputs, and other features may limit its uptake for use with organizations that need efficient ways to reliably generate effective messages for company performance, such as in a sales context.

Regie.ai reportedly offers a variety of AI-facilitated message generating services, including generation of social media posts, scanning of hiring content for appropriate wording, and generation of sales-related email messages in related messaging campaigns (sales sequences). Campaigns include both inbound, follow up, and outbound campaigns. Part of the service reportedly includes an "AI Email Assistant" that generates subject lines, value props (propositions), and cold emails. The AI Email Assistant appears to allow users to input, store, and re-use different value propositions as well as to personalize a message using an article from the recipient's company web site, the recipient's LinkedIn posts, or a few other categories of information. The service integrates with sales engagement platforms, such as HubSpot, Outreach, and Salesloft. Users are permitted to select a "campaign tone." The subject line generator part of the service provides users with a variety of system-generated subject lines and the ability to like or edit such outputs. The service also includes a call script builder. An example message displayed on the main web site are multi-paragraph messages with prompts for entering names and personalization steps. Users are apparently prompted to select campaign types from a menu and then follow the plan outlined for them in such a program, which includes generation/transmission of such messages. However, as there is not a significant amount of detail regarding the design of the service available, it is not clear what types of prompts can be provided in the generation of such messages, what steps the platform takes in terms of learning and ensuring truthfulness (preventing message corruption), generate variability in messages, or move to different types of recipients, content, etc.

Flowrite.com appears to allow for the input of different types of prompts as well as settings to generate messages that include greetings, closings, and multiple paragraphs. In one example presented on Flowrite.com, a message is generated using a prior message apparently as a prompt along with a few additional short segment inputs (yes and a date/time indicator), thereby generating a response, which is an area of significant focus in the art. In another exemplified case, the Flowrite system appears to generate communication-initiating emails by accepting a series of three clause/sentence fragment prompts, apparently in order along with selection of tone/context/goal (e.g., sales prospecting or project status update, etc.) to generate a multi-paragraph communication-initiating message. As little is presented about how the system works, it is unclear what type of learning capability the Flowrite system uses, if any, and whether the system has any mechanism for prevention of message corruption (untruthfulness). Also, the system appears to be limited in terms of the type of content that has to be inputted into the system, the singular nature of such input in terms of message generation, and the like of variability in messages, among other issues. Thus, while Flowrite.com appears to potentially generate interesting and often useful messages, in at least some cases such a system may still not address the issue of message truthfulness over time, present enough variability for users to generate truly personalized messages or provide a balance of customization and ease of use that will enable the system to work in a variety of settings, users, topics, and audiences.

Lavender.ai appears to offer an email generation system/service that is similar to Flowrite, but that is targeted specifically towards generation of sales-related emails and that provides feedback to a user regarding the complexity of proposed emails and then offers the ability for the user to have the system/service suggest improvements. Similar to other systems available on the internet, the operation of Lavender.ai is not clear with respect to the system's ability to learn or improve with continued use, the ability to consider contextual information, or the ability to ensure truthfulness of messages following either system error or user editing. For at least these reasons, the usefulness of Lavender.ai as a tool for regular use is questionable. Moreover, like other systems described above, the ability of Lavender.ai to effectively generate personalized messages is also unclear.

The preceding discussion demonstrates that there are a wide variety of approaches that have been proposed or are being employed in systems for generating artificial intelligence-facilitated messages. Nonetheless, significant problems and limitations in messaging-related artificial intelligence systems persist, despite the significant amount of investment in the field, indicating that the development of truly effective artificial intelligence-facilitated messaging systems, which reliably generate effective complex messages in a flexible and personalized manner, requires new approaches involving significant human inventive ingenuity.

BRIEF DESCRIPTION OF THE DRAWINGS/FIGURES

The drawings/figures included in this disclosure, the brief description of such figures provided here, and the more detailed description provided in the Illustrated Embodiments Shown in the Figures below, are intended to exemplify certain aspects and principles of the invention without limiting its scope.

FIG. 7 illustrates an exemplary interface module identified in an exemplary user interface of a system provided by the invention.

FIG. 10 illustrates an exemplary interface module identified in an exemplary user interface of a system provided by the invention.

Figure 18:
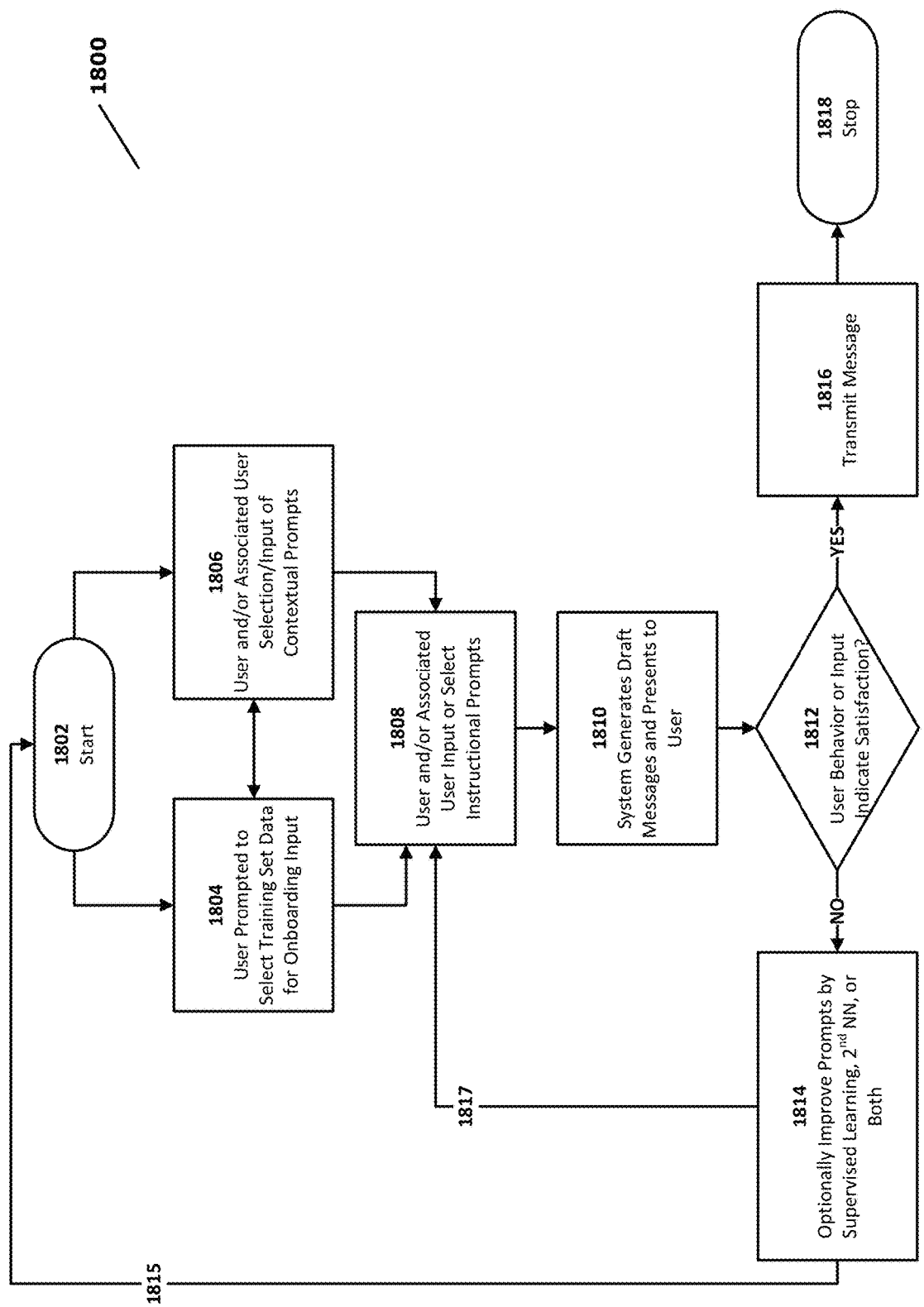

FIG. 18 a flowchart illustrating the performance of a method comprising repeat iterations of steps of such a method to obtain a level of user satisfaction as part of making a system of the invention ready for further use.

Figure 19:
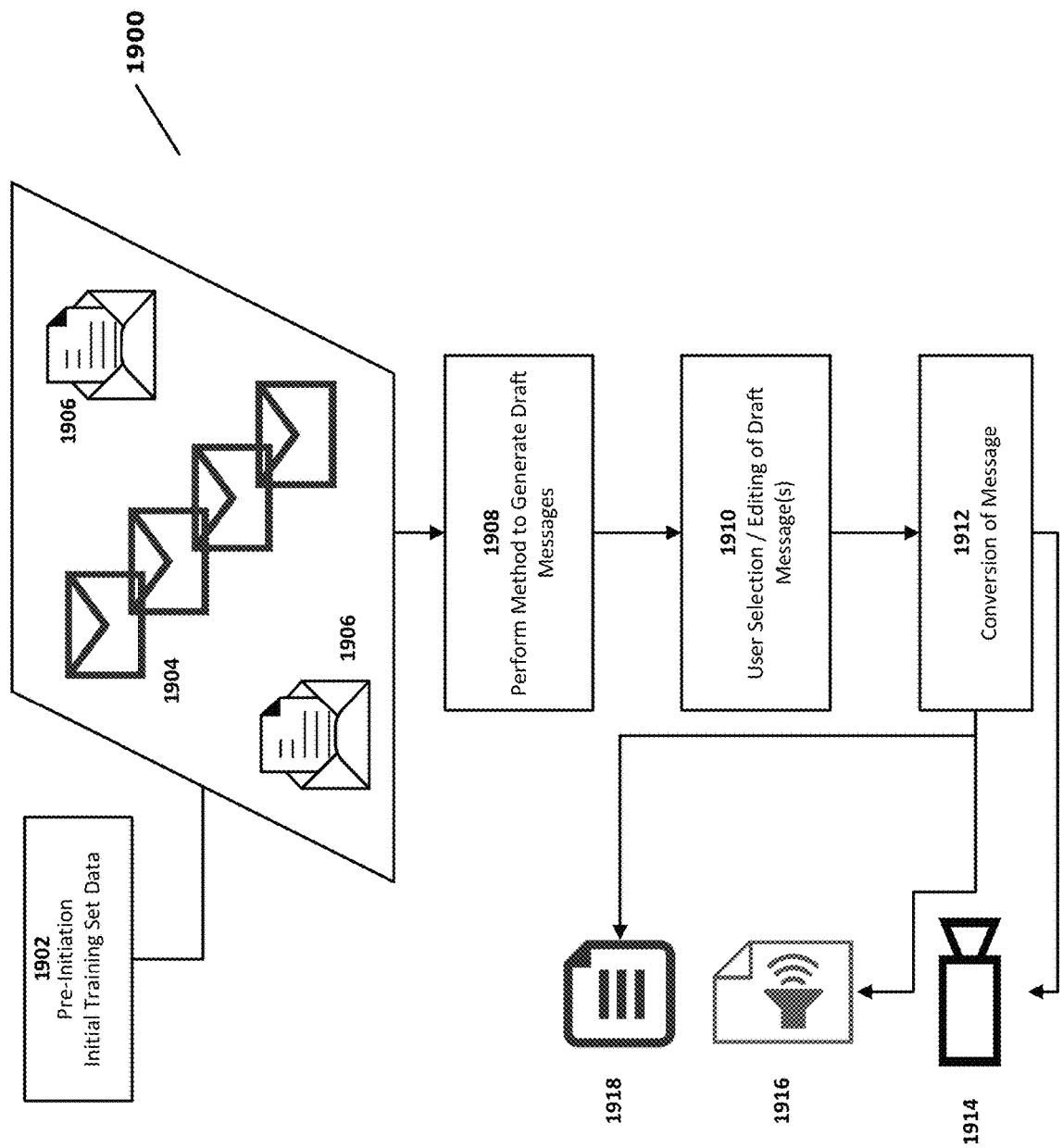

FIG. 19 is a flowchart illustrating an exemplary process for modifying a message for use in various media forms that are different from the content and form of information in most or all of a training set data used by a system of the invention in the generation of system-generated draft messages.

Figure 20:
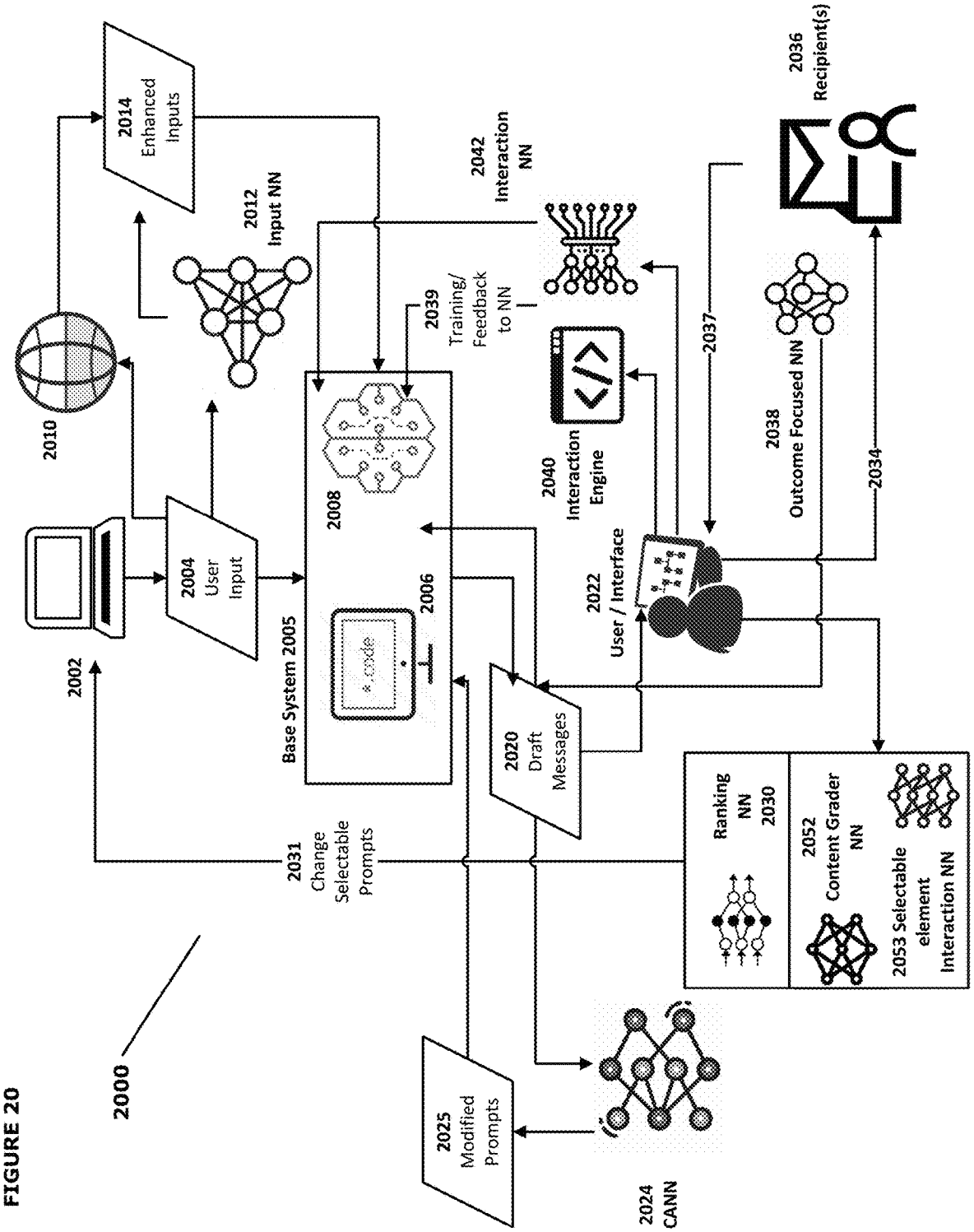

FIG. 20 provides a hybrid system/process map of a multi-neural network system and its operation in accordance with certain exemplary aspects.

Figure 21:
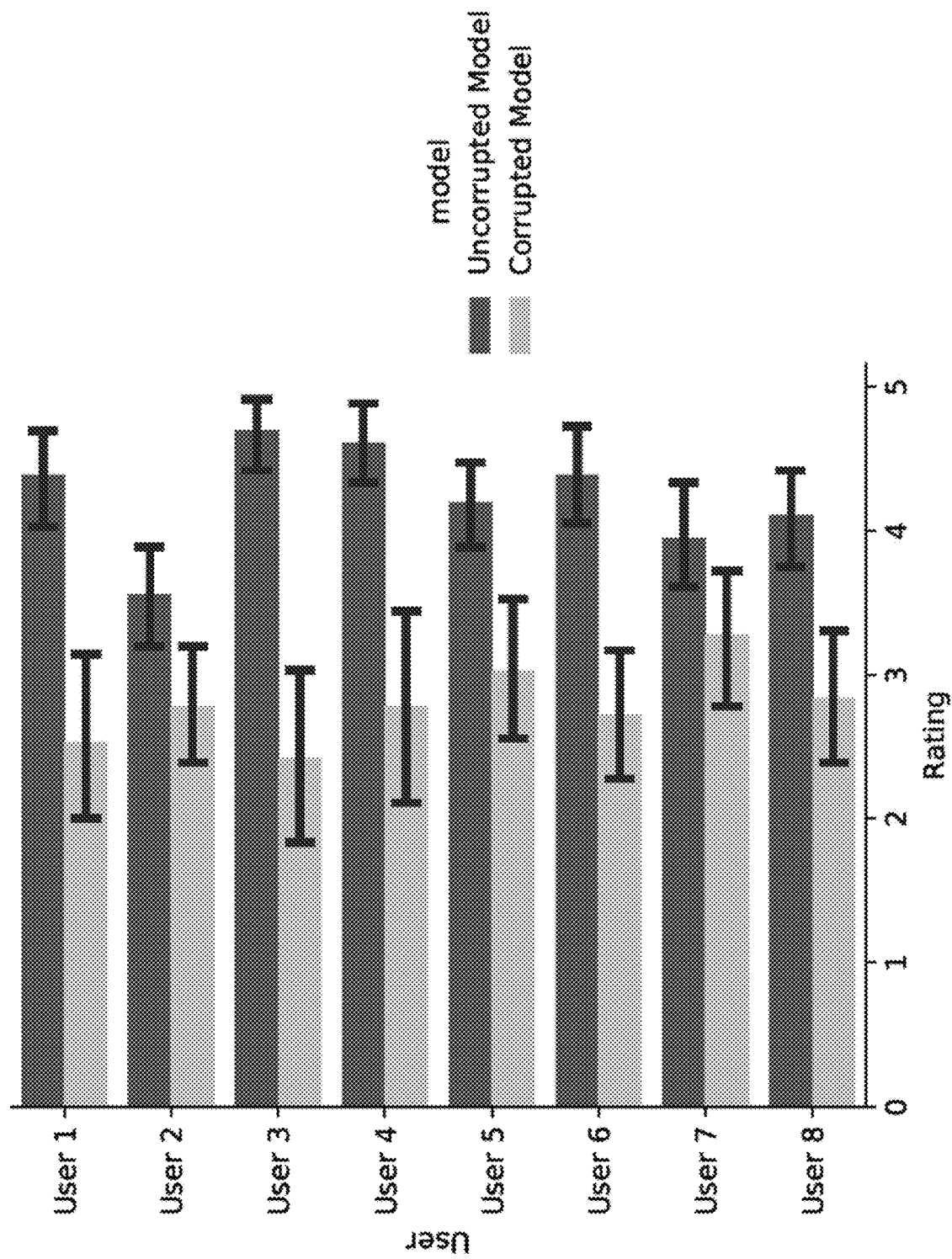

FIG. 21 is a graph of truthfulness score (corruption/truthfulness rating) measurements for each participant in a study evaluating a number of system-generated messages having either prompt corruption levels similar to those associated with neural network message-generating systems of the prior art or having uncorrupted prompts such as are generated by systems/methods of the invention.

Figure 22:
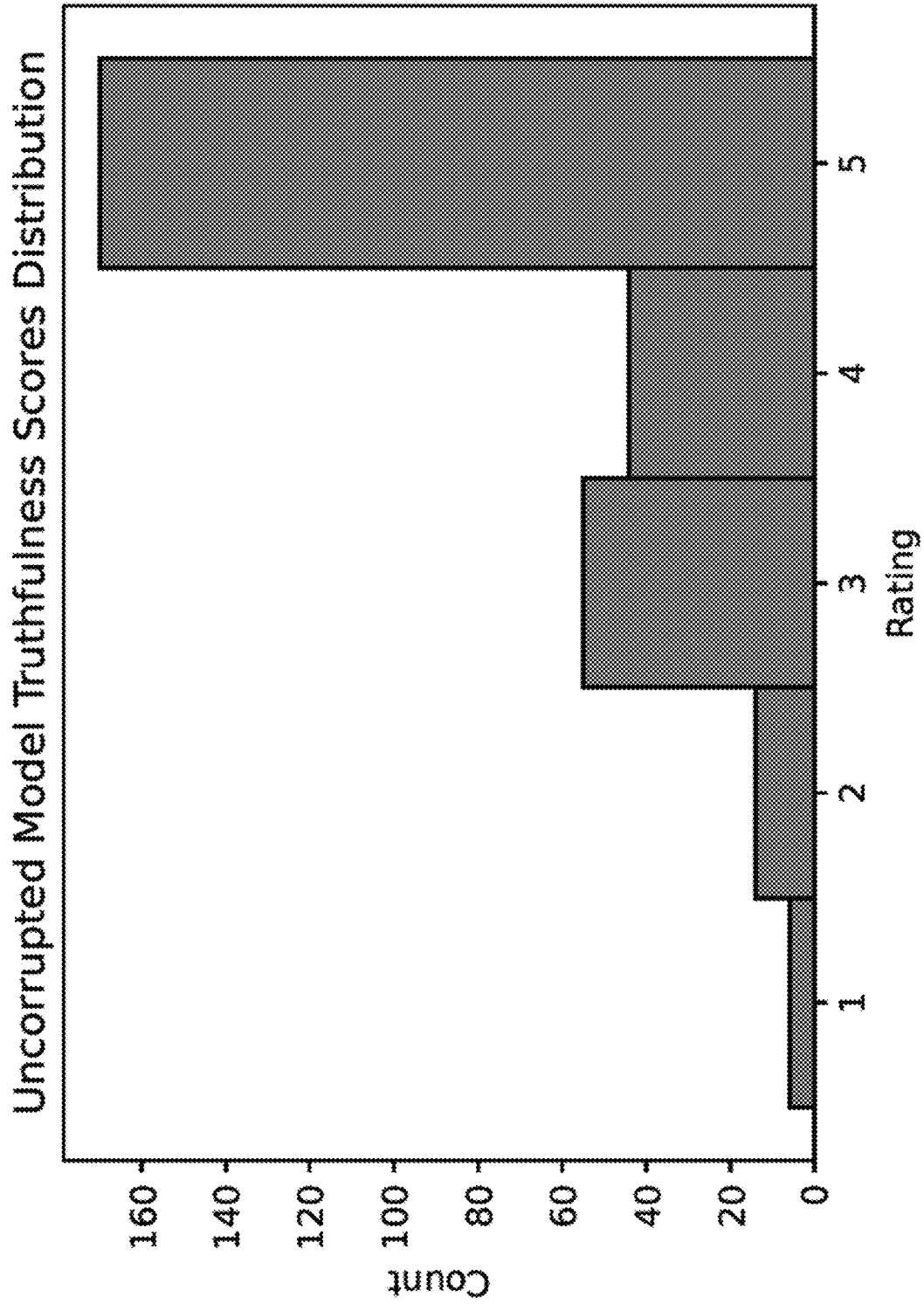

FIG. 22 is a graph of the distribution of uncorrupted model truthfulness scores/rating for participants in the study described in respect of FIG. 21.

Figure 23:
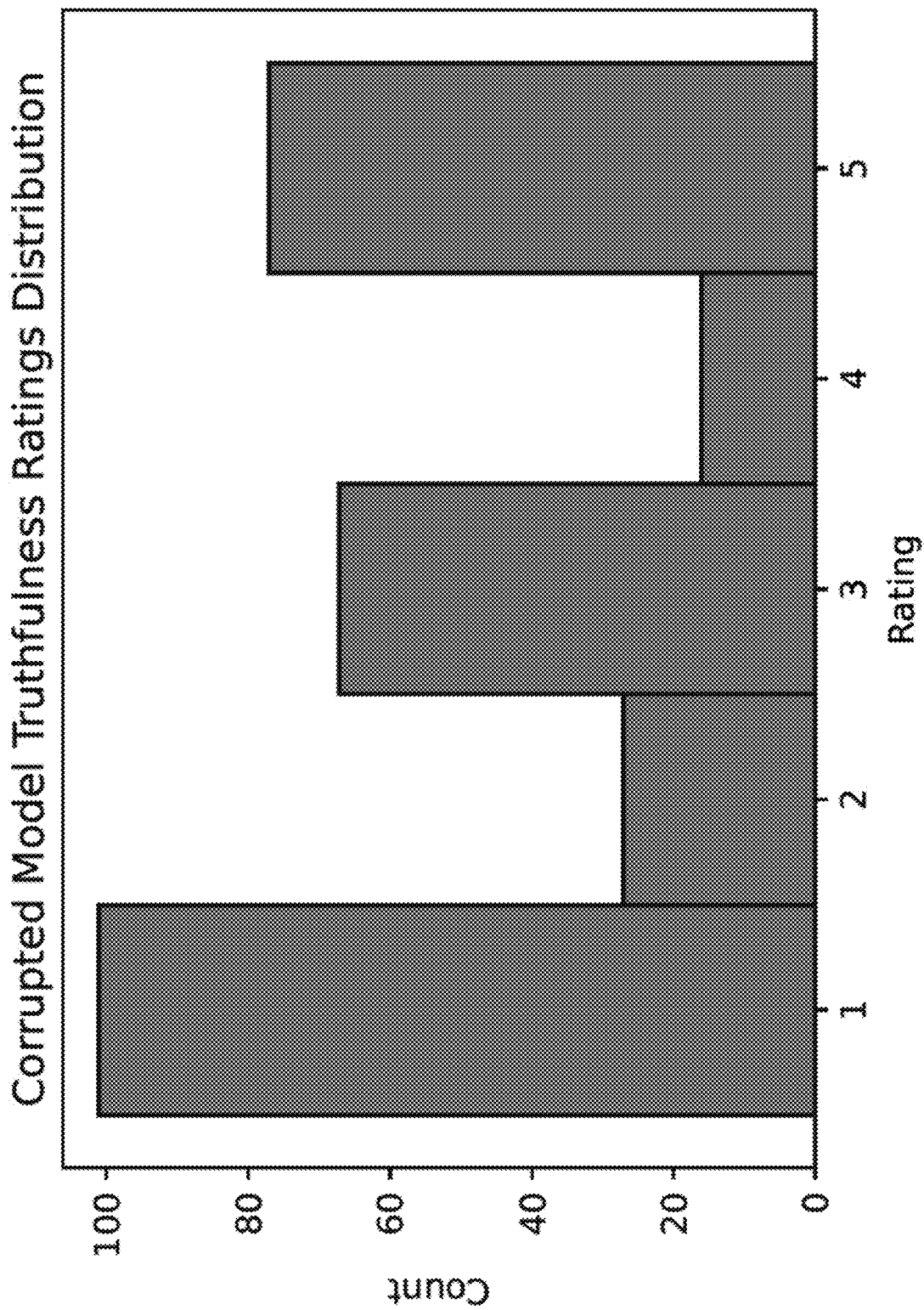

FIG. 23 is a graph of the distribution of corrupted model truthfulness scores/rating for participants in the study described in connection with FIG. 21.

CONSTRUCTION, TERMS, AND ACRONYMS

This section offers guidelines for reading this disclosure. The intended audience for this disclosure ("readers") are persons having ordinary skill in the practice of technologies discussed or used herein. Readers may also be called "skilled persons," and such technologies called "the art." Terms such as "understood," "known," and "ordinary meaning," refer to the general knowledge of skilled persons. The term "uncontradicted" means not contradicted by this disclosure, logic, or plausibility based on knowledge of skilled persons.

Disclosed here are several different but related exemplary aspects of the invention ("aspects") (also called "cases," "facets," or "embodiments"). The invention encompasses all aspects, as described individually and as can be arrived at by any combination of such individual aspects. Thus, any reference to "aspects" (e.g., "according to aspects" or "in an aspect") will be understood as referring to according to any and all of the other suitable aspects described herein. The breadth and scope of the invention should not be limited by any exemplary embodiment(s). No language in this disclosure should be construed as indicating any element/step is essential to the practice of the invention unless such a requirement is explicitly stated. Uncontradicted, any aspect(s) can be combined with any other aspect(s).

Uncontradicted, all technical/scientific terms used here generally have the same meanings as commonly understood by skilled persons, regardless of any narrower examples or descriptions provided here (including any term introduced initially in quotations). However, aspects characterized by the inclusion of elements, steps, etc., associated with specific descriptions provided here are distinct embodiments of the invention. Uncontradicted, disclosure of any aspect using known terms, which terms are narrowed by example or otherwise in this disclosure, implicitly discloses related aspects in which such terms are alternatively interpreted using the broadest reasonable interpretation of skilled persons.

Uncontradicted, "or" means "and/or" here, regardless of any occasional inclusion of "and/or" (e.g., phrases such as "A, B, or C" and "A, B, and/or C" simultaneously disclose aspects including (1) all of A, B, and C; (2) A and C; (3) A and B; (4) B and C; (5) only A; (6) only B; and (7) only C (and also support sub-groupings, such as "A or B," "A or C," etc.)).

Uncontradicted, "also" means "also or alternatively." Uncontradicted, "here" & "herein" mean "in this disclosure". The term "i.a." ("ia" or "ia") means "inter glia" or "among other things." "Also known as" is abbreviated "aka" or "AKA" and can mean also known in the art or also referred to herein as. Uncontradicted, "elsewhere" means "elsewhere herein."

For conciseness, symbols are used where appropriate. E.g., "&" is used for "and," & "~" for "about." Symbols such as < and > are given their ordinary meaning (e.g., "≤" means "less than or equal to" & "≥" means "greater than or equal to"). A slash "/" can represent "or" ("A/B" means "A or B") or identify synonyms of an element, as will be clear from context.

The inclusion of "(s)" after an element or a step indicates that ≥1 of such an element is present, step performed, and the like. E.g., "element(s)" means both 1 element or ≥2 elements, with the understanding that each thereof is an independent aspect of the invention.

Use of the abbreviation "etc." (or "et cetera") in association with a list of elements/steps means any or all suitable combinations of the recited elements/steps or any known equivalents of such recited elements/steps for achieving the function(s) of such elements/steps. Terms such as "and combinations," or "or combinations" regarding listed elements/steps means combinations of any or all such elements/steps.

Uncontradicted, terms such as "suitable" and "suitability" mean acceptable or appropriate for performing a particular function/achieving particular state(s)/outcome(s), and typically means effective, appropriate, and practical.

Uncontradicted, heading(s) (e.g., "Construction, Terms . . . ") and subheadings are included for convenience and do not limit the scope of any aspect(s). Uncontradicted, aspect(s), step(s), or element(s) described under one heading can apply to other aspect(s) or step(s)/element(s) here.

Ranges of values are used to represent each value falling within such range that are within an order of magnitude of the smallest endpoint of the range without having to explicitly write each value of the range. E.g., a recited range of 1-2 implicitly discloses each of 1.0, 1.1, 1.2, . . . 1.9, and 2.0 and 10-100 implicitly discloses each of 10, 11, 12, . . . 98, 99, and 100). Uncontradicted, all ranges include the range's endpoints, regardless of how a range is described. E.g., "between 1-5" includes 1 and 5 in addition to 2, 3, and 4 (and all numbers between such numbers within an order of magnitude of such endpoints, e.g., 1.0, 1.1, . . . 4.9, and 5.0). For the avoidance of doubt, any number within a range, regardless of the order of magnitude of the number, is covered by the range (e.g., a range of 2-20 covers 18.593).

Terms of approximation (e.g., "about," "—," or "approximately") are used (1) to refer to a set of related values or (2) where a precise value is difficult to define (e.g., due to limits of measurement). Uncontradicted, all exact values provided here simultaneously/implicitly disclose corresponding approximate values and vice versa (e.g., disclosure of "about 10" provides explicit support for the use of 10 exactly in such aspect/description). Ranges described with approximate value(s) include all values encompassed by each approximate endpoint, regardless of presentation (e.g., "about 10-20" has the same meaning as "about 10-about 20"). The scope of value(s) encompassed by an approximate term typically depends on the context of the disclosure, criticality or operability, statistical significance, understanding in the art, etc. In the absence of guidance here or in the art, terms such as "about" should be interpreted as +/−10% of the indicated value(s).

Lists of aspects, elements, steps, and features are sometimes employed for conciseness. Unless indicated, each member of each list should be viewed as an independent aspect. Each aspect defined by any individual member of a list can have, and often will have, nonobvious properties vis-a-vis aspects characterized by other members of the list.

Uncontradicted, the terms "a" and "an" and "the" and similar referents encompass both the singular and the plural form of the referenced element, step, or aspect. Uncontradicted, terms in the singular implicitly convey the plural and vice versa herein (in other words, disclosure of an element/step implicitly discloses corresponding use of such/similar elements/steps and vice versa). Hence, e.g., a passage regarding an aspect including X step supports a corresponding aspect including several X steps. Uncontradicted, any mixed use of a referent such as "a" in respect of one element/step or characteristic and "one or more of" with respect to another element/step or characteristic in a paragraph, sentence, aspect, or claim, does not change the meaning of such referents. Thus, for example, if a paragraph describes a composition comprising "an X" and "one or more Ys," the paragraph should be understood as providing disclosure of "one or more Xs" and "one or more Ys."

"Significant" and "significantly" mean results/characteristics that are statistically significant using ≥1 appropriate test(s)/trial(s) in the given context (e.g., p≤0.05/0.01). "Detectable" means measurably present/different using known detection tools/techniques. The acronym "DOS" (or "DoS") means "detectable(ly) or significant(ly)."

Uncontradicted, for any value here that is not accompanied by a unit of measurement (e.g., a weight of 50 or a length of 20), any previously provided unit for the same element/step or the same type of element/step will apply, or, in cases where no such disclosure exists, the unit most commonly used in association with such an element/step in the art applies.

Uncontradicted, the terms "including," "containing," "comprising," and "having" mean "including, but not limited to" or "including, without limitation." Uncontradicted, use of terms such as comprising and including regarding elements/steps means including any detectable number or amount of an element or including any detectable performance of a step/number of steps (with or without other elements/steps).

For conciseness, description of an aspect "comprising" or "including" an element, with respect to a collection/whole (e.g., a system, device, or composition), implicitly provides support for any detectable amount/number or ≥~1%, ≥~5%, ≥~10%, ≥~20%, ≥~25%, ≥~33%, ≥~50%, ≥~51%, ≥~66%, ≥~75%, ≥~90%, ≥~95%, ≥~99%, or ~100% or essentially all of the whole/collection being made up of the element (i.e., that the collection consists essentially of the referenced element). Similarly, a method described as including a step with respect to an effect/outcome implicitly provides support for the referenced step providing ≥~1%, ≥~5%, ≥~10%, ≥~20%, ≥~25%, ≥~33%, ≥~50%, ≥~51%, ≥~66%, ≥~75%, ≥~90%, ≥~95%, ≥~99%, or ~100% of the effect/outcome, representing ≥~1%, ≥~5%, ≥~10%, ≥~20%, ≥~25%, ≥~33%, ≥~50%, ≥~51%, ≥~66%, ≥~75%, ≥~90%, ≥~95%, ≥~99%, or ~100% of the steps/effort performed, or both. Explicit listing of percentages of elements/steps in connection with aspects does not limit or contradict such implicit disclosure.

Uncontradicted, terms such as "comprising" when used in connection with a step of a method provide implicit support for performing the step once, ≥2 times, or until an associated function/effect is achieved.

Uncontradicted, the term "one" means a single type, single iteration/copy/thing, of a recited element or step, or both, which will be clear from context. For example, the referent "one" used with a component of a composition can refer to one type of element (which may be present in numerous copies, as in the case of an ingredient in a composition), one unit of the element, or both. Similarly, "one" component, a "single" component, or the "only component" of a system typically means 1 type of element (which may be present in numerous copies), 1 instance/unit of the element, or both. Further, "one" step of a method typically means performing one type of action (step), one iteration of a step, or both. Uncontradicted, a disclosure of "one" element provides support for both, but uncontradicted, any claim to any "one" element means one type of such an element (e.g., a component of a composition/system).

The term "some" means≥2 copies/instances or ≥5% of a listed collection/whole is, or is made up of, an element. Regarding methods, some means≥5% of an effect, effort, or both, is made up of or is attributable to a step (e.g., as in "some of the method is performed by step Y") or indicates a step is performed ≥2 times (e.g., as in "step X is repeated some number of times"). "Predominately," "most," or "mostly," means detectably >50% (e.g., mostly comprises, predominately includes, etc., mean>50%) (e.g., a system that mostly includes element X is composed of >50% of element X). The term "generally" means≥75% (e.g., generally consists of, generally associated with, generally comprises, etc., means≥75%) (e.g., a method that generally consists of step X means that 75% of the effort or effect of the method is attributable to step X). "Substantially" or "nearly" means≥95% (e.g., nearly all, substantially consists of, etc., mean≥95%) (e.g., a collection that nearly entirely is made up of element X means that at least 95% of the elements in the collection are element X). "Generally free," "generally none" and the like mean≤25%. Substantially free" and "substantially none" mean≤5%. Uncontradicted, "sometimes" means≥5% of the time, often means≥25% of the time, usually means≥50% of the time, terms such as "generally" and "generally always" mean≥75% of the time, and terms such as "substantially" or "substantially always" mean≥95% of the time.

Uncontradicted, any aspect described with respect to an optionally present element(s)/step(s) also provides implicit support for corresponding aspect(s) in which one, some, most, generally all, nearly all, essentially all, or all of such element(s) are lacking/step(s) not performed, in respect of the relevant aspect. E.g., disclosure of a system comprising element X implicitly also supports a system lacking element X. Uncontradicted, changes to tense or presentation of terms (e.g., using "comprises predominantly" in place of "predominantly comprises") do not change the meaning of the corresponding term/phrase.

Uncontradicted, all methods provided here can be performed in any suitable order regardless of presentation (e.g., a method comprising steps A, B, and C, can be performed in the order C, B, and A; B and A and C simultaneously, etc.). Uncontradicted, elements of a composition can be assembled in any suitable manner by any suitable method. In general, any methods and materials similar or equivalent to those described here can be used in the practice of embodiments. Uncontradicted, the use of ordinal numbers or indicators such as "first," "second," "third," and so on is primarily, though not exclusively, intended to distinguish respective elements rather than to limit the disclosure to a particular order of those elements. Uncontradicted, any elements, steps, components, or features of aspects and all variations thereof, etc., are within the scope of the invention.

Any elements associated with a function can be alternatively described as "means for" performing a function in a composition/device/system or a "step for" performing a part of a method, and parts of this disclosure refer to "equivalents," which means known equivalents for achieving a referenced function associated with disclosed mean(s)/step(s). However, no element of this disclosure or claim should be interpreted as limited to a "means-plus-function" construction unless such intent is clearly indicated by the use of the terms "means for" or "step for." Terms such as "configured to" or "adapted to" do not indicate "means-plus-function" interpretation, but, rather, describe element(s)/step(s) configured to, designed to, selected to, or adapted to achieve a certain performance, characteristic, etc., using teachings herein or in the art.

As used herein, the word "exemplary" means "serving as an example, instance, or illustration." The following detailed description is merely exemplary in nature and is not intended to limit application and uses. Any embodiment described herein as "exemplary" is not necessarily to be construed as preferred or advantageous over other embodiments. Except where explicitly indicated or clearly indicated by context, "improved" herein means "increased." In aspects, "improved" means "reduced," such as with respect to the toxicity of a composition. Uncontradicted, terms such as "enhanced," "improved," and the like are used synonymously.

All references (e.g., publications, patent applications, and patents) cited herein are hereby incorporated by reference as if each reference were individually and specifically indicated to be incorporated by reference and set forth in its entirety herein. Uncontradicted, any suitable principles, methods, or elements of such references (collectively "teachings") can be combined with or adapted to aspects. However, citation/incorporation of patent documents is limited to the technical disclosure thereof and does not reflect any view regarding the validity, patentability, etc., thereof. In the event of any conflict between this disclosure and the teachings of such documents, the content of this disclosure controls regarding aspects of the invention. Numerous references are cited here to concisely incorporate known information and aid skilled persons in putting aspects into practice. While efforts have been made to include the most relevant references for such purposes, readers will understand that not every aspect of every cited reference will apply to every aspect of the invention.

Additional Terms, Concepts, and Acronyms

The following description of certain terms and acronyms is provided to assist readers in understanding the invention. Additional acronyms may be only provided in other parts of this disclosure and acronyms that are well known in the art may not be provided here.

Uncontradicted, a "system" of the invention comprises an electronic device/collection of devices that is composed of interrelated/interacting components/devices (including, e.g., separate networked device(s)/component(s)), including (1) memory component(s) comprising computer-readable media including preprogrammed instructions for carrying out Function(s) ("engines") and (2) a computer/processing unit capable of reading/executing such instructions causing Function(s) to be performed. Typically, systems are characterized by the inclusion of one or more specially trained neural network(s) (NN(s)). The neural networks of the system are typically specially trained (or some, most, generally all of such NN(s) are specially trained) to perform specific Functions described herein (e.g., providing a distribution of semantic elements or interpreting content of a message and recommending instructional prompts based on the semantic content of the interpreted message). Terms such as "computing unit," "computer," and the like, typically mean a device comprising physical computer-readable media and a processor that processes ("reads") information in such media. The media can comprise informative data and also functional information (modifiable/programmable computer executable instructions (CEI)). Such instructions comprise specialized Engines and perform Functions. Computerized devices in communication with each other form a data network ("network"). Components of a in operation typically interact/communicate a recurring basis (typically a regular or continuous basis), usually using common communication protocols over digital interconnections for the purpose of sharing data, functions, or other resources. Networks typically comprise physical components, e.g., routers, switches, and the like, described elsewhere. Components of networks are sometimes described as "clients" and "servers." Client and server devices/components/Units are generally remote from each other and typically interact through a communication/data network. The relationship of client and server typically arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated in a user device, e.g., a result of user interaction, can likewise be relayed to a server.

Although system/network can be/comprise computers, typically systems comprise/have memory and processing capabilities that far exceed those of typical general-purpose laptops, mobile phones, etc., as well as comprising specialized instructions/systems for performing the particular processes described herein. Devices that can access a network with a system, or otherwise access a system, can, however, comprise laptops, mobile smart phones, etc.

Generally, any method described herein can be adapted to provide a corresponding system and vice versa. Accordingly, disclosure of any method simultaneously implicitly discloses a corresponding system that can carry out the indicated Functions and a disclosure of a system that comprises certain engine(s) or other components (e.g., certain trained NN(s)) implicitly discloses a corresponding method that comprises the steps for performing Functions corresponding to such engine(s), NN(s), or other component(s). Thus, uncontradicted, terms like "system" implicitly mean/disclose a corresponding "system or (i.e., and/or) method", and terms like "method" likewise implicitly disclose a corresponding "method or system."

The computer/software units/components of networks and systems can be characterized on the basis of "function(s)" that it/they perform. A "Function" or "function" is a computer-implemented action performed by a system component based on both preprogrammed computer readable and executed instruction(s), e.g., in response to input(s). A Function also can describe the result of step(s) of a method. The step(s) of such methods/elements of such Function(s) can comprise algorithms, methods, and the like described below.

Uncontradicted, the term "engine" (sometimes also referred to as an "Engine" or "data engine") refers to computer/processor-executable software program/application (code, algorithm, etc.) or other components of or executed by a computer system which is configured to perform specified function(s), based on computer-executable/readable instructions ("CEI") contained in a memory (such CEI typically make up much, most, generally all, or all of the engine), or an engine can refer to any other component(s)/system(s) that perform similar functions on a recurring basis (either automatically, conditionally/situationally, on command/selectably, or a combination thereof). Typically, an engine processes input(s) and generates output(s). An engine typically can be implemented on computer(s) located in one or more locations. In aspects, multiple components of an engine are installed and running on one or more computer(s); multiple instances of an engine are installed and running one or more computers; or both. The operation of an engine typically performs function(s), which can represent step(s) in method(s). Such corresponding aspects are implicitly described by any explicit description of an engine or a function (e.g., description of a system/component comprising an Engine for performing Function(s) implicitly discloses a method including performance of the Function as step(s)). An engine that receives User input and provides output, i.a., to an end User can be called an "application." Engines can make up part of, or also be described as, or can comprise "programs," code," "algorithms," or similar elements known in the art for the control of electronic computer systems.

Engines/programs typically can encoded/written in any form of programming language (code), including compiled or interpreted languages, or declarative or procedural languages; and it can be deployed in any form, including as a standalone program or as a module, component, subroutine, or other unit suitable for use in a computing environment (e.g., Python, Java, C++, Ruby, C#, Go, JavaScript, R, Swift, and the like, which are known in the art). A program may, but need not, correspond to a file in a file system. A program/Engine can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program/Engine can be deployed to be executed on one computer or on multiple computers that are located at one site or distributed across multiple sites and interconnected by a data communication network. Programs/engines also can be described as "instructions" or "computer-implemented instructions," "processor-implemented instructions", "computer-readable instructions," "computer implemented data engines," etc. Features/characteristics of engines are further described below. Functions can also be performed by more advanced systems/components in the context of methods/systems, such as neural network(s).

"Input" generally is understood in the art and can refer to/mean data that is provided to a system or system component (such as a neural network, engine, or the like), from any external source thereto. "Output" refers to data generated by the system and delivered, directly or indirectly, to one or more users. Output can also refer to activities performed under the control of a system or by a system (an output application). In typical aspects, output in methods/systems of this invention include draft messages generated, at least in part (e.g., mostly, generally entirely, or entirely) by the system.

An "interface" is understood in the art, and typically refers to any collection of components, engines, etc., that provide for interactions between a user and a computer, a network, or a system. In aspects, the term "interface" is used to refer a user interface implemented in the form of a web page or similar media that can be viewed/navigated on several devices via the internet (e.g., using standard web browser(s)) (a "web interface" or "software interface"). Such an interface typically comprises a preprogrammed layout specific to the user, user class, or both. A device that displays/accesses an interface, such as a specialized web interface, can be considered a device of a network. In aspects, devices that access a network comprise fixed/specialized interface hardware. As such, network devices are sometimes referred to as devices/interfaces; however, uncontradicted, any disclosure of one such aspect implicitly discloses the other and vice versa.

A network, system, or interface can comprise output unit(s), such as display unit(s). A display unit can be any suitable device/component for visually displaying information to users, such as a computer monitor/screen, etc. In aspects, display units can comprise or be interactive (e.g., touch screen devices). Interfaces also can relay or receive information in audio format. In this respect, the term display is to be implicitly understood as meaning a "sensory output" component of an interface, device, etc.

Terms such as "data" and "information" are used interchangeably here and are only limited to a specific form when so indicated by explicit definition/statement or clear context. Interrelated data, as recognized by the system or a system-component (through programming or otherwise), can be described as a "Record" or "record." Records can include, e.g., attributes (characteristics) and values (measurements/attributes). In connection with this invention, relevant records comprise, mostly comprise, or at least generally consist of (directly or when translated) natural language messages. E.g., a record can include the body of some, most, or all of an email or other message that is suitable for use with the systems/methods provided here. Records and other data can be stored in memory of the system or a device, etc. In cases, components/systems for collection of large amounts of data may be referred to as a "data repository" (examples of which include data lakes, data warehouses, databases, and the like). Systems of the invention can include such memory storage devices/systems and methods can include storing data generated by the systems/methods, e.g., method outcome data (described elsewhere) in such storage systems for later application.

Uncontradicted, data can be relayed, transmitted, etc. ("delivered") through any suitable mode/mechanism and terms such as relayed, transmitted, conveyed, etc. are used interchangeably unless otherwise specified. The terms upload and download can be used in relation to the direction of data flow to (into) and from (out of) a referenced system, device, or other source. Electronic information relayed between components or over a network is typically relayed in packets, which can comprise other information such as identification data, source data, destination data, size data, persistence information (time to live (TTL)), composition data (e.g., flags), etc., as known in the art and discussed elsewhere. Packets can be organized into "streams." Data also can be relayed via frames/chunks, or other known units/forms. Use of such terms can, accordingly, be considered exemplary herein, such forms being typically interchangeable or replaceable by data in other formats suitable for data transmission, storage, or both. Methods can include, for example, receiving data from one or more system components, e.g., from one or more neural networks, via streaming data delivery (and systems can comprise, e.g., streaming data processor(s)), and, in other aspects, data can be received in a batch mode, or methods/systems can operate in both modes, either somewhat concurrently, or by selection, or under different preprogrammed conditions.

The term "training" in connection with neural networks is understood in the art as comprising determining better/optimal operating parameters/conditions for a neural network to perform function(s). Typically, training comprises determining and applying the best set of weights for maximizing accuracy of an NN (adjusting weights in iteration(s) of use/performance), There are a variety of methods known in the art for evaluating neural networks, such as backpropagation. Uncontradicted, the term "training set" is used as understood in the art. Typically, the "training set" (and the term "training set data") refers to any and all data used to train a neural network. The terms "initial training set" and "initial training set data" (ITSD) are used in this disclosure to refer to training set data provided before the initial use of a neural network or before the neural network is re-trained in a significant re-training event. In aspects, a significant re-training event is one in which the system is provided with an amount of training that approximates 50% or more (e.g., ≥75%, ≥90%, ≥100%, etc.) of the prior initial training set. The "initial" descriptor also can be applied to other inputs, such as prompt data.

Neural networks of systems of the invention are typically artificial intelligence systems, wherein such systems continuously learn with further uses/iterations/applications. As such, in a typical system/method, training data can be being added to the overall training set (the initial training set plus any new training set inputs) with each operation of the system by operation of one or more system components (e.g., one or more neural networks that modifies inputs to the systems, weights of a first neural network, etc.). For example, in aspects, messages generated by an iteration of the system can be used as additional training data for subsequent iterations of the system. Neural networks also may undergo some amount of training by human system administrators or by operation of system components as described herein. In aspects where a system is specifically trained to "onboard" a new user, adapt to a new type of recipient, deal with new triggers, etc., methods can specifically include performing several rounds of collecting training data before considering a system fully functional or ready for intended/regular use, and the training data is intentionally intended to increase during such steps of the method.

"Initial training set data" ("ITSD") can be delivered to systems upon initiation of message-generation activities, which can be referred to as "in-process" or "in process" initial training set data. E.g., in a method the method can include initiating the system for the generation of messages, and then delivering in-process initial training set data (often concurrently or nearly concurrently with prompt data (situational prompts or instructional prompts)). Initial training set data also can refer to data that is used to "pre-train" a neural network, before a user initiates operation of the system to generate message(s). In aspects, NN(s) receive initial training set data only through pre-training (only receive pre-training ITSD). In other aspects, NN(s) only receive in-process ITSD. In aspects, NN(s) receive both pre-training ITSD and in-process ITSD. In such aspects, typically the amount of pre-training ITSD is greater, often significantly greater, e.g., ≥1.5×, ≥2×, ≥3×, ≥4×, ≥5×, ≥8×, ≥10×, ≥12×, ≥15×, ≥20×, ≥25×, or ≥30× the amount of data provided to the NN(s) as in-process ITSD.

It is worth noting that most neural networks of systems are pre-trained with data that is not classified as training data as that term is used herein. E.g., a first neural network/EPDNN will typically be significantly trained on one or more natural language models, which can be significantly larger than training sets used in other methods/systems of the invention (e.g., in aspects a system could utilize a powerful language modeling neural network platform, such as GPT-3, which was trained on Common Crawl (commoncrawl.org), believed to be one of the largest corpus ever used to train a neural network system. Although such background training data or baseline training data is not considered to be training data in the context of the methods/systems described herein, relevant parts of baseline training data can influence the performance of systems/methods, e.g., in terms of general word choice, sentence construction, paragraph construction, etc. Typically, background/baseline training is performed using general language corpus or corpora, such as WebText, Crawler, and the like.

Here, "prompts" with respect to neural network inputs typically are distinguished from "training set data," although those of skill in the art might identify/recognize "prompts" also as training set data of neural networks. Here, "prompts" refer to specific inputs that a user, associated user, system, or combination thereof provides to neural network(s) of the system that the system is specifically trained to recognize as different from other training set data, in, e.g., prioritization (in the case of instructional prompts and situational prompts) or in that such prompts contain non-content instructions for the system (e.g., in the case of template/structural prompts). Each of these types of prompts are described in detail below.

Uncontradicted, the term "semantic element" means a word, number, or symbol that imparts meaning. Types of semantic elements and the semantic element characteristics of messages, prompts, training set data, and the like are discussed elsewhere. Uncontradicted, "meaning" is used in the ordinary sense of the word and typically can be understood as referring to conveying, indicating, signifying, or referring to a thing, notion, etc. The basic units of meaning in natural language are well understood (nouns, verbs, adjectives, adverbs, prepositions, conjunctions, and the like). In aspects, a semantic element means a single word, number, or symbol (e.g., an emoji). In other aspects, a semantic element can include clauses, sentences, or groups of sentences. Unless otherwise specified, semantic elements refer to single words, numbers, or characters separated by a delimiter/punctuation (e.g., space(s), tab(s), comma(s), colon(s), period(s), ellipses, dashes, exclamation marks, question marks, and the like).

Uncontradicted, a "sentence" herein means any collection of interrelated words regarding a subject noun (notion, thing, person, etc.), including a verb. Sentences can be informal herein, not adhering to classic grammatical rules (e.g., a sentence might stylistically lack periods or other classic punctuation marks associated with the ends of sentences). In aspects, some, most, or generally all sentences in a draft communication are "full sentences" that comply or essentially comply with typical grammatical rules (e.g., in ending in a period, exclamation mark, or question mark). A "paragraph" means one or more sentences that are separated from other sentences by one or more indicators of grouping, such as separated by first sentence indentation, spacing, or both. In aspects, most paragraphs in messages comprise ≥2 sentences. However, in aspects, messages can include 1, 2, or 3 one-sentence paragraphs, which may be considered effective in certain types of writing (e.g., sales messages) by, e.g., providing focus to a particular sentence (e.g., "would you like to hear more?"). In aspects, paragraphs are interrelated through a "transition." A transition here means a sentence or clause that serves to connect a concept, subject, topic, action, or the like from one paragraph to another paragraph (e.g., if paragraph one talks about a team winning a game and paragraph two talks about a new software program a transition could talk about how the software program is allowing salespeople to win new leads). In aspects, messages generated by the system comprise "greetings" ("salutations"), which are understood in the art (e.g., "Hi XXX" or "Greetings YYY"). In aspects, messages generated by the system also include a "closing" ("regards") usually including a sentiment and often also including the sender's name (e.g., "Cheers! NAME" or "Best Regards, NAME."

Uncontradicted, terms such as "amend" and "amendment" in connection with changes to a record/data, such as changes to neural network prompt(s) (e.g., to an instructional prompt) means a change, which can comprise deletion(s), addition(s), or substitution(s) of semantic element(s). Terms such as "change," "modify," etc. can be used similarly herein.

Uncontradicted, a "communication-initiating message" means a message that is not in reply to an earlier message from the intended recipient of the message (i.e., is not in response to a particular earlier message). Such a message can also be considered an "opening message." In aspects, a "communication-initiating message" is a message in which a prior message from the intended message recipient to the intended sender is not a prompt, is not included in ITSD, or both. In aspects methods can include generation of "reply to" emails, other message responses, etc. In aspects, methods can include generation of replies after the system initially generates, and a user transmits, a communication-initiating message. In aspects, the system can be used to generate a second reply, third reply, and the like, with some, most, generally all, or all of the earlier messages (or parts thereof) used as prompts, training set data, or both in the generation of later messages in the message chain/sequence.

Uncontradicted, an "email" means any text communication that takes the form of or that is substantially similar to an email. In other words, an email in the broadest sense does not have to mean a message that is sent by any particular communication media, but, rather, refers more to the form of the communication (e.g., having a clear sender and recipient, comprising a greeting, closing, or both, and containing one or more paragraphs). Email in this sense can include "webmail" such as mail sent through Gmail and other leading webmail providers. Email can also mean a communication that is designed for a particular email program or platform (e.g., Microsoft Outlook). While the scope of email can be limited to communications transmitted through TCP/IP (e.g., SMTP and POP3), this is only one aspect of email type that can be generated by systems of the invention. As the historical divisions between "texting" (or "instant messaging") and email have broken down over recent years with, e.g., emails increasingly being sent over cellular networks and text messages becoming longer and more sophisticated, such that the formality of a greeting, a set apart paragraph of content or more (typically ≥2 paragraphs of content) and closing/regards are what separates emails from text messages for most people now.

Uncontradicted, "context" means data regarding facts or circumstances serve as setting, background, clarification, purpose (intent), or motivation regarding a communicated event, statement, or idea, or overall message. The term "context" can also refer to interrelated data in a data collection, such as a prompt. E.g., a situational prompt might include facts about hiring at a company as a "context." The term context is similar in this respect to terms such as "topic," "sub-topic," "subject," and the like. These terms are difficult to define with precision and are dependent on the scope/content of a communication and, accordingly, can often be interpreted interchangeably here if not contradicted by context or explicit statement. E.g., in a complex communication there may be an overall topic (e.g., hiring) and several sub-topics related thereto (salary, timing of hiring, nature of the position, and characteristics of desired candidates). Each of the sub-topics can be communicated through one or more clauses, sentences, and the like, if not complete paragraph(s). The term "category" also can be used in a similar sense herein to refer to interrelated clauses, statements, sentences, and the like, typically in a particular data record, data collection, etc., such as in a prompt. E.g., a "value proposition" ("value prop") is an example of a prompt category, which provides statement(s) summarizing why a recipient should purchase a product or service or take other requested/implied action(s).

For convenience of readers, a list of commonly used acronyms included in this disclosure and a description of the terms they represent is presented here:

TABLE 1

Select Acronyms

| Acronym | Full Term | Brief Description |
| --- | --- | --- |
| AI | Artificial intelligence | A term generally understood in the art. Typically, reference to AI can mean a NN or alternate form of AI that performs the described function, achieves the described result, etc., albeit maybe in a different way. |
| ASE | Alternative semantic element | Semantic element(s) that a system adds to a message that convey a meaning similar to a meaning of semantic elements of a prompt on its own, in combination with other ASEs or in combination with other sematic elements of a message. |
| CANN | Content analysis neural network | An NN (or group of NNs) trained to interpret the semantic content of messages for functions, applications, etc. |
| CSNN | Contextual Similarity Neural Network | An NN or NNG that is trained to compare the semantic content of two or more data sources, such as a message and a prompt data record |
| DR | Data repository | A database (SQL/no-SQL), data warehouse, data lake, or other type of repository of data forming part of a device or system memory, as applicable. |

TABLE 1-continued

Select Acronyms

| Acronym | Full Term | Brief Description |
|---|---|---|
| EPDNN | Element Prediction Distribution Neural Network | A NN (or group of NNs) that generate(s) a distribution of possible semantic elements for inclusion in location(s)/part(s) of system-generated draft message(s). |
| ITSD | Initial training set data | Data used to initially train a first NN/EPDNN for generating messages with respect to a new user, new type of message, new class of recipient, and the like. ITSD typically comprises (e.g., mostly comprises) template messages of the type the user wants the NN to mimic, but also can include training of the NN to recognize and use different types of prompts and other types of inputs (e.g., template/command prompts, meta categories/tags, and the like). |
| MITSD | Modified initial training set data | Training set data generated by modification (enhancement, editing) of ITSD by the operation of optional system process(es). |
| MVNN (also called a MONN) | Message variation neural network (message optimization neural network) | Neural network(s) trained and utilized in generating messages directly from other system-generated messages. In aspects, such methods are performed without use of other prompts or without use of prompts as sources of message variability (but optionally with the instruction to produce messages that are consistent with, sufficiently related to instructional prompts). |
| NLM | Natural language model | A term known in the art. |
| NLP | Natural language processing | A term known in the art. |
| NN | Neural Network | A term known in the art. |
| NNG | Neural Network Group | A group of NNs that comprise a NN that performs a particular function or that comprises multiple NN(s) that cooperatively perform a function. |
| PIM | Positive interaction message | A message that a user has exhibited a positive interaction towards, e.g., in terms of a positive rating, by storage of the message for future use, by editing of the message, or by transmission of the message to others. |
| TSD | Training set data | Any data that is specifically related to message to be generated by a system used to train NN(s) of the system, and typically given higher priority than background/general training data (such as background NLM/NLP training data). TSD comprises ITSD. TSD typically does not include prompts, though skilled persons recognize that prompts, like background training data, also are used to train NN(s) and as inputs for NN operations. |
| URD | User response data | Data comprising user response to draft messages, including no response, editing (e.g., degree or nature of editing), storage, transmission, or rating. |

In some cases, descriptions of terms and/or acronyms are repeated one or more times in the following portions of the disclosure to aid readability. In other cases, abbreviations are defined or used below but not included in this table (e.g., RNN).

SUMMARY OF THE INVENTION

The inventions described and claimed herein have many attributes and aspects including, but not limited to, those set forth in, e.g., described or referenced in, this Summary. This Summary of the Invention ("Summary") is not intended to be all-inclusive, and the scope of the invention is not limited to or by the aspects, features, elements, or embodiments provided in this Summary, which is included for illustrative purposes only and not restriction. Any of the aspects described under this section can be combined with any other aspect described in this section or with any other aspect of this disclosure.

The systems and methods provided herein provide effective use of artificial intelligence systems, particularly systems involving one or more neural networks, to generate effective communications efficiently. "Effective" in this respect means that systems/methods are able to generate a significant number of messages that users/authors can either transmit immediately or after relatively minimal editing, or are able to generate usable messages at least 5% of the time, at least 7.5% of the time, at least 10% of the time, ≥12.5% of the time, ≥15% of the time, or more. "Efficient" in this respect refers to the fact that, in aspects, users can generate messages in some, most, or generally all, uses in less than about 1 hour, less than about 30 minutes, less than about 15 minutes, less than about 10 minutes, or less than about 5 minutes. However, neither description is meant to limit the scope of the invention, but, rather, merely illustrate benefits of systems/methods in some aspects.

In aspects, the methods involve a user, an associated user, or both, submitting to a system instructional prompt data, and optionally also providing situational prompt data, to a system comprising one or more trained neural networks. The neural network(s) of the system/method are trained both in terms of general comprehension of one or more natural languages and also in terms of the recognition and priority handling of instructional prompt data, such that at least some times, often at least most of the time, and, in aspects, generally all of the time, at least some semantic elements contained in the instructional prompts is incorporated into messages generated by the system, at least some, most, or generally all of the statements in the instructional prompts are incorporated into most, generally all, or substantially all system-generated messages, or both. Methods/systems of the invention are further characterized, in aspects, by incorporation of one or more elements that provide for retention of instructional prompt content over iterative use of the method. In aspects, a second neural network (which can be one or more neural networks, such as a group of neural networks in a second group of neural networks) is provided that analyzes output of the method/system. In aspects, the second neural network analyzes draft messages generated by the system and uses the content of such messages as an input for recommending changes to the instructional prompts, automatically changing at least some of the instructional prompt content, or both, for use in subsequent iterations of the method. In methods/systems of the invention, a number of draft messages are generated and presented to a user by using the first neural network to generate a distribution of semantic element options for each semantic element that the system determines to include in a draft message and by using a sampling engine or other means for choosing among such semantic elements, to generate a plurality of different messages, which are presented to a user for rating/evaluating, transmitting, editing, or a combination of any or all thereof (e.g., rating, editing, and then transmitting). In aspects, the first neural network (which again, can represent one or more neural networks ("NNs") in a group of NNs), is pretrained with relevant training set data (a part of the "initial training set data"), such as records comprising content of or corresponding to at least parts of relevant messages (e.g., emails or parts thereof). The term "initial training set" in this respect can mean either or both message-related and process-related data used to pre-train a neural network before an iteration of the method/instance or use of the system, and training set data submitted "in operation" by a user (at initiation of the method/use of the system) (e.g., "in operation" submission of initial training set data can be in the form of exemplary messages that a user inputs, uploads, etc.). Thus, NNs can receive initial training set data by pre-training, in-process submission/upload, or both. In aspects, some, most, or at least generally all of the initial training set data is provided to NN(s) by pre-training the NN(s) before a user approaches the system to produce messages. In aspects, some, most, or at least generally all of the initial training set data is provided to NN(s) "in process" along with or near in time to the submission/input of situational prompts, instructional prompts, or both.

In aspects, the amount of content in most, generally all, or all, of the records that make up such training data are significantly larger than chat messages, but, optionally, smaller than other content, such as full articles, e.g., being between 300-4500 characters, 350-4500 characters, 250-2500 characters, 250-5000 characters, 200-5000 characters, 300-3000 characters, 100-5000 characters, 150-4500 characters, 220-3200 characters, 270-3200 characters, 280-3800 characters, 50-5000 characters, 50-3000 characters, 50-2500 characters, 150-4000 characters, 400-2800 characters, or 400-4000 characters. In aspects, most, generally all, or all training set records, draft messages prepared by the system, or both, comprise between about 50-1500 words, e.g., about 50-1250 words, 50-1000 words, 50-750 words, 100-2000 words, 100-1500 words, 100-1200 words, 100-1000 words, 150-1500 words, 150-1000 words, 150-750 words, 200-2000 words, 200-1600 words, 200-1200 words, 200-1000 words, 250-1250 words, 250-1500 words, 250-1750 words, or 250-2500 words.

Methods/systems of the invention can be used in the generation of effective, linguistically complex messages, often in an efficient manner. The characterization "linguistically complex" means that such methods can be, typically are, generally are, or always are messages that include a significant amount of content, as indicated in the preceding paragraph, as compared to a chat, and, in aspects, comprise a complex grammatical structure, e.g., as compared to a typical chat message. For example, in aspects, messages generated by the methods/systems can comprise two or more collections of multiple sentences, e.g., full paragraphs. Messages also or alternatively can include a recognizable message greeting/salutation, a recognizable closing, or both. Messages generated by systems/methods can be recognized to address two or more different types of topics (e.g., changing focus between different ideas/concepts, things/organizations/people, actions/events, or states/statuses). Recognition of such changes can be determined by, e.g., surveys of typical audience members, e.g., in an adequately powered survey, where, for example, a significant number, a majority, generally all, or even nearly all, of the surveyed typical audience members indicate that such a change has occurred. Messages also can include, in aspects, transitions between different topics, which, again, can be measured by, e.g., surveys of typical audience members. Methods/systems are effective in that, e.g., they obtain response rates that are similar to or in cases better than those achieved by average human performance (e.g., in terms of read rates, click-through rates, response rates, or other measures, e.g., associated sales rates, and the like). Methods/systems of the invention also are efficient in, e.g., not requiring a significant amount of instructional input in order to effectively operate and methods/systems also or alternatively are effective in maintaining and typically even improving in the accuracy of messaging (in aspects, detectably or significantly increasing the mimicking of style of the user or a selected individual the user is seeking to imitate, such as a thought leader/role model), e.g., in ensuring that instructional prompts remain "truthful" (not growing and not decreasing in content in a significant manner) over time. Another way to describe "truthfulness" of inputs, particularly over the course of use, is to say that the input remains "uncorrupted." Methods/systems of the invention are, in aspects, effective, in being deployable/usable within a limited number of uses by a user, due to the elements of the method/system as described herein.

In an exemplary detailed aspect, the invention provides methods/systems for efficiently generating effective linguistically complex messages that include (1) providing a user with access to an internet-connected computer system that comprises one or more neural networks, each neural network of the one or more neural networks comprising one or more layers of neurons, each of the neurons comprising one or more inputs and one or more weights associated with the one or more inputs, wherein at least a first neural network or first group of neural networks in the one or more neural networks further comprises or provides input to a language modeling engine of the system which is trained on a general natural language training set of at least five hundred million words in at least one natural language; (2) providing the user, through automatic operation of the system, with a human-system interface that receives input from the user and relays output to the user; and (3) training the first neural network or at least one neural network in the first group of neural networks with an initial training set, the initial training set comprising a plurality of training set message records. In aspects, most, generally all, substantially all, or all/each training set message record comprises data comprising data corresponding to a natural language message (e.g., an email message), and, in aspects, most, generally all, or all/each initial training set message comprises (a) a salutation (greeting) and (b) two or more paragraphs, each paragraph of the two or more paragraphs comprising (I) at least one sentence, each sentence being composed of (A) a collection of semantic elements and (B) (i) one or more punctuation elements or (ii) one or more other delimiters. A "semantic element" in this respect can comprise, consist, or consist essentially of a word, number, or a symbol representing one or more words in one or more natural languages. However, in aspects, a semantic element can comprise a number of, such as a collection of, words or similarly sized semantic elements (e.g., a semantic N-gram of 2, 3, 4, 5, or more words), a clause, a sentence, or a larger collection of words/similarly sized collection of characters/elements (e.g., of 2-25, 2-20, 2-18, or 2-15 characters, often with most such words/character collections/tokens being 2-12, 2-10, or 2-9 characters).

As noted, in aspects, a semantic element is a single word or similar token/character collection. In such aspects, a grouping of semantic elements might be described as a "collection." Typically, in a "collection of semantic elements" or another grammatical form that is understood to comprise a number of semantic elements, such as a clause, a sentence, and the like, at least some (e.g., at least 25% or at least 33%), or most, of the semantic elements are words, symbols that represent words other than mathematical functions, or combination thereof, and in aspects generally all of the semantic elements comprise words or symbols that represent words. In such aspects, the method is not employed entirely on content representing numbers, although the method can, at various levels, be employed on tokens, code, vectors, or the like that can comprise numbers or be expressed entirely as numbers, despite representing, at least in part, other characters, e.g., letters, emojis, and the like.

The method/system typically further involves (4) causing the user or an associated user to submit input comprising one or more prompts to the system via direct user input inputted via the interface, user selection of one or more presented prompts via the interface, or both, the prompts comprising one or more system-recognized instructional prompts and optionally further comprising one or more system-recognized situational prompts.

An "instructional prompt," as will be described below in detail, is a data input that is recognized by the system as being high priority data for use by the first neural network (NN). In aspects, the first NN (which, again, can actually represent a group of NNs in a "first group"), is pre-trained with a training set that includes one or more elements that will be used in instructional prompts in system/method operation, such that the NN is trained to "recognize" such instructional prompts, at least in some, most, generally all, and sometimes substantially all/all cases. In aspects, the first NN is also trained to prioritize instructional prompts, such as in being "penalized" for not recognizing instructional prompts, "rewarded" for recognizing instructional prompts, or both, or otherwise having the weights of some number of NN neurons modified in view of the recognition or unrecognition of instructional prompts. In aspects, at least some content of an instructional prompt is incorporated in drafter messages in at least about 25%, at least about 33%, at least most, at least about 65%, or generally all iterations of a method of the invention/use of a system.

"Situational prompts," in contrast to instructional prompts, are prompts that are typically given higher priority than, e.g., the content of words in the training set, alone, but may be treated at a similar level, or somewhat prioritized level, but are not prioritized as highly as the instructional prompts. Situational prompt input is "situational" in that it is situationally used usually based on whether the first NN determines that content in the situational prompt is "sufficiently related" to either the content of the training set, the content of the instructional prompt, or both. Sufficient relation, in such a respect, means that the NN determines there is a connection to the content of the situational prompt, based on the first NN's training, which will increase with system/method use (number of iterations performed). Typically, sufficiently related content is content that a significant number or a majority of typical users would also see as related or highly related to another referenced content, such as content of an instructional prompt, in a survey, e.g., an adequately powered survey of typical users. In aspects, the first NN will incorporate at least some highly related content, at least some related content, or both, in at least some, at least most, or generally all cases, after one iteration of the method, after a number (e.g., 5, 10, 15, 20, or 50) iterations, or both. In either case, the first NN can, and, in aspects, will generally or always evaluate the situational prompt content, as well as the instructional prompt content, and content of the initial training set (or training set in general, as the training set can grow with additional iterations of the method). However, in aspects, some, most, generally all, or all of any of the semantic elements of a situational prompt may not appear in drat messages generated by a system. In aspects, the generation of messages by systems are detectably modified by the inclusion of situational prompts, in at least some proportion of messages generated by the system when such prompts are present (e.g., ≥10% of the time, ≥15% of the time, ≥20% of the time, etc.), even when semantic elements of the situational prompts (or equivalent semantic elements thereof) do not appear in such messages. In aspects, semantic elements or equivalent semantic elements of situational prompts will appear in at least some messages generated by a system if there is sufficiently related semantic content in the instructional prompts, training set, or both.

In aspects, some, most, generally all, substantially all, or all of the situational prompt data is inputted, at least in an initial iteration of the method, if not in several, most, generally all, or all iterations, prior to the submission of the instructional prompt data. While not always required, in aspects, such ordering may result in better performance of the system. In other aspects, the instructional prompts are somewhat, mostly, generally always, substantially always, or always provided after the situational prompt inputs, at least on some iterations, such as in the first iteration of a method. In aspects, both data are inputted simultaneously, at least in part, at least mostly, generally, essentially/substantially, or entirely.

The next operation/function of the system, step of the method, typically is (5) by automatic operation of the system generating a plurality of draft messages through a process comprising the system automatically initiating composition of each draft message by a method comprising the first neural network or at least one neural network of the first group of neural networks automatically (I) evaluating the content of the instructional prompts and any situational prompts provided, (II) recommending inclusion of a semantic element, typically a sequentially next semantic element in the collection making up the draft message, and providing a distribution of semantic element options for each next semantic element in the draft message until the neural network determines or another element of the system directs that the draft message is complete, wherein the neural network generates the distribution of semantic element options based at least in part on an evaluation of message context. In a typical aspect, "message context" means (A) the content of the initial training set, (B) the situational prompts if any (inasmuch as in some methods/systems, situational prompts are not required to practice the method/ use the system), (C) the instructional prompts, and (D) the content of the draft message itself (e.g., as the message grows towards completion in aspects where the message is drafted element-by-element or in parts/"chunks."). The "context" is the content as semantically "understood" by the neural network, given the training of the neural network, both in respect of its general natural language model, and in respect of the specialized/particular training the first NN received with the initial training set (typically given after the development of an operational general natural language model/engine). Methods/systems are further characterized in, i.a., (III) the first neural network or at least one neural network of the first group of neural networks selecting one or more semantic elements contained in the situational prompts, if present, initial training set, or a combination thereof, which the neural network determines are sufficiently related to the instructional prompts and (IV) the neural network treating the instructional prompts as a priority context with respect to the incorporation of semantic elements into each draft message, such that, in at least about 80% of draft message at least some of the semantic elements of the instructional prompts or semantic element equivalents thereto are incorporated.

The method/system also typically further includes a step of (5)(b) by automatic operation of the system employing a sampling engine of the system to select one semantic element from each distribution of semantic element options generated by the neural network for each next semantic element, and incorporating each selected semantic element into the draft message until the until the neural network determines or another element of the system directs that the draft message is complete, wherein the sampling engine's selection of a semantic element from each distribution varies based on one or more programmable and selectable word variation settings that are either pre-programmed into the system or set directly or indirectly by the user or an associated user. As discussed below, the sampling engine can be a component of a system that is not operated as part of a neural network, at least in part. E.g., a sampling engine can be a more traditional computer system "engine" (function, algorithm, code, etc.), such as a random sampling engine, a greedy sampling engine, a beam sampling engine, a typical sampling engine, etc. As known in the art, beam search, e.g., uses several (e.g., 5) candidate sequences called beams, and considers several (e.g., again, five) next-best words for each beam. Then, it compares all of these (five beams*five words=25 candidates) and selects the top five candidates by probability. These become the beams in the next step, now one word longer than before. This has the advantage of giving the best sequences a few different possible beginnings. Also or alternatively, a sampling engine can use a random sampling technique, or a modification of such techniques, e.g., Top K or Top P sampling (also known as nucleus sampling). In another aspect, a sampling engine can employ stochastic beam search, which reportedly exhibits some of the best properties of both random sampling and beam search.

The method can further include a step/function of (6) by automatic operation of the system, presenting at least a plurality of the draft messages to the user, via the interface (e.g., displaying the draft messages on a screen) and (7) via the interface, having the user select at least one draft message from the plurality of presented draft messages as one or more selected messages. The method includes/system further provides (8) via the interface, permitting the user to (a) modify the content of at least one selected message to generate one or more modified messages, (b) transmit at least one selected message to the intended audience as one or more transmitted messages, (c) input an evaluation of at least one selected message to the system thereby identifying the at least one selected message as one or more evaluated messages, or (d) perform a combination of any or all of (a)-(c). Storing of messages is also a possible outcome.

Methods can include/systems further comprise (9) automatically by operation of the system (a) recording method outcome information (user response data) comprising (I) the user's selection of one or more draft messages and (II) information comprising at least one modified message or the user's generation of at least one modified message, (II) information comprising the user's transmission of at least one draft message, (III) the users' evaluation of at least one selected draft message, or (IV) a combination of any or all of (I)-(III) (or storage thereof for later use) and (b) storing such method outcome information (URD), relaying such method outcome information, or both, for further reporting, analysis, or use. Storing can be performed using the system memory, which can be any suitable cloud or locally based as physical, transferrable, computer-readable media (PTCRM) (e.g., computer-readable media that is physical, transferrable, and reproducible. E.g., transferable & reproducible signals with physical effects that execute Function(s), flash memory, RAM, etc., but excludes transient signals), such as non-transient, reproducible computer-readable media (NT-CRM) (in this context, "transient" meaning not be reusable, transferrable, or both), or any similar type of computer-storage media described elsewhere in this disclosure or otherwise known in the art.

Methods can further include/systems provide (10) analyzing one or more transmitted messages, evaluated messages, or modified messages generated of an iteration of the method as one or more analyzed messages, (b) evaluating the current instructional prompts and situational prompts based on the content of the one or more analyzed messages, and (c) changing the instructional prompts, situational prompts, or both, for use in subsequent iterations of the method to reflect the content of an evaluated message, modified message, transmitted message, or a combination of any or all thereof to incorporate one or more semantic elements of the evaluated message, modified message, transmitted message, or combination of any or all thereof or to make deletions of material that is not consistent with such positive interaction message(s). Also or alternatively, methods can include providing other feedback to the system, e.g., providing the neural network(s) of the system with feedback, such as a performance grade, which impacts the behavior of the system. Such feedback can come from human supervision, application of a different type of neural network (e.g., a continent grading neural network), or both. The invention also provides systems that can carry out such methods, e.g., by comprising at least one or two neural networks that perform such functions.

In aspects, methods/systems of the invention comprise steps/components for enhancing situational prompts, instructional prompts, training set data, or any combination thereof, which can be performed automatically or semi-automatically/selectively. Enhancement can be performed by, e.g., performing queries of internet data using known methods and collecting search results for additional to one or more of such prompts. In aspects, data is obtained from one or more social media sites for enhancing prompt(s), such as from LinkedIn, Twitter, Instagram, Facebook, and the like. In aspects, data is obtained selectively or automatically from a proprietary database/web service, such as Hoovers. In aspects, data is obtained from a customer relationship management (CRM) system, which are known systems configured to perform functions relating to managing interactions with customers of goods/services, e.g., the well-known Salesforce™ CRM. E.g., in aspects, emails or other messages stored in a CRM are retrieved by the system and used as training data for one or more neural networks in the performance of methods of the invention.

In aspects, methods include use of other neural network(s) to also or alternatively generate prompts from training set data, such as initial training set data. Still other aspects employ further specialized neural network(s) as described in the Figures and elsewhere.

As noted, the invention provides both methods of performing such steps and systems for carrying out such steps. E.g., in one aspect the invention provides a system that is specially adapted to carry out such method, e.g., in comprising one or more neural networks that are trained to perform one or more specific functions described above, particularly, i.a. (among other things), generating a distribution of possible alternative semantic element options for each semantic element that the neural determines to add to a draft message. Such specialized computer systems are an important aspect of the invention.

ASPECTS OF THE INVENTION

The following is a non-limiting list of exemplary aspects of the invention, which illustrates various embodiments of the invention in a summary form to aid readers in quickly understanding the overall scope of the invention.

Similar to patent claims, listed aspects described in the paragraphs of this section may make reference to (depend on/from) one or more other paragraphs. Readers will understand that such references mean that the features/characteristics or steps of such referenced aspects are incorporated into/combined with the referring aspect. E.g., if an aspect in a paragraph (e.g., a paragraph indicated by text at the end of the paragraph as aspect 2) refers to another aspect by one or more aspect numbers (e.g., aspect 1 or "any one of aspects 1-3"), it will be understood to include the elements, steps, or characteristics of such referenced aspects (e.g., aspect 1) in addition to those of the aspect in which the reference is made (e.g., if aspect 2 refers to aspect 1, it provides a description of a composition, method, system, device, etc., including the features of both aspect 1 and aspect 2). Reference to ranges of aspects should be interpreted as referencing all such aspects individually, each as unique embodiments of the invention, and in combination with one another as unique embodiment(s) of the invention, according to the presentation provided of such aspects, unless such an aspect within such a referenced range is either contradictory or nonsensical. If contradicted or non-sensical, readers will understand that the reference to the contradictory or nonsensically referenced aspect was inadvertent and such aspect should be considered excluded from the list of aspects without impacting the inclusion of any other referenced aspect(s).

In a first aspect, the invention provides a method for efficiently generating effective and linguistically complex comprising:

(1) providing a user with access to an internet-connected computer system that comprises one or more neural networks, each neural network comprising one or more layers of neurons, each neuron comprising one or more inputs and one or more weights associated with the one or more inputs, the neural network(s) comprising element prediction distribution neural network(s) (EPDNN(s)) that is/are trained on a natural language training set (e.g., a NLM training set of $\geq 100$ million, $\geq 250$ million, or $\geq 500$ million words) in $\geq 1$ natural language (e.g., $\geq 2$, $\geq 3$, $\geq 5$, or $\geq 10$ natural languages, such as English, Chinese, or Spanish);

(2) providing the user, through automatic operation of the system, with a human-system interface that receives input from the user and relays output to the user;

(3) further training the EPDNN(s) with an initial training set, the initial training set comprising training set message records, each training set message record comprising data corresponding to a natural language message, each initial training set message optionally comprising structural elements comprising (a) a salutation (greeting) and (b) two or more paragraphs, each paragraph of the two or more paragraphs comprising (I) at least one sentence, each sentence being composed of (A) a collection of semantic elements and (B) one or more delimiter (e.g., punctuation) elements, wherein a semantic element is a word, number, or a symbol representing one or more words in one or more natural languages and in a collection of semantic elements at least most of the semantic elements are words, symbols that represent words other than mathematical functions, or combination thereof;

(4) causing the user or an associated user to submit input to the system, by direct input via the interface, by selection of one or more selectable elements presented to the user via the interface, or both, the input comprising (a) one or more system-recognized instructional prompts or training set data that the system uses to automatically generate one or more system-recognized instructional prompts, or both, and (b) optionally further comprising one or more system-recognized situational prompts, one or more system-recognized structural prompts; or both;

(5) by automatic operation of the system generating a plurality of draft messages, each draft message generated by a process comprising (a) initiating composition of the message;
(b) adding semantic elements to the message until the system determines that at least most of the message is complete by
(I) the EPDNN(s) automatically evaluating the content of the instructional prompts and any provided situational prompts and generating a distribution of semantic element options for each semantic element that the system determines to add to the message before determining that at least most of the message is complete the distribution of semantic element options based at least in part on an evaluation of message context, wherein message context comprises
(A) the content of the initial training set,
(B) the consent of the situational prompts if any, and
(C) the content of the instructional prompts,
(II) the EPDNN(s) treat(s) content of situational prompts, if present, as a priority context in generating the distribution of semantic element options if the EPDNN(s) determine(s) that such content of the situational prompts is sufficiently related to content of the initial training set, instructional prompts, or a combination thereof, and (III) the EPDNN(s) treat(s) the instructional prompts as a priority content source in generating the distribution of semantic element options (e.g., such that, in at least about 80% of draft messages some, most, or all, of statements in the instructional prompts are incorporated in the message), at least most of the incorporated statements having a similar semantic meaning as corresponding statements in the instructional prompt, wherein a statement is sentence, clause, or other semantic element that conveys information that most individuals in a population of typical message recipients would determine are semantically distinct;

(c) by automatic operation of the system, employing a sampling engine of the system to select one semantic element from each distribution of semantic element options generated by the neural network, and incorporating each selected semantic element into the draft message, wherein the sampling engine's selection of a semantic element from each distribution varies based on one or more programmable and selectable word variation settings that are either pre-programmed into the system or set directly or indirectly by the user or an associated user; and (d) stopping the addition of semantic elements selected from distributions of semantic element options to the message, wherein the determination to stop the addition of semantic elements is based on a recommendation of the EPDNN(s), system message rules, or both;

(6) by automatic operation of the system, presenting at least a plurality of the draft messages to the user, via the interface;

(7) via the interface, having the user select at least one draft message from the plurality of presented draft messages as one or more selected messages;

(8) via the interface, permitting the user to (a) modify the content of at least one selected message to generate one or more modified messages, (b) transmit at least one selected message to the intended audience as one or more transmitted messages, (c) input an evaluation of at least one selected message to the system thereby identifying the at least one selected message as one or more evaluated messages, (d) store at least one message as a stored message for later use, or (e) perform a combination of any or all of (a)-(d);

(9) optionally, by automatically by operation of the system (a) recording user response data (aka, method outcome information) comprising information regarding (I) the user's editing of message(s), (II) the user's transmission of transmitted message(s), (III) the user's evaluation of message(s), (IV) the user's storage of message(s), or (V) a combination of any or all of (I)-(IV) and (b) storing or relaying such user response data to one or more recipients, system components, or both, or both storing and relaying such URD, e.g., for further reporting, analysis, or use; and

(10) for each iteration of the method, by operation of the system, automatically (a) analyzing (a) the content of one or more transmitted messages, positively evaluated messages, stored messages, or modified messages as one or more positive interaction messages (PIMs), (b) analyzing the user response data, or (c) analyzing the compliance of one or more draft messages with message standards (e.g., by NN analysis) and (b) based on the analysis evaluating (I) the current instructional prompts, situational prompts, or both, (II) the compliance of messages to message standards, (III) the operating performance or operating parameters of the EPDNN(s), or (IV) any combination thereof, and (c) if the evaluation determines a change in operation of the system would generate improved messages, automatically, prior to a sequent iteration of the method, (I) changing the instructional prompts, situational prompts, or both, (II) changing the operating parameters of the EPDNN(s) (e.g., by providing training to the EPDNN(s), such as through EPDNN-recognized feedback), (III) providing feedback to the EPDNN concerning message compliance with standards (e.g., as described in connection with NNs such as CSNN(s)), or (IV) performing a combination of any one or more of (I)-(III) (and thereafter repeating steps of the method with such modification(s) in place) (aspect 1).

In aspects, the invention provides the method of aspect 1, wherein the method requires the user or an associated user to input at least one situational prompt (aspect 2).

In aspects, the invention provides the method of aspect 1 or aspect 2, wherein the training set message records comprise communication-initiating messages, the draft messages are usable as draft communication-initiating messages, or both, wherein a communication-initiating message is a message that is intended to initiate a communication between a transmitter/author and one or more audience member regarding at least one subject (aspect 3).

In aspects, the invention provides the method of any one or more of aspects 1-3 wherein the change in instructional prompts significantly reduces the likelihood of message corruption over a number of iterations of a method (e.g., 2-50, 2-40, 2-100, 2-200, or 2-20 iterations of the method) (aspect 4).

In aspects, the invention provides the method of any one or more of aspects 1-4, wherein (1) no draft message is generated as a response to a prior message of an audience member or (2) the method does not use a prior message from an audience member to the user or transmitter/author as training set data, prompt data, or both (aspect 5).

In aspects, the invention provides the method of any one or more of aspects 1-5, wherein the method requires the user to input or select at least one situational prompt (aspect 6).

In aspects, the invention provides the method of any one or more of aspects 1-6, wherein in at least most cases the system stops generation of draft messages when the neural network transmits an end message signal or end message recommendation (aspect 7).

In aspects, the invention provides the method of any one or more of aspects 1-7, wherein the system is preprogrammed to end drafting of draft messages based on information including the number of semantic elements, number of characters, or both, contained in draft messages (aspect 8).

In aspects, the invention provides the method of any one or more of aspects 1-8, wherein the system is preprogrammed to end drafting of draft messages based on information comprising the presence of semantic element redundancy in the draft message (aspect 9).

In aspects, the invention provides the method of any one or more of aspects 1-9, wherein the sampling engine selects selected semantic elements based on information comprising the immediately previously selected semantic element incorporated into the draft message (aspect 10).

In aspects, the invention provides the method of any one or more of aspects 1-9, wherein the sampling engine selects one or more of the selected semantic elements in the draft message based on information comprising a portion of the draft message that is drafted prior to the selection of the one or more selected semantic elements (aspect 11).

In aspects, the invention provides the method of any one or more of aspects 1-9, wherein the sampling engine selects one or more of the selected semantic elements in the draft message based on information comprising a most, substantially all, or the entirety of the draft message that is drafted prior to the selection of the one or more selected semantic elements (aspect 12).

In aspects, the invention provides the method of any one or more of aspects 1-12, wherein step (10) of the method is performed by a method comprising the system automatically (1) facilitating human analysis of the one or more analyzed messages; (2) permitting human editing of the instructional prompts, situational prompts, or both; and (3) incorporating the human editing changes to the instructional prompts, situational prompts, or both, and using such changed instructional prompts, changed situational prompts, or both, in subsequent iterations of the method (aspect 13).

In aspects, the invention provides the method of any one or more of aspects 1-13, wherein step (10) of the method is performed by a method comprising (1) providing a second neural network or a second group of neural networks (e.g., CSNN(s)) comprising at least one neural network that is trained to evaluate the contextual similarity of messages, (2) by automatic operation of the system having the second neural network or one or more neural networks of the second group of neural networks automatically evaluate the contextual similarity between one or more analyzed messages and the instructional prompts, situational prompts, or both, and (3) applying a context penalty feedback, context reward feedback, or both, to the first neural network or one or more neural networks of the first group of neural networks responsible for the generation of the draft communication-initiating messages, based on the variation between the content of the analyzed messages and the instructional prompts, situational prompts, or both (aspect 14).

In aspects, the invention provides the method of any one or more of aspects 1-14, wherein step (10) of the method is performed by a method comprising (1) providing a second neural network or second group of neural networks (e.g., CANN(s)), (2) by automatic operation of the second neural network or second group of neural networks (a) analyzing the analyzed messages to identify contexts therein as one or more analyzed message contexts and (b) changing one or more semantic elements of the instructional prompts, situational prompts, or both, based on the analyzed message contexts, for use in one or more further iterations of the method (aspect 15).

In aspects, the invention provides the method of aspect 15, wherein at least most of the modification of the instructional prompts and situational prompts performed in step (10) of the method is carried out by automatic operation of the system (aspect 16).

In aspects, the invention provides the method of aspect 16, wherein after about 10 iterations of the method at least about 50%, such as ≥60%, ≥65%, ≥70%, ≥70%, ≥75%, ≥85%, or ≥90% (e.g., all) of the modification to the situational prompts and instructional prompts in step (10) of the method is carried out by automatic operation of the system (aspect 17).

In aspects, the invention provides the method of any one or more of aspects 1-17 wherein the method further comprises, by automatic operation of the system, performing one or more weight optimization methods, such as back propagation function, to evaluate changing the weights of the first neural network or one or more neural networks of the first group of neural networks based on the method outcome information (user response data) (aspect 18).

In aspects, the invention provides the method of aspect 18, wherein changes in the weights of the first neural network or one or more neural networks of the first group of neural networks, brought about by training such neural networks, detectably or significantly changes draft communication-initiating messages subsequently generated by the system in subsequent iterations of the method (aspect 19).

In aspects, the invention provides the method of any one or more of aspects 1-19, wherein the situational prompt content comprises (1) information regarding or relating to an intended audience for a communication-initiating message, (2) information regarding or relating to one or more transmitters/authors of the communication-initiating message, a transmitter/author-associated organization, or both, (3) information regarding or relating to (a) the intended audience and (b) the transmitter/author, the transmitter/author-associated organization, or a combination thereof (aspect 20).

In aspects, the invention provides the method of any one or more of aspects 1-20, wherein at least some of the communication-initiating training set message records further comprise message-associated contextual information, such as information about a particular message in the initial training set, about the audience for a message in the initial training set, and the like (aspect 21).

In aspects, the invention provides the method of any one or more of aspects 1-21, wherein the method comprises performing steps (1)-(8) of the method≥2 times (aspect 22).

In aspects, the invention provides the method of any one or more of aspects 1-22, wherein the method comprises performing steps (1)-(10) of the method≥2 times (aspect 23).

In aspects, the invention provides the method of aspect 22 or aspect 23, wherein performing steps (1)-(8) of the method or steps (1)-(10) of the method detectably or significantly reduces corruption of messages over a number of iterations, improves frequency of positive interaction message generation, improves user approval of the system, or a combination of any or all thereof (aspect 24).

In aspects, the invention provides the method of any one or more of aspects 1-24, wherein the method comprises the system transmitting a message to the user or an associated user suggesting changes to the instructional prompts, situational prompts, or both, based on the method outcome information/URD (aspect 25).

In aspects, the invention provides the method of any one or more of aspects 1-25, wherein the method comprises the system changing some of the weights of the first neural network or of one or more neural networks in the first group of neural networks based on the method outcome information/URD (aspect 26).

In aspects, the invention provides the method of aspect 26, wherein the method comprises a second neural network or at least one neural network in a second group of neural networks automatically analyzing the modified portions of one or more modified messages generated in the method and based upon such method outcome information (1) changing the weights of the first neural network or at least one neural network in the first group of neural networks, (2) suggesting changes in the instructional prompts, situational prompts, or both, or (3) changing the instructional prompts, situational prompts, or both (aspect 27).

In aspects, the invention provides the method of any one or more of aspects 1-27, wherein at least most of the natural language communication-initiating messages in the initial training set comprise at least two paragraphs directed to distinct subjects, wherein a paragraph about a distinct subject is at least mostly directed to a distinct thing (including person or organization), distinct event or activity, distinct state or phenomenon, or distinct idea or concept, with respect to a subject of another paragraph (aspect 28).

In aspects, the invention provides the method of aspect 28, wherein a majority of typical individuals surveyed in an adequately powered population of typical audience members would identify most of the natural language communication-initiating messages in the initial training set as comprising two distinct statements or subjects (aspect 29).

In aspects, the invention provides the method of any one or more of aspects 1-29, wherein at least most of the natural language communication-initiating messages in the initial training set comprise at least two paragraphs that are each at least primarily directed to a distinct communication purpose, wherein a communication purpose is either to inform an audience, persuade an audience, or entertain an audience (aspect 30).

In aspects, the invention provides the method of aspect 30, wherein a majority of typical individuals surveyed in an adequately powered population of typical audience members would identify most of the natural language communication-initiating messages in the initial training set as comprising at least two statements or paragraphs that are each at least primarily directed to a distinct communication purpose (aspect 31).

In aspects, the invention provides the method of any one or more of aspects 1-31, wherein most of the draft communication-initiating messages generated by the method comprise a greeting and between 2-7 paragraphs (aspect 32).

In aspects, the invention provides the method of aspect 32, wherein most of the initial training set communication-initiating messages comprise between 2-5 paragraphs; most of the draft communication-initiating messages generated by the method comprise between 2-5 paragraphs; or both (aspect 33).

In aspects, the invention provides the method of any one or more of aspects 1-33 wherein at least most of the draft communication-initiating messages, at least most of the initial training set communication-initiating messages, or both, comprise at least one paragraph comprising (1) (a) one or more interrogative sentence, (b) one or more imperative sentence, or (c) at least one exclamatory sentence, and (2) two or more declarative sentences (aspect 34).

In aspects, the invention provides the method of any one or more of aspects 1-34, wherein the method comprises the system automatically filtering one or more draft communication-initiating messages and excluding any of the one or more draft communication-initiating messages captured by the filter from presentation to the user (aspect 35).

In aspects, the invention provides the method of any one or more of aspects 1-35, wherein the method comprises the system automatically recommending the user to transmit or otherwise at least one of the one or more draft communication-initiating messages (aspect 36).

In aspects, the invention provides the method of any one or more of aspects 1-36, wherein the method comprises the system automatically ranking the draft communication-initiating messages and optionally presenting the ranked draft communication-initiating messages to the user in ranked order, presenting the ranking of the ranked draft communication-initiating messages to the user, or both (aspect 37).

In aspects, the invention provides the method of any one of aspects 1-37, wherein the first neural network or at least one neural network in the first group of neural networks is trained with at least part of the initial training set prior to the user submitting the input comprising the one or more situational prompts, instructional prompts, or both (aspect 38).

In aspects, the invention provides the method of aspect 38, wherein the first neural network or a neural network in the first group of neural networks is trained with most of the initial training set prior to the user submitting the input comprising the one or more situational prompts, instructional prompts, or both (aspect 39).

In aspects, the invention provides the method of any one of aspects 1-39, wherein the first neural network or a neural network in the first group of neural networks is pre-trained with a portion of the initial training set that is at least 3 times the size of any other portion of the initial training set prior to the user submitting the input comprising the one or more situational prompts, instructional prompts, or both (aspect 40).

In aspects, the invention provides the method of aspect 40, wherein the first neural network or a neural network in the first group of neural networks is trained with a portion of the initial training set that is at least 10 times the size of any other portion of the initial training set prior to the user submitting the input comprising the one or more situational prompts, instructional prompts, or both (aspect 41).

In aspects, the invention provides the method of any one or more of aspects 1-41, wherein the initial training set size and capacity of the first neural network or first group of neural networks are such at least about 10% of users in an adequately powered survey population of users positively evaluates or directly transmits (without modification/editing) at least one presented communication-initiating message candidate generated by performing the method (aspect 42).

In aspects, the invention provides the method of aspect 42, wherein at least about 5%, such as ~7.5% or more, ≥~10%, ≥~12.5%, or ≥~15% of users in an adequately powered survey population of users positively evaluates or directly transmits (without modification/editing) at least one presented communication-initiating message candidate generated by performing the method without first performing a distillation step or pruning step and without first editing the presented communication-initiating message candidate (aspect 43).

In aspects, the invention provides the method of any one or more of aspects 1-43, wherein the first neural network or first group of neural networks exhibits a few-shot LAMBADA accuracy of at least about 50%, at least about 60%, at least about 65%, at least about 70%, at least about 75%, at least about 80%, at least about 85%, or ≥~90% (aspect 44).

In aspects, the invention provides the method of any one or more of aspects 1~44, wherein the initial training set comprises at least about 20, at least about 30, at least about 40, or at least about 50, e.g., about 10-100, ~15-90, ~20-80, ~20-100, ~10-500, ~20-500, ~50-500, ~100-1000, 10-10000, ~25-75, ~20-200, ~30-300, ~35-350, ~40-400, or 25-250 messages, optionally mostly, essentially only, or only being communication-initiating messages (aspect 45).

In aspects, the invention provides the method of any one or more of aspects 1-45, wherein communication-initiating messages contained in the training set comprise messages generated by one or more selected communication-initiating message authors (aspect 46).

In aspects, the invention provides the method of any one or more of aspects 1-46, wherein most of the communication-initiating messages in the initial training set are at least 250, or ≥~300, ≥~325, ≥~400, ≥~450, or ≥~500 characters in length (aspect 47).

In aspects, the invention provides the method of aspect 47, wherein at least about 75% of the communication-initiating messages in the initial training set are at least 200, 250, or at least 300, e.g., ≥350, ≥400, ≥450, or ≥500 characters in length (aspect 48).

In aspects, the invention provides the method of aspect 48, wherein at least about 90% of the communication-initiating messages in the initial training set are at least 300, e.g., ≥350, ≥400, ≥450, or ≥500 characters in length (aspect 49).

In aspects, the invention provides the method of any one or more of aspects 1-49, wherein at least 20%, 25%, 30%, 33%, 40%, or 45% of the communication-initiating messages in the initial training set are at least 500 characters in length (aspect 50).

In aspects, the invention provides the method of any one or more of aspects 1-50, wherein at least most of the communication-initiating messages in the initial training set are less than 1500 characters in length, such as ≤1350 or ≤~1250 characters in length (aspect 51).

In aspects, the invention provides the method of aspect 51, wherein at least most of the communication-initiating messages in the initial training set are less than 1100, less than 1000 characters or ≤900 or ≤800 characters in length, wherein the upper limit of aspect 51 or aspect 52 can be optionally combined with the lower limit aspects of aspect 49 to 50 to form any number of ranges provided by such combinations (aspect 52).

In aspects, the invention provides the method of any one or more of aspects 1-52, wherein at least most of the draft communication-initiating messages are at least 250 or at least 300 characters in length, such as ≥350 characters in length (e.g., 250-1000, 250-900, 300-900, 300-1200, 300-1000, 350-1250, 350-1000, 350-750, 300-750, 400-800, 250-750, 300-600, 350-650, 325-975, 325-775, or 375-675 characters in length) (aspect 53).

In aspects, the invention provides the method of aspect 53, wherein at least most of the draft communication-initiating messages are between ~300 characters and ~1200 characters in length, such as, e.g., 250-1500, 275-1500, 300-1500, 325-1500, 350-1500, 400-2000, 400-1600, 400-1200, 400-1000, 250-1250, 300-1250, 350-1250, 400-800, 250-750, 300-900, 400-1000, 250-1000, 300-1000, 350-1000, 325-775, or 325-650 characters (aspect 54).

In aspects, the invention provides the method of any one or more of aspects 1-54, wherein most of the communication-initiating messages in the initial training set comprise at least 50 semantic elements, each semantic element corresponding to a word, number, or symbol, wherein each symbol would be understood as representing one or more words, and wherein the majority of the semantic elements represent words, symbols, or both thereof (aspect 55).

In aspects, the invention provides the method of aspect 55, wherein at least ~50%, such as ≥~65%, ≥~75%, ≥80%, ≥~85%, or ≥90% of the communication-initiating messages in the initial training set comprise at least 35, ≥40, ≥45, ≥50, ≥55, ≥60, ≥65, ≥75, or ≥80 semantic elements (e.g., 40-200, 40-160, 40-150, 50-150, 50-200, 50-250, 50-300, or 50-500 semantic elements) (aspect 56).

In aspects, the invention provides the method of aspect 56, wherein at least 75% of the communication-initiating messages in the initial training set comprise at least 40, 50, 55, 60, 65, 70, or 75 semantic elements (aspect 57).

In aspects, the invention provides the method of any one or more of aspects 1-57, wherein at least 25% of the communication-initiating messages in the initial training set comprise at least 70, 75, 80, 85, or at least 100 semantic elements (aspect 58).

In aspects, the invention provides the method of any one or more of aspects 1-58, wherein most of the draft communication-initiating messages comprise at least 35, 40, 45, or 50 semantic elements (aspect 59).

In aspects, the invention provides the method of aspect 59, wherein most of the draft communication-initiating messages comprise 40-200 semantic elements, such as 45-180, 50-200, 40-160, 40-180, 50-150, 50-175, 50-250, or 50-300 semantic elements (aspect 60).

In aspects, the invention provides the method of any one or more of aspects 1-60, wherein most of the communication-initiating messages in the initial training set comprise at least one transition linking at least two paragraphs of the two or more paragraphs (aspect 61).

In aspects, the invention provides the method of any one or more of aspects 1-61, wherein most of the draft communication-initiating messages comprise at least two paragraphs and at least one transition linking 2 or more paragraphs of the at least two paragraphs (aspect 62).

In aspects, the invention provides the method of any one or more of aspects 1-62, wherein at least most of the communication-initiating initial training set message records correspond to the bodies of email messages (aspect 63).

In aspects, the invention provides the method of aspect 63, wherein at least most, e.g., at least about 60%, 65%, or 75%, (e.g., all) of the communication-initiating initial training set message records comprise complete email messages (aspect 64).

In aspects, the invention provides the method of aspect 64, wherein at least about 80%, such as ≥90%, ≥95%, or ≥99%, e.g., all of the communication-initiating initial training set message records correspond to at least essentially complete email messages (aspect 65).

In aspects, the invention provides the method of any one or more of aspects 1-65, wherein the method does not comprise generation of a response to a prior communication generated by any member of the intended audience (aspect 66).

In aspects, the invention provides the method of any one or more of aspects 1-66, wherein the initial training set, situational prompts, and instructional prompts do not comprise an approximately contemporaneous message from the intended audience (aspect 67).

In aspects, the invention provides the method of any one or more of aspects 1-67, wherein at least some of the semantic elements of the instructional prompt or semantic element equivalents thereof that are incorporated into one or more draft communication-initiating messages are not sufficiently related to either the one or more initial training set or the one or more situational prompts to be incorporated into a draft communication-initiating message if the at least one instructional prompt semantic elements were situational prompt semantic elements (aspect 68).

In aspects, the invention provides the method of any one or more of aspects 1-68, wherein at least some of the semantic elements of the instructional prompt or semantic element equivalents thereof that are incorporated into one or more draft communication-initiating messages are not sufficiently related to the content of the initial training set, the content of the situational prompts, or both, to be incorporated into a draft communication-initiating message if the at least one instructional prompt semantic elements were in situational prompts (aspect 69).

In aspects, the invention provides the method of any one or more of aspects 1-68, wherein at least one of the one or more semantic elements of the instructional prompts are sufficiently related to either the one or more initial training set contexts or the one or more situational prompt contexts, such that the at least one instructional prompt semantic elements or semantic element equivalents would be incorporated into a draft communication-initiating message if the one or more semantic elements were situational prompt content (aspect 70).

In aspects, the invention provides the method of any one or more of aspects 1-70, wherein at least one of the instructional prompts are inputted by the user (aspect 71).

In aspects, the invention provides the method of any one or more of aspects 1-70, wherein at least one of the instructional prompts are inputted by an associated user prior to the user submitting input comprising one or more situational prompts (aspect 72).

In aspects, the invention provides the method of any one or more of aspects 1-70, wherein the instructional prompts comprise instructional prompts inputted by a user and instructional prompts inputted by an associated user (aspect 73).

In aspects, the invention provides the method of any one or more of aspects 1-70, wherein the instructional prompts comprise instructional prompts inputted by automatic operation of the system (aspect 74).

In aspects, the invention provides the method of any one or more of aspects 1-74, wherein the system comprises rules for user-inputted instructional prompts and the method comprises by automatic operation of the system providing a warning to a user regarding an instructional prompt, rejecting an instructional prompt, or both (aspect 75).

In aspects, the invention provides method of any one or more of aspects 1-75, wherein the method comprises the system automatically presenting between 2-9 selectable instructional prompt messages through the interface as selectable options for the user, wherein each selected situational prompt message becomes part of the situational prompts (aspect 76).

In aspects, the invention provides the method of aspect 76, wherein the system automatically presents 2-7 selectable instructional prompt messages via the interface (aspect 77).

In aspects, the invention provides the method of aspect 77, where the system automatically presents 2-5 selectable instructional prompt messages via the interface (aspect 78).

In aspects, the invention provides the method of any one or more of aspects 75-78, wherein the user is not permitted to select all of the presented selectable instructional prompt messages automatically provided by the system via the interface (aspect 79).

In aspects, the invention provides the method of any one or more of aspects 1-79, wherein the system automatically presents 2-7, such as 2-5, such as 3-7, or 3-5 selectable situational prompts to the user through the interface (aspect 80).

In aspects, the invention provides the method of any one or more of aspects 1-80, wherein the method comprises one or more neural networks of the system evaluating and ranking possible selectable situational prompt options, the system automatically optionally further using the ranking to rank the order of presentation of one or more of the selectable situational prompt options, to determine what selectable situational prompt options to present to the user, or both (aspect 81).

In aspects, the invention provides the method of aspect 81, wherein the one or more neural networks of the system use information about the transmitter/author, an organization associated with the transmitter/author, information about the audience, information about an organization or person associated with the audience, or a combination thereof in performing the evaluation and ranking of the possible selectable situation prompt options (aspect 82).

In aspects, the invention provides the method of any one or more of aspects 1-82, wherein the user, associated user, or both, inputs or selects one or instructional prompts, and the method comprises the system either selectably modifying or automatically modifying the content of the one or more instructional prompts and optionally presenting the modified instructional prompts to the user in place of, or at a higher rank than, the unmodified instructional prompts (aspect 83).

In aspects, the invention provides the method of aspect 83, wherein modifying the content of the instructional prompts comprises enhancing one or more selected or inputted instructional prompts by obtaining related content from one or more internet sources based on the content of the inputted or selected situational prompt and adding or recommending the addition of such related content to the instructional prompts (aspect 84).

In aspects, the invention provides the method of aspect 83 or aspect 84, wherein the method comprises generating one or more alternative word choices for at least some of the words in one or more of the inputted or selected instructional prompts (aspect 85).

In aspects, the invention provides the method of any one or more of aspects 83-85, wherein the generation of the modified instructional prompts is performed at least in part by automatic or selectable operation of one or more neural networks of the system (aspect 86).

In aspects, the invention provides the method of any one or more of aspects 1-86, wherein the user, associated user, or both, inputs or selects one or situational prompts, and the method comprises the system either selectably modifying or automatically modifying the content of the one or more situational prompts and optionally presenting the modified situational prompts to the user in place of, or at a higher rank than, the unmodified situational prompts (aspect 87).

In aspects, the invention provides the method of aspect 87, wherein modifying the content of the situational prompts comprises enhancing one or more selected or inputted situational prompts by obtaining related content from one or more internet sources based on the content of the inputted or selected situational prompt and adding or recommending the addition of such related content to the situational prompts (aspect 88).

In aspects, the invention provides the method of aspect 87 or aspect 88, wherein the method comprises generating one or more alternative word choices for at least some of the words in one or more of the inputted or selected situational prompts (aspect 89).

In aspects, the invention provides the method of any one or more of aspects 87-89, wherein the generation of the modified situational prompts is performed at least in part by automatic or selectable operation of one or more neural networks of the system (aspect 90).

In aspects, the invention provides the method of any one or more of aspects 1-90, wherein the method comprises, by automatic operation of the system, amending the selectable situational prompt messages, recommending an amendment to the selectable situational prompts, or both, based on intended audience member replies, other responses, or both (aspect 91).

In aspects, the invention provides the method of any one or more of aspects 1-91, wherein the method comprises the user inputting contextual input that is stored in the system, presented to the user via the interface, and that can be selected by the user as a situational prompt in the performance of one or more iterations of method (aspect 92).

In aspects, the invention provides the method of any one or more of aspects 1-92, wherein at least one situational prompt used in the method is inputted by an associate user (aspect 93).

In aspects, the invention provides the method of any one or more of aspects 1-93, wherein the intended audience are associated with an organization and the situational prompts, instructional prompts, or both, comprise information about the organization (aspect 94).

In aspects, the invention provides the method of any one or more of aspects 1-94, wherein the system automatically searches for, selects, and presents information obtained from the internet about a type of situational prompt in response to a user selection or associated user selection of a type of situational prompt to present to the user via the interface as a selectable situational prompt (aspect 95).

In aspects, the invention provides the method of any one or more of aspects 1-95, wherein most of the semantic elements of the draft communication-initiating messages are (1) semantic elements in the situational prompt, instructional prompt, or both, (2) semantic element equivalents thereof, or (3) a combination thereof (aspect 96).

In aspects, the invention provides the method of aspect 96, wherein at least about 80% of the semantic elements of the draft communication-initiating messages are (1) semantic elements in the situational prompt, instructional prompt, or both, (2) semantic element equivalents thereof, or (3) a combination thereof (aspect 97).

In aspects, the invention provides the method of any one or more of aspects 1-97, wherein the method comprises a evaluating word variation (loss, gain, or both) in the draft communication-initiating messages with respect to the initial training set, instructional prompts, situational prompts, or a combination of any or all thereof, and optionally generating and transmitting a word-variation penalty, no/low word-variation reward, or both, to the first neural network or to one or more neural networks in the first group of neural networks based on word variation in the draft communication-initiating messages with respect to the content of the initial training set, instructional prompts, situational prompts, or a combination of any or all thereof (aspect 98).

In aspects, the invention provides the method of any one or more of aspects 1-98, wherein the method comprises generating variability in the draft communication-initiating messages by the user, the system, or both modifying the word variation settings (aspect 99).

In aspects, the invention provides the method of aspect 99, wherein the method comprises the system automatically modifying the word variation settings in response to the user's transmission, use, or editing of presented communication-initiating messages (aspect 100).

In aspects, the invention provides the method of aspect 99 or aspect 100, wherein the method comprises the system automatically providing the user with the ability to set or adjust the word variation settings (aspect 101).

In aspects, the invention provides the method of any one of aspects 1-101, wherein the sampling engine employs one or more methods comprising random sampling, beam search, stochastic beam search, typical sampling, or a combination thereof in the selection of semantic elements from semantic element options in a distribution (aspect 102).

In aspects, the invention provides the method of any one or more of aspects 1-102, wherein the method further comprises the system automatically (1) tracking replies or other responses to or associated with communication-initiating messages prepared by the method and (2) (a) amending the instructional prompts based on such replies or other responses to or associated with the communication-initiating message; (b) amending the situational prompts based on such replies or other responses to or associated with the communication-initiating message; (c) suggesting changes to the instructional prompts based on replies or other responses to or associated with the communication-initiating messages; (d) suggesting changes to the situational prompts based on replies or other responses to or associated with the communication-initiating messages; or (e) performing a combination of some or all of (a)-(d) (aspect 103).

In aspects, the invention provides the method of aspect 103, wherein the method further comprises a step of amending the weights of the first neural network or first group of neural networks based on performing a training/optimization comprising analysis of the replies or other responses, such as a back propagation method (aspect 104).

In aspects, the invention provides the method of any one or more of aspects 1-104, wherein the method further comprises the system automatically (a) tracking replies or other responses to or associated with communication-initiating messages prepared by the method and (b) amending the weights of the first neural network or first group of neural networks based on performing a training/optimization method comprising analysis of the replies or other responses, such as a back propagation method (aspect 105).

In aspects, the invention provides the method of any one or more of aspects 1-105, wherein the method further comprises inputting one or more messages generated by performing steps (1)-(7) of the method to generate a plurality of draft messages and using at least some of the plurality of draft messages as part of the initial training set for one or more iterations of the method (aspect 106).

In aspects, the invention provides the method of aspect 106, wherein the method comprises human supervision of the use of the draft messages by the user or an associated user (aspect 107).

In aspects, the invention provides the method of aspect 106 or aspect 107, wherein some, most of, or all of the plurality of draft messages are submitted to the first neural network or one or more neural networks of the FNNG prior to the user submitting input comprising one or more situational prompts (aspect 108).

In aspects, the invention provides the method of any one of aspects 106-108, wherein the method of aspect 106 is performed two or more iterations, with at least some of the plurality draft communication-initiating messages generated in each iteration being used as part of the initial training set (aspect 109).

In aspects, the invention provides the method of any one or more of aspects 106-109, wherein at least part of the method involving is performed by a third neural network or third group of neural networks, the method comprises the application use of any one or more of the other neural networks described in connection with the Figures herein (e.g., an SCNN, CGNN, SEINN, CSNN, IBMMNN, MONN, or the like) (aspect 110).

In aspects, the invention provides the method of any one or more of aspects 1-110, wherein most, substantially all, or all of the presented communication-initiating message candidates comprise a salutation statement and a closing statement (aspect 111).

In aspects, the invention provides the method of any one or more of aspects 1-111, wherein most, substantially all, or all of the presented communication-initiating message candidates comprise at least one transition linking at least two paragraphs of the communication-initiating message candidate, wherein a majority of individuals in an adequately powered population of typical audience members would find most of the at least one transitions to be effective transitions between the two paragraphs (aspect 112).

In aspects, the invention provides the method of any one or more of aspects 1-112, wherein the presented communication-initiating message candidates are in the form of an email that is ready for transmission to one or more intended audience members (aspect 113).

In aspects, the invention provides the method of aspect 113, wherein the system provides the user with the ability to selectively transmit the presented communication-initiating message candidates to one or more email recipients (aspect 114).

In aspects, the invention provides the method of any one or more of aspects 1-113, wherein the presented communication-initiating message candidates are in the form of a marketing newsletter, group email, announcement, or a social media posting that is ready for transmission to one or more intended audience members (aspect 115).

In aspects, the invention provides the method of any one or more of aspects 1-115, wherein the presented communication-initiating message candidates are directed to sale of a product or service (aspect 116).

In aspects, the invention provides the method of aspect 116, wherein the reply or response rate for the sales-related communication-initiating message candidates have a higher reply or response rate than about 3% (aspect 117).

In aspects, the invention provides the method of aspect 117, wherein the reply or response rate for the sales-related communication-initiating message candidates have a higher reply or response rate than about 5%, in aspects at least about 6.5%, and in further aspects at least about 9% (aspect 118).

In aspects, the invention provides the method of any one or more of aspects 1-118, wherein the situational prompts, instructional prompts, initial training set, or any combination thereof comprises information about an audience member comprising name, title/position, and organizational association (e.g., employer) (aspect 119).

In aspects, the invention provides the method of any one or more of aspects 1-119, wherein the situational prompts, instructional prompts, initial training set, or any combination thereof comprises information about an audience member comprising information regarding the audience member's employment history (aspect 120).

In aspects, the invention provides the method of any one or more of aspects 1-120, wherein the situational prompts, instructional prompts, initial training set, or any combination thereof comprises information about an audience member's or audience member-associated organization social media activity, such as posts, interactions, etc. (aspect 121).

In aspects, the invention provides the method of any one or more of aspects 1-121, wherein the situational prompts, instructional prompts, initial training set, or any combination thereof comprises information about the relationship between the transmitter/author, a transmitter/author-associated organization, or both, and one or more audience members, associated organization(s), or both (aspect 122).

In aspects, the invention provides the method of any one or more of aspects 1-122, wherein the situational prompts, instructional prompts, initial training set, or any combination thereof comprises information about the relationship between one or more third party persons or organizations and one or more audience members, associated organization(s), or both (aspect 123).

In aspects, the invention provides the method of any one or more of aspects 1-123, wherein the situational prompts, instructional prompts, initial training set, or any combination thereof comprises information about shared interests or other commonalities between the transmitter/author and one or more audience members (aspect 124).

In aspects, the invention provides the method of any one or more of aspects 1-123, wherein the situational prompts, instructional prompts, initial training set, or any combination thereof comprises information about personal interests, likes, or dislikes of one or more audience members or a combination of any or all thereof (aspect 125).

In aspects, the invention provides the method of any one or more of aspects 1-125, wherein the situational prompts, instructional prompts, initial training set, or any combination thereof comprises information about one or more organizations associated with one or more audience members, such informationally optionally comprising an organization description, organizational characteristics, organizational culture, one or more organization clients or customers, one or more organizational investors or other stakeholders, one or more organizational products, one or more organizational services, organizational news/developments, organizational competition, organizational personnel, organizational financial performance or other performance metrics, organizational activities or initiatives/goals (e.g., hiring initiatives, sales initiatives, and the like), or a combination of any or all thereof (aspect 126).

In aspects, the invention provides the method of any one or more of aspects 1-126, wherein the situational prompts, instructional prompts, initial training set, or any combination thereof comprises information about inter-organizational relationships between one or more individuals and one or more audience members, such as the direct reports, management, or peers of one or more audience members (aspect 127).

In aspects, the invention provides the method of any one or more of aspects 1-127, wherein the situational prompts, instructional prompts, initial training set, or any combination thereof comprises location information regarding one or more audience members, one or more audience member-associated organizations, one or more associated third parties, the transmitter/author or a transmitter/author-associated organization, or a combination of any or all thereof (aspect 128).

In aspects, the invention provides the method of any one or more of aspects 1-128, wherein the situational prompts, instructional prompts, initial training set, or any combination thereof comprises event or situation information concerning the transmitter/author, transmitter/author-associated organization, one or more audience members, audience member-associated organization(s), or associated third party person(s) or organization(s), such as places of future or past meeting (aspect 129).

In aspects, the invention provides the method of aspect 129. wherein the situational prompts, instructional prompts, initial training set, or any combination thereof comprises information concerning one or more locations, such as historical or interesting facts about a location, climate of a location, current weather in a location, economic information about the location (e.g., housing prices, product prices, employment, market conditions, and the like), social information about a location (e.g., political information, crime information, quality of life information, and the like), demographic information, cultural information (e.g., famous people associated with a location, teams associated with a location, and the like), or a combination of any or all thereof (aspect 130).

In aspects, the invention provides the method of any one of aspects 119-130, wherein the method comprises the system automatically obtaining information on one or more selected subjects/contexts from internet-available sources and using such automatically obtained internet-sourced information in the instructional prompts, situational prompts, or both, or presenting information comprising or derived from such internet-sourced information as a selectable or suggested option for the generation or refinement of instructional prompts, situational prompts, or both (aspect 131).

In aspects, the invention provides the method of any one or more of aspects 1-131, wherein the method comprises identifying users that are new users and the method comprises the system automatically prompts the new user to (1) submit supplemental training set submissions comprising communication-initiating messages and optionally related contextual information, or both, one or more times, to the neural network and thereafter performing steps (4)-(8) of the method until a user satisfaction standard or system-defined performance standard is achieved; (2) repeatedly performing steps (4)-(8) of the method, in each iteration thereof generating one or more modified messages until a user satisfaction standard or system-defined performance standard is achieved; (3) repeatedly performing steps (4)-(10) of the method, in each iteration thereof generating one or more evaluated messages until a user satisfaction standard or system-defined performance standard is achieved; or (4) performing a combination of any or all of (1)-(3) (aspect 132).

In aspects, the invention provides the method of any one or more of aspects 1-132, wherein the method comprises integrating the system with a third party computer system comprising data regarding the intended audience, the transmitter/author of the message, an organization associated with the transmitter/author of the message, one or more parts of the situational prompts, one or more parts of the instructional prompts, or a combination of any or all thereof, wherein the transmitter/author of the message optionally can be the user or an associated user (aspect 133).

In aspects, the invention provides the method of aspect 133, wherein the method comprises integrating the system with a third-party platform containing data records comprising prior messages sent by the user or transmitter/author, e.g., the SalesForce™ platform (aspect 134).

In aspects, the invention provides the method of aspect 134, wherein the system automatically selects data records from the third-party platform based on data contained in the third-party platform regarding the effectiveness of the messages contained in the data records (e.g., emails that led to replies, sales, etc., recorded in a SalesForce™ CRM) and uses the selected data records as part of the initial training set or otherwise to train the first neural network or one or more neural networks in the first group of neural networks (aspect 135).

In aspects, the invention provides the method of any one or more of aspects 1-135, wherein the personality type of the user is used as a situational prompt, an instructional prompt, or both (aspect 136).

In aspects, the invention provides the method of any one or more of aspects 1-136, wherein the personality type of one or more audience members is used as a situational prompt, instructional prompt, or both (aspect 137).

In aspects, the invention provides the method of any one or more of aspects 1-137, wherein the method comprises (1) obtaining between 1-20, such as between 2-20, 3-20, 2-15, 3-15, 2-10, or 3-10 previously transmitted communications authored by (a) the transmitter/author (which optionally is the user), (b) an author associated with or selected by the user, or (c) both, and (2) the system automatically causing one or more neural networks of the system to use the content of the previously transmitted communications, optionally with additional context regarding the previously transmitted communications, as situational prompts or in a manner similar to situational prompts (aspect 138).

In aspects, the invention provides the method of any one or more of aspects 1-138, wherein at least most users in an adequately powered population of typical audience members rate that repeated performance most steps of the method results in the generation of presented communication-initiating messages that are substantially closer in tone and style to the user's natural tone and style after two or more iterations of such steps (aspect 139).

In aspects, the invention provides the method of any one or more of aspects 1-139, wherein the method comprises the system automatically generating one or more different message-type output candidates, wherein the one or more different message-type output candidates are of a message-type that is different from the message-type of most or all of the communication-initiating initial training set messages (aspect 140).

In aspects, the invention provides the method of aspect 140, wherein most or all of the communication-initiating initial training set messages comprise emails or the bodies of emails and the system automatically generates a video output candidate, an audio output candidate, a script output candidate, or a combination of some or all thereof (aspect 141).

In aspects, the invention provides the method of any one or more of aspects 1-141, wherein the primary topic, purpose, or both of the draft messages is the sale of a product or service (aspect 142).

In aspects, the invention provides the method of any one or more of aspects 1-141, wherein the primary topic, purpose, or both, of the draft messages is the hiring of an employee, contractor, or organization (aspect 143).

In aspects, the invention provides the method of any one or more of aspects 1-141, wherein the primary topic, purpose, or both, of the draft messages is the delivery of news about a recent, current, or upcoming event (aspect 144).

In aspects, the invention provides the method of any one or more of aspects 1-144, wherein at least some of the neural networks in the plurality of neural networks are transformer neural networks (aspect 145).

In aspects, the invention provides the method of aspect 145, wherein most of the neural networks in the plurality of neural networks are transformer neural networks (aspect 146).

In aspects, the invention provides the method of aspect 146, wherein substantially all or essentially all of the neural networks in the plurality of neural networks are transformer neural networks, which in this or any similar aspect can optionally mean or comprise transformer(s) with additional memory and retrieval units as known in the art (see, e.g., arxiv.org/abs/2202.06991 and arxiv.org/abs/2203.08913 (aspect 147).

In aspects, the invention provides the method of any one or more of aspects 1-147, wherein (1) the system receives data from a plurality of users using the system to generate messages that the system recognizes as similar in content and purpose and (2) the system automatically uses the information from the plurality of users to (a) automatically amend the situational prompts, (b) recommend amendments to the situational prompts, (c) automatically amend the instructional prompts, (d) recommend amendments to the instructional prompts, (e) automatically amend the weights the first neural network uses or the first group of neural networks use to generate draft communication-initiating messages, (f) suggest amending the weights the first neural network uses or first group of neural networks use to generate draft communication-initiating messages, or (g) perform some/all of (a)-(f) (aspect 148).

In aspects, the invention provides the method of aspect 148, wherein the data from the plurality of users comprises user editing of presented communication-initiating messages, user transmission of presented communication-initiating messages, user evaluation of presented communication-initiating messages, or a combination thereof (aspect 149).

In aspects, the invention provides the method of aspect 148 or aspect 149, wherein the data from the plurality of users comprises the reply, reading, or other response rate of actual audience members to transmitted messages generated by iterations of users in the plurality of users (aspect 150).

In aspects, the invention provides the method of aspect 150, wherein the transmitted messages are sales messages and the data from the actual audience members comprises purchases of products or services in association with transmitted messages transmitted by users in the plurality of users (aspect 151).

In aspects, the invention provides the method of aspect 151, wherein the transmitted messages are emails, long text messages, audio recordings, scripts, blog posts, advertisements, advertorials, social media postings, or video messages (aspect 152).

In aspects, the invention provides the method of any one or more of aspects 1-152, wherein the method comprises using one or more neural networks, which can optionally be performed by a third neural network or one or more neural networks in a third group of neural networks, to evaluate draft messages based on content besides word variation or content of the draft messages (aspect 153).

In aspects, the invention provides the method of aspect 153, wherein the method comprises one or more neural networks using data comprising method outcome data to predict messages that the user will like and to optionally use such prediction in the presentation of messages to the user (aspect 154).

In aspects, the invention provides the method of aspect 153 or 154, wherein the method comprises one or more neural networks using data concerning the reply or other response to transmitted messages, transmitted edited messages, or both, at an individual level, population level, or both, to predict which draft messages are most likely to receive a reply or other response, and optionally to use such prediction in the presentation of messages to the user (aspect 155).

In aspects, the invention provides the method of aspect 154 or 155, wherein the system automatically excludes draft messages that the one or more neural networks do not rank highly from presentation to the user (aspect 156).

In aspects, the invention provides the method of any one or more of aspects 1-156, wherein the method comprises the system automatically storing one or more user selected communication-initiating messages for further use and presenting such stored user selected communication-initiating messages to the user for further use or re-use (aspect 157).

In aspects, the invention provides the method of aspect 157, wherein the method comprises providing the user with the ability to select a new intended audience member in association with generating a message primarily based on a stored user selected communication-initiating message (aspect 158).

In aspects, the invention provides the method of aspect 158, wherein the system provides information regarding a new intended audience member automatically upon the selection of the new intended audience member by the user; prompts the user to provide situational prompt information, instructional prompt information, or both, regarding the new intended audience member; or a combination thereof (aspect 159).

In aspects, the invention provides the method of any one or more of aspects 1-159, wherein at least most, e.g., at least about 65%, at least about 75%, or at least about 85%, or all, of the contextual prompt input is entered prior to entry of most, e.g., at least about 65%, 75%, 85%, or all, of the instructional prompt content is entered in at least the initial iteration of the method, or in one or more iterations of the method (aspect 160).

In aspects, the invention provides the method of any one or more of aspects 1-160, wherein instructional prompt content inputted directly by the user is less than about 1,250 semantic characters in length (aspect 161).

In aspects, the invention provides the method of aspect 161, wherein instructional prompt content inputted directly by the user (e.g., not including selectable instructional prompts, enhanced instructional prompts, system-generated instructional prompts, or a combination thereof) is about 25-1,250 characters in length, e.g., about 50-1,000 characters in length, e.g., about 50-850, 50-750, 25-1,000, 25-750, 30-600, 25-500, 20-400, or 25-250 characters in length (aspect 162).

In aspects, the invention provides a method according to any one or more of aspects 1-162, wherein some, most, generally all, substantially all, essentially all, or all of the data transmitted a part of the system comprising the first neural network or first group of neural networks to the part of the system that provides for the interface is performed in a stream data delivery manner (aspect 163).

In aspects, the invention provides a method according to any one or more of aspects 1-162, wherein some, most, generally all, substantially all, essentially all, or all of the data transmitted a part of the system comprising the first neural network or first group of neural networks to the part of the system that provides for the interface is performed in a batch delivery manner (aspect 164).

In aspects, the invention provides a method according to aspect 163 or aspect 164, wherein data is transmitted from a part of the system comprising the first neural network or first group of neural networks to the part of the system that provides for the interface is performed in a batch manner and streaming data manner, either selectively, in response to the presence of certain preprogrammed conditions, or both (aspect 165).

In aspects, the invention provides the method of any one or more of aspects 1-165, wherein the first neural network or one or more neural networks of the first group of neural networks generates a next semantic element distribution in a unidirectional manner (aspect 166).

In aspects, the invention provides the method of any one or more of aspects 1-165, wherein the first neural network or one or more neural networks of the first group of neural networks generates a next semantic element distribution in a bidirectional manner (aspect 167).

In aspects, the invention provides the method of any one or more of aspects 1-167, wherein the order of content of messages generated by the system is independent of the order of entry of the instructional prompts (aspect 168).

In aspects, the invention provides the method of any one or more of aspects 1-168, wherein the method comprises analyzing initial training set data and in at least some cases changing, deleting, or enhancing the initial training set data to generate modified initial training set data and using the modified initial training set data as either prompt data for the first neural network or as additional training data/initial training set data for the first neural network (aspect 169).

In aspects, the invention provides the method of any one or more of aspects 1-169, wherein prompt data (instructional prompts and situational prompts, is present) is presented to the system in sections separated by one or more system-recognized section indicators (aspect 170).

In aspects, the invention provides the method of any one or more of aspects 1-170, wherein the system is trained to recognize one or more particular types or categories of contexts or topics in prompts based on terms and to use such use the terms to find related content in training data (aspect 171).

In aspects, the invention provides the method of any one or more of aspects 1-171, wherein the method comprises sending a reply message to a recipient, wherein at least part of the recipient's message to the sender/user is used as a prompt, training set data, or both (aspect 172).

In aspects, the invention provides the method of aspect 172, wherein the method comprises drafting a reply to a response to an initial message drafted with the system (aspect 173).

In aspects, the invention provides the method of any one of aspects 1-171, wherein the method comprises composing a follow-up message to a recipient, wherein at least part of the prior message to the recipient is used prompt content, training set data, or both (aspect 174).

In aspects, the invention provides the method of aspect 174, wherein the initial message to the recipient was also generated by the system and method of any one or more of aspects 1-171 (aspect 175).

In aspects, the invention provides the method of aspect 174 or aspect 175, wherein the system provides a recommended campaign of communication with a recipient and uses elements of the recommended campaign as prompt data, uses campaign-stage relevant messages as training set data, or both (aspect 176).

In aspects, the invention provides the method of any one or more of aspects 1-176, wherein the system reduces prompt input by eliminating one or more semantic elements before the first neural network or one or more neural networks of the first group of neural networks uses the prompt input generating a distribution of semantic element options (aspect 177).

In aspects, the invention provides the method of any one or more of aspects 1-177, wherein the system changes prompt input by substituting one or more semantic elements before the first neural network or one or more neural networks of the first group of neural networks uses the prompt input generating a distribution of semantic element options (aspect 178).

In aspects, the invention provides the method of any one or more of aspects 1-178, wherein the system adds to prompt input by adding one or more semantic elements before the first neural network or one or more neural networks of the first group of neural networks uses the prompt input in generating a distribution of semantic element options (aspect 179).

In aspects, the invention provides the method of any one or more of aspects 1-179, wherein the system recognizes prompt topic/context category tags/indicators and one or more system engines can use such prompt topic/context category tags/indicators in modification of prompt content or other functions, one or more neural network are trained to recognize such prompt topic/context category tags/indicators in performance of neural network functions (e.g., in generating a distribution of semantic element options), or both (aspect 180).

In aspects, the invention provides the method of any one or more of aspects 1-180, wherein the method comprises applying one or more initial training set data neural networks (which typically is/are separate from the first neural network or any content analysis neural network/content analysis prompt modification neural network), in reviewing initial training set data and either changing/amending the initial training set data, recommending changes to the USD, or both (aspect 181).

In aspects, the invention provides the method of aspect 181, wherein the one or more initial training set data neural networks automatically change the initial training set data to generate modified initial training set data (aspect 182).

In aspects, the invention provides the method of aspect 182, wherein the system uses the modified initial training set data as additional training set data, as prompt content, or both (aspect 183).

In aspects, the invention provides the method of aspect 183, wherein the message performs the step of aspect 182 either initially in generating messages with a particular type of training set data, recipient, type of communication, sender, or combination thereof; performs the step of aspect 182 intermittently; or both (aspect 184).

In aspects, the invention provides the method of any one or more of aspects 1-184, wherein the system recognizes template prompts/command prompts that direct one or more aspects of message generation other than the content of the message and are not used as content in generating messages (aspect 185).

In aspects, the invention provides the method of aspect 185, wherein the template prompts include the form of the message (e.g., generating an email), commands to use one or more prompts that are already in the system, or both (aspect 186).

In aspects, the invention provides the method of any one or more of aspects 1-186, wherein the system is programmed, trained, or both, to recognize keywords or key terms as categories of prompt topics, contexts, or both (aspect 187).

In aspects, the invention provides the method of any one or more of aspects 1-187, wherein the method comprises the user, an associated user, or system inputting situational prompt input and at least some corresponding semantic elements or equivalent semantic elements of semantic elements are present in draft messages at least in some significant amount of cases, if not most cases, but neither most of the semantic elements nor equivalent semantic elements thereof in the situational prompt input appear in draft messages in most cases or generally all cases (aspect 188).

In aspects, the invention provides a computer system comprising a plurality of neural networks, a human-system interface, and the ability to transmit and receive data via the internet, which performs the method of one or more of aspects 1-188 (aspect 189).

In aspects, the invention provides a computer system that comprises means for carrying out or that otherwise carries out the steps of the method of any one or more of aspects 1-189 (aspect 190).

In aspects, the invention provides a computer program comprising instructions encoded in physical, transferrable, and reproducible computer readable media, which, when executed by a computer, cause the computer to carry out the steps of the method of any one or more of aspects 1-189 (aspect 191).

In aspects, the invention provides a computer system for semi-automatically or automatically generating linguistically complex messages comprising (1) a computer system that (a) recognizes at least some input as training set data, contextual prompts, and situational prompts, (b) comprises or presents a user interface that provides a plurality of dedicated input elements for receiving data from a user, which comprise (I) one or more selections of instructional prompts, contextual prompts, or both, (II) one or more sections for direct input of prompts/prompt data comprising instructional prompts, situational prompts, or both, and, optionally, (III) one or more settings that modify the types of messages generated (e.g., tone, word variability, etc.); (c) comprises a first neural network that uses the prompt data and training set data to generate a distribution of semantic element options for each message the system drafts for the user; (d) comprises a selection engine that selects from the semantic element options according to programmable word variation settings; (e) comprises a data relay for relaying draft messages to the user via a display interface; and (f) comprises a content analysis neural network that analyzes the semantic content of draft messages and uses the semantic content of such draft messages to directly or indirectly change prompt data before the next use of the system (aspect 192).

In aspects, the invention provides the system of aspect 192, wherein the system further comprises a training set analysis neural network or a training set analysis group of NNs that analyzes initial training set data (or training set data in general) and either directly or indirectly changes the initial training set data to make modified training set data that can either be used as additional training data, prompt data, or both (aspect 193).

In aspects, the invention provides the system of aspect 192 or aspect 193, wherein the system further comprises an interaction engine which analyzes user interaction with draft messages and uses the outcome of such interactions to recommend changes to or cause changes of at least some weights of the first neural network based on user interaction with draft messages (aspect 194).

In aspects, the invention provides the system of any one or more of aspects 192-194, wherein the system further comprises a user interaction neural network which analyzes user interaction with draft messages and is trained to use the outcome of such interactions to, directly or indirectly, recommend changes to or cause changes of at least some weights of the first neural network based on user interaction with draft messages (aspect 195).

In aspects, the invention provides the system of any one or more of aspects 192-195, wherein the system comprises a system for tracking user replies or responses to messages and a recipient response neural network that analyzes such responses and replies and makes one or more changes, directly or indirectly, to the system based upon such responses/replies (aspect 196).

In aspects, the invention provides the system of any one or more of aspects 192-196, wherein the system comprises an engine or neural network that analyzes the content of prompt data, initial training set data, or both; a search engine component for finding related content on the internet or select sites on the internet, select data repositories, or both; and an engine or neural network for enhancing such prompt content, ITSD content, or both, based upon the identified related content (aspect 197).

In aspects, the invention provides the system of any one of more of aspects 192-197, wherein the system comprises (1) a neural network that analyses the tone/personality of a user based on inputs comprising user editing of messages, user rating of messages, user selection of content or settings, or a combination thereof, and, directly or indirectly, modifies the presentation of draft messages, the content of prompts, message settings, or any combination thereof in subsequent iterations/uses of the system, (2) comprises a neural network that directly re-writes drafted messages prepared by the earlier steps of the method, or (3) both thereof (aspect 198) (indirectly in this or other aspects meaning, e.g., promoting another neural network, engine, etc., to make the indicated changes or take the indicated actions).

In aspects, the invention provides the system of any one or more of aspects 192-198, wherein the system stores positively evaluated, user edited, or user transmitted messages, or messages that were effective in terms of recipient reply or response, for future use as either training data, prompt data, or a template for future communications (aspect 199).

In aspects, the invention provides a computer system for semi-automatically generating linguistically complex messages comprising (1) a computer system comprising (a) means for recognizing input as training set data, contextual prompts, and situational prompts, (b) user interface means for receiving (I) one or more selections of instructional prompts, contextual prompts, or both, (II) permitting input of prompts/prompt data comprising instructional prompts, situational prompts, or both, and, optionally, (III) permitting selection or adjustment of one or more settings that modify the types of messages generated (e.g., tone, word variability, etc.); (c) comprises a first neural network that uses the prompt data and training set data to generate a distribution of semantic element options for each message the system drafts for the user; (d) comprises a selection engine that selects from the semantic element options according to programmable word variation settings; (e) interface means for relaying draft messages to the user; (f) one or more content analysis neural networks that analyze the semantic content of draft messages and uses the semantic content of such draft messages to directly or indirectly change prompt data before the next use of the system (aspect 200).

DETAILED DESCRIPTION OF THE INVENTION

For convenience, combinations of elements/steps and individual elements/steps are described in this section of this disclosure, typically with focus on particular steps/components or combinations thereof, at a time. Despite the focus of such passages on specific elements/steps, readers will understand that, uncontradicted, any aspect, facet, embodiment, or other description of particular step(s) or element(s) provided herein can be applied to any general description of the compositions/methods of the invention, or any other recited element(s)/step(s) thereof, which are provided in any part of this disclosure. Uncontradicted, the description of such elements is meant to add to, enhance, and also exemplify aspects of the invention described in other parts of this disclosure, such as the preceding section of this disclosure (Exemplary Aspects of the Invention).

System Elements

Systems of the invention can include any suitable combination of hardware and software elements, which can be configured in any suitable manner to form a system and to interact with user devices, other networks (e.g., networks/systems associated with a user-associated organization wherein the system can obtain prior user-associated emails or other communications/messages), proprietary websites, social media platforms, or the internet.

In aspects, the invention provides a computer system comprising a plurality of neural networks, a human-system interface, and the ability to transmit and receive data via the internet, that performs any one or more of the various methods described in the Aspects of the Invention, Summary of the Invention, or that are illustrated in or described in connection with the Figures disclosed herewith. In aspects, the invention provides a computer system that comprises means for carrying out or that otherwise carries out one or more function(s) of such a system or step(s) of such a method. In aspects, the invention provides computer program(s), neural network(s), or both, comprising instructions encoded in physical, transferrable, and reproducible computer readable media, which, when executed by a computer/computer system, cause the computer/system to perform any one or more of such methods.

In an exemplary aspect, the invention provides a computer system for semi-automatically or automatically generating linguistically complex messages comprising (1) a computer system that (a) recognizes at least some input as training set data, situational prompts, and situational prompts, (b) comprises or presents a user interface that provides a plurality of dedicated input elements for receiving data from a user, which comprise (I) one or more selections of instructional prompts, situational prompts, or both, (II) one or more sections for direct input of prompts/prompt data comprising instructional prompts, situational prompts, or both, and, optionally, (III) one or more settings that modify the types of messages generated (e.g., tone, word variability, etc.); (c) comprises a first neural network that uses the prompt data and training set data to generate a distribution of semantic element options for each message the system drafts for the user; (d) comprises a selection engine that selects from the semantic element options according to programmable word variation settings; (e) comprises a data relay for relaying draft messages to the user via a display interface; and (f) comprises a content analysis neural network that analyzes the semantic content of draft messages and uses the semantic content of such draft messages to directly or indirectly change prompt data before the next use of the system. In a further aspect, such a system further comprises a training set analysis neural network or a training set analysis group of NNs that analyzes initial training set data (or training set data in general) and either directly or indirectly changes the initial training set data to make modified training set data that can either be used as additional training data, prompt data, or both. In another aspect, the invention provides such a system as described in this paragraph, wherein the system also or alternatively comprises an interaction engine or interaction system, which analyzes user interaction with draft messages and uses the outcome of such interactions to recommend changes to or cause changes of at least some weights of the first neural network based on user interaction with draft messages. User activity tracking software/engines ("activity trackers" or "user activity monitors") are known in the art. E.g., web-based applications can employ web tracking software/applications, click-tracking tools, etc. Furthermore, nearly all computer programming languages have the capability to record user input and to store it as data as a basic function of such programs. In aspects, part, most, or all of the functions of an interaction engine are carried out by neural network(s) trained to analyze such user interactions. A number of such engine(s) (e.g., a number of specific neural networks) for different aspects of user interaction with messages can be included in a system (e.g., one engine can track user modification of messages, another engine can track user ratings of messages, and still a further can optionally track user transmission of messages). In an exemplary aspect, the system includes a user interaction/experience neural network (UINN or UXNN), which analyzes user interaction with draft messages and is trained to use the outcome of such interactions to, directly or indirectly, i.a., (a) recommends changes to or (b) cause changes in/of at least some weights of the first neural network based on user interaction with draft messages.

Systems of the invention can, in aspects, comprise a non-neural network engine(s) or neural network(s) that analyze(s) the content of prompt data, initial training set data, or both, as described further elsewhere. Such engine(s)/NN(s) can analyze any such types of data for errors, omissions, or opportunities for enhancement. In aspects, systems further comprise search engine(s) and related engine(s) for automatically or selectively finding related content to prompt data, training set data, draft message content, or a combination thereof, on the internet or select sites on the internet, select data repositories, or both; and an engine or neural network for enhancing such prompt content, initial training set data content, draft message content, or a combination of some or all thereof. Enhancement as described herein can, in cases, be used to refer to the addition of data that such an engine determines is sufficiently related to the other data input (prompt, training set) or output (draft message(s)). The term enhancement also can sometimes be used to represent, i.a., correction of errors, completion of expected incomplete records, additional of predicted omissions, replacement of terms with terms that are determined by the system to be better optimized for intended applications/operations, addition of content to data record(s), or other modifications thereof (in some cases enhancement is used just to refer to addition of content to data records). E.g., if a prompt includes content about a location, enhancement can mean obtaining information about the location, such as historical facts, demographic facts, fun facts/trivia, weather information, economic information, and the like. Similarly, where a prompt provides information about a person or organization enhancement can mean including information about such person or organization, which as exemplified herein can include automatically obtaining associated social media posts (e.g., from LinkedIn posts, Twitter messages, Facebook posts, reviews on Google/Yelp or other sources, Glassdoor posts, etc.), content from web sites, published article information, governmental disclosures (e.g., SEC 10-k/10-Q, 8-K, or S-1 submissions/reports). A system also can enhance inputs/outputs by removing inappropriate terms, awkward phrases, spelling errors, and the like, or optimizing wording content of data sources according to standard(s), output of neural network(s) of the system, or the like.

In aspects, any such system can further comprise a neural network that analyses the tone/personality of a user based on inputs comprising user editing of messages, user rating of messages, user selection of content or settings, or a combination thereof, and, directly or indirectly, modifies the presentation of draft messages, the content of prompts, message settings, or any combination thereof in subsequent iterations/uses of the system. Neural network methods for understanding and applying user personality types are known. Relevant principles, methods, and the like are described in, e.g., US20210288926; U.S. Ser. No. 10/991,142; US20190205382; US20200395008; U.S. Ser. No. 11/275,895; US20210182663; U.S. Ser. No. 10/049,103; WO2021185998; US20180075483; US20210390876; U.S. Ser. No. 11/257,496; WO2021258000; Mohades Deilami, F., Sadr, H. & Tarkhan, M. Contextualized Multidimensional Personality Recognition using Combination of Deep Neural Network and Ensemble Learning. Neural Process Lett (2022). doi.org/10.1007/s11063-022-10787-9; Nilugonda et al., 2021, "Big Five Personality Traits Prediction Using Deep Convolutional Neural Networks" in Advanced Informatics for Computing Research; Ma, Anthony G. Brown. "Neural Networks in Predicting Myers Brigg Personality Type from Writing Style." (2017); Mjudmer et al., "Deep Learning-Based Document Modeling for Personality Detection from Text," in Affective Computing and Sentiment Analysis (Eik Cambria, Ed.) (2017) (IEEE Intelligent Systems); Tian et al., 2021. Royal Society Open Science. doi.org/10.1098/rsos.201976; and Baaran et al, Sage Open, 2021, 11(3). doi.org/10.1177/21582440211032156; Mehta et al, 2018, arXiv:1908.03628v2; and such approaches were embodied, in at a chat level, in Replika AI/Apps (reportedly launched in 2017).

In aspects, systems can include one or more neural networks that directly re-writes drafted messages prepared by the system/method. E.g., initially drafted message(s) can be submitted to a message optimization neural network, which can re-write the message(s) in accordance with the training of the message optimization neural network. E.g., in one aspect, such a neural network is trained using messages of communication thought leaders, messages that have proven effective with a particular type of recipient, messages that were previously effective for the user/sender, or a combination thereof. The operation of such a neural network may, in aspects, be similar to the operation of an EPDNN/selection engine combination described elsewhere in making a number of semantic element predictions and selections therefrom to generate new messages using the original system-drafted messages as key prompts for the message optimization neural network(s). In aspects, non-NN engine(s) also or alternatively can be used to modify the content of such messages. In aspects, such modifications are presented to users via interface(s). In aspects, systems/methods include the ability to generate such further modified messages as an option for users. In aspects, the system can present original and modified messages comparatively (e.g., side-by-side), reflected proposed changes/amendments, and the like.

In aspects, systems of the invention can receive and process feedback in one or more forms provided by users in reaction to output of the system/method, proposed changes in inputs, and the like. In aspects, the system stores information regarding user interactions with system-generated outputs, inputs, or both. E.g., a system can record, analyze, store, and utilize in further analytical processes, outputs, etc., positively evaluated, user edited, or user transmitted messages, or messages that were effective in terms of recipient reply or response, for future use as either training data, prompt data, or, e.g., for use as a template or in generating template(s) for future communications. Positively stored, utilized (transmitted), or edited and rated/transmitted messages can, e.g., be used as prompts, to form a new training set, and the like for further uses/iterations of the system/method.

In another exemplary aspect, the invention provides systems in which various functions that can be performed by various known components/systems in the art are described in terms of "means" for performing functions (or steps for functions). E.g., in one aspect the invention provides a computer system for semi-automatically generating linguistically complex messages comprising (1) a computer system comprising (a) means for recognizing input as training set data, situational prompts, and situational prompts, (b) user interface means for receiving (I) one or more selections of instructional prompts, situational prompts, or both, (II) permitting input of prompts/prompt data comprising instructional prompts, situational prompts, or both, and, optionally, (III) permitting selection or adjustment of one or more settings that modify the types of messages generated (e.g., tone, word variability, etc.); (c) comprises a first neural network that uses the prompt data and training set data to generate a distribution of semantic element options for each message the system drafts for the user; (d) comprises a selection engine that selects from the semantic element options according to programmable word variation settings; (e) interface means for relaying draft messages to the user; (f) one or more content analysis neural networks that analyze the semantic content of draft messages and uses the semantic content of such draft messages to directly or indirectly change prompt data before the next use of the system. In general, any functions described herein that are known to be performed by a variety of known systems/components can be described in terms of "means" for carrying out such functions. Examples of such means can include storage means, processing means, data relay means, semantic element selection means, and the like.

For sake of better illustrating the invention, the focus of the disclosure in the following sections will primarily be on components of systems/steps of methods of the invention, but readers will continue to recognize that any aspects described in such sections can be combined with any other suitable aspect, embodiment, etc., disclosed herein.

Processors

Systems will comprise processors (sometimes called processor unit(s), processor systems, processor components, and the like). Processors are understood in the art and typically the term is understood to mean device(s)/system(s) that can, i.a., execute ("read" or "run") CEIs (engines, algorithms, applications, code, etc.) stored in memory. A system can comprise multiple processors/processor units/components, which can be physically or functionally separate from each other. Such separate processing device(s)/system(s) can form a discrete/inter-operating processor, or a system can comprise multiple processing unit(s) that at least some, most, or all of the time operate separately from each other. Systems can include different types of processors, such as, e.g., a stream data processor for handling intake of streaming data delivered from another part of the system or associated network. Processors typically comprise physical components, at some level, but processing can be "virtual," and elements of processing can be performed at a software/engine level. Processors can, for example, comprise a workflow/architecture that can be characterized as comprising massively parallel processes/very large workflow (e.g., as such terms are understood in the art in connection with leading cloud-based systems, such as Microsoft Azure systems). E.g., in aspects, the number of cores/processors in a multi-core MA is ≥~10, e.g., ≥~20, ≥~50, ≥~100, ≥~200, ≥~500, or ≥~1,000, such as ≥~2,000, ≥5,000, ≥10,000, ≥12,500, or ≥~15,000 cores (e.g., —1,000-20,000 cores, 1,000-15,000 cores, 3,000-18,000 cores, 2,000-16,000 cores, or ~2,500-15,000 cores). In aspects, the processor of a system is primary, generally only, or entirely composed of cloud~based processor capabilities/functions. In aspects, a processor operates based on a scalable, massively parallel, and distributed processor system. Massively parallel process (MPP) functions/methods can be achieved by use of large system step functions, such as Amazon Web Services (AWS) Step Functions. Microsoft Azure services also include MPP functions. In aspects, one, some, most, or all processor(s) of a system can be characterized as being "highly available" or comprising "highly available" workflow(s). In aspects, a system or component of a system exhibits≥~97%, ≥~98%, ≥~99% availability (accessibility and standard/optimal operability) over a period (e.g., per quarter, year, 3-year period, 5-year period, etc.), and in more particular aspects, a highly available system exhibits≥~99.8%, ≥~99.9%, ≥~99.95%, or ≥~99.999% availability. High availability can be achieved by any suitable method(s) including normal means, message queues, lambda retry functions (e.g., in AWS), or a combination thereof. General resources/structures for high availability comprise application of component redundancy, component monitoring and management, failover (node/process substitution/routing), use of distributed replicated volume(s), load balancing, or a combination thereof. Processors can employ, in aspects, parallel processing, which can comprise an architecture of or perform distributed parallel processing, non-distributed parallel processing, or both. "Distributed processing" typically means processing performed on physically separate but networked machines. Non-distributed parallel processing can be performed on interconnected and co-located cores. Parallel processing systems can comprise systems classifiable as clusters, grids, cloud, or a combination thereof. Systems and associated networks can comprise/use routers, which can comprise networking/communication equipment configured to provide internal and external communications. Routers can include packet-switching and/or routing device(s)/unit(s) (including switches and/or gateways) configured to provide network communications between system/network component(s). Routers can be selected for capability to handle, configured for, or both, to handle the data demands of network, data storage, latency, availability, and throughput of system/network and other factors that may contribute to the cost, speed, fault-tolerance, resiliency, efficiency, and/or other design goals of the network/system architecture. Router(s) of the system/network can comprise security capabilities, such as VPN, firewall, etc. and can also include multiprotocol label switching capabilities. In aspects, some, most, generally all, essentially all, or all routing, switching, and similar functions are performed by software defined wide-area network components/units (SD-WAN appliances) (which can be on-demand components).

In aspects, system engine(s)/component(s)/unit(s)/system(s) are mostly, generally, essentially, or entirely based in public cloud networks/remote server devices (e.g., integrated/linked server cluster(s)) that can be used for outsourced computation, data storage, communication, and service hosting operations. These server(s) may be virtualized (i.e., server(s) may be or comprise virtual machines). Examples of public cloud networks include Amazon Web Services (AWS), Google Cloud services, and Microsoft Azure Services. A system can comprise a network management platform and server cluster(s) supporting public cloud networks, providing load balancing, redundancy, high availability, scalability, etc.

In aspects, system can comprise virtual machines/servers (emulations comprising memory, processing, and communication resources), which can be embodied by computer device(s), server cluster(s), etc., which typically are managed by a centralized server device, application, etc., which acts as a system controller, and can be accessed selectively by authorized system administrators. Virtual machine systems through Microsoft, VMWare, and the like are known in the art and can be adapted to such applications.

Memory

Systems of the invention include the ability to store data, including computer executable instructions (CEI) (code) (e.g., engines). Systems can include any suitable type of memory component(s), system(s), etc. Various forms of memory systems are well known in the art. E.g., hardware components of a system's memory can use any suitable type of memory media. E.g., in aspects memory can comprise dynamic RAM or Flash memory. In aspects, memory comprises disk-based storage memory or a hybrid structure disk-based storage and DRAM/flash memory (e.g., using disk storage for "colder" data with DRAM or flash being used for "hotter" data).

In general, memory component(s)/system(s), which can also be referred to as memory unit(s), may include computer executable instructions encoding kernel(s), and/or applications. A kernel can be an operating system, including modules for memory management, scheduling and management of processes, input/output, and communication, or device drivers that allow the operating system to communicate with the hardware modules/components (e.g., memory units, networking interfaces, ports, and buses) of the relevant computing device/system. Applications may be one or more user-space software programs, such as web browsers or email clients, as well as any software libraries used by these programs.

Memory may also store data used by these and other programs and applications. Data storage/memory unit(s) of a system or other network device can comprise/be in data storage arrays that can include drive array controllers configured to manage read and write access to groups of hard disk drives, solid state drives, etc. Drive array controllers, alone or in conjunction with system component(s) (server device(s)), also can be configured to manage backup or redundant copies of data stored in data repository(ies) (DR(s)) of a system (also sometimes called memory unit(s)) to protect against data failures, etc., e.g., failures that prevent system component(s) from accessing parts/units of memory/data storage. As discussed elsewhere, DR(s) can include any suitable form of data repository(ies), including any suitable database(s), such as a structured query language (SQL) database, no-SQL databases, data lakes, and the like. Various types of data structures can store information (e.g., analytical data) in such a database, including but not limited to tables, arrays, lists, trees, and tuples. Furthermore, databases or other DR(s) in data storage can be monolithic or distributed across multiple physical devices.

Data repositories ("DRs") can be classified based on how data is primarily, substantially only, or only received (ingested), stored, and accessed/utilized (consumed) in/from the DR. Examples of known DRs include databases, data warehouses, and data lakes. Typically, each DR in a device or system's memory can be distinguished based on characteristics in these other ways from other DRs in the overall memory of the device/system. E.g., skilled persons can distinguish a database DR from a data lake DR based on, i.a., the structure of the DR, the type of data stored in the DR, etc.

In specific facets, DR(s) are stored in whole or in part and processor function(s) are employed via a cloud platform such as Microsoft Azure, AWS, or Google Cloud. Distributed processor system(s)/component(s) that can make up some, most, generally all, or all parts of a system processor can use distributed memory, whereby, e.g., processors can be endowed with chunks of the memory space and communicate via message-passing or similar methods. Each processor can in such aspects have direct access to its local memory and indirect access to nonlocal or remote chunks of memory. In aspects, some, most, generally all or all of system memory is based on a cloud computing platform/paradigm (e.g., DR/data store as a Service/Storage (DaaS) Platform or an Infrastructure as a Service (IaaS) or Platform as a Service (PaaS) Platform, comprising processing and possibly other functions in addition to memory and memory-supportive functions only). In aspects, cloud-based system memory element(s) of a system is or are based on a distributed system, scalable on demand (or automatically) system, or both. In aspects, distributed file systems that form some, most, generally all, or all of the system memory store data across many separate servers. In some facets, most, generally all, or substantially all the system memory is not distributed.

In aspects, the system memory unit(s) comprises a cloud-based memory comprising an internet-scale file system (e.g., Google File System (GFS)). Examples of cloud-based storage systems having these, and other features discussed here include Amazon Simple Storage Service (S3), Nirvanix Cloud Storage, OpenStack Swift, and Windows Azure Binary Large Object (Blob) storage. A system memory unit can comprise a file management system/layer, which defines some or most of the architecture for other data management levels in the Memory Unit (e.g., a Hadoop Distributed File System (HDFS) or similar system with capability to partition and replicate data sets to nodes where they are more likely to be consumed by applications directed by Mapping Functions (mappers)). Such file systems typically comprise a configurable data set replication function, detectably or significantly minimizing the impact of component/device failure in the system memory unit hardware architecture or operating system/software. In aspects, function(s) or component(s) of system memory unit(s) also can comprise a data management system (DMS), which can include a database management system (DBMS). In aspects, elements of the system memory unit(s) can comprise or operate with an execution tool to detectably or significantly (DoS) distribute computational load among components of a memory system and which can act as an API for the memory and can include or relate to other system component(s)/function(s), such as data inspection, data auditing, or data visualization functions directed to system memory. System processor(s) also typically comprises a query system for information extraction from DR(s).

Engines, Algorithms, and Related Components

Systems of the invention can be characterized by inclusion, use, etc., of one or more "engines." The term "engine" is somewhat described elsewhere, but any description provided there or here refers to certain aspects of a concept understood in the art and such descriptions are intended only to be illustrative or clarifying, rather than limiting, unless expressly stated. However, any of the characteristics provided in this disclosure can be used to define narrower aspects of engine(s) in the system.

In the art, several terms are used interchangeably with engine (including algorithm, function, code, program, etc.). The lines between such elements are often not clear in the art. In general, an engine herein will refer to a programmable collection of computer-executable instruction(s) (CEIs) (code) that imparts or performs one or more discrete and significant functions in the operation of a computer or system. Typically, an engine performs either one function or ≥2 discrete, but related, functions. In this respect, an engine is typically distinguishable from an "operating system," a programming language, and the like. An engine can be characterized by algorithm(s)/processes it performs, but an engine also can be a component in an algorithm/process. Similarly, engines can often form part of programs (e.g., a web browser typically comprises a browser engine and a JavaScript engine) or can be characterized as a program. In aspects, engine(s) can comprise or be packaged as, e.g., a library or an object that imparts functionality to a program, system, etc. Other examples of engines include database engines, graphics engines (e.g., Python matplotlib), search engines, plotting engine, and the like. In aspects, some or most engines will not have a standalone interface/API, and, in such respect, are distinguishable from most programs and applications. However, in other cases, an API can be considered an engine. Engines may also be described by other terms such as, e.g., microservices. Although, as evidenced from the foregoing, the term "engine" can vary in scope, the term is well understood to refer to functional units of software code that perform focused functions according to generally understood principles. Accordingly, the structure of engines is generally well understood to those of ordinary skill in the art either from a description of such functions (e.g., in the case of well-known engine types, such as graphics engines and search engines) or from the description of such functions provided herein.

The term "algorithm" is also understood in the art. Typically, an algorithm means a finite sequence of instructions, typically used to solve a specific problem or class of specific problems or to perform a computation. Often algorithms can be ready described using mathematical expressions, pseudocode, flowcharts, or a combination of any thereof. In the latter case, algorithms and processes tend to overlap. Processes described e.g., in the figures can, in this respect, be considered algorithms Typically, algorithms are expressible in typical coding language (e.g., JavaScript, Python, etc.). Both algorithms and engines typically lead, or contribute, directly or indirectly, to some kind of output (e.g., a transformation of data) and typically start from an initial state and input, which is used to produce such output(s). Classic coding algorithms include, e.g., bubble sort algorithms for sorting data and best-fit algorithms for searching. In machine learning/AI, common algorithms include linear regression, logistic regression, decision tree algorithms, k-Nearest Neighbor algorithms, random forest algorithm/ensemble, and k-Means algorithms Numerous other examples are known in the art. In aspects, an engine performs or executes once or more algorithms. However, in other aspects, steps performed in a broader algorithm include steps performed by engine(s). Neural networks typically execute numerous and interrelated algorithms at different levels (e.g., a neuron/node can execute an algorithm; a NN layer can perform a function/algorithm, such as classification, clustering, and the like; and interconnected nodes/neurons, such as interconnected neurons in a dense NN or a densely connected NN, which systems can include, can be considered to collectively perform complex algorithms/functions including sub-algorithms/functions).

In general, functions described herein that are not performed by other system components can be assumed to be performed by engine(s). E.g., engine(s) of the system participate in the generation and presentation of data to users and receipt of input from users via graphical interface(s). Thus, any description of such function(s) herein provides simultaneous implicit support for corresponding engine(s) included in a system of the invention, unless it is clear that such function is performed exclusively by another type of component (e.g., one or more neural networks that are clearly separated from the referenced engine). In aspects, engine(s) of a system can be non-artificial intelligence/non-machine learning engines.

In aspects, engine(s) of a system can be implemented, in part, by operation of one or more neural network(s), either by direct operation of the neural network or by indirect operation of the neural network operating in coordination with other system elements. E.g., analytical neural networks are often referred to as "inferencing engines" or "neural network inferencing engines." Thus, in general, any general description of an engine herein, can be performed by any type of computer component, including a classic computer program, object, library, or more advanced system such as neural networks, and, uncontradicted, the general use of the term "engine" implicitly discloses corresponding aspects of each such type of engine and for neural network and non-neural network engines, in general.

Systems also can include application program interface(s), which provide for system administrator(s) to edit conditions of operation of the system and specific system components (e.g., for providing training to neural network(s), for changing the conditions of engines, and the like). Examples of suitable API(s) are described in connection with the Figures provided herewith and several other suitable types of API(s) are known in the art.

Given the level of knowledge in the art regarding such engines, there is no need to specify the specific further features of well understood engines herein (e.g., search engines, graphics engines, relational database engines, and the like). However, particular engines that characterize some of the more novel and inventive aspects of certain embodiments are further described herein in a non-limiting manner to better illustrate the invention and enable skilled persons to readily put the invention into operation.

Language Modeling Engine

One type of engine that is common in systems of the invention is a language modeling engine. The language modeling engine executes one or more language models. Language models, as known in the art, are models/tools that predict words in a text based on inputs, such as, in aspects, the preceding words of a sentence, paragraph, or document. An EPDNN, for example, uses its language model to generate a possible distribution of words according to settings and based upon inputs to the NN. There are a variety of language models, known in the art, such as statistical language models/probabilistic approaches (e.g., use of Hidden Markov Models). In aspects, the language model can use input/message context to distinguish between words that may be similar in one or more respects which do not reflect meaning (e.g., by distinguishing between phonetically similar words). Examples of such approaches/techniques known in the art include N-gram approaches (e.g., at a token, word, or other level) (unigrams, bigrams, trigrams, etc.) or related models (e.g., a skip-gram model or Bag-of-words model).

Language models (LMs) can be unidirectional or bidirectional. In aspects, LMs executed by language modeling engine(s) can include or be characterized as exponential models (maximum entropy models). In aspects, LMs executed by language modeling engine(s) can comprise continuous space models. Other models that may be employed by language modeling engine(s) can include positional language models or bag of concept models. In aspects, systems include a language modeling engine performs, i.a., neural language model(s), in whole or in part executed by neural network(s), which comprise use of non-linear combinations of weights and probabilistic classifiers that learn probability distribution associated with natural language processing (NLP) tasks, e.g., through known techniques such as stochastic gradient descent with back propagation.

In aspects, part or some of language modeling is also or alternatively performed by non-AI/non-neural network engines of the system, e.g., systems that perform probabilistic models or perform in other natural language processing functions/algorithms, such as stemming, lemmatization, embeddings, stop-word removal, and the like, reference to dictionary/thesauruses or other corpora, etc. Examples of such tools (e.g., segmentation, sentence parsing, stemming, and lemmatization, and tokenization) are provided in the Natural Language Toolkit (NLTK) library that is available in Python.

In aspects, a/the language modeling engine of a system is a part of the system that is executed by, in part, directly or indirectly, the first neural network (FNN)/element prediction distribution neural network (EPDNN) of systems/methods, either mostly, generally only, substantially only, or exclusively. A variety of neural network models are available and known, which can either be employed in systems/methods of the invention or used as a model, benchmark, etc., for system neural language models. Examples of such models and related tools include BERT (Bidirectional Encoder Representations from Transformers)(developed by Google), which uses a transformer neural network architecture; RoBERTa (Robustly Optimized BERT Pretraining Approach), which provides a method for pre-training of a self-supervised NLP system built on modification of hyperparameters in BERT; OpenAI's GPT-3 (another transformer-based NLP model that can manage statistical dependencies between different words and is trained on over 175 billion parameters on 45 TB of text) and which provides developers with the capability of reprogramming instances of the model using instructions; ALBERT (standing for a "lite" BERT—a system using factorized embedding parameterization and cross-layer parameter sharing and a self-supervised loss for sentence order prediction); XLNet (which uses an autoregressive pre-training method enabling bidirectional context learning); OpenAI's GPT2 (background trained on the extensive WebText training set); StructBERT (an extension of BERT incorporating language structures into pre-training of the model); T5 (Text-to-Text Transfer Transformer) (also developed by Google Research and which employs replaced token detection methods rather than masked token inputs for corrupted tokens); ELECTRA (Efficiently Learning an Encoder that Classifies Token Replacements Accurately); and DeBERTa (Decoding-enhanced BERT with disentangled attention) (which employs disentangled attention, an enhanced mask decoder, and is also needed to comprehensively model relative positions in a sequence of tokens). Alternative models can be developed or employed in methods/systems, and any models employed can include any one or more combinations of such features described in association with the models described here, elsewhere in this disclosure, or otherwise in the art. Recently, switch transformers have been described which may be useful for such platforms (see, e.g., Fedus et al., arXiv:2101.03961. doi.org/10.48550/arXiv.2101.03961. Another recently described neural network with reportedly significantly greater capabilities than GTP-3 is Wu Dao 2.0. Other NLP tools known in the art that can be utilized, adapted, or used as models for language modeling engine(s) or components thereof include Aylien, IBM Watson, Google Cloud Natural Language API, Amazon Comprehend, Stanford Core NLP, the TextBlob Python Library, MonkeyLearn, the SpaCy Python Library, and the GenSim Python library. Still other tools available for use as, in, or as templates for generating natural language models/language modeling engine(s) include SpanBert, XLM, ELMo (which uses bidirectional methods) (available at allenai.org/allennlp/software/elmo and known in the art), and the like.

Neural network (neural) language modeling engines of systems/methods typically are competent general language modeling engines prior to further training such model(s)/NN(s) with initial training set data (ITSD) (ITSD typically mostly comprises or generally consists of the type of messages that the system is to generate). In aspects, a neural language modeling engine of a system is trained on a general (background) natural language training set of at least five hundred million words in at least one natural language (e.g., English, Chinese, Spanish, Arabic, Russian, German, French, and the like). In aspects, a language model engine is executed by, at least in part, neural network(s) trained on a general/background language training set of ≥700 million, ≥800 million, or ≥1 billion words in at least one natural language. In aspects, neural network(s) of systems/methods are provided background/general training with a domain-specific training set on a capable language model (e.g., FinBERT) (see, e.g., McCormick, C., 2020, Domain-Specific BERT Models, mccormickml.com/2020/06/22/domain-specific-bert-tutorial/). General language competence can be demonstrated by any suitable measure or assessment in the art. Models can, e.g., be subject to surveys of audience members (e.g., as described elsewhere herein) or models (e.g., LAMBADA score testing/modeling as described elsewhere or similar methods described in reference(s) incorporated herein).

Sampling Engine

In aspects, systems/methods comprise sampling engine(s). A sampling engine typically refers to an engine that performs decoding function(s), e.g., selecting semantic elements from a probability distribution generated by a system element, such as a neural network, e.g., an EPDNN. A variety of decoder/sampling approaches are known in the art that can be usefully employed/executed by sampling engine(s). Such methods include Greedy Search (sometimes referred to as "maximization"); Beam Search and variants thereof; Natural Search; Random Sampling; Temperature (Random Sampling with Temperature); Top-K Sampling; quantum search decoder; and Nucleus Sampling (for quick summaries of such methods see, e.g., Phy, V., Jul. 8, 2020, towardsdatascience.com/decoding-strategies-that-you-need-to-know-for-response-generation-ba95ee0faadc; Mann, B., 2019, towardsdatascience.com/how-to-sample-from-language-models-682bceb97277; von Platen, P., 2020, huggingface.co/blog/how-to-generate; and Karakaya, M., 2021, medium.com/deep-learning-with-keras/sampling-in-text-generation-b2f4825e1dad). Relevant principles, methods, etc., are described in, e.g., Fan et al., 2018, arXiv: 1805.04833 (doi.org/10.48550/arXiv.1805.04833); Holtzman et al., 2020, arXiv:1904.09751 (doi.org/10.48550/arXiv.1904.09751); Huan et al., 2021, Proceedings of the AAAI Conference on Artificial Intelligence, 35(14), 13082-13089. Retrieved from ojs.aaai.org/index.php/AAAI/article/view/17546; Bausch et al., arXiv:1909.05023 (doi.org/10.48550/arXiv.1909.05023)/Quantum Mach. Intell. 3, 16 (2021); Huang et al., AAAI 2021: 13082-13089; Spero, Max. "Improved Beam Search Diversity for Neural Machine Translation with k-DPP Sampling." (2019); Leblond et al., arXiv:2104.05336; ZarrieB S et al. Information. 2021; 12(9):355. doi.org/10.3390/info12090355; and Meister et al., arXiv:2106.07400. Sampling engines, sampling methodologies, and related principles are also described in, e.g., U.S. Pat. No. 11,182,566; US 2022/0100676; US 2020/0327555; U.S. Pat. No. 10,726,059; US 2022/0012433; and U.S. Pat. No. 11,216,459.

Neural Networks

Systems of the invention typically include one or more neural network(s). Typically, system(s) include at least one neural network ("NN") that acts as an element prediction distribution neural network (EPDNN) (also referred to as a first neural network (FNN)). In any case where a single neural network is described herein, readers will understand that such disclosure implicitly discloses an alternative embodiment in which a group of neural networks performs the indicated function or comprises at least one neural network in the group that performs the indicated function (e.g., semantic element distribution prediction). In aspects, systems of the invention include at least 2, at least 3, at least 4, at least 5, or more different types of NNs or neural network groups. E.g., in one aspect, systems of the invention comprise a content analysis neural network (a "CANN"), in addition to at least one EPDNN. Other examples of neural networks that can be included in systems of the invention and the general characteristics attributable to some, most, generally all, or all NNs of systems are described elsewhere (e.g., message optimization neural networks that can also or alternatively be included in a system are described above). As neural networks are known in the art, some general elements of NNs are only touched on or summarized here and others not addressed herein given the availability of relevant information, systems, and the like in the art.

The basic structure and operation of neural networks is known and, accordingly, not extensively discussed here. In general, each neural network of the one or more neural networks comprising one or more layers of neurons, each of the neurons comprising one or more inputs and one or more weights associated with the one or more inputs (as well as being associated with other standard features such as biases and the like), wherein at least a first neural network or first group of neural networks in the one or more neural networks further comprises or provides input to a language modeling engine of the system (as described above), which is trained on a general natural language training set of at least five hundred million words in at least one natural language.

Generally, any suitable type of neural network for performing functions described herein, such as NLP functions, can be incorporated into systems or used in methods of the invention. Neural networks are well understood in the art and, accordingly, are only briefly described herein, though some preferred aspects of the invention can include neural network characteristics as aspects of the invention.

Neural networks generally comprise a number of networked neurons in multiple layers forming an architecture. Often, a neural network neuron operates through a perceptron, which, in turn, typically consists of input values, weights, and a bias, a weighted sum, and activation function. An activation function decides whether a neuron should be activated or not, and sometimes is referred to as an activator. In aspects, neural networks can comprise multi-layer perceptrons (MLPs). In aspects, neural networks comprise non-linear activators, such as sigmoid activation functions/logistic function activators or non-sigmoid activators. In aspects, most or generally all of the activators/neurons in one or more neural network(s) are not sigmoid activators. In aspects, most of the activators or generally all of the activators in one or more neural networks are also or alternatively not Tan h (hyperbolic function) activators. Examples of non-linear activators/neurons include, e.g., Rectified Linear Activation Function (ReLU) activators. Neural networks, with, e.g., primarily ReLU activators are often classified as ReLU neural networks or rectifier neural networks and can be incorporated in systems of the invention in some aspects. In aspects, some, most, or at least generally all of the activators of one or more neural networks are known variants of ReLU activators, such as Softplus (Soft Plus), Softmax, Swish, Leaky ReLU, ELU (exponential linear unit), Gaussian Error Linear Unit (GELU), and SELU (scaled exponential linear unit) activators. In aspects, visible layers of a neural network are generally free or substantially free of ReLU activators and ReLU variant activators. In aspects, hidden layers generally lack or substantially lack sigmoid or Tan h activators. In aspects, visible layers comprise sigmoid or Tan h activators. Aspects of activators and other elements of neural network architecture/operation are described in, e.g., Goodfellow, DEEP LEARNING, 2016, ISBN-10: 0262035618.

The term "artificial neural network" (ANN) generally is synonymous with the term "neural network," but sometimes the term ANN is used to describe MLP NNs or other types of NNs that are not recurrent NNs (RNNs) or convolutional NNs (CNNs).

In aspects, neural network(s) of a system can comprise/be characterized as feedforward neural networks. Other NN architectures that can characterize NN(s) of systems, in aspects, include radial basis network, deep feed forward, long/short term memory (LS™), gated recurrent unit (GRU), auto encoder (AE), variational AE, denosing AE, sparse AE, Markov chain, Hopfield Network, Boltzman Machine (BM), restricted BM, deep belief network, deep convolutional network, deconvolutional network, generative adversarial network, liquid state machine, extreme learning machine, echo state network, deep residual network, Kohonen Network, support vector machine, and Neural Turing Machine architectures/types, or any other similarly known architectures in the art that are suitable for the applicable NN.

In aspects, one, some, most, or at least generally all of the NNs are RNNs. However, in other aspects, at least most, at least generally all, or at least substantially all of the NNs of the system are non-RNN neural networks. RNNs and other relevant concepts used herein, such as natural language models, are described in, e.g., U.S. Pat. No. 11,144,725. Some of these concepts and others (e.g., various layers of operation, cloud computing systems, tokens, NLP functions, and the like) are further described in US 20210342380 and US 20210182662. System elements/methods described in such references that are adapted to systems/methods herein can be combined with any systems/methods of the invention.

In aspects, neural network(s) can comprise convolutional neural networks (CNNs). CNNs are similar to feedforward networks, but they are usually utilized for recognition of data, such as pattern recognition, e.g., image recognition, rather than, e.g., for natural language processing functions. In other aspects, some, most, generally all, or least substantially all of the NNs of the system are not classifiable as CNNs.

In aspects, NN(s) can comprise n adaptive-resonance (ART) neural network (described in, e.g., G. A. Carpenter & S. Grossberg, "Neural dynamics of category learning and recognition: Structural invariants, reinforcement, and evoked potentials", in M. L. Commons, R. J. Hermstein, S. M. Kosslyn, & D. B. Mumford, (Eds.), 9 Computational and clinical approaches to pattern recognition and concept formation. Quantitative analyses of behavior (Hillsdale, N.J., Lawrence Erlbaum Associates, 1990)).

In aspects, the trainable neural networks of the invention can be considered "deep" neural networks. Uncontradicted, a "deep" neural network in the context of this invention is a neural network containing at least three layers, typically where at least one layer is considered a "hidden" layer, one an input layer, and one an output layers. Often NNs will include many hidden layers. Such concepts are well known in the art. In aspects, a neural network can include ≥5, 10, 20, 30, 50, 100, 200, 250, 300, 500, 700, 800, 1000, or even more layers. In general, any suitable numbers of layers can be used in neural networks of the invention. Each layer of an NN can comprise any suitable number of neurons. The number of neurons in, e.g., an input layer can be selected based on known factors, such as the number of inputs, provided that in language Neurons can be of any suitable type, including multi-valued neurons. Neural network(s) can include, in aspects, complex-valued neural network(s) (CVNN(s)) or NNs having CVNN-like functioning/properties (see, e.g., Bassey et al., arXiv:2101.12249, Jan. 28, 2021).

In aspects, some, most, generally all, or all NNs of a system are capable of processing sequential input data, such as natural language (which is not possible with certain other types of NNs). In aspects, some, most, generally all of the NNs in a system are capable of processing sequential data out of order (e.g., as in the case of a transformer neural network).

Neural network(s) in systems of the invention can include one or more attention layers or other "attention" elements known in the art. Neural network(s) can, for example, comprise a transformer architecture (and can be characterized as transformer neural network(s)) (see, e.g., Vaswani et al., 2017, arXiv:1706.03762). In aspects, some, most, at least generally all, or at least substantially all of the NNs of systems are characterizable as comprising/having a transformer architecture/operation. In aspects, any, some, most, or all of the transformer NN(s) are transformers with additional memory and retrieval units as known in the art (e.g., as described in arxiv.org/abs/2202.06991 and arxiv.org/abs/2203.08913).

In respect of EPDNNs and other natural language modeling (NLM)/natural language processing (NLP) neural networks of the invention, such neural networks can comprise, mostly comprise, generally consist of, or all be NNs that exhibit significant language processing capabilities, similar to any of the performance characteristics known with respect to leading neural network systems, such as BERT, GPT-3, and the like. E.g., in aspects, one or more neural networks involved in NLP/NLM functions of a system exhibit a few-shot LAMBADA accuracy of at least about 50%, at least about 60%, at least about 65%, at least about 70%, at least about 75%, at least about 80%, at least about 85%, or ≥~90%, employing methods that have been used to evaluate leading neural networks, such as, e.g., GPT-3. Such methods are known in the art (see, e.g., Paperno et al., 2016, Conference: Proceedings of the 54th Annual Meeting of the Association for Computational Linguistics (Volume 1: Long Papers) (DOI:10.18653/v1/P16-1144); T. Brown, B. Mann, N. Ryder, M. Subbiah, J. Kaplan, P. Dhariwal, A. Neelakantan, P. Shyam, G. Sastry, A. Askell, and others. arXiv preprint arXiv:2005.14165 (2020); and Vu, Tu et al. "STraTA: Self-Training with Task Augmentation for Better Few-shot Learning." EMNLP (2021) (principles of each of which may also be applicable to other aspects of the invention).

Neural networks, such as any of the NLM neural network described herein, can be referred to as a "model" or in respect of a "model." The term "model" is sometimes applied to NNs, in general (i.e., in the sense that a NN can be considered an analytical model, computational model, machine learning model, etc.). In another sense, the term "model" in the art refers to either the function or type of function performed by a neural network (e.g., semantic element prediction) or a neural network characterized as being trained to perform a function. Uncontradicted, here the term model refers to the function of an NN/NNG or type of function performed by an NN/NNG, or an NN/NNG that performs such a function. A model also can refer to a type of approach of a set of functions, algorithms, etc., such as those performed by a NN/NNG and components/elements thereof. E.g., a natural language model (NLM) refers to a type of model for interpreting, generating, or modifying natural language in computer systems, such as NNs. Descriptions of prior art disclosures, however, may use model in a different manner Skilled persons will recognize this variability in meaning of this term and be able to work with it given context of its use.

Neural networks are "intelligent" systems and can "learn" or "evolve" with training/learning, including learning/training that occurs through use that increases the overall training set available to the NN, feedback, or both. Methods of learning/training NNs are known in the art. Uncontradicted, training of an NN herein comprises performance of various techniques that typically result, usually indirectly, in detectable or significant changes in weight(s) of neuron(s) of an NN, usually also or alternatively leading to a detectably or significantly change in output, in terms of output of the NN or of the system, in respect of a given analysis/function, input, or both. Typically, such changes in weights occurs from further training of the neural network or changing the parameters of such training (e.g., applying different rewards to an NN for complying with a standard, such as output of another NN). Skilled readers will understand that in this and several other respects, systems/methods of the invention embody "deep learning" approaches to information processing/analysis. Because NN(s) "learn" and "evolve," NN(s) (or models) can be described as either immature or mature. While such terms are relative, they will be generally understood in the art at least in clear cases (e.g., immature NN(s)/model(s) meaning models in the first number of iterations of a method/use of a system and mature NN(s)/model(s) meaning when an NN approaches convergence (e.g., generally or substantially producing substantially identical results in each use/iteration).

In aspects, systems can further include text/image recognition and manipulation neural networks. An example of such a neural network platform is the DALL-E system (see, e.g., Ramesh et al., 2021. arXiv:2102.12092v2 and the InstaGan system (see, e.g., Mo et al., ICLR 2019, arXiv: 1812.10889v2). E.g., in aspects systems can include a neural network or group of neural networks that analyzes image content of inputs (e.g., social media posts, articles, websites, news-related images, and the like), suggests inclusion of images (e.g., company logos or other organizational-images (e.g., flags, weather indicators, images associated with locations), images relating to concepts in messages, and the like). In aspects, systems include NNs that focus on suggested replacement of images in inputs (prompts, training data, or both) or addition of images to messages, prompts, training data, etc.

As can be seen from various parts of this disclosure, in aspects systems of the invention comprise ≥2 types of neural networks, each type of neural network performing a particular function (e.g., in the case of EPDNN(s) prediction semantic element probability distributions based on prompts and training data inputs and in the case of CANN(s) analyzing the content of system-generated messages to generate summaries thereof, summaries of elements thereof, or collections of semantic elements therefrom, etc., and using such data to, according to preprogrammed standards, operation of yet another neural network, etc., to directly or indirectly modify prompt data for further iterations of a method/uses of a system. Additional NNs that can be present include message optimization NNs described above. Several additional types of NNs that can be used in systems of the invention are further described herein. Such NNs can include, e.g., NNs focused on replies, responses, or reception of system-generated messages; NNs that focus on learning the personality of a user and using such information as a prompt or other input in the generation of messages; and NNs that focus on the analysis of training set data and optional correction, enhancement, etc., thereof.

Additional NN(s) of systems can also include, e.g., style copier NN(s) (SCNN(s)), instruction-based message modifying-NN(s) (IBMMNN(s)), message optimization NN (MONN)/message variation NN (MVNN), content-grader NN(s) (CGNN(s)), selectable element interaction NN(s) (SEINN(s)), contextual similarity neural network(s) (CSNN(s)), or combinations or some or all hereof, as described in connection with the Figures, or any of the other various type(s) of NN(s) described in other sections of this disclosure. In aspects, NN(s) further comprise NN(s) that serve as a prompt recommendation model, as described elsewhere herein. In aspects, systems/methods comprise one or more ensemble models, such as NN(s) that perform an ensemble model, using analysis from two or more NN(s) to generate predictions or other analyses. In aspects, the NN(s) that feed data into an ensemble model are related (e.g., two or more EPDNN(s)). In aspects, the NN(s) that feed data into an ensemble model provide different type of functions, e.g., a CGNN and an SEINN, a CANN and an CSNN, or other suitable combination of NNs described herein. In aspects, systems/methods also or alternatively include sequentially stacked artificial neural network layer(s), e.g., to performing pruning or other methods (e.g., as described in U.S. Pat. No. 10,417,563), e.g., where output of a first neural network provides the training input for the next higher neural network in the hierarchical stack or by transferring the contents of a previously-trained neural network at the same stage/order of hierarchical complexity to another neural network of the system/method.

Interfaces

Users can interact with systems via interface(s), which are also described elsewhere. In general, any suitable type and number of interface(s) can be used for input and output of data, to and from the system. Interfaces can include audio components, for example. In the context of systems of the invention, typically interfaces will present data in a graphical user interface (GUI) as are well known in the art. In aspects, the typical interface that is employed for input, output, or both, is a web interface. In such aspects, the system can comprise engine(s) or other components for generating representations/representation data that will be displayed via a suitable web interface. A "representation" in this respect is understood in the art as a data construct designed for or associated with instructions for display on a graphical user interface (GUI). Representations also can provide information concerning objects, systems, devices, processes, etc., which exist in a structured/hierarchical or otherwise interacting or connected relationship. Examples of interface representations are provided in connection with several of the Figures submitted herewith and described below. In aspects, the user interface is an input/output combined interface. In aspects, input and output interfaces are separate. In aspects, situational prompts and instructional prompts are inputted via an interface. In aspects, an interface comprises both direct input elements (e.g., freeform data entry fields) as well as one or more, typically two or more, e.g., 3 or more selectable prompt inputs, again as exemplified in the exemplary embodiments shown in and described in connection with the Figures. In aspects, interfaces further comprise one or more, e.g., 2 or more settings, that control aspects of the method (e.g., word variability, tone of message generated, etc.). In aspects, the number of input/output elements of any particular type in an interface are intentionally kept limited to optimize performance vis-à-vis human interactions. E.g., in aspects an interface presents only 2-5 draft messages, such as 2-4, 3-4, or 2-3 messages, such as 2 messages or 3 messages. Similarly, in aspects, an interface presents only a limited number of selectable prompts (e.g., 1-10, 1-8, 1-7, 1-6, or 1-5 selectable prompt types/categories/messages) and only a limited number of setting selections (e.g., 1-5, 1-4, or 1-3 settings).

Connections to Other Networks, Systems or Data Sources

In aspects, systems of the invention network/connect with various other systems, networks, data sources, etc. In aspects, systems of the invention connect to the internet and use internet-based communications with users, cloud-based system resources (cloud-based processors, cloud-based memory, cloud-based neural networks, or a combination thereof), and internet-based communication resources in, e.g., enhancement of prompts, training sets, messages, or some or all thereof, etc. In aspects, systems of the invention interface with proprietary networks or sites, such as internet-based customer relationship management (CRM) systems (e.g., Salesforce systems and similar systems described herein or known in the art), proprietary personal/organization databases (e.g., Hoovers), and the like. In aspects, engine(s) of systems include engine(s) for extracting data from such sites/data sources, searching such sites/data sources, and, in certain cases, editing records in such sites/data records. E.g., systems of the invention can include resources for extracting information from social media sites associated with recipients/audience members (e.g., LinkedIn posts, Twitter tweets, and the like). As another example, systems of the invention can, e.g., extract information from a user's associated Salseforce™ or other CRM including prior messages that a user sent which can be used as prompts or training data for the system. In aspects, at least some of these steps are performed automatically by the system, e.g., in response to user selection/option to use such steps or otherwise automatically as a built-in operational feature. In aspects, systems comprise search engine(s) that can obtain information from targeted free sites (e.g., government sites, such as the SEC's Edgar database site), from the internet in general (e.g., performing a Google search engine search), or from proprietary/semi-proprietary sites. Systems can comprise engines (e.g., a streaming data engine, streaming data processor, and the like) and other components for facilitating communications with such other networks, systems, and data sources, such as a network interface controller (NIC) or the like. In aspects, systems include other provisions for protection of system data, system integrity, and the like, such as firewall(s), authentication protocol(s)/engine(s), and the like, which are known in the art. Data connections and data delivery methods/systems with systems can be of any suitable type and nature. In aspects, some data is delivered in the system (between components) in a batch delivery system, in a streaming data system, or both (typically at different times or under different conditions operating in a batch data delivery mode and at other times/under other conditions operating by streaming data delivery methods).

Data Elements

Data elements are key components of communication and, accordingly, typically are important aspects of systems and methods of the invention. Data processing, data forms, etc., can generally be any suitable type and nature for inclusion in systems/methods of the invention. Accordingly, only certain illustrative aspects of data elements or that otherwise relate to data are described here, generally, but with focus on key data elements use in systems/methods (e.g., neural network prompts, training set data, and the like). Although in some inventions the nature of data can be considered to be non-functional, in respect of methods/systems for generation of communication, essentially all data relating to a message is functional in contributing to the meaning (directly or through context) or style/tone of the communication. As such, skilled persons will recognize that in respect of such systems/methods characterizing the nature of such data as merely descriptive or nonfunctional is in error. In addition, given the fact that neural network(s) of systems are trained to recognize key data elements used in systems/methods, such as prompt data, such data also can be considered to have a functional component that goes beyond the natural language meaning of such data (e.g., in terms of indicating priority of use in generating messages).

Natural Language Messages and Semantic Elements

Messages generated by systems/methods and important components of training set data include natural language messages. Typically, some, most, generally all, or all of the messages generated by the system, messages included in training set data, or both, are linguistically complex, e.g., comprising at least 2 paragraphs, at least 1 multi-sentence paragraph, optionally 2 or 3 difference sentence types (exemplified elsewhere herein), a greeting or closing, and the like. Typically, most, generally all, or all of the message outputs and training set messages are limited in size, however, to, e.g., less than 8, 7, or 6 paragraphs of content; less than 2000, 1750, or 1500 characters; or less than 500 semantic elements, etc. In aspects, some, most, or generally all messages generated by the system or used in training set data can be characterized as semi-structured data (e.g., as emails including recipient address information, greeting, closing, etc.). Other characteristics of messages and inputs are described elsewhere.

Records relating to natural language messages can, at various stages of storage, use, etc., be put into (translated into) different form not corresponding to natural language and analyzed, stored, relayed, etc., in such modified forms (e.g., in a machine-readable code, programming language, vector, or other encoding) or can be associated with additional data elements in records (e.g., metadata tags, additional context, and the like). E.g., in aspects, natural language message components of a method, such as prompts, training set data, or both, may subjected to embedding, tokenization, compression, encryption, vectorization, etc. In aspects, inputs are tokenized, data records are presented as tokens, or both. In aspects, tokens represent N-grams (either delimiter-separated n-grams, semantic n-grams, or fragment n-grams composed of a collection of characters from some other semantic element). In other aspects, systems can, at least in part, analyze message on a character-by-character basis. In general, any disclosure/aspect herein relating to semantic elements, words, and the like, provides implicit support for a step/function, etc., wherein token(s) or other elements described herein are used in place of such semantic elements in respect of any step(s) of described methods, components of systems, or functions carried out by system components.

In other aspects, units of input and output of systems/methods are described in terms of "semantic elements," which, as described elsewhere are typically words, symbols, or numbers or collections thereof (e.g., N-grams, clauses, sentences, paragraphs, etc.). Typically, a semantic element means a single word or word combination, number, or symbol corresponding to one or more words. Other elements of messages can include delimiters, which can include natural language punctuation elements (indentations, periods, commas, and the like).

The art recognizes that higher order semantic categories often are difficult to categorize. Often the best way of recognizing, e.g., a change in topic, sub-topic, category of communication/focus, context, and the like remains human survey. Thus, e.g., in aspects relating to such terms, readers will understand that any differences described herein, uncontradicted, mean differences that a significant number, a majority, or both, of typical recipients/audience members detect, report, etc., in a survey of such individuals, which typically will be a survey that is adequately powered with respect to the question(s) posed (e.g., whether a change in subject has occurred). Terms such as subject/topic vs. sub-topic, etc., depend on context themselves. In a larger communication, a topic generally can be understood as a broad connecting theme that typically can be stated in a few words (e.g., "hiring"). Such a communication, which can be generated by a system, included in training data, or both, may include several sub-topics or categories of communication (e.g., $\geq 2$, $\geq 3$, $\geq 4$, or $\geq 5$ subtopics/categories, such as 1-10, 1-8, 1-7, 2-10, 2-8, 2-7, 1-5, 2-5, 1-4, 2-4, or 2-3 subtopics/categories). Sub-topics or categories may be associated with, e.g., different ideas/concepts, different persons/organizations, different events/activities, or different states/characteristics thereof. In aspects, messages generated by the system, and other data elements (e.g., prompts, training set records, or both) comprise $\geq$sub-topics or categories of information. E.g., situational prompts can include different categories of contexts, as exemplified below (e.g., hiring and name of a recipient), such as $\geq 2$, $\geq 3$, $\geq 3$, or $\geq 5$ contexts, e.g., 1-5, 1-4, 1-3, 2-5, 2-4, or 2-3 contexts.

The term "context" in connection with prompts typically refers to information that primarily serves for a neural network to use in interpreting and generating content based on other inputs, such as instructional prompts, but also or alternatively can mean content, such as in situational prompts, that is only used (either directly or via equivalent semantic elements) when a neural network determines that there is a sufficient basis to use such information (e.g., sufficient relationship between such information and other inputs, such as instructional prompts). "Context" in respect of the actual natural language message of input/output has its ordinary natural language meaning (e.g., semantic elements that precede or follow other related semantic elements and primarily serve to clarify the meaning of such related semantic elements in an overall communication or communication element, such as a paragraph or sentence, or that form a setting for a statement, idea, event, promoting understanding thereof).

Training Data (e.g., Initial Training Set Data)

Neural networks of systems, such as NNs that perform NLP/NLM functions, are trained using training data. As noted elsewhere, the term "training data" herein is typically used to refer to a focused collection of training data that is specifically related to the type of messages or other content that the neural network is trained to analyze. E.g., for a system focused on generation of emails, training data can mostly comprise most of the components of email messages. Typically, NNs can be pre-trained with baseline/background training data that is not as focused. E.g., in connection with an NLP/NLM NN of a system, such as an EPDNN, such an NN is typically trained with a significant natural language training set providing the NN with general language analysis/recognition capabilities (e.g., the WebText corpora; the Common Crawl corpora; the BookCorpus and English Wikipedia corpora used to train BERT; or any similar sufficient corpora of, e.g., $\geq 500$ million, $\geq 650$ million, $\geq 900$ million, $\geq 1$ billion, or $\geq 1.5$ billion words in a natural language, and optionally including multiple corpora for multiple languages or natural language translation capabilities or access thereto). In aspects, relatively smaller language training sets are suitable (e.g., $\geq 100$ million words) in domain-specific models, as described elsewhere. In aspects, EPDNN(s) comprise a significant number of parameters, e.g., $\geq 50$ million parameters, $\geq 75$ million parameters, or $\geq 100$ million parameters.

In aspects, training set data can be given higher priority by NNs than general/background training data (e.g., general natural language training data), by training of the NNs to recognizing training set data and to afford it higher priority in analysis or other functions performed by a NN. E.g., in terms of determining the length of a message, format of a message, etc., an NN can be trained to mimic the length, form, tone, etc., of the messages in the training set data, above the several other types of communications and non-communication content that may be contained in the baseline/background training set data. E.g., in aspects, system-generated messages, e.g., messages post-editing, post-positive rating, post storing, or post transmission, serve as training data for further iterations/uses. In aspects, such previously generated messages (subject to a user interaction indicating favorable review, at least in part) are treated as higher priority input than, e.g., background/general training data, and, in aspects, are accorded higher priority than some, most, or generally all other training data. In such aspects, performing prompt editing, enhancement or other modification via methods provided herein, e.g., employing a CANN to analyze, e.g., user positive interaction messages (PIMs), generate/extract prompts therefrom, and feed such prompts or edit existing prompts based on such CANN output, can ensure that system error or user editing (in an immature network) or user editing (even after maturity/convergence), can detectably or significantly enhance future truthfulness of system output as compared to methods lacking such steps/elements. According to aspects, the system detectably or significantly changes the content of at least one, some, or most of the instructional prompts based on the analyzed message(s) where there is a significant difference in the analyzed message(s) and the prior instructional prompts (e.g., one or more missing statements, one or more added statements, one or more significantly changed statements that cause a change in meaning of the applicable statement(s), or a combination thereof).

In aspects, methods of the invention include training the first neural network or at least one neural network in the first group of neural networks (first neural network group or "FNNG") with an initial training set, the initial training set comprising a plurality of training set message records, each of such training set message record comprising data corresponding to a natural language message. Such data can be, e.g., an entire message (e.g., an entire email message) or a portion of a larger message (e.g., the "body" of an email message, a portion of an email message, etc.). Typically, each message will relate to one or more subjects, topics, etc., and can include multiple sub-topics, contexts, and the like. In aspects, some, most, or all of each training set message record comprises or corresponds to a message that comprises (a) a salutation (greeting) and (b) two or more paragraphs, each paragraph of the two or more paragraphs comprising (I) at least one sentence, each sentence being composed of (A) a collection of semantic elements and (B) one or more punctuation/delimiter elements (e.g., return symbols/line indicators, and the like). As described further elsewhere, a semantic element is a word, number, or a symbol representing one or more words in one or more natural languages. In aspects, in some, most, generally all, or all collections of semantic elements in a data element, such as messages in training data, at least most of the semantic elements are words, symbols that represent words other than mathematical functions, or combination thereof. In other words, in aspects methods of the invention involve natural language elements involving semantic meaning rather than purely numerical data or mathematical functions.

A particular aspect of the invention involves the generation of communication-initiating messages (messages that are not in reply/response to a prior message from intended audience member(s)/recipient(s)). This characteristic of methods/systems can be applied to any one or more of the other aspects described herein. The generation of such messages is different from many of the prior art message-generating methods/systems, which focus on replies to incoming messages/prior messages and use such prior messages as the only input or the key input in generating a response. E.g., in aspects, training set data can comprise, mostly comprise, or generally consist of communication-initiating messages and the draft messages are draft communication-initiating messages.

In aspects, at least some of the training set message records, in any one or more aspects described here, further comprise message-associated contextual information (message-associated information that typically does not make part of the message itself, e.g., notes, recipient-related information, services/product-related information, notes about efficacy of the message (e.g., response, reply, etc.), information regarding the recipient's associated organization, role, etc., and the like). Training set record contextual data can also or alternatively include, e.g., information regarding a particular message in the initial training set, about the audience for a message in the initial training set, and the like. Such information can be included in the record in the same format as the message content itself or can be, e.g., metadata associated with a record. In aspects, most, generally all, substantially all, or all of the records in the ITSD or training set data overall (or a portion thereof, e.g., pre-training ITSD) are records associated with at least some contextual data. In aspects, NN(s), other components/engines etc., or both, are trained to recognize and utilize training set message record-associated contextual data in a detectable or significant manner with respect to one or more system functions, outputs, etc.

In aspects, some, most, or generally all of the message records in training set data comprise linguistically complex messages. E.g., the invention provides methods/systems according to any one or more other aspects provided herein, where at least most of the natural language communication-initiating messages in the initial training set comprise at least two paragraphs directed to distinct subjects. In aspects, a paragraph about a distinct subject is at least mostly directed to a distinct thing (including person or organization), distinct event or activity, distinct state or phenomenon, or distinct idea or concept, with respect to a subject of another paragraph. In aspects, a majority of typical individuals or a significant number of typical individuals sampled/surveyed in a population thereof, such as an adequately powered population of typical audience members, would identify most of the natural language communication-initiating messages in the initial training set as comprising two distinct subjects or sub-topics. In aspects, some, most, or generally all messages/message records in the initial training set comprise at least two paragraphs that are each at least primarily directed to a distinct communication purpose, wherein a communication purpose is either to inform an audience, persuade an audience, or entertain an audience/recipient. In aspects, a majority of typical individuals surveyed in a survey/sampling population, such as an adequately powered population of typical audience members/recipients, identify most of the natural language communication-initiating messages in the initial training set as comprising at least two paragraphs that are each at least primarily directed to a distinct communication purpose.

As noted elsewhere, initial training set data can comprise pre-training data, in-process training data, or both. In aspects, the invention provides a neural network or related method of any one or more of the aspects described herein wherein the neural network(s) (e.g., EPDNN(s)) are pre-trained with at least part of the ITSD prior to the user submitting most, generally all, or all of the initial prompt data (e.g., prior to submitting most, generally all, or all situational prompt data). In aspects, NN(s), such as an EPDNN, is trained with most of the initial training set data prior to the user submitting the input comprising the one or more situational prompts, instructional prompts, or both. E.g., in aspects, a first neural network or a neural network in a first group of neural networks is pre-trained with a portion of an initial training set that is at least 3 times (≥3×) the size (e.g., ≥5× the size, ≥7× the size, ≥10× the size, ≥12× the size, ≥15× the size, ≥20× the size, ≥25 the size, ≥33× the size, ≥50× the size, ≥75× the size, ≥100× the size, ≥150× the size, or ≥200× the size) of any other portion of the initial training set prior to the user submitting the input comprising the one or more situational prompts, instructional prompts, or both. E.g., in aspects, in-process initial training data comprises 1-10, 1-7, 1-5, 1-3, 2-10, 2-7, 2-5, 2-4, or 2-3 message records and/or the pre-training portion of the initial training data set comprises ≥10, ≥15, ≥25, ≥35, ≥50, ≥75, ≥100, ≥150, ≥200, ≥250, ≥300, ≥350, ≥400, ≥500, ≥750, or ≥1,000 message records. In aspects, an initial training set comprises at least about 20, such as at least about 30, at least about 40, or at least about 50, e.g., about 10-100, ~15-90, ~20-80, ~20-100, ~10-500, ~20-500, ~50-500, ~100-1000, 10-10000, ~25-75, ~20-200, ~30-300, ~35-350, ~40-400, or 25-250 messages, which optionally mostly, essentially only, or only are communication-initiating messages.

As noted elsewhere, in aspects methods include generating an expanded initial training data set (ITSD) by application of steps of methods. E.g., in aspects, at least some, most, or generally all messages that make up the ITSD are system-generated messages. In aspects, such system generated ITSD messages comprise messages by performing the basic steps of the method (e.g., producing messages by use of an EPDNN and a selection engine). In aspects, system generated ITSD messages comprise, mostly comprise, or generally consist of messages generated by other engine(s)/NN(s) of systems, such as a NN that uses system-generated messages to generate additional messages from initial set(s) of system-generated methods (e.g., through applying methods similar to those used by EPDNN(s) and selection engine(s) or by using other methods such as a neural network trained specifically on word variation selections in combination with other engines or engine(s) that employ word variation algorithms/rules and techniques for generating message variants of initial system-generated messages.

Initial training set data (ITSD) can be characterized by the source/origin of such data. In aspects, message records in ITSD comprise message(s) authored by one or more recognized thought leaders in a field. In aspects, methods comprise presenting users with an option to select an ITSD comprising, mostly comprising, or generally consisting of messages authored by one or more of such thought leaders. In other aspects, an ITSD comprises, mostly comprises, or generally consists of messages that have been selected by the management of a user-associated organization. In aspects, an ITSD comprises, mostly comprises, or generally consist of messages from individuals associated with a single organization. In aspects, an ITSD comprises, mostly comprises, or generally consists of messages generated by a sender/user.

In aspects, systems/method according to any one or more of aspects described herein are characterized in that most, generally all, or substantially all of the message records in the ITSD are at least 250, or ≥~300, ≥~325, ≥~400, ≥~450, or ≥~500 characters in length. E.g., in aspects, at least about 65%, at least about 75%, or at least about 90% of the communication-initiating messages in the initial training set are at least 200, 250, or at least 300, e.g., ≥350, ≥400, ≥450, or ≥500 characters in length. In another facet, the invention provides methods/systems according to any one or more aspects described herein in which at least 20%, 25%, 30%, 33%, 40%, or 45% of messages in the initial training set are at least 500 characters in length. In another embodiment, systems/methods according to any one or more aspects described here are characterized in that at least most, generally all, or substantially all of the message records in the ITSD are less than 1500 characters in length, such as ≤1350 or ≤~1250 characters in length. In aspects, most, generally all, or substantially all of the messages in the ITSD are less than 1100, less than 1000 characters or ≤900 or ≤800 characters in length. In aspects, any of the upper limits of character sizes for messages described herein and any of the lower size limits of character size limits described herein can be combined to define ranges that characterize some, most, or generally all messages in an ITSD (e.g., most, generally all, or substantially all messages in an ITSD can be between 250-1500, 300-1250, 300-1000, 325-900, or 300-800 characters in length/size/composition). ITSD message records also or alternatively can be characterized on the basis of semantic elements, e.g., on the basis of single words or similar discrete meaning and presentation semantic elements (e.g., where each semantic element is a character, symbol, or collection of characters/symbols recognized as having a discrete meaning—as opposed to clause, N-gram, or sentence semantic elements). In exemplary aspects, systems/methods of any one or more aspects described herein are characterized by least 75% of the messages in the initial training set comprising at least 40, 50, 55, 60, 65, 70, or 75 semantic elements. In aspects, at least 10%, at least 15%, at least 20%, at least 25%, at least 33%, at least 50%, at least 65%, or at least 80% of the communication-initiating messages in the initial training set comprise at least 70, 75, 80, 85, or at least 100 semantic elements.

In aspects, some, most, generally all, or substantially all of the message records in an ITSD comprise linguistically complex messages. E.g., an embodiment is a system/method according to any one or more of aspects, wherein most, generally all, or substantially all of the message records of the ITSD comprise messages comprising at least one transition linking at least two paragraphs of the two or more paragraphs. In aspects, most, generally all, or substantially all message records in an ITSD comprise complete emails or at least most, generally all, or substantially all of the bodies of emails.

Neural Network Prompts

Methods of the invention comprise submission of, and systems are adapted to receive, recognize, and utilize prompt data (prompts) for neural network(s), e.g., for EPDNN(s) of a system. Prompts are also described elsewhere, and any such descriptions can be combined with the following description of NN prompts ("prompts" or "prompt data").

Prompts can be characterized in, i.a., recognition by one or more system elements, such as one or more neural networks of systems. E.g., prompts can be recognized by neural network(s) of systems, through training the neural network(s) to recognize prompts. E.g., EPDNN(s) are typically trained to recognize instructional prompts, situational prompts in aspects, and, also or alternatively, structural/template prompts in still other aspects. EPDNN(s) can be trained to recognize such prompts by any suitable factor(s) and training method. Factors leading to recognition can include, e.g., the nature of the content of the prompts, positioning of the prompts in submissions, indicators associated with prompts (e.g., in association with a selection entered via an interface, a symbol/keyword or tag in a direct submission, etc.), or any other suitable factor(s). NN(s) can be trained to recognize prompt content by, e.g., applying penalties, rewards, or other feedback in connection with training such a NN to recognize such prompts. NN(s) treat such prompts as priority inputs with respect to other inputs, or both, etc. NN(s) act on types of prompts in accordance with their nature, e.g., incorporating statements of instructional prompts, using situational contexts as situational inputs, contexts, etc., or in using structural/template prompts to direct elements of form and other non-semantic characteristics of system-generated messages.

Prompt data can be submitted/transmitted to a system in any suitable manner. In aspects, a user or an associated user to submits input comprising one or more prompts to the system via direct user input inputted via the interface, user selection of one or more presented prompts via the interface, or both. Such prompts can comprise one or more system-recognized instructional prompts and optionally further comprising one or more system-recognized situational prompts, and optionally also or alternatively one or more template/structural prompts.

As noted elsewhere, instructional prompts are prompts that system components recognize as repositories of priority content in the generation of system-generated messages. In aspects, in the use of systems or practice of methods at least some, e.g., most, or generally all, or substantially all of the semantic elements of the instructional prompt or alternative semantic elements to some, most, generally all, or substantially all thereof, are present in draft messages generated by the system, in generally all, substantially all, or all cases (with respect to iterations of the system, different instructional prompt/system combinations, etc.). Systems can achieve this recognition and level of application of instructional prompts in any one or more suitable ways. Typically, instructional prompts are recognized by neural network(s) of systems/methods, such as an EPDNN, through training of the applicable NN(s) or application of rewards/penalties for inclusion/non-inclusion of the prompts. CANNs also somewhat serve to ensure that subsequently generated messages produced by a system remain close to the intent reflected in initial instructional prompt content by determining meaning of positive indicator messages (PIMs) and using such meaning (e.g., statements contained therein) as prompt data for further iterations of a method. Other NN(s) can analyze other aspects of system of operation to also ensure that instructional prompts are incorporated into draft messages and, in aspects, other non-NN engine(s) or other NN(s) also can be used to analyze compliance of messages in incorporating prompts or take action thereon, such as, e.g., filtering messages determined to exhibit low semantic similarity to instructional prompts, ranking messages that are more similar to instructional prompts and presenting them first or more prominently, providing recommendations to users (e.g., highlighting missing elements of instructional prompt data), etc.

In aspects, generally all, substantially all, essentially all, or all statement(s) contained in instructional prompts at the start of a use/iteration of the method/system are present in draft messages prepared by the system. In another facet, most, generally all, substantially all or all statement(s) in messages are semantically equivalent to corresponding/counterpart or related statement(s) in an applicable instructional prompt. "Semantic equivalence" in this and other respects means providing the same or substantially same meaning (having the same "gist"). Semantic equivalence can be demonstrated by a survey of typical recipients as described elsewhere herein, by computer analysis of appropriate models, or both. In aspects, some, most, generally all, or all statements in a message are composed of semantic elements in the instructional prompt, alternative semantic element(s) thereto (ASE(s)), or a combination thereof present in a corresponding instructional prompt. In other aspects, most, generally all, or substantially all statements in the instructional prompts are incorporated in most, generally all, or substantially system-generated messages. "Statements" are clauses, sentences, or other semantic elements that impart a discrete meaning as compared to other statements in a natural language message, such as a TSD message, instructional prompt, or system-generated message. The discrete nature of statements is recognizable by, e.g., a significant number of typical recipients, a majority of recipients, or both, as determined in a typical survey as described elsewhere. EPDNN(s) treatment of instructional prompts as a priority content source in generating the distribution of semantic element options can be determined by any suitable manner, such as the fact that most, generally all, or substantially system-generated messages are significantly more semantically similar (as determined by survey, computer analysis, or both) to instructional prompts than to situational prompts or training set data. Readers will understand that the meaning of statements in instructional prompts and system-generated messages are similar and that the measures described herein are provided merely as ways of reflecting such similarity.

Statements in messages/system-generated messages will often, usually, or generally not contain the same single element semantic elements as instructional prompts due to the word variability generating properties of systems of the invention. "Single element semantic elements" and similar terms (single term semantic elements" or "word level semantic elements" mean semantic elements consisting of a single term (such as a word, single symbol, etc.) as opposed to larger semantic elements, such as clauses, sentences, and the like.

Because instructional prompts are instructional, even statements of instructional prompts that are not sufficiently related to either training set data or situational prompt content are still usually, generally always, or substantially always incorporated into draft messages. Instructional prompts can be said in this respect to serve as priority content sources for generating messages in methods/systems. Thus, for example, if a user provides an instructional prompt containing content that has no relationship to ITSD or situational prompts, the system, in aspects, will generally always or substantially always incorporate statements of such instructional prompt into draft messages. In aspects, statements of instructional prompts also (i.e., also or alternatively) are somewhat or mostly not presented in the order they are presented in the instructional prompt submission. Instructional prompt messages/content can, however, also, be sufficiently related to ITSD, semantic prompts, or both.

Methods/systems of any one or more aspects can comprise the submission of situational prompt(s)/situational prompt data. In aspects, systems/methods do not require or do not even provide for submission of situational prompts. In aspects, systems/methods always at least provide for submission of situational prompts as an option. In aspects, systems/methods require submission/presence of situational prompts, either as submitted/provided by a user, associated user, or by the system itself. In aspects, at least one situational prompt is selected or otherwise inputted as a requirement of system operation.

Situational prompts are treated as priority context and content for system component(s) (e.g., an EPDNN), but, unlike instructional prompts, statements in situational prompts, semantic elements in situational prompts, or both, are only sometimes utilized in the generation of messages (i.e., they are only used in some situations). Situational prompts also or alternative can be used differently than instructional prompts. E.g., situational prompts can exert impacts on messages without the content of situational prompts being incorporated in any significant manner into messages. E.g., situational prompts can act in part, primarily, or only as context for shaping the generation of draft messages based on statements/semantic content of training set data and instructional prompts.

Situational prompts typically exhibit detectable or significant impacts on at least a significant number of messages, over a sufficient number of iterations, on the content of messages generated by a system. Situational prompts can exhibit effects by either providing contextual information that system components (e.g., an EPDNN) can use in generation of system draft messages where there is a sufficient relation to such context; in providing statements/semantic elements that can be incorporated where there are sufficiently related elements in ITSD, instructional prompts, or both; or a combination thereof. "Sufficient relation" and similar terms means that NN(s) that evaluate such situational prompt content and other data elements (e.g., ITSD or instructional prompts) determines that there is a sufficient relation of the content of the situational prompt to such other sources of information to lead to the use of such situational prompts as context, content, or both, with respect to some, most, or generally all messages generated by the system in an iteration/use. What is sufficient related will vary with training and characteristics of the NN that evaluates the content of data. A NN may find content to be sufficiently related in an immature stage of training, use, etc., that in a more advanced/mature state is not found to be sufficiently related, and vice versa. In aspects, system components that rely on the presence of a "sufficient relationship" between elements, such as with respect to content of situational prompts, are trained, adapted, configured, etc., such that the system detectably or significantly treats content that a population of human participants in a study/survey, such as a significant number, majority, or generally all of in an adequately powered population of typical expected or actual recipients or audience members also would deem "related" to other data elements that the system component(s) have treated as sufficiently related. E.g., where a significant number of typical recipients surveyed believe that content of a situational prompt is sufficiently related to the content of other data elements (e.g., instructional prompts), such a system would detectably utilize such content in a significant number of cases over a suitable number of iterations of the applicable method/system use. In aspects, most, generally all, substantially all, or all of the situational prompt content submitted to a system is not incorporated into messages in most, generally all, or substantially all cases. In aspects, where semantic elements or messages of situational prompts are incorporated into messages, such semantic elements represent less than all, less than generally all, or less than 50%, e.g., less than 33%, less than 25%, or less than 10% of the applicable number of statements or overall content of the total situational prompt input. In aspects, system-generated messages including statements contained in semantic prompt content represent less than most or generally none/few cases over a number of iterations, messages, or both. Situational prompt content typically includes information that is expected to either to contribute to message generation, in at least a significant number of cases, or that a system can draw upon in some cases, but not all cases. Examples of situational prompt content can include (1) information regarding or relating to an intended audience for a communication-initiating message, (2) information regarding or relating to one or more transmitters/authors of the communication-initiating message, a transmitter/author-associated organization, or both, (3) information regarding or relating to (a) the intended audience and (b) the transmitter/author, the transmitter/author-associated organization, or a combination thereof. In aspects, situational prompt data includes system-generated situational prompt content (e.g., in aspects most or generally all situational prompt content is system-generated). In aspects, some, most, or all of any situational prompt content or any human submitted situational prompt content is submitted by additional user(s). In aspects, user(s) submit most, generally all, or substantially all situational prompt content. In aspects, situational prompt content includes content that is enhanced or otherwise modified by the system prior to evaluation. E.g., in aspects, as described elsewhere, system components selectively or automatically obtain information related to other inputs provided by users/associated users (e.g., social media posts about a recipient or associated organization) and add such information to situational prompt content.

Prompts can be submitted in a variety of ways, from a variety of sources. Prompt data (instructional, situational, or structural prompts) can, e.g., be submitted entirely by user(s), entirely by associated user(s) (e.g., administrators that provide standard prompts on behalf of an organization associated with user(s)), submitted by automatic operation of one or more system processes/step(s)/function(s), as exemplified elsewhere, or any suitable combination thereof. In aspects, some, most, generally all prompt content of one or more of such types is/are submitted by a user. In aspects, at least some prompt content of one or more types is submitted by associated user(s). In aspects, at least some, most, or even generally all prompt content is submitted to the system by the system itself. For example, in aspects of the invention a user only submits ITSD to the system, e.g., a number of emails of a type/style that a user wishes to imitate, and one or more system components (e.g., a CANN) determines prompts from analysis of such messages and identification of statements therein. In aspects, some, most, or generally all of the instructional prompt content, situational prompt content, structural prompts, or any combination thereof, or at least of such prompt content that is user inputted, are inputted by selection of one or more selectable elements/modules presented to the user via interface(s). In aspects, prompt content includes system-recognized indicators of prompt type, content/context category/statement category, or both, or that at least separate prompt content/input content sections, which can be system provided or user provided (in the latter case, e.g., in direct input). In aspects, NN(s), such as a CANN, EPDNN, or both, are trained to recognize prompt content categories, statements, statement category, context categories in situational prompts, or any combination thereof and to use such recognition in methods/functions as described elsewhere herein. In aspects, a system recognizes, e.g., an NN is trained or a non-NN engine is programmed to recognize or otherwise identifies, keywords or key terms as indicators of prompt content category, statement type/category, etc.

Prompt data can be submitted at any suitable time. Initial prompt data typically is administered following ITSD submission (e.g., after NN pre-training with ITSD), concurrently or near concurrently with ITSD submission, or both. In aspects, most, generally all, or all situational prompt data is inputted, at least initially, before initial prompt data is inputted. In aspects, situational prompt data and instructional prompt data are somewhat, mostly, or generally only submitted together as a single data submission to a system. In aspects, in such a submission, situational prompt content is presented in a manner that leads to it being inputted before most, generally all, or all of the instructional prompt content in such a combined data submission.

As noted, in aspects at least some, most, or all of the messages generated by a system are communication-initiating messages. In other facets, systems/methods are employed to prepare replies to incoming messages. In aspects, such methods relating to generation of replies comprise system component(s) using some, most, generally all, or all of an incoming message as instructional prompt content, situational prompt content, or both. In aspects, systems/methods comprise other components that analyze incoming messages and provide prompt content, prompt recommendations, or both, for the generation of replies. In aspects, methods initially generate communication-initiating messages but comprise the option of preparing further "reply" (response) messages if, e.g., a message to a communication-initiating message is received by the system or inputted by a user. In aspects, incoming messages also or alternatively are used as training set data. In aspects, incoming messages are treated as priority training set data (e.g., NN(s) are trained to recognize incoming messages as priority training set data). In aspects, incoming message content is primarily treated as situational prompt content. In aspects, the system provides for a recommended campaign of messages and the system provides prompts relating to the stage of messaging in a campaign. In aspects, system components, such as NN(s), use communication initiating message/response pairs, or further advanced message progressions (strings of messages) as a basis for prompt generation, message modification, recommendations to users, training set data, or combination thereof.

Systems/methods according to any one or more aspects can comprise submission of template prompts/structural prompts. Structural prompts (also called template prompts) are NN prompts that direct one or more aspects of message generation other than the content of the message and are not used as semantic context in the generation of messages. As suggested by their name, structural/template prompts typically provide direction to a system with respect to other elements of message generation. E.g., structural prompts can direct the system to generate messages that are adapted to a style of presentation, or to prepare messages of a certain presentation (e.g., an email, an audio file, a video, etc.). Structural prompts can include information regarding use of a tone, style, etc. As with other prompts, NN(s) are trained to recognize structural prompts and to follow the direction of structural prompts. As NN(s) are learning systems, rather than rule-based systems, any prompt, including a structural prompt, may sometimes not be utilized in all cases. In aspects, systems comprise NN(s) that correctly follow structural prompts in most, generally all, or substantially all cases, especially in a mature state of operation. Structural prompts can be directed to, e.g., the form of the message (e.g., generating an email), commands to use one or more prompts that are already in the system (e.g., employ a tone, filter messages in a certain manner, etc.), or both. In aspects, situational prompts are given lower priority by the system, in most or generally all cases, than instructional prompts, as can be determined by studies of operation, evaluation of NN training/parameters, and the like.

In aspects, systems/methods include employing a second NN or second NNG (neural network group) to analyze the content of PIMs to determine structural prompt information associated with the PIMs and to provide such structural prompt information to the system for future iterations of the method/uses of the system, e.g., in terms of amending/changing already existing structural prompts, adding structural prompts, etc. Structural prompts can also use keywords, recognized prompt categories/statement categories, and the like (e.g., where a system is trained to recognize "news" as a category of statement, prompt elements, or inputs, a structural prompt can say "talk about news," which can cause the system to draw on news situational prompts or to obtain news situational prompt content and to add such situational prompt content). In aspects, structural prompts may be associated with an identifier of prompt type (e.g., """"). In aspects, such identifiers can be provided by the system when a structural prompt is selected by a user, directly inputted, or both. In aspects, structural prompts are given lower priority than instructional prompts. In cases of a lower prioritization of a prompt type, such as this case, where there is conflictual information in the two types of prompts, the instructional prompt will prevail or control in generally all, substantially all, or all cases. E.g., a structural prompt might state the following where a system is trained to recognize such input— talk about news but don't mention more than 20 words
make a clever transition to the value prop, connecting what the product does with how they can use our product to improve theirs
call for a meeting
""""

but, with respect to instructional prompt options, the user does not select news as an instructional prompt category, the system can, through training or otherwise, typically, generally always, or substantially always effectively override the structural prompt given the user's behavior and, rather, include content about instructional prompts actually submitted or inputted (e.g., if user elected to discuss job postings in such a case, most, generally all, or substantially all of the time, if not all of the time, the messages would include content/statements regarding job posting(s), rather than news).

Structural prompts can be inputted in any suitable manner. For example, structural prompts can come in either the format mentioned above where users or associated users give instructions in a line after line manner, by user selection, or in a templated manner. For example, a templated structural prompt might have the following type of format—
""""

{talk about news but don't mention more than 20 words}
Speaking of {something clever that relates to the news above} . . . . {what LeadIQ does}
Interested in learning more?
""""

In such a template, NN(s)/system component(s) can be trained to follow instructions associated with indicators (e.g., inside the curly braces), but to directly copy or otherwise differently use elements outside of or not associated with indicator-associated instructions. Thus, for example, a message generated using such a structural prompt might read—

Hi Enxhell,
Saw you guys just raised 100 million! Congrats!
Speaking of raising . . .
Sales teams using LeadIQ are raising quotas because we save so much time that they can close a lot more deals.
Interested in learning more?

System-Generated Messages

The primary output of methods/systems of the invention is system-drafted (system-generated messages). As noted, messages of systems/methods can include, mostly be, generally only are, or, in cases, only are linguistically complex messages (e.g., messages comprising a greeting and multiple paragraphs). According to facets, messages generated by systems/methods can comprise one or more paragraphs comprising (1) (a) one or more interrogative sentence, (b) one or more imperative sentence, or (c) at least one exclamatory sentence, and (2) two or more declarative sentences. According to facets, some, most, generally all or all messages comprise at least two paragraphs associated with at least one transition.

In aspects, messages generated according to aspects comprise between 2-7 paragraphs. Messages generated by systems/methods can alternatively comprise, mostly comprise, generally consist of, or substantially consist of messages of 2-5, 2-4, 2-3, or 3-5 paragraphs. In aspects, one, some, most, generally all, or substantially all of such paragraphs in most, generally all, or substantially all such messages comprise ≥2 sentences, e.g., 2-8 sentences, 2-7 sentences, 2-6 sentences, or 2-5 sentences.

Aspects of the invention characterized by, i.a., elements defined by a range of acceptable values, as here, are provided where such aspects are associated with features, benefits, outcomes, characteristics, and the like that are detectably or significantly different, or otherwise different in kind, nature, substantial effect, than other systems lacking such definition, but, uncontradicted, are directed to particular embodiments and not intended to limit the provision of alternative embodiments not including such a range limitation. In aspects, the benefits or features of such a range limitation may be clear. Many ranges in this disclosure relate to message size characteristics and size of other data records/data elements (e.g., message records in ITSD). Messages of the size(s) indicated can exhibit unexpectedly beneficial properties and characteristics. E.g., they impart a level of communication that is not capable with, e.g., a chat or typical SMS/text or instant message format communication, while also not being of such an extensive size that they impart too many different contexts, statements, and the like for systems to be able to efficiently process, effectively process, or both. E.g., in aspects, messages generated herein are not in the form in, and typically lack the characteristics of, e.g., a published technical article, a longer journalistic work, a mid-to-long blog posting, a book, a long poetic piece, a short story, an essay, or other types of similar works of such length, complexity, or both.

In aspects, messages generated by the invention comprise, and in iterations, such as the first iteration of a process, generally consist of, communication-initiating messages. In aspects, as described elsewhere, messages generated by a system/method also or alternatively comprise reply messages responding to an incoming communication.

Additional features, characteristics, etc., of messages generated by systems/methods are discussed elsewhere herein. Any other disclosure herein relating to system-generated messages can be combined with any aspect described in this section and vice versa.

System Operation and Method Steps

Systems of the invention and methods also can be better understood by descriptions of the functions or steps performed by different system components and people that interact with systems and system inputs/outputs. Such descriptions follow here, but readers will recognize that any disclosure provided in this section can be combined with any relevant disclosure of any other section, such as with respect to the preceding discussion of system components and data elements used or generated thereby.

Human-System Interactions

Systems/methods of the invention involve interactions with people and output thereof is generated to assist people with communication in work or in other settings. People that interact with systems or that carry out steps in methods of the invention can be characterized on their role with respect to systems/methods, and such types of individuals can be used to characterize steps of methods or system actions.

The principal actors in methods and system interactions are "users," i.e., individuals that bear the primary responsibility for using the system to generate messages. In parts of this disclosure terms such as "user or sender" or "user/sender" or "user/author" or "user/transmitter" and the like are used to refer to a class of person(s). Such terms reflect that, e.g., system users do not necessarily have to actually transmit (send, post, publish, etc.) messages. E.g., in cases user(s) can generate messages using systems on behalf of other individuals that will actually transmit such messages. Thus, the term "user" herein can indicate a user that is a sender, author, or transmitter or a user acting on behalf of a sender. In the latter case, the system can provide features for such a user to work with such a sender, such as, e.g., facilitating presentation of draft messages, edited messages, or stored messages between senders and users. Readers will understand that such embodiments are implicitly provided by the description of methods/systems herein relating to users (even where transmitters, authors, or senders not mentioned) and vice versa.

The other type of individual(s) associated with systems/methods are the recipients of messages or the audience for such message. Uncontradicted, terms such as "recipients" and "audience members" are used synonymously herein, merely reflecting messages can be transmitted, presented, etc., in different forums/venues, such as through direct communications (in the case of emails and similar directed communications to a recipient) or posted (e.g., in the case of short social media posts, and the like, which can e.g., be characterized by being associated with the size characteristics of message aspects described herein (e.g., comprising 2-7, 2-6, 2-5 paragraphs and e.g., comprising 400-2000, 400-2400, 450-1700, 500-2000, 500-2500, or 500-1500 characters or, e.g., 250-1000 singular semantic elements, e.g., 300-1200, 300-1000, 300-900, 300-800, 300-750, 350-1000, 350-950, 350-850, 400-1000, 400-1200, 400-900, or 400-800 singular semantic elements.

In aspects, prompt data is about a sender, a sender-associated organization, a recipient/audience, or a recipient/audience-associated organization, or a combination thereof, or a person or an entity that has a known relationship to any one or more thereof (e.g., a company that recently engaged in a business deal with a recipient/sender-associated organization, a person that the user-associated organization just hired, a person that is in a relationship with a recipient, a person that is related by family association with a sender, and the like). Thus, in any one or more aspects, the situational prompts, instructional prompts, initial training set, or any combination thereof comprises information about an audience member/recipient. In aspects such information comprises a name, title/position, and organizational association of a recipient or audience member. In aspects systems are specifically trained to recognize such information as situational prompt information, instructional prompt information, or both. In another exemplary aspect, situational prompts, instructional prompts, initial training set data, or any combination thereof comprises information about an audience member comprising information regarding the audience member's employment status, employment history, or both. According to one or more aspects situational prompts, instructional prompts, initial training set data, or any combination thereof comprises information about an audience member's or audience member-associated organization social media activity, such as posts, interactions, etc. In aspects, some, most, or generally all of such information is automatically added to prompt content, ITSD, or both, by automatic operation or selected operation of system component(s) that obtain, analyze, and append/use such information to modify data elements, as exemplified elsewhere herein (e.g., by causing a search engine component to find such related information and to add it or information derived from it to ITSD, prompts, or both). In yet another exemplary aspect, situational prompts, instructional prompts, initial training set data, or any combination thereof comprises information about the relationship between the transmitter/author, a transmitter/author-associated organization, or both, and one or more audience members, associated organization(s), or any combination thereof. In facets, situational prompts, instructional prompts, initial training set data, or any combination thereof comprises information about the relationship between one or more third party persons or organizations and one or more audience members, associated organization(s) thereof, or both, or regarding a sender, a sender-associated organization or both (e.g., regarding recent deal announcements, mergers, spin-offs, bid wins, funding events, hiring or personnel changes, licensing deals, and the like).

In one or more aspects, prompt data, training data, or both, also or alternatively comprises information about shared interests or other commonalities between the transmitter/author and one or more audience members. In aspects, the invention provides methods/systems, in which the situational prompts, instructional prompts, initial training set, or any combination thereof comprises information about personal interests, likes, or dislikes of one or more audience members or a combination of any or all thereof. In aspects, users are afforded an opportunity to upload information about recipients for future use, such as notes regarding such personal likes, dislikes, etc., which can be used as situational prompts, instructional prompts, or both.

In further aspects, the invention provides methods/systems wherein the situational prompts, instructional prompts, initial training set, or any combination thereof comprises information about one or more organizations associated with one or more audience members, such informationally optionally comprising an organization description, organizational characteristics, organizational culture, one or more organization clients or customers, one or more organizational investors or other stakeholders, one or more organizational products, one or more organizational services, organizational news/developments, organizational competition, organizational personnel, organizational financial performance or other performance metrics, organizational activities or initiatives/goals (e.g., hiring initiatives, sales initiatives, and the like), or a combination of any or all thereof. In other facets, such data elements include information about inter-organizational relationships between one or more individuals and one or more audience members, such as the direct reports, management, or peers of one or more audience members. In aspects, methods include, or functional system components perform include, automatically or selectively, obtaining any such relationship information, organizational information, or both, from either select data sources (e.g., proprietary sites, internal databases, and the like) or from the internet, e.g., using search engine components of systems and using the output thereof to enhance or amend prompt data, ITSD, or both.

In still further aspects, the situational prompts, instructional prompts, initial training set, or any combination thereof comprises location information regarding one or more audience members, one or more audience member-associated organizations, one or more associated third parties, the transmitter/author or a transmitter/author-associated organization, or a combination of any or all thereof. In aspects, such location information is used to obtain related information from the internet or select sources (by selective deployment/use or automatic operation of system components) and such location information is added to prompts (e.g., situational prompts), training set data, or both.

In aspects, situational prompts, instructional prompts, initial training set, or any combination thereof comprises event or situation information concerning the transmitter/author, transmitter/author-associated organization, one or more audience members, audience member-associated organization(s), or associated third party person(s) or organization(s), such as places of future or past meeting. As noted, in aspects, systems provide users, associated users, or both, with the opportunity to record such information or to integrate systems that record such information for future use, e.g., as situational prompts. In aspects, systems can automatically obtain information of such type, e.g., by automatically obtaining such information from internal records, the internet (or select sites/data sources), or both, such as upcoming meetings and events that the sender and recipient are both attending or are likely to attend (e.g., a message could, based on such data, include prompts leading to a message element/statement such as "Will you be at the AI conference in San Francisco on May 1?"). Situational prompts, instructional prompts, initial training set, or any combination thereof can further comprise information concerning one or more locations of interest to a sender, recipient, associated organizations, or relevant third parties thereto or relevant events thereto (places persons meet, places person(s) are visiting, and the like), such as historical or interesting facts about a location, climate of a location, current weather in a location, economic information about the location (e.g., housing prices, product prices, employment, market conditions, and the like), social information about a location (e.g., political information, crime information, quality of life information, and the like), demographic information, cultural information (e.g., famous people associated with a location, teams associated with a location, and the like), or a combination of any or all thereof. Again, in aspects, such information can be automatically obtained as part of prompt/ITSD enhancement or modification methods, described elsewhere in several sections of this disclosure.

In aspects, recipients are individuals that are first receiving a message from a sender, or that are, at least, first obtaining a message from the sender about the primary subject, overall content, etc., of the message to be prepared by the system/method. Such messages are communication-initiating messages. Examples of such messages include "cold call" emails and the like, where there is no history of dialog regarding a particular service, product, etc., that the message generated by the system seeks to inform the recipient about, persuade the recipient to purchase, etc.

In other aspects, recipients initiate discussions with the sender/transmitter/author, e.g., through an incoming email, posting, comment, phone call, or similar incoming communication. In such aspects, the incoming message(s) of the recipient or elements thereof can be used as prompt content, training set data, or both. In aspects, system components/method steps include automatically analyzing incoming messages, either when received or relayed to the system, and using such messages or message portions in such respects. In aspects, such incoming messages can be, automatically or selectively, subject to further automatic analysis (e.g., using a CANN to generate prompts or recommended prompts from such an incoming message, using a specialized NN to recommend draft responses based on a response training set or an incoming message/response-pair training set, etc.) and the analytical results thereof used in training set data, prompt data, or in other data elements/processes. In such respects, systems can, e.g., automatically generate response to such incoming messages. In aspects, methods include generating an initial communication-initiating message, receiving a response/replay from a recipient, and thereafter generating further follow up messages to the recipient, e.g., by using both the initial message, the recipient's reply, or both, as training set data, prompt data, or otherwise in methods provided herein or in a manner analogous to those described in similar methods provided herein. In aspects, such methods can include using the system in the generation of follow up messages, reminder messages, further reply messages, forwarded messages to Third Parties or other recipients, and the like, e.g., where the number of messages between the sender and recipient are ≥4, ≥5, ≥6, ≥7, ≥8, or ≥9 messages in a series of messages. In aspects, systems of the invention comprise communication campaign data, campaign templates, and the like (e.g., regarding a sales campaign strategy, a marketing campaign strategy, or the like). In aspects, such campaign strategy information is automatically presented as a selectable prompt, or automatically or selectively used as prompt data, training set data, or both. In aspects, campaign data information sends prompts (e.g, email reminders, texts, and the like) for a user to send out additional messages to a recipient, generates and sends a series of messages for a recipient that can be automatically sent at different future timepoints, and the like. In aspects, campaign-related information can include recommended messages, statements, contexts, and the like for different stages in the campaign and the system automatically uses, recommends, provides selections of, etc., such campaign stage-relevant information for use as prompt content, training set data, or both.

Other individuals that can interact with systems/methods can include administrators. Administrators (system administrators) can oversee and adjust operation of the system, e.g., changing programming steps, adjusting parameters, the like. Accordingly, in aspects, systems can, e.g., comprise an API where an administrator can interact with/modify and obtain information from or concerning system components and their operation. Administrators also can be trainers, individuals that provide supervised learning to NNs, such as in pre-training steps, adjustment steps, aspects where humans review or input prompts based on PIMs, and the like. In aspects, systems/methods comprise automatically facilitating PIM review and prompt data collection from human trainers, at least in some iterations of the method/uses of the system (e.g., in the first 10, 20, 50, 100 iterations, etc., or until some indicator of system maturity/convergence has been determined).

As noted, associated organizations and associated third parties can be relevant to methods/systems of the invention. Aspects of the invention can include obtaining associated organization input from users, associated users, or through obtaining such information from the internet/selected sources, etc. Similarly, as described elsewhere, systems can seek to obtain personal or organizational relationship or event information related to third parties that have an association with a sender, recipient, or both, and respective organizations thereof.

Neural Network Training Set Input

Methods/systems typically comprise provision of training set data to NN(s) of systems. The nature of training data is described elsewhere herein (e.g., baseline/background training data such as WebText and training data in the context of systems/methods, which is focused on a particular type of message and which NNs are trained on above general/baseline/background natural language training. Provision of training set data is usually an early or initial step in methods or in preparing a system for use and in iterative uses/operations of a system. Typically, training data, at least ITSD, in most part, precedes submission of prompt data, as training NNs with ITSD/training data provides NNs with the ability to interpret, analyze, and utilize prompt data and to generate messages in view of prompt data. In this respect, while methods described elsewhere focus on message record components of ITSD/TSD, readers will understand that NNs are also trained on prompt data before receiving "actual" prompt data that will be the basis for generating specific message(s) in an application of methods/systems. Thus, for example, methods can include, and systems can be characterized in, i.a., NN(s) trained to recognize prompt data, e.g., by exposure to prompt data training sets and receipt of rewards, penalties, and the like with respect to analysis of such prompt training data sets. In aspects, training sets include both prompts and message records. In aspects, such combined data records are used in the generation of messages as a part of NN training, such as training an EPDNN.

Onboarding/Iterative Increases, Modifications, or Enhancements in Training Set Data In aspects, methods of the invention comprise, and systems of the invention facilitate, onboarding of a user to the system, or priming of a system to prepare new types of messages (to a new type of recipient, with respect to significantly new content, or both), etc. Such methods relate to, e.g., achieving a state of system readiness for initial use, regular use, etc., through going through initial training set steps, often in 2, 3, 4, or more iterations of specific training. E.g., in one aspect, methods comprise producing system-generated messages from a limited data set (e.g., 1-10, 1-7, 1-6, 2-7, 2-5, 2-4, 2-3, or 3-5 messages from a source, such as a new user). In aspects, such methods can comprise, e.g., generating initial system-generated messages from such a limited training set and using such system-generated messages as prompts, additional TSD, or both, for further iterations of system use. In aspects, such methods can include assessing via system engine evaluation against pre-programmed/programmable standards, by use of a system-readiness evaluating neural network, user feedback, user response data (URD), or any combination thereof, whether a system is sufficiently trained/onboarded to be considered ready for use with the new user, new message type, new recipient class, etc. Thus, in aspects, steps of the method up to the generation of messages and user interaction therewith are performed 2, 3, 4, 5, or more times, to generate a series of message that can be used as additional TSD. Steps can include setting variation settings to create variability in such messages. Typically, user interaction with messages (user reaction) is a key driver of what messages are fed back into the system. E.g., a user can be asked to rank several messages as part of an onboarding process, to edit messages, to evaluate messages to discard, or a combination thereof. Edited messages and liked messages, which reflect positive interaction messages (PIMs) are then typically fed back into the process/system as additional TSD. In aspects, PIMs are subjected to a message variation NN (MVNN, sometimes called a MONN), which takes PIMs as input and is trained to generate additional messages from such messages. In aspects, PIMs take message pairs, or message groups (≥3 messages), and optionally instruction data, such as instruction to continue to "honor" (prioritize and remain consistent with) instructional prompt data, to generate still further messages, which also or alternatively are "fed back" into the system as additional TSD, thereby further rapidly increasing the amount of TSD available for onboarding of the system, user, etc. In aspects, such methods are combined with other aspects described herein, such as using a CANN to analyze the content of one, some, or most of such system generated messages to further arrive at additional prompts that can also be fed back for additional iterations or that can be used as basis for amending current/initial prompt data. In any such cases, situational prompts are typically inputted (by the user, system, associated user, or combination thereof) after input of most, generally all, or all TSD in an iteration, followed further by input of instructional prompts by the user, associated user, system, or combination thereof, and then operation of the EPDNN/section engine to generate additional draft messages, which additional draft messages are further used as TSD, basis for operation of the MVNN to make even further messages for use as TSD, or a combination thereof, typically until the user, system, or both determine that the system is ready for use without further performance of such training steps. Onboarding processes also can include prompting a user to provide additional training set data or make data sources available to the system that may contained additional training set data content, such as messages contained in a CRM record associated with the user/sender. These steps can be combined in any suitable manner. For example, in one exemplary aspect the invention provides a method that comprises identifying users that are new users or, for current/prior users, identifying applications of the system that are significantly different from prior uses, and thereafter selectively or automatically causing the system to perform an "onboarding" (intensive/structured training) procedure for the new user/new use. The steps of such "onboarding" or intensive training can include, e.g., automatically prompting the user or new user to (1) submit training set submissions comprising messages relevant to the desired end product messages and optionally related contextual information, one or more times (e.g., ≥2 times, ≥3 times, ≥5 times, etc.), (2) delivering such TSD to neural network(s) of the system, typically comprising EPDNN(s), and (3) thereafter generating draft messages, permitting the user to evaluate such messages, optionally using PIMs therein as additional TSD, and (4) repeating some or all of steps until a user satisfaction standard or system-defined performance standard is achieved.

In aspects, such onboard procedures comprise prompting a user to submit/upload or otherwise make available 1-20, such as between 2-20, 3-20, 2-15, 3-15, 2-10, or 3-10 previously transmitted communications authored by (a) the transmitter/author (which optionally is the user), (b) an author associated with or selected by the user, or (c) both, and (2) the system automatically causing one or more neural networks of the system to use the content of the previously transmitted communications, optionally with additional context regarding the previously transmitted communications, as ITSD, situational prompts, or similar data elements with respect to training and use of one or more neural networks of systems.

With respect to onboarding and other methods, steps of methods can include, and system elements can provided for/be adapted for integrating the system with a third party computer systems, such as CRMs, comprising data regarding the intended audience, the transmitter/author of the message, an organization associated with the transmitter/author of the message, comprising information related to one or more parts of the situational prompts, one or more parts of the instructional prompts, or a combination of any or all thereof, and analyzing and optionally using relevant portions of such third party computer system data as additional training set data, prompt data, or both. A variety of data from such systems can be selectively or automatically inputted into the system, such as data contained in the third-party platform regarding the effectiveness of the messages contained in the data records (e.g., emails that led to replies, sales, etc., recorded in a CRM). In aspects, the system automatically uses selected data records from such third-party sources of information as part of the initial training set, prompt data, or otherwise to train neural network(s) and thereby detectably or significantly change or improve system performance.

Prompts (e.g., Modified Prompts) as Training Set Data

In other aspects, methods can comprise applying one or more initial training set data analysis neural networks (ITSDANN(s)) in reviewing initial training set data and either changing/amending the initial training set data, recommending changes to the initial training set data, or both. In aspects, one or more initial training set data neural networks automatically change the initial training set data to generate modified initial training set data (MITSD). In aspects, ITSADANN(s) comprise CANN(s), which analyze the content of TSD, similar to how CANN(s) analyze the content of system-generated messages. Other types of ITSADANN(s) are exemplified/described elsewhere. In aspects, a system uses MITSD as additional TSD, prompt content, or both.

Prompt Input

Prompt data is inputted in methods typically after ITSD input, typically with most, generally all, or all of the situational prompt data, if any, being inputted prior to most, generally all, or all of the instructional prompt data. Prompt data can be inputted by selection of selectable prompt content (which can be, e.g., presented via an interface as full content or presented by terms, symbols, etc., that represent content). Prompt data also or alternatively can be input through direct submissions to a system (e.g., by typing in content into a freeform submission box associated with instructional prompt input, situational prompt input, or both). E.g., in aspects, a user is presented via the interface with the ability to directly input at least some instructional prompt content; to select 2-7, 2-6, 3-5, 3-7, or 2-5 situational prompt content categories, and to input type-restricted/size-restricted additional situational prompt content, instructional prompt content, or both (e.g., by presenting 2, 3, 4, or 5 fields, where a user inputs select discrete content such as a person's name, associated organization, etc.). In aspects, systems do not provide for/methods do not comprise input of situational prompt input. In aspects, systems provide for, or systems require, submission of at least some amount of situational prompt content. In aspects, systems allow users to select or require users to select at least one selectable category of prompt content from the interface. In aspects, selectable prompt content reflects a collection of statements, semantic elements, etc., that are preprogrammed in the system which is significantly larger than the presented terms representing the situational prompt. In aspects, such preprogrammed situational prompt content is associated with one or more keywords that can be used as direct input to a system (e.g., where a situational prompt associated with name meaning, which may be, e.g., 2-5 sentences in length, for example, is associated with the keyword "name," which can be called up by, e.g., a structural prompt "talk about name" In aspects, some, most, or generally all of the situational prompts, situational prompt selectable options, or both, are inputted by an associate user (e.g., another person associated with user's organization, such as a manager). In aspects, at least some, most, or generally all situational prompt data is system-generated data, e.g., obtained by system searches for information, such as information associated with a recipient, recipient organization, recipient location, and the like. In aspects, users input at least some situational prompt content. In aspects, the system automatically searches for, selects, and presents information obtained from the internet about a type of situational prompt in response to a user selection or associated user selection of a type of situational prompt to present to the user via the interface as a selectable situational prompt (e.g., where a user selects a "name" category and inputs a recipient name the system automatically obtains information about the meaning of such a name through system search engine and related engine components). In aspects, methods/systems are characterized by, i.a., size of prompt inputs overall or with respect to one or more categories of prompt inputs, such as prompt inputs not obtained from third party sources, prompt inputs directly inputted by users, or both. In aspects prompt inputs or some or both of such categories of inputs comprise less than 1500, less than 1250, less than 1100, less than 1000, less than 800, less than 700, or less than 600 single element semantic characters, such as about 25-1,250 characters, 50-1,000 characters, e.g., about 50-850, 50-750, 25-1,000, 25-750, 30-600, 25-500, 20-400, or 25-250 characters.

In aspects, systems comprise mechanisms for ensuring or enhancing the quality of inputted prompts. E.g., in aspects, the system comprises engine(s) that review directly inputted prompt input and suggest or make changes to such prompt input before such prompt input is used by neural network(s) of the system. E.g., a simple type of evaluation and editing step can be a spell checker; a checker for compliant language; a checker for ensuring that prompts contain certain terms, statements, and the like; or combination thereof. In aspects, prompt inputs are subject to neural network(s) that analyze prompt inputs and make changes to prompts, suggest changes to prompts, or both. In aspects, systems provide warnings to users regarding instructional prompts that are evaluated to be ineffective, inappropriate, etc. In aspects, a system rejects such a proposed instructional prompt input. In aspects, a system removes portions of an instructional prompt input that is unclear, violative of policies/standards, and the like. In other aspects, as discussed elsewhere, TSD is subjected to neural network analysis, e.g., analysis with a CANN, to generate prompt content that can be added to a collection of prompt data or used to create new prompt data. Any such steps can be automatically performed or selectively automatically performed by the system.

In aspects, instructional prompt content is also or alternatively added by user selection of selectable elements presented via the interface. E.g., in aspects, a system presents 2-9, 2-8, 2-7, 2-6, 2-5, 2-4, or 2-3, e.g., 3-9, 3-7, 3-5 instructional prompt inputs for a user to select.

In aspects, a system forces a user to make choices requiring the user to select less than all of the presented selectable instructional prompt elements, less than all of the selectable situational prompt elements, or both. E.g., an interface might present 5, 6, 7, or 8 instructional prompt elements/modules; 5, 6, 7, or 8 selectable situational prompt modules; or both; but only permit the user to select 50%, 33%, or 25% of such selectable modules in one or both categories (e.g., allowing a user to select 1-3 instructional prompt elements, 1-3 situational prompt elements, or both).

In aspects, one or more indicators of personality can be inputted, selected, or both, as instructional prompts, situational prompts, or both. E.g., in aspects a user can input/select a Myers-Brigg personality type, a DISC personality type, a "big-5" personality type, a context-relevant personality type, such as a purchaser type profile, and the like. E.g., the personality type(s) of recipients, users, or both can be inputted. In aspects, methods/systems can include inferring recipient/audience personality from relevant data or by use of other systems, such as various personality inference systems known in the art, and such information used to recommend a personality profile or automatically used alone or with other personality profile inputs as prompt data or as setting data (e.g., in recommending or setting a tone for message generation).

Prompt data and system-generated messages can be about any suitable type of topic, category of information, etc. In an exemplary aspect, the primary topic, purpose, or both of draft messages, prompt content, or both, and optionally most or all of TSD is sales of a product or service; hiring of an employee, contractor, or organization; delivery of news about a topic, organization, person, event, place, etc.; or a combination of some or all thereof.

Pre-Message Generation Prompt Enhancement

As noted, in aspects, methods include the step of automatically, by operation of the system, enhancing prompt data, e.g., by the system searching for, finding, and adding related content to prompt input(s). Examples noted elsewhere include, e.g., finding information about a location when a location is inputted as prompt data, finding information about an organization when an organization is provided as prompt data, or finding information about an event or status when an organization or person is inputted as prompt data (e.g., finding a person's status via a social media site, or finding organizational performance data when an organization is inputted). Content for prompt enhancement can be found/obtained by searching for related content from one or more internet sources based on the content of the inputted or selected situational prompt and adding or recommending the addition of such related content to the instructional prompts. In aspects, such sources are curated sources, such as proprietary sites, e.g., Hoovers. In aspects, methods/systems also can include modification of prompts by generating alternative word choices, through classic methods (e.g., stemming methods, thesaurus reference methods) or by application of neural network(s) to prompt content to generate alternate prompt content, provided that typically such methods, if performed, are subject to instructions to retain the content/accuracy/truthfulness of the original instructional prompts. In this respect aspects can include methods in which generally all, substantially all, or all instructional prompt input is not permitted to be edited before it is evaluated/used by neural network(s), such as EPDNN(s).

In other aspects, methods comprise/systems functions include analyzing TSD, such as initial training set data, e.g., by subjecting ITSD/TSD to a CANN, and in at least some cases changing, deleting, or enhancing the initial training set data to generate modified initial training set data (MITSD) or other modified training set data (MTSD) and using MTSD (e.g., MITSD) as either prompt data, as additional TSD, or both. In such aspects, such additional prompt data is, in aspects, at least with respect to initial instructional prompts, used as an addition to original/initial instructional prompt data.

Presentation/Adjustment of Other Settings

In aspects, interfaces present, and method steps include presenting the user with, options to change, or having the user change, one or more additional settings presented via the interface (e.g., through selectable/adjustable setting controls). An example of such a selectable or adjustable control can be, e.g., a tone setting, which changes the content of prompts, the content of TSD used by neural networks(s), or both, to effectively change the tone of system-generated messages. Another setting that can be adjusted includes, e.g., message variability (word variation settings).

In aspects, systems provide/methods comprise automatically recommending changes in settings or automatically changing settings in response to various triggers/inputs. E.g., in aspects, the system changes settings in response to user response data (URD) (the user's behavior with respect to system-generated messages, such as evaluations, transmissions, edits, or storage thereof). E.g., where a user exhibits relatively low engagement with system-generated messages as compared to an expected standard, comparative responses, etc., methods can comprise automatically recommending or changing word variation settings to create more variability in messages generated in next iterations and, by such method, hopefully find more positive interaction message(s) (PIM(s)) that can be used to better train the relevant model(s) of the system.

Message Generation and Draft Messages

The steps of system-generated message drafting can be performed in any suitable manner Typically, message generation comprises providing NN prompt data and TSD to NN(s), e.g., EPDNN(s) (sometimes called the first NN (FNN) or the first NN group (FNNG)). EPDNN(s) are NLP NNs that generate semantic element predictions based on inputs. Key inputs for EPDNN(s) include the NN prompts, especially, but not exclusively, instructional prompts, as well as TSD. EPDNN performance also will be influenced by the NLM corpus or corpora, and NLP training conditions used to generate the model/natural language modeling engine. E.g., where a domain-specific corpus or corpora is used to generate an EPDNN, the output of the EPDNN will detectably or significantly reflect the NNs training with the domain-specific corpus or corpora as compared to baseline/background training on a general NLM corpus, such as WebText, CommonCrawl, or the BERT baseline training set. NNs often use other semantic elements of a message as input for generating probably semantic element additions to draft messages. Such consideration can be performed in a unidirectional or bidirectional manner, and at a single semantic element (e.g., "next word") level, or broader level (e.g., N-gram, clause, sentence, paragraph, or whole message level) as known in the art and briefly discussed elsewhere herein. NN performance, including EPDNN performance, also is influenced by the maturity of the relevant NN model. For example, as a model matures (approaches convergence), the variability of messages generated by the model detectably or significantly reduces unless user editing of messages takes place. An EPDNN generates a distribution of semantic element probability for each semantic element or alternative semantic element that the system adds to a system-generated message. Examples of such NLM NNs are known in the art and available or use, including GPT-2, GPT-3, BERT, AlBERTa, and the like, which are described elsewhere.

A selection engine (e.g., a decoder) selects from among the distribution, usually in accordance with word various settings, e.g., by applying known selection engine settings, such as Beam Search, and the like as described elsewhere. The system adds semantic elements/alternative semantic elements based on the application of such selection engine settings. In aspects, a selection engine employs one or more selection methods/protocols selected from random sampling, beam search, stochastic beam search, typical sampling/typical decoding (see, e.g., Meister et al., 2022, arXiv: 2202.00666v3), or a combination of some or all thereof (concurrently, sequentially, or a combination thereof).

The system performs EPDNN probable semantic element distribution generation and selection engine selection therefrom for each semantic element or alternate semantic element that the system adds to each draft message. The system typically performs such additions until either a system engine determines that a message should be terminated (e.g., based on size of the message, repetition of message statements/elements, or both), until the EPDNN sends a stop signal to the selection engine, or both. In aspects, a detection in redundancy of statements in a draft message is a trigger that promotes or causes termination of message drafting. Whenever the message drafting is terminated a draft message is ready for further analysis and possibly for presentation to a user, dependent on whether such a message will be modified/enhanced, filtered, etc. In aspects, the system appends a small amount of message content after termination of drafting. For example, the system can determine to cease drafting of paragraphs but append a closing/regards statement, a post scription (p.s.) statement, or the like, based on system message generation settings (editor/engine operation), NN training, etc.

In aspects, an EPDNN evaluates the content of the instructional prompts and any situational prompts provided, and optionally structural prompts provided, if any, and generates a distribution of semantic element options for each next semantic element to be included in a draft message (e.g., until the neural network determines or another element of the system directs that the draft message is complete), wherein the EPDNN generates the distribution of semantic element options based at least in part on an evaluation of overall message context, wherein message context comprises, the content of the TSD (e.g., the ITSD in a first iteration), the content of the situational prompts if any, the instructional prompts, and the content of the draft message itself.

The EPDNN/first neural network group (FNGG) (AKA the EPDNNG) uses situational prompts, if present, as context, in a detectable or significant manner, in a significant number of messages, where content of the situational prompts is sufficiently related to content of other aspects of context, such as the TSD or instructional prompts. The EPDNN/EPDNNG is trained to treat and, in substantially all cases treats, the instructional prompts as a priority context with respect to the incorporation of semantic elements into each draft message generated by the system. In aspects, the system recognizes prompt topic/context category tags/indicators and one or more system engines or NN(s) can use such prompt topic/context category tags/indicators in modification/expansion of prompt content or other functions, one or more neural networks of the system are trained to recognize such prompt topic/context category tags/indicators in performance of neural network functions (e.g., in generating a distribution of semantic element options), or both. Examples of such expansion, recognition, etc. are provided elsewhere herein.

E.g., in aspects, in at least about 50%, ≥60%, ≥70%, at least about 75%, at least about 80%, or in ≥85%, ≥90%, ≥95%, ≥97%, ≥98%, ≥99%, ≥99.5%, or ≥99.9% of draft messages generated by a system, most, generally all, or substantially all of the identifiable statements in the applicable instructional prompts are present, using either semantic elements in the instructional prompts, alternative semantic elements or both. Typically, at least some, most, or generally all of the semantic elements in some, most, generally all, or all statements in instructional prompts are replaced with alternative semantic elements. In aspects, some, most, or generally all messages comprise a reordering of one or more statements (e.g., 2 or more statements, 3 or more statements, etc.) in instructional prompts. In aspects, input includes situational prompts, and the inclusion of the situational prompts detectably or significantly changes the content of draft messages a detectable or significant amount of the time, such as most of the time, when situational prompt content is sufficiently related to other message context, such as content of the instructional prompts, TSD, or both. In either case, such methods typically include, by automatic operation of the system, causing the sampling engine to select one semantic element from each distribution of semantic element options generated by EPDNN/EPDNNG for each included semantic element option, and causing the system to incorporate each selected semantic element into a draft message until the system determines that a draft message is complete. Variation of word settings in the generation of such draft messages can be, in aspects, modified by user selection, as described elsewhere, such variations changing, e.g., the decoder protocol/method employed by the selection engine (e.g., parameters thereof, choice thereof, etc., such as changing from use of a Greedy Search protocol/decoder to a Beach Search protocol/decoder).

As noted, content of the draft message can influence the prediction of semantic elements. The evaluation of draft message content can be done any suitable basis, as described elsewhere (e.g., in a unidirectional manner or bidirectional manner, on a single element-by-single element basis, such as a word-by-word basis, or on a larger semantic element basis. In some methods, the last word, or last several words (N-gram basis) is used in next element prediction. In some respects, the entire preceding portion of a growing message is used in next element prediction. In other aspects, a possible entire message or large portion thereof is determined/predicted and then used to make word prediction/distribution analysis for each possible semantic element thereof.

In aspects, the system generates messages in a manner that is independent of the order of entry of some or all of the prompt data. E.g., in aspects, the order of message statements is independent of the order of message statements in the independent prompt submission, as can be demonstrated through statistical analysis, or percentage of cases (e.g., in ≥25%, ≥33%, ≥50%, ≥65% or ≥75% of cases one or more statements in the draft message is in a different order than such statement(s) is/are presented in the instructional prompts.

The steps used to generate a message are performed by the system a number of times/iterations to generate a desired number of messages. In aspects, systems generate a plurality of messages for presentation to a user. In aspects, messages generated by a system differ a detectable or significant amount from each other in terms of semantic element content, statement content, or both. In aspects, ≥5%, ≥10%, ≥15%, ≥20%, ≥25%, or ≥33% of the semantic element content of system-generated messages is different across messages, semantic element placement differs by any such amount (i.e., ordering of semantic elements vary), or both, or the ordering of statements varies by one or more statements. In aspects, systems generate 2-7, such as 2-5, 2-4, 3-5, 3-4, or 2-3 messages. In aspects, initial draft messages are subjected to further editing, enhancement, or used to generate additional messages, by, e.g., subjecting the messages to a message variation neural network (MVNN), which is trained to review message(s) and to generate variable messages based on such input. In aspects, a number of message greater than the number to be presented to a user is generated and some of the messages are excluded or filtered from presentation to a user, based on, e.g., work of another neural network that evaluates messages and recommends filtering of messages to system components, based on application of non-NN engines, etc. E.g., in aspects, a system generates ≥125%, ≥150%, ≥200%, ≥250%, or ≥300% of the number of messages that are presented to a user and subjects those messages to filtering, deletion, and the like to arrive at a reduced number of messages that the system elects to present to a user. In aspects only a single message is presented to a user. In aspects, at least 2 messages are presented to a user.

Presentation of Draft Message(s)

Methods comprise presentation of message(s) to a user by interface(s), which can be, e.g., accessible via web pages that present a system-generated representation of inputs, outputs, or both, such outputs specifically including presented messages. Interfaces allow users to select one, some, or all of such messages; to edit one some or all of such messages; and optionally to further store one or some of such messages; to evaluate (rate, rank, like/dislike) one, some, or all presented messages; or to transmit initially presented messages, edited messages, or both. In aspects, systems include the ability for users to retrieve previously stored system-generated messages (including user-edited messages), to search previously stored, transmitted, edited, or presented messages; or both. Draft messages can be presented in any suitable fashion. In aspects, systems can provide for the ability for messages to be read audibly to users, for example. In typical aspects, messages are at least graphically presented via a GUI and allowed to directly edit message(s) via such a graphical user interface.

User Interaction with Draft Messages

User selection, ranking/evaluating, storing, editing, and transmitting system-generated messages (edited or not) are acts that can be considered "user reactions." Data regarding user reactions (user reaction data—"URD") can be used in various processes of systems/steps of methods as discussed in several parts of this disclosure. Systems can, automatically, track user reactions, and store URD for later applications, e.g., in a DR, such as in a NoSQL database of the system. In aspects, the system requires at least some user reaction. E.g., systems can require a user to at least rank/rate/evaluate, edit, delete, reject, report, or transmit/store a message. Message(s) associated with relatively or absolutely positive user evaluations/rankings and other user behavior that is indicative of effective message generation can be considered positive interaction messages ("PIMs"). In aspects, PIMs are automatically stored. In aspects, PIMs are automatically used in one or more system processes, as described elsewhere herein, such as in generation of new/additional prompt data or editing of prompts based on a content evaluation of PIM(s) (e.g., by analysis of PIM(s) with a CANN). User editing of a message can, in aspects, mostly, generally, or always be considered determinative or indicative that the edited message is a PIM. Storing and transmitting a message also or alternatively can be considered determinative or indicative that a message is a PIM. Where URD is indicative that a message is a PIM, the determination of PIM status can be based on multiple factors, rules, algorithms, application of neural networks of the system, etc. In aspects, the system presents options to rate/evaluate, edit, transmit, store, delete, or otherwise interact with system-generated messages all at once. In aspects, the system presents some or all such options in a sequential manner. In aspects, the system allows a user to interact with all system-presented messages at once. In aspects, the system causes the user to evaluate messages in a sequential manner or in a partially sequential manner (e.g., presenting messages in pairs and sequentially selecting favorites to achieve a single favorite or smaller set of favorites, or maintaining a favorite and comparing other candidate messages against it in a side-by-side manner until a final favorite message is selected, etc.).

In aspects, the system can require user editing of messages. For example, in a highly mature system/converged system, in which message variability is greatly reduced, the system may require user editing of messages as a means to create more variability within messages generated by the system.

The engines and other elements necessary for input of user reactions to presented messages can be any one or more standard input/output techniques associated with interfaces known in the art. Output means are discussed elsewhere, including GUI outputs of any suitable type known in the art. Input means can include keyboard inputs, GUI element selection inputs (such as through mouse or touchpad cursor selection methods), touchscreen inputs, voice inputs, motion inputs, biometric inputs, and the like, which are all known in the art.

As noted, in aspects, URD (sometimes alternatively called method outcome information/MOI) is recorded automatically by operation of the system. E.g., the system can selectively or automatically (a) record method outcome information comprising (I) the user's selection of one or more draft messages and (II) information comprising at least one modified message or the user's generation of at least one modified message, (II) information comprising the user's transmission of at least one draft message, (III) the users' evaluation of at least one selected draft message, or (IV) a combination of any or all of (I)-(III) and (b) store such method outcome information, relaying such method outcome information, or both, for further reporting, analysis, or use.

Repeat/Iterative System Use/Step Repetitions

Methods of the invention include repeating step(s) of methods described herein a plurality of times, typically numerous times (e.g., $\geq 3$, $\geq 10$, $\geq 20$, $\geq 50$, or $\geq 100$ iterations). Systems of the invention typically similarly are adapted to generate several generations of messages over such a series of iterative applications. Iterations can refer to some, most, or generally all steps of a method of an aspect, but less than all steps, or, depending on the aspect repeating substantially all, essentially all, or all of the recited steps of the method. E.g., pre-training of NN(s), such as an EPDNN, typically will occur only once, or rarely, at least for a type of message, type of recipient, and type of sender, but other steps of using such EPDNN and other system elements to generate series of messages can be repeated a few or several times. In aspects, methods/systems of the invention include mechanisms for improving message generation with increased use due to, i.a., the ability of NN(s) of the system to learn better performance through various training/feedback steps, and, in aspects, methods/systems include steps/functions for ensuring that messages generated by systems remain relatively truthful/accurate (e.g., significantly more truthful/uncorrupted), even if some, most, or generally all of such messages generated in use of the system (in a series of messages) were (1) subjected to user editing that semantically changed, removed, or added statements with respect to the content of the instructional prompts, or (2) include messages where system operation led to inclusion of content, deletion of content; or modification of content in a manner inconsistent with instructional prompts, e.g., deleting statements, adding statements, or changing the semantic meaning of statements in messages as compared to the instructional prompts. In aspects, such repeated use of the system/performance of method(s) or method step(s), detectably or significantly improves the truthfulness of messages to the initial instructional prompts, user evaluation of messages, frequency of PIM generation, response/reply to rates, or a combination of any or all thereof. E.g., in aspects, repeating steps can result in messages that a significant number or a majority of users deem to be more personalized, closer in tone/style to their drafting or drafting of a desired persona/author, such as a key opinion leader, or both, such as in an adequately powered study of such users.

In aspects, the invention provides methods/systems that upon use of the system for a new intended recipient/audience member, new subject (e.g., product or service to sell), new context, or combination thereof, automatically searches for information regarding the new intended audience member, subject, context, etc., and recommends prompt information, TSD, etc., based thereon, automatically uses such content to enhance prompts or serve as prompts, or prompts the user to provide situational prompt information, instructional prompt information, or both, regarding the new intended audience member, subject, context, etc.

Post User/Message-Interaction Prompt Review/Modification

In aspects, methods/systems include steps for/means for modifying prompt content post message generation, i.e., between production of an earlier generation/series of system-generated messages and the next iterative set of method steps/use of the system. In aspects, the prompt modification means/steps detectably or significantly enhance truthfulness of messages, PIM frequency, or both, over a number of iterations (e.g., in $\geq 2$, $\geq 3$, $\geq 5$, $\geq 10$, $\geq 15$, $\geq 20$, $\geq 25$, $\geq 30$, $\geq 40$, or $\geq 50$ iterations). In aspects, such steps/means achieve such a detectable or significant improvement in message quality/performance. In aspects, such steps/means achieve such results even where messages are edited by users, inappropriately edited or generated by system performance, or both a detectably or significant amount of time, or a considerable percentage of the time (e.g., at least 5%, such as ≥10%, ≥15%, or ≥20% of the time) for at least some amount of content (e.g., in respect of the deletion, addition, or change in semantic meaning of at least 1 statement in an instructional prompt as compared to most, generally all, or all system-generated messages; reflecting differences in at least 5%, at least 10%, at least 15%, or at least 20% of statements between most, generally all, or all messages and the initial instructional prompts; or both).

Steps/means performed/employed to achieve such performance of systems/methods can include any one or more suitable steps/means described herein and equivalents thereof known in the art. Such steps/means typically include an analysis of system-generated messages to determine the semantic content thereof (e.g., identification of statements therein) and the use of such semantic content to generate instructional prompts, modify existing instructional prompts, or both. Such steps/means also or alternatively can comprise steps that result in detectable or significant training of an EPDNN. Such steps/means can further also or alternatively include steps/means for semantically comparing messages content to earlier presented instructional prompt content and using techniques such as deletion, filtering, editing, recommendation, and the like to edit prompts in response to detected message corruption.

In one aspect, systems can facilitate human review of system-generated messages to perform some or all of such techniques. E.g., a system can automatically send a number of system-generated messages to a system administrator/trainer or can promote an analysis by a user, or both. Users can be provided with the capability to edit prompt data, such as instructional prompt data (and optionally also situational prompt data where a failure to consider/utilize situational prompt data is detected or suspected). E.g., the system can deliver system-generated messages to such human reviewers with the instruction to summarize statements contained therein. In aspects, the system may suggest statements based on an analysis of messages (e.g., as performed by a CANN) for the user/reviewer to edit, select, etc. In aspects, the system may suggest changes to the prompts based on such analysis or based on input from the user. In aspects, human reviewers/strainers edit prompts (adding content, changing content, deleting content, etc.) based on such a comparison. In aspects, human reviewers input instructions to the system to provide reward/penalty feedback to the EDPDNN, e.g., based on a rating of 1-10, 1-5, 0-1, or other scale/grade system (A-D and F), or other form of feedback, etc. submitted by reviewers, based on a comparative review of initial/earlier prompts and messages generated, thereby causing a change in the performance of the EPDNN, and thereby further changing message generation outcomes in a manner that typically, mostly, generally only, or significantly enhances truthfulness, message efficacy, etc., either instantly (in the next iteration/application), over time, or both.

In aspects, such steps performed/means embodied in an applicable method/system also or alternatively include providing and using a neural network trained to evaluate contextual similarity of messages (a contextual similarity neural network or NN group (CSNN/CSNNG)), typically by automatic operation of the system to assess and act on semantic differences in initial prompt content and message content. Such steps/means can include the system automatically causing the CSNN/CSNNG to evaluate contextual similarity between one, some, most, generally all, or all of the system-generated messages and the instructional prompts, situational prompts, or both, and automatically applying a context penalty feedback, context reward feedback, or both, to the EPDNN based on semantic variations between the content of the analyzed system-generated messages and the analyzed prompts.

In aspects, such steps performed/means embodied in in an applicable method/system, include, i.a., providing and utilizing a second neural network from an EPDNN (a CANN or CANNG) that is trained on the analysis of messages to determine the semantic content of one or more positive interaction messages (PIMs) by, e.g., the identification of statements therein, and, based on such analysis, at least in some cases causing system elements to change one or more prompts to reflect the semantic content of the PIMs, prior to the next iterative operation/use of the system.

In aspects, NN-performed steps described above, such as steps/functions carried out by a CANN or carried out by a CSNN, are performed by analyzing or comparing only modified portions of messages or by affording greater weighting or prioritization to the analysis or comparison of edited message portions of messages (compared to messages overall or other portions of messages). E.g., a CSNN can compare edited portions of PIMs against instructional prompt content and evaluate such a comparison, resulting in, directly or indirectly, application of reward or penalty to the EPDNN, thereby changing operating parameters (e.g., changing EPDNN neuron weights through the training given to the EPDNN via such feedback). Also or alternatively, a CANN can analyze edited portions of PIM(s), determining the semantic content thereof, and assess, e.g., if such content is present in the instructional prompt data being used by the system prior to the next iteration of the method/use of the system.

In aspects, human supervision of the system is limited to either initial iterations, occasional iterations, or both. In further related aspects, the system automatically additionally either compares content of draft messages and prompts (e.g., via a CSNN) to indirectly change the parameters/performance of the EPDNN, conducts semantic analysis of messages and uses such determined semantic content to modify prompts (e.g., via a CANN), or both. E.g., in such aspects, after about 10 iterations of the method/system use, at least about 50%, such as ≥60%, ≥65%, ≥70%, ≥70%, ≥75%, ≥85%, or ≥90% (e.g., all) of the modification to the situational prompts and instructional prompts is carried out by automatic operation of the system. In aspects, in such hybrid systems, system review of prompts, message content, or both, occurs at least about 2× as often/much, e.g., ≥3× as much/often, ≥5× as much/often, ≥10× as often/much, ≥20× as much/often, ≥50× as much/often, or ≥100× as much/often than human analysis, over 20, 50, 100, or more iterations/uses. In aspects, employing such steps/using such system features significantly enhances one or more measures of truthfulness in system message output, significantly enhances message efficacy, or both, in a significant number of messages, most messages, or both. In aspects, any human facilitation of human review or actual human review, comparison, or content analysis of messages, prompts, etc., as applicable, is not a built-in/hard wired part of system operation or required step in a method.

In aspects, steps/means described in this section can result in the system automatically, upon a message that meets a criterion, trigger, standard, pattern, etc., transmitting a message to a user regarding such feedback, recommending review of prompt data, or recommending modifications to instructional prompts, situational prompts, structural prompts, or a combination thereof.

Any of the automated steps/functions described in this section may not result in a modification of prompt data, EPDNN settings, or both, as applicable, if the applicable system components do not direct corruption of prompts in terms of missing statements, including extraneous statements, or containing flawed/erroneous or sub-optimal statements. Thus, while aspects are often described in terms of amending prompts or changing EPDNN parameters through training/feedback, in some, most, or generally all iterations of such steps/means no changes in prompt data may occur because the applicable means (e.g., the CANN or CSNN) did not detect a sufficient amount of corruption to require action. In mature systems, the rate of prompt modification is expected be very low, with action by the system occurring ≥90%, ≥95%, ≥99%, ≥99.5%, or ≥99.9% of the time only when a user edits prompts.

Evaluating Message Recipient Efficacy and Use of Response Data

System elements can be adapted to obtain, and methods of the invention include steps for, tracking recipient/audience member message receipt, attendance, opening, review, reply, interaction, or other response/outcome data. A variety of message tracking and outcome tools are known in the art and any suitable type or combination of such tools/methods can be employed in practicing the invention. For example, numerous methods for tracking message opening/read data are known, as are methods for tracking time a user interacts with, spending reviewing (leaves open), various types of content. Other well-known measures of message responsiveness/efficacy include click through rates, based on the number of unique hyperlinks or similar content in a message that a recipient interacts with. Embedded offer codes, specific contact information, QR codes leading to other content, and the like are all other well-known methods for tracking message responsiveness/reaction or impact in recipients. In other contexts, such as social media messages, share rates, reflecting a degree of "virality" of a message can be used. Commercial services for tracking effectiveness are known in the art (e.g., Nielsen Ad Ratings, Google Analytics, and the like). Various other rates and measures known in the art also or alternatively can be tracked by the system or the system can import such data from other systems (selectively or automatically) (e.g., via CRMs, purchasing systems, etc.), or the system can facilitate input of such message response data (MRD). Examples of additional metrics include conversion rates, bounce rates, list growth rates, email sharing/forward rates, and indirect measures such as increases in sales of product/services in a region, category, the like, estimated or known ROI, and negative measures such as unsubscribe rates. Given the wide availability of such measurement methods the details of such systems are not described in detail herein.

In aspects, the system automatically tracks replies or other responses to or associated with messages prepared by the method/system, and optionally stores or analyzes such MRD or reports such MRD to the user, associated users, or others. In aspects, system components use MRD to modify system operating elements or method step conditions. E.g., a MRD neural network or MRDNNG can be trained to analyze one or more aspects of MRD and to use such analysis to provide input to system operations. E.g., MRD can be used by MRDNN(s) to evaluate recommendations to amendments to NN prompts or to cause amendments to NN prompts used by the EPDNN. Also or alternatively, a MRDNN can provide feedback to the EPDNN, resulting in changes (indirectly via training) to EPDNN parameters, such as neuron weights, via such feedback. Changes recommended or made can include, e.g., (a) amending the instructional prompts based on MRD; (b) amending the situational prompts based on MRD; (c) suggesting changes to the instructional prompts based on MRD; (d) suggesting changes to the situational prompts based on MRD; or (e) performing a combination of any or all of (a)-(d).

In aspects, systems comprise components (e.g., NN(s)) or methods include steps that use, i.a., one or more aspects of MRD (e.g., open rates, click-thru rates, and the like) to predict which system messages a type of recipient will like, a particular recipient will like, etc. In aspects, systems can further use such prediction data in one or more further functions, such as ranking functions, filtering functions, or recommendation functions (discussed below). In aspects, system components, such as NN(s) perform a similar prediction of likeability of message(s) from the perspective of the user, and uses such information in, e.g., ranking functions, recommendation functions, or filtering functions. Alternatively, still, the output of such data can be used to rank messages or select messages in terms of inclusion in training set data or prioritization of such messages (or content thereof) as inputs (e.g., prompts, TSD, etc.).

Further Training of EPDNN

Methods of the invention can comprise, and systems of the invention facilitate further training of NN(s), such as the EPDNN, over iterations. Training can be provided to an NN by application of rewards/penalties. Weight/penalty applications can be applied by any suitable type or number of NN weight modification/optimization methods. A commonly used example of such a method is back propagation methods. Such methods can be employed automatically or selectively and carried out by automatic operation of system components. Additional training of NN(s) also occurs in systems/methods by provision of additional training data. E.g., PIMs are typically added to the TSD of an EPDNN in each case PIM(s) are generated. In aspects, PIMs or portions thereof, or data derived from either thereof, such as semantic analysis thereof/statements identified therein, are treated with priority prompt status in future iterations of the method (as noted herein, a common way PIM content is used is by CANN analysis leading to evaluation/modification of prompts, such as instructional prompts). Over iterations, either or both types of training imparted to NNs can result in significant or detectable changes in system-generated messages, at least until system/model maturity (convergence) is achieved. As noted elsewhere, during evolution of a model operated by a system of the invention, one of the aspects of the invention is a period of continued improvement in message efficiency measures, efficacy measures, or both as, well as an at least relatively significantly greater retention of message truthfulness, etc.

Other Optional System Operations

Systems/methods can include additional operations that can further enhance efficiency of system use or impart alternative benefits, functions, etc. Examples of such functions that can be carried out by systems, particularly after initial use of the system, are filtering functions, ranking functions, and recommendation functions.

In aspects, systems automatically filter one or more system-generated messages (aka, draft messages), such that the system excludes the presentation of the one or more draft messages that are captured by the filter from presentation to the user. Message filtering is known in the art and is simple as providing CEIs to system component(s) such as data management engine(s), graphic engine(s), and the like, resulting in filtered messages being hidden from presentation, deleted, or handled in any suitable equivalent/similar manner.

In aspects, systems can comprise a recommendation engine, which provides one or more types of recommendations to users based on system/method outputs. E.g., in one aspect, the system automatically transmits recommendation(s) to a user regarding editing, transmission, or storage of one or more system-generated messages, e.g., based on any of the analyses performed by system components (e.g., based on MRD). In aspects, systems comprise neural network(s) that estimate efficiency, MRD, and the like, and provide such recommendations based on the output of such NN(s).

In aspects, the system comprises a ranking engine/function, and the system automatically ranks system-generated messages and uses the ranking in one or more respects in presenting messages to the user. E.g., a ranking engine can present message in a rank order based on criteria, can group messages based on rank data, or can provide a ranking score or indicator in association with messages presented to users.

In aspects, ranking of possible selectable prompts is performed by the system. E.g., in aspects, one or more neural networks of the system evaluate and rank possible selectable situational prompt options, based on criteria(on). In cases, the system automatically optionally further uses the ranking to, e.g., set the order of one or more of the selectable situational prompt options, to determine what selectable situational prompt options to present to the user, or both.

Ranking and filtering functions can be performed on any suitable basis, such as, e.g., NN predictions of inputs that will lead to improved/optimal results in system performance, e.g., by NN(s) that use such prediction data to model/predict efficacy in terms of URD, MRD, message truthfulness, etc. In aspects, a system can use information about the transmitter/author, an organization associated with the transmitter/author, information about the audience, information about an organization or person associated with the audience, or a combination thereof in performing the evaluation and ranking of the possible selectable situation prompt options. E.g., NN(s) can model predicted efficacy with respect to a person, organization, type of message, etc., and use such information in ranking or filtering functions.

Ranking/filtering/recommendation functions/engines also can be combined with other functions/components of systems. E.g., where a system amends prompts, pre-message generation, post-message generation, or both, ranking, filtering, or recommendation functions can be used to present modified prompts that the system components, e.g., NN(s), predict will lead to better URD, MRD, increased PMI frequency, or other measures of efficacy or effectiveness, etc., and using such prediction(s) to rank options, report recommendations, filter options, and the like. E.g., in aspects where a system automatically obtains information on one or more selected subjects/contexts from internet-available sources and uses such automatically obtained internet-sourced information to enhance or serve as prompt data (e.g., as situational prompt data), such functions can include providing such amended prompts as recommended prompts for inclusion, ranking such prompts with respect to other prompts, or filtering prompts based on expected effectiveness. E.g., where a user edits a prompt, selects editing of a prompt, or the like, such an edited prompt can be recommended, ranked relatively higher, etc. The same principle can be applied to system-edited prompts.

In aspects, the invention provides systems/methods that comprise evaluating word variation (loss, gain, or both) in draft messages with respect to the initial training set, instructional prompts, situational prompts, or a combination of any or all thereof, and optionally generating and transmitting a word-variation penalty, no/low word-variation reward, or both, to the EPDNN based on word variation in the draft messages with respect to the content of the initial training set, instructional prompts, situational prompts, or a combination of any or all thereof. Methods adaptable to such methods/components are known in the art.

Group/Population Data-Based Methods

In another facet, systems of the invention are adapted, or methods of the invention include steps for, using data obtained from a number of users using the system to generate messages. E.g., a group of users (a population) can concurrently have access and overlapping use a system to generate messages. In such aspects, system can include components for tracking data with most, generally, or all users in the population (e.g., URD data, PIM data, MRD data, and the like associated with each user).

E.g., in exemplary aspects (1) the system receives data from a plurality of users using the system to generate messages (e.g., messages that the system recognizes as similar in content and purpose) and (2) the system automatically uses the information from the plurality of users to (a) automatically amend the situational prompts, (b) recommend amendments to the situational prompts, (c) automatically amend the instructional prompts, (d) recommend amendments to the instructional prompts, (e) automatically provide training to NN(s), such as the EPDNN, thereby detectably or significantly changing the operation of such NN(s), (f) suggest imparting training to the EPDNN or other NN(s), or (g) perform some/all of (a)-(f) (aspect 148).

In exemplary aspects, methods/systems comprise one or more neural networks using data concerning the reply or other response to transmitted messages, transmitted edited messages, or both, at an individual level, population level, or both, to predict which draft messages are most likely to receive a reply or other response, and optionally to use such prediction in association with e.g., presentation of messages, selectable elements, or both to a user (e.g., by ranking functions, filtering functions, recommendation functions, etc.).

In aspects, systems use data from the plurality of users associated with user editing of presented communication-initiating messages, user transmission of presented communication-initiating messages, user evaluation of presented communication-initiating messages, or a combination thereof, across the population or portion of the population. In aspects, data analyzed by system component(s) in a population of users comprises the reply, reading, or other response rate of actual audience members/recipients to transmitted messages generated by iterations of users in the plurality of users.

Ensemble Models

In aspects, the invention additional provides one or more ensemble NN(s), engine(s), or combination thereof, employing ensemble data models/methods. E.g., in aspects, a system provides for an NN that analyzes predictions from a CANN and a CSNN and makes predictions based on the combination of such predictions and the system uses such predictions in one or more outputs (e.g., in generating recommendations, in filtering of selectable elements, in amending prompt data, in amended TSD, or performing any combination thereof). Other NN(s) are described throughout this disclosure and can provide inputs to such ensemble models/elements, such as ensemble NN(s). E.g., an ensemble model can collect prediction of data of recipient likes generated by one NN, prediction of user likes by another NN, and use such predictions in an ensemble model to perform system functions.

System Performance/Output

In aspects, systems/methods include components/steps for changing the form of output generated by a system, automatically or selectively. E.g., in aspects, a method comprises the system automatically generating one or more different message-type output candidates, wherein the one or more different message-type output candidates are of a message-type that is different from the message-type of most or all of the communication-initiating initial training set messages. E.g., TSD can mostly, generally, or substantially only comprise email messages and the system can use system-generated text messages based thereon as a basis for the generation of audio files that comprise audio content corresponding to such messages or portions thereof, video files (e.g., avatar/character videos) wherein character(s) relay such messages, such messages are displayed, or both, and the like. Output also can include, e.g., call scripts for, e.g., salespeople that use voice calls alternatively or in addition to transmitting email messages. Other output that can be generated by a system, whether through transformation or as direct output of the system, include, e.g., emails, long text/SMS messages, social media posts, short blog posts, advertising copy and short advertisements, advertorials, and the like. In aspects, output is in the form of an email. In aspects, output is in the form of a sales-related email or hiring related email. In aspects, TSD, prompts, or both, reflected the intended output of the system (e.g., in aspects, TSD, prompts, or both, mostly, generally, or essentially entirely relate to sales emails).

Messages generated by methods/systems can have any suitable characteristics. In aspects, messages are characterized by size, linguistic complexity, or other characteristics. E.g., in one aspect, most, generally all, or all messages generated by a system are at least 250 or at least 300 characters in length, such as ≥350 characters in length (e.g., 250-1000, 250-900, 300-900, 300-1200, 300-1000, 350-1250, 350-1000, 350-750, 300-750, 400-800, 250-750, 300-600, 350-650, 325-975, 325-775, or 375-675 characters in length). In aspects, most, generally all, or essentially all messages generated by a system/method are between ~300 characters and ~1200 characters in length, such as, e.g., 250-1500, 275-1500, 300-1500, 325-1500, 350-1500, 400-2000, 400-1600, 400-1200, 400-1000, 250-1250, 300-1250, 350-1250, 400-800, 250-750, 300-900, 400-1000, 250-1000, 300-1000, 350-1000, 325-775, or 325-650 characters. In aspects, most, generally all, or essentially all messages of methods/systems are at least about 50 semantic elements in content/length, E.g., in aspects at least ~50%, such as ≥~65%, ≥~75%, ≥80%, ≥~85%, or ≥90% of messages, message records in TSD, or both, comprise ≥50, ≥75, or ≥100, ≥150, ≥200, ≥250, ≥300, or ≥350 semantic elements (e.g., 40-1200, 50-1500, 50-1000, 100-1000, 200-1000, 250-1000, 100-750, 200-800, 250-750, 200-800, 300-1200, 300-1000, 300-1500, or 300-900 semantic elements. In aspects, messages generated, messages in TSD, or both, comprise 50-500, 75-500, 100-500, 40-400, 75-375, 50-350, 50-400, 75-300, 125-375, 125-500, 125-625, 150-750, 150-600, 200-600, 200-800, or 200-500 semantic elements. In aspects, messages generated, messages in TSD, or both comprise ≥2 paragraphs, ≥3 paragraphs, or ≥4 paragraphs, e.g., 2-7 paragraphs, 2-6 paragraphs, or 3-7 paragraphs. In aspects, messages generated or in TSD comprise 2-12, 2-10, 2-8, 2-6, 2-5, 2-4, or 2-3 semantically distinct statements, such as 3-12, 3-10, 3-9, 3-8, 3-6, or 3-5 semantically distinct statements. In aspects, generated messages, messages in TSD, or both comprise at least two paragraphs and at least one transition linking 2 or more paragraphs of the at least two paragraphs. In cases, a majority of individuals in an adequately powered population of typical audience members would find most of the at least one transitions to be effective transitions between the two paragraphs. In aspects, most, substantially all, or all of the presented communication-initiating message candidates comprise a salutation statement and a closing statement. In any of such aspects "comprise" will be understood to include mostly comprising, generally consisting of, essentially consisting of, etc. In aspects, most, generally all, or all messages generated in TSD, or both are records containing most of the content of emails or reflect entire email messages.

In aspects, messages generated by systems/methods comprise communication-initiating messages, as described elsewhere herein. E.g., such messages can be characterized by not being a response to a prior communication generated by any member of the intended audience. In aspects, such communication-initiating message methods/systems can be characterized by, i.a., no draft message is generated as a response to a prior message of an audience member, the method does not use a prior message from an audience member to the user or transmitter/author as context in training the first neural network or any of the one or more neural networks in the first group of neural networks, or both. In aspects, the TSD or prompts do not comprise an approximately contemporaneous message from the intended audience. In aspects, most, generally all, or essentially all output is a message that is generally ready for transmission to an intended recipient. In aspects, methods/systems provide an option to selectively transmit messages to recipients. E.g., a system can comprise an email program component that operates similar to or integrates with a system such as Microsoft Outlook, Gmail, Mozilla Thunderbird, and the like.

System Effectiveness

In aspects, the capacity of the EPDNN and TSD are such at least about 10% of users in an adequately powered survey population of users positively evaluates or directly transmits (without modification/editing) at least one presented communication-initiating message candidate generated by operation of the system, use of the method. In aspects, recipients of such messages exhibit a positive response or reply rate of ≥2%, ≥3%, ≥4%, ≥5%, or more, e.g., ≥7%, ≥8%, or ≥10% of recipients in a population of typical recipients exhibits positive reaction/response to system-generated messages. In aspects, the invention provides the method of aspect 116, wherein the reply or response rate for the sales-related communication-initiating message candidates have a higher reply or response rate than about 3%, such as reply or response rate of greater than about 5%, in aspects at least about 6.5%, or at least about 9%.

In aspects, at least about 5%, such as ~7.5% or more, ≥~10%, ≥~12.5%, or ≥~15% of users in an adequately powered survey population of users positively evaluates or directly transmits (without modification/editing) at least one presented communication-initiating message candidate generated by performing the method without first performing a distillation step or pruning step and without first editing the presented communication-initiating message candidate.

Storage and Use of System-Generated Messages

In aspects, the invention systems/methods comprise components or steps for automatically storing one or more system-generated messages, e.g., PIM(s), for further use. In facets, systems include the ability to search for such stored messages, select such stored messages, edit such stored messages, or use such stored messages as TSD, prompts, etc. In aspects, systems/methods comprise components or steps providing a user with the ability to select a new intended audience member in association with generating a message primarily based on a stored user selected message. In aspects, a recommendation engine recommends the use of stored messages in TSD, or content(s) of stored message(s) as prompts.

Technical Effects

Skilled persons will recognize that the systems and methods of the invention provide a number of technical effects, examples of which are provided throughout this disclosure. Additional exemplary technical effects associated with systems/methods of the invention are provided here.

A first exemplary technical effect associated with methods/systems of the invention is improved speed in semi-automated or automated generation of linguistically complex messages through elements of the invention including use of adequately powered neural network(s) trained with relevant training set data and relevant, prioritized, and managed prompts, limiting message size of the training set data and outputs, and provision to users of limited message options and setting/prompt selections/inputs, all increasing efficiency of the methods/systems as compared to less focused systems/methods.

A second exemplary technical effect associated with methods/systems of the invention is increased speed in obtaining an effective automatic/semi-automatic linguistically complex message generating system for a new user or a prior user approaching the generation of messages for a new purpose, new context, or new audience. E.g., methods employing the use of user onboarding techniques, using system generated messages as training set data, and the like, can facilitate the provision of this type of technical effect.

A third exemplary technical effect associated with methods/systems of the invention is the reduction of processing time, system resources, coding time, or any combination thereof, in terms of the generation of an effective automatic/semi-automatic message generating system. Methods/systems of the invention achieve such effects through, e.g., employment of neural network-based systems versus the use of large numbers of messaging templates, message generation rules, extensive user inputs/manual supervision, and the like, which were associated with many of the previously described/attempted approaches to facilitating message generation through computer technology.

A fourth exemplary technical effect associated with methods/systems of the invention is the sustained usability of a semi-automatic/automatic message generating system over repeated use/time as compared to prior art systems, in that, i.a., the systems exhibit a higher level of accuracy (truthfulness) over time as compared to prior art/alternative systems, which tend to corrupt over time (e.g., in terms of deletions or additions to messages over time without reaffirming/strengthening the situational prompts and instructional prompts used in subsequent iterations of the method/use of the system).

A fifth exemplary technical effect/benefit of the invention is improved effectiveness of messaging as compared to prior art systems and even with respect to human systems. The inventors have observed that messages generated by the system can perform or perceive that system-generated messages will perform as well, and often better, than human-generated emails in terms of open rates, response rates, reply to rates, positive evaluations, or combinations thereof (e.g., in, e.g., obtaining response/reply rates of $\geq 2\%$, $\geq 2.5\%$, $\geq 3\%$, $\geq 4\%$, $\geq 5\%$, $\geq 6\%$, or $\geq 7.5\%$).

A sixth exemplary technical effect associated with systems/methods of the invention is a semi-automated/automated message generation platform that detectably or significantly adapts to a user's style over multiple uses/iterations.

A seventh exemplary technical effect associated with systems/methods of the invention is the provision of a computerized message-generation platform that continuously improves, at least over a number of iterations, in terms of effectiveness of messages, mimicking a user's style, or both, based upon, e.g., the various mechanisms for learning and adjusting message-generation inputs provided herein.

Illustrated Embodiments

The drawings/figures provided here, and the associated following brief description of figures, are intended to exemplify certain aspects and principles of the invention without limiting its scope.

Additional aspects of the invention are described in this Section with reference to flowchart illustrations/block diagrams of methods. Readers will understand that generally each "block" of flowchart illustrations/block diagrams, and combinations of blocks therein, can be implemented by execution of CEI by processor(s). CEI units/functions reflected in such "blocks" are provided to processor(s) of applicable device(s)/system(s) to produce a machine, system, or both, such that the CEI executed by a processor implement the systems/functions specified in the block(s). Such CEI are stored in CRM (e.g., NTCRM/PTRCRM) that can direct the applicable computer(s) to function in a particular manner according to the CEI, such that the CRM comprising DR(s) (comprising functional data) and CEI(s) comprises an article of manufacture that performs useful real-world operations.

Although aspects exemplified here are described with reference to flow charts/block diagrams, any portion or combination of each block, combination of blocks, functions, etc., can be combined, separated into separate operations, or performed in other orders, as would be suitable in the context of a system or method of the invention. References to "modules," "units," "steps," etc. in this disclosure typically are made for convenience of the reader and are not intended to limit implementation of any method or system. Any portion or combination of any block, module, etc. can be implemented as computer executable (program) instructions (e.g., software), hardware (e.g., combinatorial logic, Application Specific Integrated Circuits (ASICs), Field-Programmable Gate Arrays (FPGAs), processor(s), or other hardware), firmware, or any combination thereof (CT). In other words, flowcharts, block diagrams, etc. reflected in the Figures illustrate architecture, functionality, and operation of possible implementations of systems/methods. Each block in a flowchart/block diagrams may represent a device, component, module, segment, CEI, or portion of CEI, for implementing the specified step(s)/function(s). In aspects, step(s) of methods or arrangement of function(s) described in respect of such blocks may occur in an order different from that set forth in the Figures. E.g., two blocks shown in succession may, in fact, be executed substantially concurrently, or the blocks may sometimes be executed in the reverse order, depending upon the functionality involved. Readers will note that each block of block diagrams or flowchart illustrations, and combinations of blocks in block diagrams/flowchart illustrations, can be implemented by special purpose hardware-based systems that perform the specified functions or acts or carry out combinations of special purpose hardware and computer instructions.

Different programming techniques can be employed e.g., procedural or object-oriented approaches in system(s)/method(s). Any particular routine can execute on a single processor, multiple processors, or even in multiple devices, as suitable. Data can be stored in a single storage medium or distributed through multiple storage mediums and may reside in a single database or multiple databases (or other data storage techniques). Thus, although the steps, operations, or computations may be presented in a specific order, this order may be changed in alternative aspects and any of the specifically disclosed routines/workflows provided here can comprise rearrangement, repeating, skipping, combining, or any combination thereof (CT) of one or more step(s)/function(s) to provide the indicated output. In embodiments, to the extent multiple steps are shown as sequential in the Figures, some combination of such steps in alternative embodiments may be performed at the same time. Where suitable, any sequence of operations described herein can be interrupted, suspended, or otherwise controlled by another process, e.g., an operating system, kernel, etc. The routines can operate in an operating system environment or as stand-alone routines. Functions, routines, methods, steps, and operations described herein can be performed in hardware, software, firmware, or any CT, e.g., as described herein.

For these and other reasons, the illustrative description of aspects in the Figures and described here with respect to the Figures should not be used to limit the scope of the invention as provided by other portions of this disclosure or the disclosure read as a whole in view of the art.

Displayed Figure elements are typically identified with the "#" symbol in the following. Where reference to an element is repeated in a Figure description, additional element reference(s) are sometimes omitted. The abbreviation "n.s." refers to features/steps that are not shown in the Figure.

FIG. 1

Figure 1:
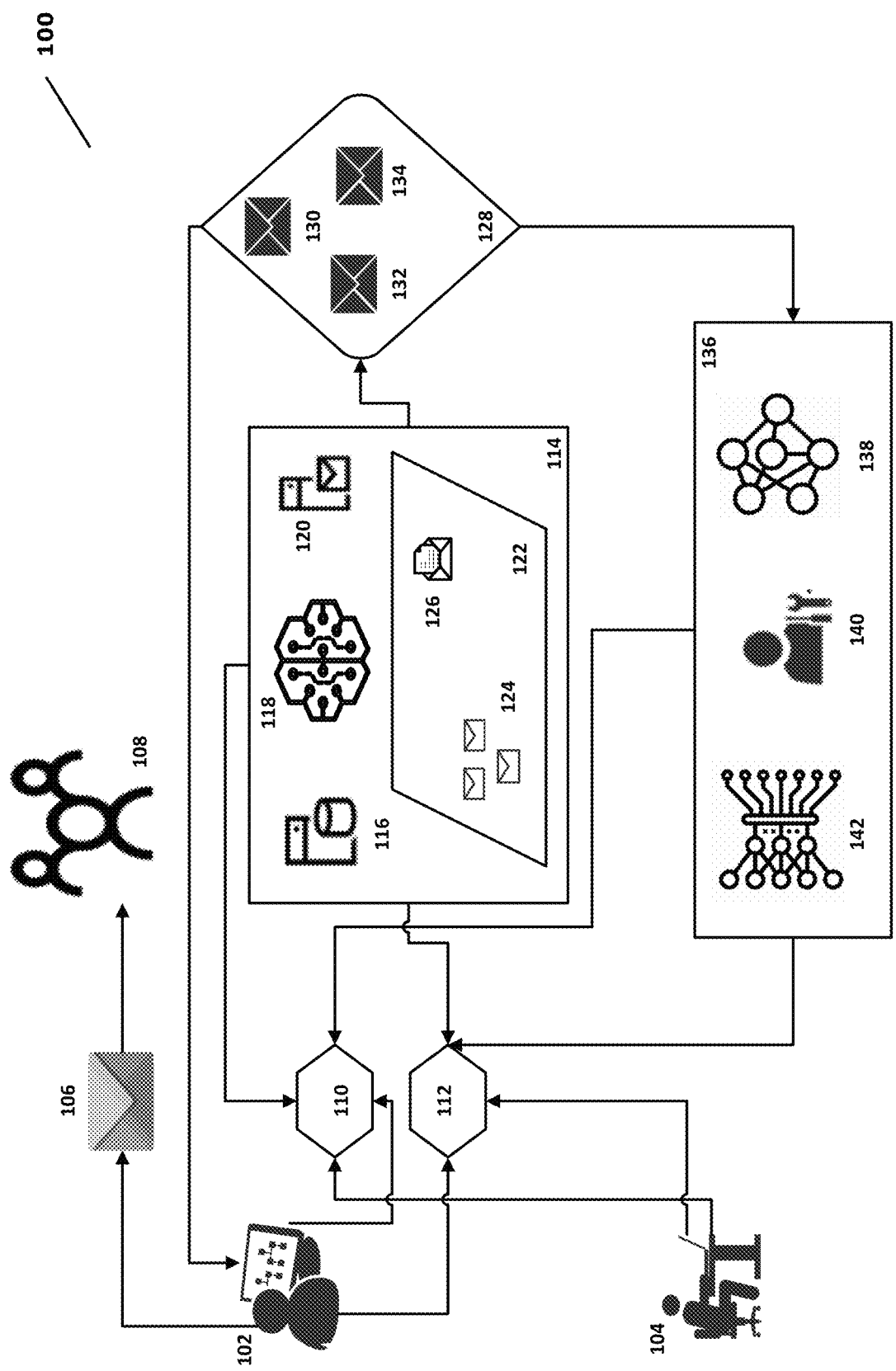
FIG. 1 illustrates an overview of an exemplary embodiment of a system provided by the invention or used in carrying out methods of the invention.

FIG. 1 is an illustration that depicts an overview of key components of an exemplary system of the invention, #114, and functional relationships between such components, system users, and audience members/message recipients that reflect elements of methods of the invention, #100.

This Figure, like other Figures provided herewith and described herein, does not seek to depict and this section does not seek to describe every possible element that can be included in such a system or even basic components that are required to operationalize such a system that would be known in the art (e.g., a source of power for the system).

User(s), #102, can access the system via any one or more suitable interface(s). As exemplified, an interface can include a computer, such as a laptop, desktop, or mobile device, e.g., where an interface is delivered as a web page/web application or similar application delivered via the internet, LAN, SDWAN, VPN, or another virtual network, etc. In aspects, user(s) are required to comply with authorization protocol(s) or tools and the system includes authorization engine(s) or other authorization methods/components (n.s.).

Associated user(s), #104, typically also can similarly access the system, optionally only with authorization as discussed briefly above, through such an interface or a different interface. Associated user(s) can include, for example, managers, content generation-leaders, and the like that provide content either to the training set, situational prompts, or instructional prompts. For example, an associated user might input an instructional prompt that applies to an individual user or a group of users, in one or more situations (such as in generating messages for one or more specific situations, types of audiences, etc.). Associated user(s) can also represent administrators that can change settings of operation of the system, such as by directly training neural network(s), via changing weights, providing the neural network with training experiences, or otherwise, or change other aspects of the system.

User, associated user, or both, submit instructional prompt data, #110, and, optionally, situational prompt data, #112, to the system, via interface(s). In aspects, most, generally all, essentially all, or all of the situational prompt data is either inputted before or concurrently with the instructional prompt data. Instructional prompt data, situational prompt data, or both, can be inputted by direct submission, by user selection of system-loaded options presented via the interface, or both, as will be exemplified in the description of other figures, or is also or alternatively inputted by automatic operation of one or more functions of the system, as also exemplified/described elsewhere.

Instructional prompt data is or primarily/generally or essentially includes information/data that the neural network, #118, is trained to recognize and prioritize in the generation of draft system-generated communications. Instructional prompt data/content can include anything that the system recognizes as priority context for the generation of messages. Examples can include, for example, audience member information or audience member-associated organization information. Additional examples of instructional prompt inputs are provided in connection with additional figures discussed infra.

Situational prompt data can include, in aspects, any type of other information that user or associated user wants to input as context for the system/method. Such data is considered "situational" in that the neural network(s) of the system #118 will incorporate semantic element content therefrom or corresponding thereto (e.g., equivalent semantic elements of semantic elements contained therein) generally only when the neural network(s) determine that such information is sufficiently related to other content considered by the neural network(s), such as the instructional prompts, the content of the initial training set, or both. Examples of situational prompts can include, e.g., the likes or interests of the user (or sender, if the sender is anticipated to be different from the user), the likes or interests of a receiver, or both, and also can include points of interest to any organizations associated with either or both thereof. Additional examples of situational prompts are described in connection with other figures, infra.

Both types of prompt inputs, optionally along with other data, such as setting options, exemplified below, are delivered to the system, #114, which includes a capable server comprising processing and memory components, #116, and one or more trained neural network(s), #118. The processing and memory components of the system can be actual on-site componentry/systems, virtual (e.g., cloud-based) processing or memory systems, such as are available through commercially available and known platforms such as Microsoft Azure, Amazon Web Services, Google Cloud Platform, and the like, or a combination thereof. Similarly, neural network(s) of the system can be locally based, accessible through platform(s), such as, e.g., OpenAI, Microsoft Azure, HuggingFace, etc., or a mixture thereof, provided that at least some of the neural network(s) have any required training specified here for carrying out the functions/steps of the system/method.

Neural network(s), #118, are trained with training data, #122, which can include, for example, parts or all of a number of email messages, #124, and optionally messages that contain or are associated with additional contextual information, #126. The latter type of message record, #126, includes the content of a message along with information about the message or related to the message, which is not found within the message itself, such as information about the sender, recipient, purpose, etc., that are not completely evidence from the content of the message alone.

Using steps/engines as will be described below, system, #114, generates a plurality of system-generated draft messages, #128, in one or more forms (e.g., as emails, as exemplified here), by, inter alia, employing neural network(s), #118 to provide a distribution of each of the semantic elements that neural network or other components of the system determine to include within a draft message which are, for each draft message, selected by other system components, such as a selection engine (n.s.) and thereafter incorporated into the applicable draft message. The nature of the distribution and word selection mechanisms are such that in most, generally all, or substantially all cases/iterations the messaged generated by the system will differ from each other by at least one or more semantic elements. E.g., draft messages, #130, #132, and #134, are expected to be semantically distinct at a semantic element level, but, given the prioritization of the instructional prompts by the system, will sometimes, often, mostly, contain one or more semantic elements that are similar to each other or equivalent semantic elements thereof. These messages, #130, #132, and #134, are presented to user, #102, via the interface, wherein the user can rank/evaluate, edit, or transmit the messages. System, #114, can include or be associated with an email server, #120, or can interface with any well-known email system, such as Gmail, Outlook365, and the like, to facilitate transmission of messages, #106, once the user determines such messages are ready for sending to audience members, #108.

The method/system can further include additional editing/redirecting mechanisms/resources, #136, for promoting (e.g., detectably or significantly enhancing) the accuracy/truthfulness of system-generated messages over future iterations/uses. For example, the system can include or be associated with a second neural network (or a second group of neural networks), #138, which ranks system-generated messages on a scale or other rating system as compared to the content of the original instructional prompts or by some other standard and makes adjustment to the instructional prompts or situational prompts, neural network weights/architecture/operation, or a combination thereof, in response to variances from any standard set by the user, associated user, or preprogrammed into the system. In aspects, one neural network ranks messages on a scale and a second neural network adjusts prompts (n.s.). In related aspects of the invention, the invention can also or alternatively comprise one or more neural networks that directly re-write draft messages prepared by the system (n.s.). Also, or alternatively, the editing/redirecting resources can include engines, systems, etc., #140, which facilitate associated user/user review of system-generated messages, such as in a supervised learning model/environment, wherein such human assessment of system-generated messages (or other output evaluation) is used to change the prompts (situational, instructional or both), modify the operation conditions of the neural network(s) (e.g., weights or operation of some of the neurons in some layer(s) thereof), or both. Finally, the editing/redirecting resources, #136, can also or alternatively include a third neural network or third type of neural network, #142, which automatically interprets the content of the system-generated messages, and uses the semantic content of such messages to generate draft message-derived system-generated instructional prompt inputs, and thereafter recommends changes to the instructional prompts to the user, automatically changes/amends the instructional prompt to incorporate such draft message-derived instructional prompts inputs, or a combination there. The instructional prompt content can be, in aspects, relatively constrained (e.g., comprising less than 500, less than 300, less than 200, or less than 100 semantic elements), but, surprisingly, even a small amount of instructional prompt content, when prioritized through adequate training of the first-described neural network(s), #118, can result in a message system/method that is significantly more accurate/trustworthy in the generation of draft messages, particularly over a number of iterations.

FIG. 2

Figure 2:
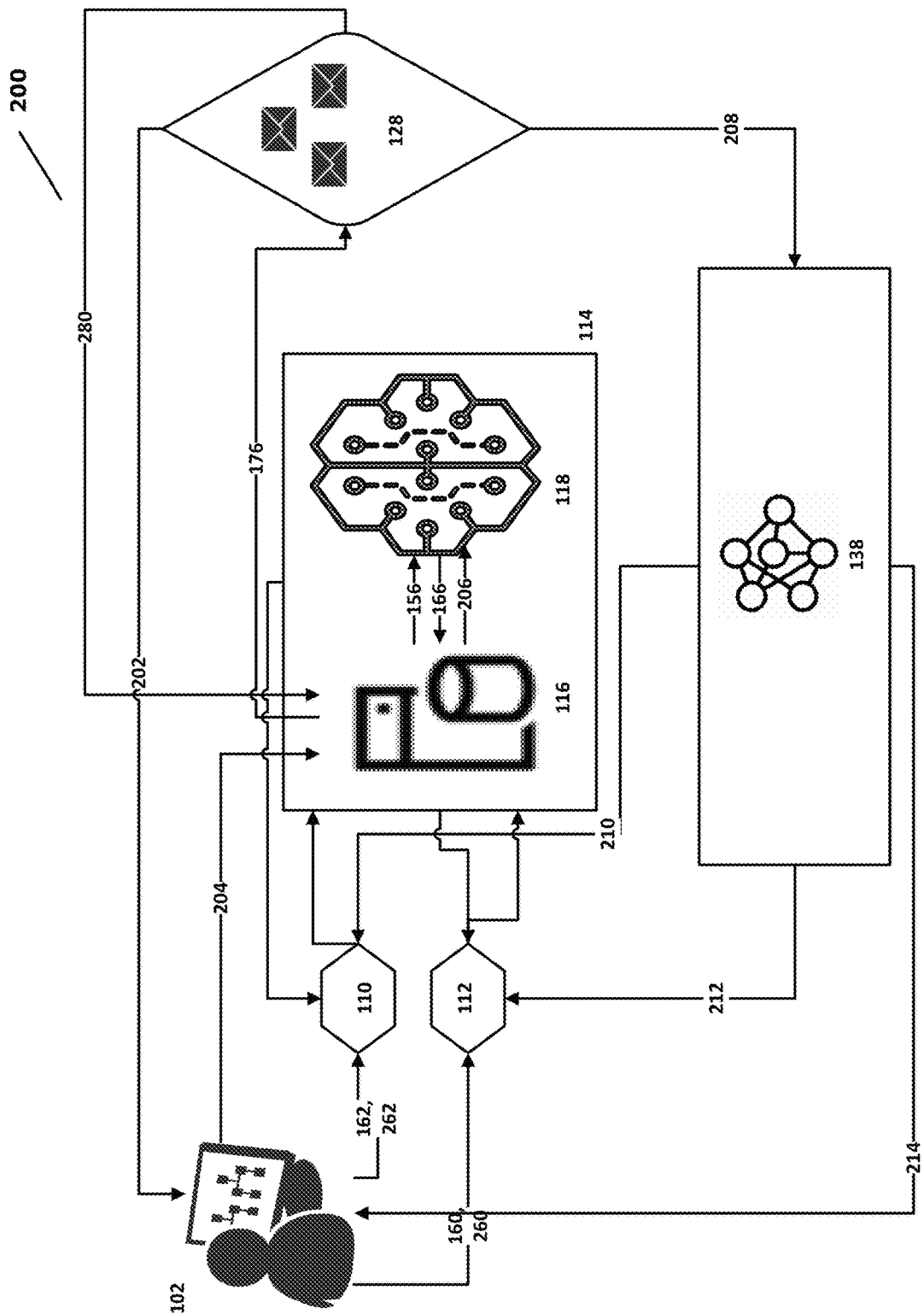
FIG. 2 illustrates an overview of a more specific exemplary embodiment of an exemplary system of FIG. 1.

FIG. 2 illustrates an overview of steps of a more particular method, #200, within the scope of methods/systems described in FIG. 1. As described in FIG. 1, user, #102, inputs instructional prompt data, #110, as well as optionally inputting situational prompt data, #112, via an interface, and such data are relayed, #162 and #160, to the system, #114, by any suitable data delivery method(s) known in the art, e.g., to processor/memory server(s), #116.

The server(s)/computer(s) (combination(s) of processor(s)/memory unit(s)) of the system, #116, can include engine(s), sub-system(s), or other component(s) that are preprogrammed or otherwise configured/adapted to recognize submissions including prompt data and to transmit prompt data (instructional prompts and, if present, situational prompts), #156, to a first neural network (or neural network(s) in a first group of NNs), #118, which is another component of the system (other elements of the system, #114, not described herein are not shown). This first type of NN ("FNN") of FNN group, #118 is sometimes alternatively referred to herein as an "element prediction distribution neural network" or "EPDNN." An EPDNN, #118, typically is (1) pre-trained to comprehend one or more natural languages, generally (e.g., having a general "few shot" LAMBADA score of ≥~65%, ≥~70%, or ≥~75% or exhibiting performance capabilities that are at least about the same as GPT-2, BERT, or GPT-3, with respect to one or more measures of natural language recognition/comprehension measurability, such as are known in the art) providing the EPDNN with the ability to provide alternative semantic element options based on provided context (which can include the content of a particular draft message), (2) is pre-trained or under programming which, in either case, causes or at least promotes the NN to recognize and prioritize instructional prompt content as priority content (a priority "context") in message drafting content selection, and (3) is either pre-trained with an initial training set, concurrently trained with an initial training set, or both, the initial training set typically comprising records that contain some, most, or all parts of messages that act as context for the EPDNN/first NN and can, i.a., provide context for the form of messages for the system to generate (e.g., in training the EPDNN to generate messages having a form similar to, e.g., full email messages).

In operation, such a first NN, #118, upon receiving context input from the system, #156, predicts/generates a distribution of semantic elements (n.s.) for each location/part of each draft message, using the instructional prompts, situational prompts, and training set data act as "context," and thereafter delivers, #166, such prediction data back to (or makes such prediction data accessible to) the processor/server #116, which executes engine(s) such as a selection engine that selects which semantic element options to include in each system-generated draft message based on word variation settings (n.s.). As described below, the EPDNN, #118, other system components, or both, can determine when each system-generated message to be drafted is complete (e.g., a EPDNN can send a "stop" signal/word, such as are known in the art, which can either be treated as a command or recommendation to the system. Also or alternatively, the system can comprise engine(s), algorithm(s)/rule(s), etc., which provide certain cutoff(s) for draft messages, such as repetition of message content or length of the message. In such a manner, system, #114, generates, #176, a plurality of draft messages, #128.

Draft messages, #128, are delivered, #202, back to the user, #102, via an interface. The user in turn can provide feedback regarding a message (e.g., a like/dislike selection, a rating, etc.), can edit the message, or can elect to transmit message(s) to audience member(s), store message(s) for later use, or otherwise use message(s) in a system-drafted form or after user editing. In any such case, data concerning such method outcomes (method outcome data) can be relayed back to the system, #204, and the processor/engine(s), of the system, #116, can use such information to, i.a., relay instructions or make modifications, #206, to the first neural network, e.g., causing a modification in at least some weight(s) of the FNNs neurons or otherwise modifying the operating conditions/instructions of the first NN.

The content of draft messages, #128, also can be delivered, #280, back to the processor/memory components, #116, of the system, #114, which can include such system-generated messages optionally as additional training set material for further iterations of the method.

The content of system-generated draft messages, #128, also can be provided, #208, to a second neural network ("SNN") or second group of neural network(s), #138, which is trained to interpret ("comprehend"/"understand") the content of messages and to prepare instructional prompts, situational prompts, or both based on such message interpretation(s). Although SNN, #138, is illustrated as separate from the system, #114, this may or may not be the case, as it is possible that SNN can form an integrated part of a system. In either case, such content analysis NN(s) ("CANN(s)"), #138, can either recommend changes/amendments to the instructional prompts, situational prompts, or both to the user, #214; automatically make changes to the instructional prompts, situational prompts (if present), or both, #210 and #212; or perform both types of functions. In aspects, the user can make changes to the instructional prompts, situational prompts, or both, #260 and #262, based upon such recommendations, or other factor(s), for use in further iterations of the method.

In aspects, the CANN/SNN, #138, automatically makes at least some changes to the instructional prompts, situational prompts, or both, #210 and #212, based on the content of the system-generated messages, #128. SNN message-interpretation-based editing of instructional prompts, or situational and instructional prompts has been surprisingly found to result in significantly improved message generation in system/methods of the invention as compared to methods/systems proposed in the prior art.

FIG. 3A

Figure 3A:
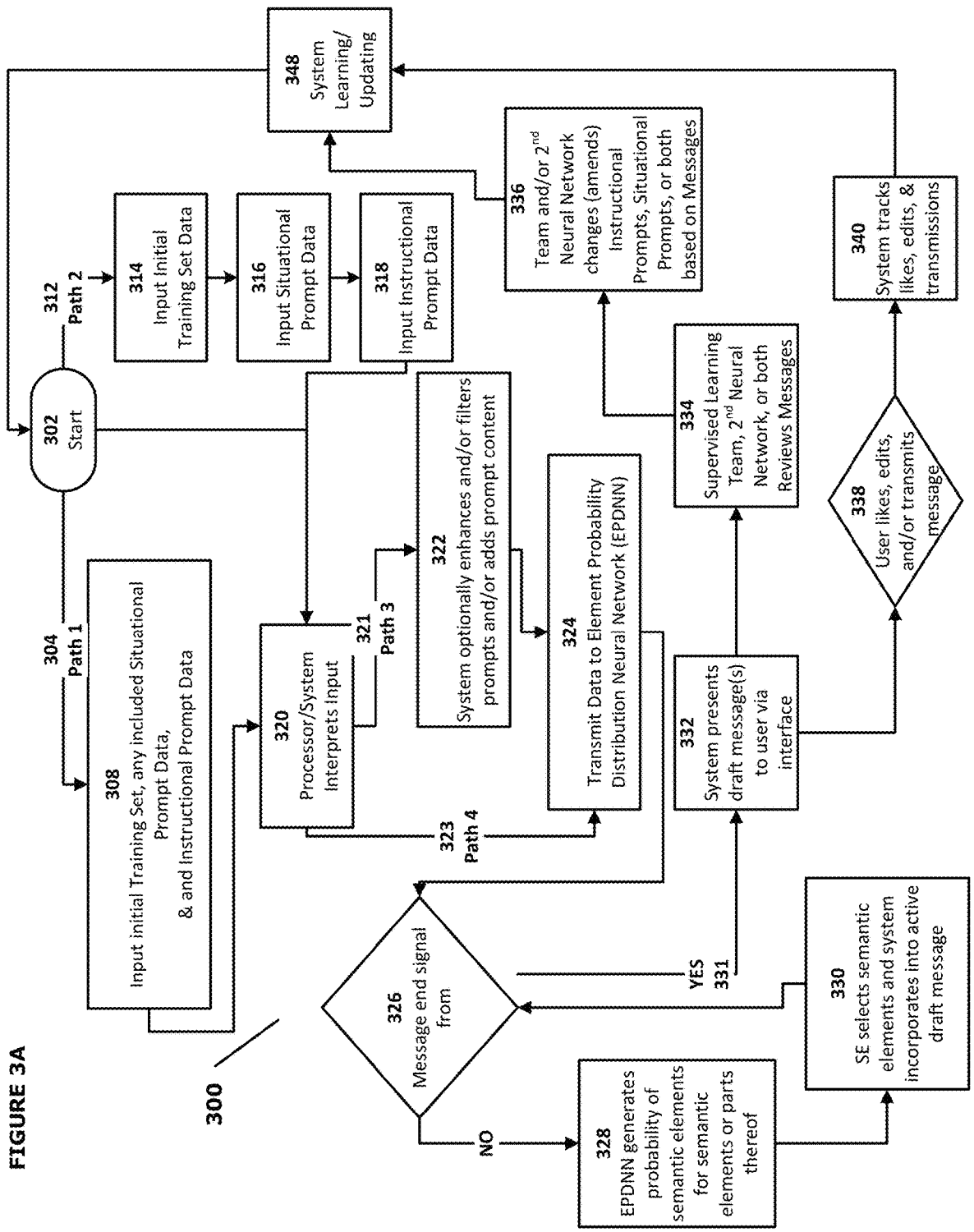
FIG. 3A is a flow chart providing an overview of steps of an exemplary method of generating messages using a system of the invention.

FIG. 3A sets forth a flow chart of steps of an exemplary method of the invention, #300, employing a system such as described in FIGS. 1 and 2 or elsewhere herein. The illustrated method reflects key steps in generation of system-generated draft messages as well as various ways that systems of the invention can learn and improve on system performance with repeated use/iterations.

Upon initiation of operation by a user, #302, input comprising prompt input and training set input can be provided to a system in any suitable manner.

E.g., according to exemplary data input pathway/method 1, #304, the input of initial training set data occurs at the same time as the input of situational prompt data, if present, and input of situational prompt data and instructional prompt data, #308.

In aspects, initial training set data also or alternatively is subjected to system learning (n.s.) (see, e.g., FIG. 3B), resulting prompt data enhancement (n.s.) (and also or alternatively optionally training set enhancement), with the enhanced prompt data submitted to the EPDNN (n.s.). Such aspects are discussed with respect to other Figures below.

Alternatively, according to exemplary data input pathway 2, #312, the input of at least some, most, generally all, or even all initial training set data #314 occurs as a first step of the method (as "pre-initiation" training data), followed by the input of situational prompt data, #316, if included, and the input of instructional prompt data, #318. In other words, in pathway 2, TSD, situational prompt data, and instructional prompt data are mostly, generally, or entirely submitted in a sequential manner, rather than mostly, generally, or only submitted together/concurrently, as reflected in alternative pathway 1. In cases, methods can be performed by use of both pathways, concurrently, alternatingly, or sequentially for some data (n.s.). Pathway 2 can, in aspects, accommodate submission of more data of a particular type, e.g., a large amount of TSD may be used to training the system (e.g., in several cycles of training with large data sets) prior to input/upload of prompt data. Pathway 1, by contrast, may be faster, and possibly more efficient where there is a limited amount of TSD, as in the case of onboarding a new user or different type of use/recipient model.

Regardless of whether the method upon start #302, follows path 1, #304, or path 2, #312, the processor/system interprets the input received, #320.

In some embodiments, labeled path 3, #321, the system further enhances or filters prompts and/or otherwise adds other/additional prompt content #322, or transforms existing prompts (e.g., rewording one or more semantic elements in prompt data). Prompt modification, if performed in methods, can comprise, e.g., loading instructional or situational prompt data from an additional user or that has been preprogrammed into the system for application either automatically, conditionally/situationally, or both, whereas enhancement typically means the system automatically adding content based on user input, e.g., automatically adding "fun fact" content about a location, an audience member's name/interest, or the like, based on the selection of such content as situational prompt input or instructional prompt input.

In certain embodiments of the method, e.g., path 4, #323, the system does not (a) provide enhancement, does not (b)

filter prompts, does not (c) add prompt content, or, e.g., does not complete a combination thereof.

In any case, the system transmits the various input data to an element probability distribution neural network (EPDNN), #324, (AKA, a first neural network/FNN). Until a draft message is complete, #326, the EPDNN utilizes provided prompt and training set data to generate a distribution of semantic elements, #328, for each semantic element the system elects to add to an active draft message and a selection engine ("SE") selects one of the semantic elements from the distribution, #330, for incorporation into a draft message until an end signal is received from the processor applying system message rules or the EPDNN sends an end signal to system, #326.

Upon occurrence of an end signal, #331, the system can deliver/present draft message to the user via an interface, #332. In aspects, steps comprising, e.g., #326, #328, and #330 are repeated with the initiation of new messages, until a desired number of messages are generated (e.g., 2, 3, 4, or 5 draft messages) (n.s.). In aspects, the system can include a NN, engine, etc. which evaluates situational prompts and determines what message to input which situational prompt concepts, elements, etc., into (n.s.).

From this point, two activities can occur, which can, in aspects, operate in a parallel/concurrent manner First, a supervised learning team can review system-generated draft messages, at least a second neural network (comprising, e.g., a CINN), or both, #334. The supervised learning team, second neural network, or both makes changes to (amends) instructional prompts, situational prompts, or both, based on, i.a., draft messages generated by the system, #336. The outcome of this process can result in system updating/learning, such as modification of weights of one or more neural networks of the system, #348. Second, following the presentation of system-generated draft messages via the interface, #332, users can take one or more system actions with respect to such draft messages, such as "liking" a draft message, editing a draft message, transmitting a draft message (either directly or after editing), or a combination thereof, #338. The system can track "likes" or other feedback, message edits, message transmissions, or a combination thereof, #340. In embodiments, the system optionally also or alternatively changes weights of neural network(s) or other system/NN operating condition(s) based on such user activity/method outcome activity, #338.

Figure 3B:
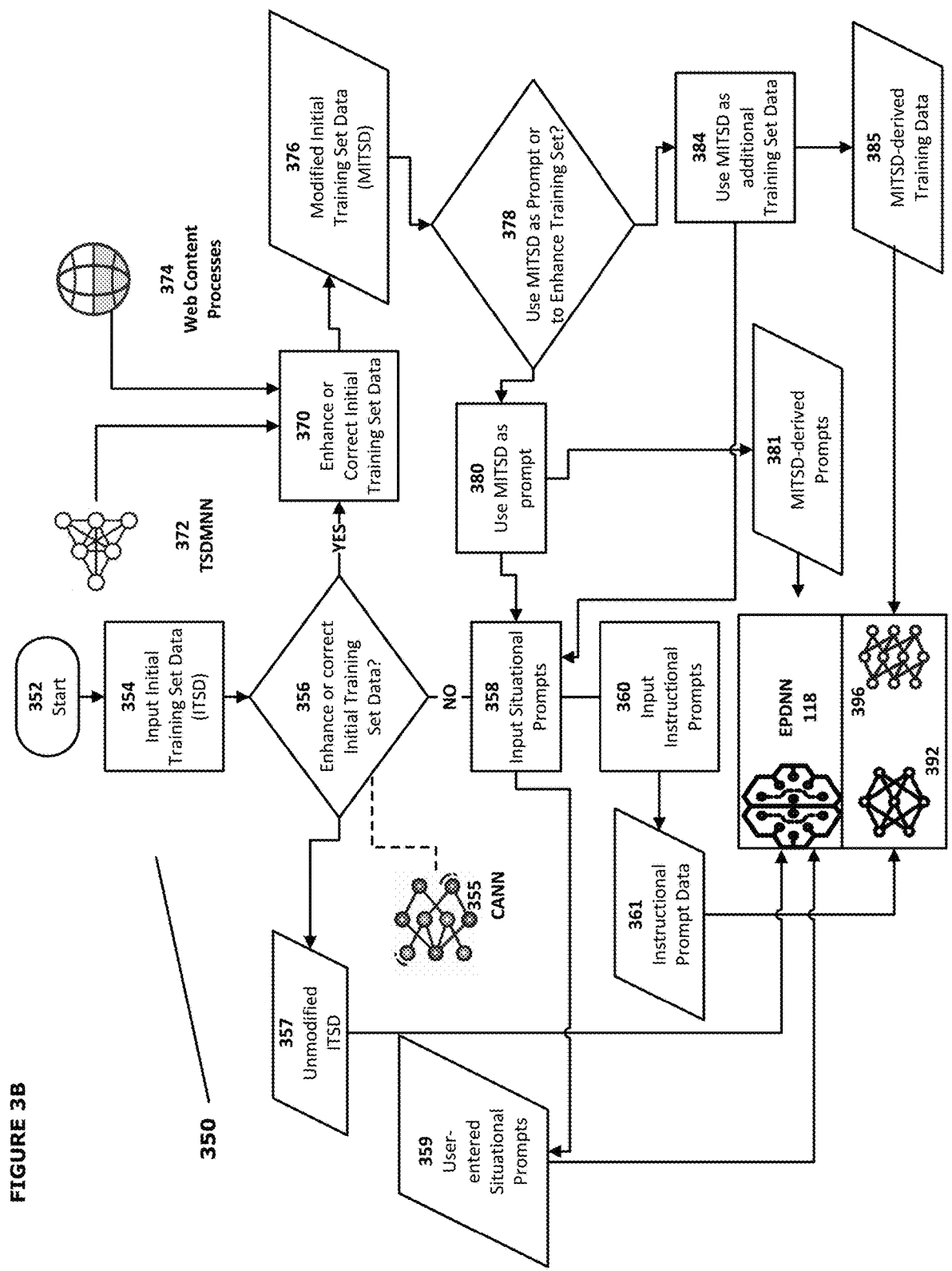
FIG. 3B is a flow chart illustrating an exemplary method used to evaluate and possibly enhance or modify initial input as an element of data provided to a neural network of a system of the invention.

Further, when the system user transmits a message, #338, the system, in some embodiments, tracks replies, other responses, or both replies and other responses, to the transmitted message, and updates neural network(s) or other system components/parameters if/as appropriate, as a part of system learning, #348. After system learning step(s) are complete, #348, the system is ready for subsequent use/iterations, which will, over time, exhibit detectably or significantly improved performance in terms of accuracy/truthfulness of messages generated, effectiveness of messages generated (e.g., in terms of lower rates of editing, higher rates of transmission without editing, higher rates of likes/favorable feedback, or a combination of any or all thereof). FIG. 3B FIG. 3B sets forth a flow chart of steps of an exemplary process, #350, that can be used, according to certain aspects, to provide input to an element prediction distribution neural network (EPDNN, #118). A user initiates the process, #352, and inputs initial training set data (ITSD), #354, via the user interface (n.s.). The system evaluates, #356, whether the ITSD should be enhanced, modified, or both, e.g., by application of one or more system engine(s) employing rules/algorithms for such evaluation, enhancement, or both, or one or more neural networks that are focused on/trained in evaluation and correction/enhancement of ITSD (n.s.). In other cases, a CANN, #355, is employed to interpret the content of ITSD and to generate prompts therefrom or edits prompts based thereon. If the system determines not to enhance/modify/correct the ITSD, the original/unmodified ITSD, #357, is delivered to the EPDNN, #118. If the system determines to enhance/correct (change/amend) ITSD, #370, the system can employ system components, e.g., web content processes/engine(s), #374, which can, e.g., collect internet information from searches and evaluate/add such content to the ITSD to generate modified ITSD (MITSD), #376, or use a training set data modifying neural network (TSDMNN), #372, which is trained to evaluate and make corrections or other amendments to ITSD, again resulting in MITSD, #376. The system can then further evaluate, #378, (by engine(s), NN(s), or otherwise) whether to use the MITSD as prompt data for the EPDNN, #380 (instructional or situational), and delivering such prompt data, #381, to the EPDNN, #118, or (i.e., and/or) to add the MITSD to the training set data/initial training set data for the EPDNN, #384, delivering such MITSD training set data, #385, to the EPDNN, #118. E.g., if a user selects a trigger (a term herein typically indicating a type/category/class of situational prompt or instructional prompt (or topic thereof), other than a value proposition), such as a name meaning trigger, the selected trigger message, a related edited message, or a related liked message, etc., could be used as situational prompts in association with that trigger, enhancing performance of the system in connection with the trigger/area of interest (n.s.). In aspects, steps described herein can be performed by two separate EPDNN(s) (n.s.), such different data delivered to two different EPDNNs, or both. For example, a system can comprise one EPDNN that operates based on input of generally only, essentially only, or only prompt data and another EPDNN that operated based on input of both message data and prompts (such as style copier NN, as discussed elsewhere herein). As described, e.g., in connection with FIG. 3A, a user can also input situational prompt input, #358, and instructional prompt input, #360, which respective data, #359 and #361, also are provided to the EPDNN, #118. Methods according to and similar to the illustrated aspect can be used to rapidly provide a variety of high-quality inputs to an EPDNN, #118, increasing the speed of operational competency of systems of the invention and improving user satisfaction with such systems through messages with greater degrees of variability, effectiveness, etc.

In aspects, positive interaction message (PIM) data also can be relayed/provided to other neural network(s) of a system, some or all of which can be categorized as EPDNN(s), but which do not generate messages. E.g., such data can be delivered to a situational prompt neural network, #396, which is specifically trained to specialize in using PIM data to suggest edits or to make edits in situational prompts and instructional prompt neural network, #392, can be trained to focus on suggesting or making edits to instructional prompts.

Figure 4:
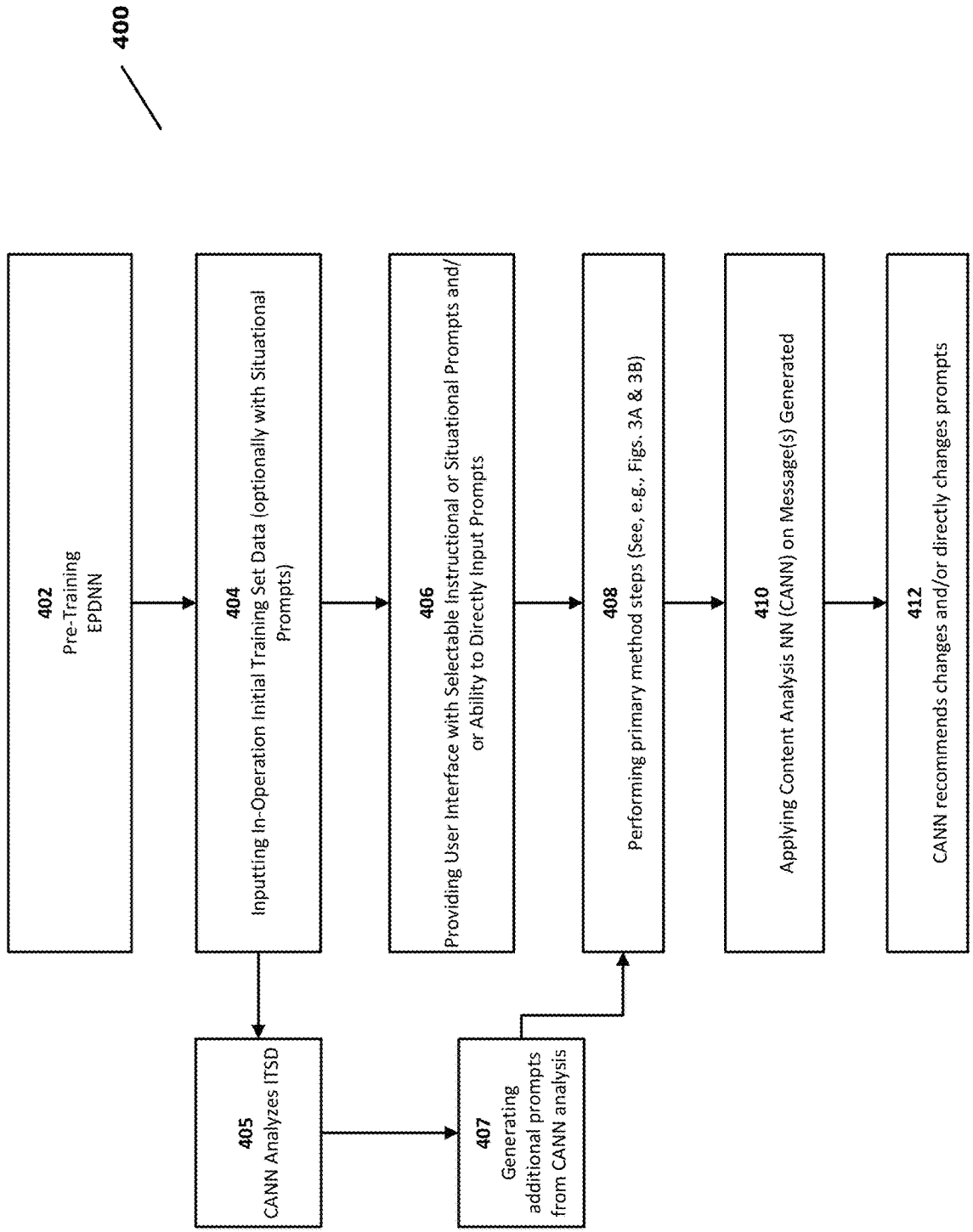
FIG. 4 is a flow chart providing steps of an exemplary method of using an exemplary system provided by the invention, where the method includes pre-training a neural network with part of a training set (e.g., part of an initial training set).

Such an embodiment reflects, e.g., how systems can comprise multiple NNs that perform different system functions in accordance with aspects of the invention.
FIG. 4

FIG. 4 is a flow chart providing an overview of steps of a method of the invention, #400, with particular focus on the initial use of a system of the invention in automated/semi-automated draft message generation and use of initial system-draft messages in preparing the system for further iterative applications. The portion of the exemplary method illustrated in FIG. 4 starts with the provision of pre-training of an element prediction distribution neural network (EPDNN), #402. In this context, pre-training refers to pre-training with specific content training set material, such as material having a form and content that is similar to the desired form and content of system-generated draft messages, rather than general natural language programming training on noncurated internet material, and the like, which is usually done prior to step #402.

E.g., step #402 can represent specifically training a customized iteration of an adequately NLP trained neural network, such as GPT-2, GPT-3, or BERT, with a training set containing messages (or parts of messages) of a particular form that is useful to the generation of desired system-generated draft messages. For example, where a method of the invention is employed to draft emails, such as communication-initiating emails, e.g., sales "cold call" emails, the pre-training of the EPDNN, #402, is performed using examples of such emails or parts thereof, such that the EPDNN is trained to mimic the form and content of such messages. The content provided in such pre-training can be considered "initial training set data" and typically will make up the greatest part of any initial training set data provided to the EPDNN. Initial training of an NN, ongoing training of an NN, or both, such as training of an EPDNN, can be performed using prompt/message pairs, as described elsewhere. E.g., modified prompts generated in methods can be paired with related messages to train an EPDNN. In other cases, such modified prompt data, generated by human supervision or system element performance, can be used to train other NN(s), optionally also with other training data/inputs (not shown).

The pre-trained EPDNN is then provided with input of an in-operation initial training set, #404, by user(s), associated user(s), the system (by automatic operation thereof), or a combination thereof. For example, user(s) or associated user(s) can upload emails previously drafted by the user, drafted by a thought leader/expert author, to form part of the initial training set in combination with the portion of the initial training set that the EPDNN has been pre-trained with. In certain embodiments, the input of in-operation initial training set data is accompanied by inclusion of situational prompt data, #404. Messages used in pre-training or in in-operation initial training also can optionally include additional message context information, as described elsewhere.

Initial training set input steps are followed by providing user(s), each via a user interface, with selectable instructional or situational prompts and/or the ability to directly input such prompts to the system, #406. E.g., selectable prompts can be presented by the system as selectable menu or module items, as will be exemplified in other Figures discussed below.

Element #408 of the flow chart references performing steps of the method described in FIGS. 3A and 3B, not represented in this Figure, so as to produce a plurality of system-generated draft messages.

Upon preparing the desired number of system-generated draft messages, #408, a content analysis neural network (CANN) is then applied to messages generated by the method, #410 (for sake of clarity, this step also falls within the scope of steps shown in FIGS. 3A and 3B). The CANN either recommends changes to prompts to user(s) via the interface, directly changes one or more prompts of the EPDNN, or performs both steps, #412, so as to maintain the content of the prompts, and promote the accuracy/truthfulness or effectiveness of the system with continued use/iterations.

Optionally, a CANN also can perform analysis on ITSD, #405, and, from such analysis, prompts can be generated or edited based on such data, #407, which are then used in the performance of other steps of the method, #408.

In other variations of such methods, prompt data is not inputted by a user or associated user (i.e., step #404 is skipped at least in the initial operation of the system), but, rather, system components, e.g., components comprising CANN(s), #405, analyze user-provided ITSD to determine the contents of such ITSD (semantic elements therein, statements therein, contextual data therein, etc.), and thereby generate prompts from such ITSD, #407, and such data is fed to the EPDNN(s) and other system components to perform the initial method mostly, generally only, or only using such system-generated prompts.

FIG. 5

Figure 5:
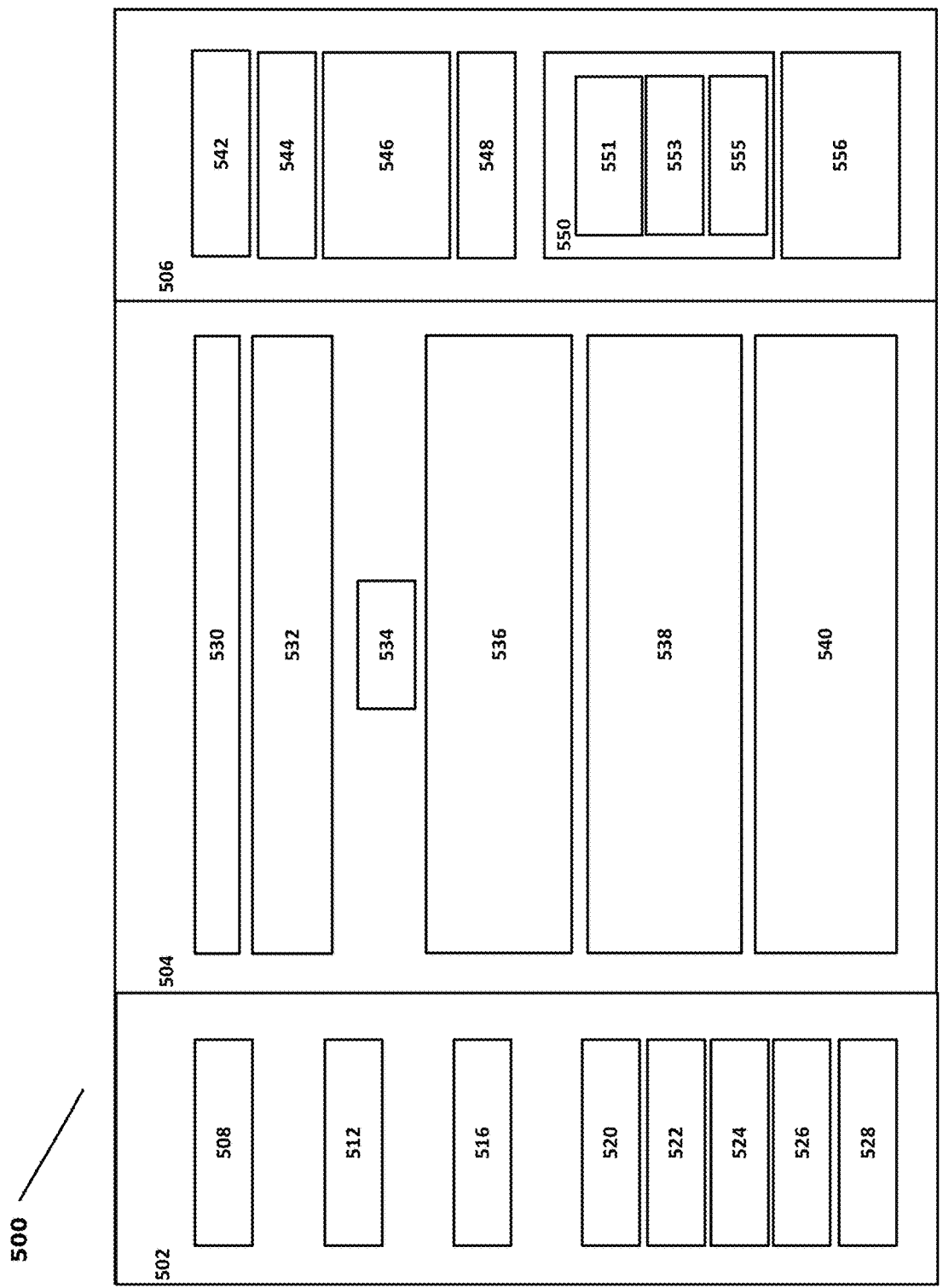
FIG. 5 illustrates an exemplary user interface of an exemplary system provided by the invention.

FIG. 5 illustrates the layout of an exemplary user interface, #500, for use in an exemplary system of the invention. Such a user interface can be presented on, e.g., a system interface such as a digital screen, for example a computer, laptop, pad, or phone screen.

The user interface, #500, as exemplified includes three sections: a settings/short input section #502, a set of selectable prompt content modules, #506, and an output display/direct input section, #504.

The settings/quick input section of the user interface, #502 can include a plurality of selectable/controllable settings in addition to inputs that can serve as situational prompts, instructional prompts, or both. For example, setting #508 can represent an output mode/application setting to be presented/employed (e.g., one such application/mode can be an email generation mode, but others could be generating different types of output, such as an audio file, or a dashboard for hidden system settings, reports, etc.). Quick input #512 can provide an input for a target audience, such as a company that employs target audience members/recipients, whose input can be used as instructional prompt data or a trigger for pre-training instructional prompt data, training set data or both. For example, the system may load information about the company as instructional prompt data automatically upon selection of a company, may obtain company information from, e.g., an automatic internet search of public (select or non-selected sites), proprietary sites (e.g., Hoovers, LinkedIn, Craft.co, Crunchbase, Hubspot, Uplead, LeadIQ, Lexis, WestLaw, and the like). Setting #516 can, e.g., be a selectable "tone" communication setting, which changes system settings, such as likely word choices employed by the selection engine, neural network weights, training set selection, or a combination thereof, to change the tone of the communication to mimic the selection, which will be further exemplified below. Short inputs #520, #522, #524, #526, and #528 allow the user to input recipient email address, name, title, associated-company/organization, and location information, which the system can use as instructional prompts to ensure that messages are personalized for the audience member and/or system-mandated instructions, e.g., with respect to the email address, to ensure that regardless of variability in the operation of neural network(s) of the system emails are nonetheless sent to the right recipient by employing inflexible system rules for such required inputs.

The module section of the interface, #506, includes a number of content modules, directed inputs, and editable selections, and additional settings. E.g., setting, #542, can allow a user to import content from a potential content source, such as LinkedIn, Twitter, Facebook, and the like, which can automatically obtain information associated with a target recipient/audience member, and use such information (e.g., profile information, recent social media activity, and the like) as situational prompt content. Input #544, represents, e.g., a "fun fact" keyword input (e.g., inputting the keyword golf, pizza, guitar, and the like, will cause the system to import content relating to such keywords as situational prompts). Relatively large input window, #546, represents, e.g., a "freeform" section where users can type short facts, messages, etc., that are usable as instructional prompts, situational prompts, or both (e.g., instructional prompts). In aspects, the system determines if the information is an instructional or situational prompt based on rules, similarity to other instructional prompt/situation prompt information in system training, or other factors (e.g., similarity to key instructional prompt information such as the recipient's associated organization). For example, the freeform message "Aiden loves drums" can be used as an instructional prompt and incorporated into messages. In aspects, systems will include both freeform inputs for instructional prompts and situational prompts (n.s.). Thus, alternatively, if a freeform situational prompt input is provided, such a message ("Aiden loves drums") could appear in a message that touch on concepts that NN(s) determine are sufficiently related to drums, such as "staying on beat," referencing a great drummer in the user's location at a relevant time, referencing characteristics of a famous drummer in a message about a topic, such as perseverance or creativity, and the like. Module #548 can be, e.g., a selectable module related to one or more categories of selectable job position-types ("Top Hiring Categories"), which information can be, in aspects, automatically generated by the system using conventional web information-acquisition methods (see, e.g., the further description of such an exemplary module in the description of FIG. 9). Module #550 provides a number of selectable content submodules, #551, #553, and #555 relating to a single topic. For example, if a selected module is concerning a recipient's name(s), selectable prompt #551 can relate to the meaning of the recipient's first name, selectable prompt #553 can relate to the origin of the recipient's second name, and selectable prompt #555 can relate to similar or other facts concerning the recipient's last name. Selectable module #556 can provide the user with the ability to select additional prompt data concerning a recipient-associated organization. Such selectable prompt content can add additional instructional prompt or situational prompt content for the system to use in generating draft messages. Notably, the content and layout of various selectable modules can be different within, e.g., the module section of the interface, #506, as is clear by the interface example(s) shown in, e.g., FIGS. 13, 14A, and 15.

Input/output section, #504, of the exemplified illustrated user interface, #500, includes a first set of components (top 3 components as shown) relating to inputs, and a section set of components (bottom 3 components as shown) relating to outputs. The top input section includes a value proposition drop down menu, #530, wherein a user can select a value proposition/key message/intent (purpose) instructional prompt, examples of which (e.g., "increase opportunities") are described further below. Such a value proposition selection can serve as a key instructional prompt, causing the delivery of one or more pre-written instructional prompts or one or more pre-written instructional prompt options concerning the value proposition or other intent/purpose of the messages to be generated by the system/method. Information display module, #532, provides information summarizing the value proposition selection that is the focus/selection of drop-down menu, #530. Setting button, #534, allows the user to opt to include a case study supporting the value proposition selection, #530, or not. The lower output section includes three windows, #536, #538, and #540, where system-generated draft emails are displayed to the user and optionally where the user can direct edit one, some, or all of such messages. Additional settings buttons that can be present, as later exemplified, can include settings for transmitting messages (n.s.), evaluating messages (n.s.), or both. Such user interfaces, providing a number, but a limited number, of structured input options and system/method settings, provide for an efficient way for users to control the content of system-generated messages and to efficiently provide instructional prompt and situational prompt direction to the system for tailoring/personalization messages to recipients, thereby increasing the chances of reading, impact, and desired response.

FIG. 6

Figure 6:
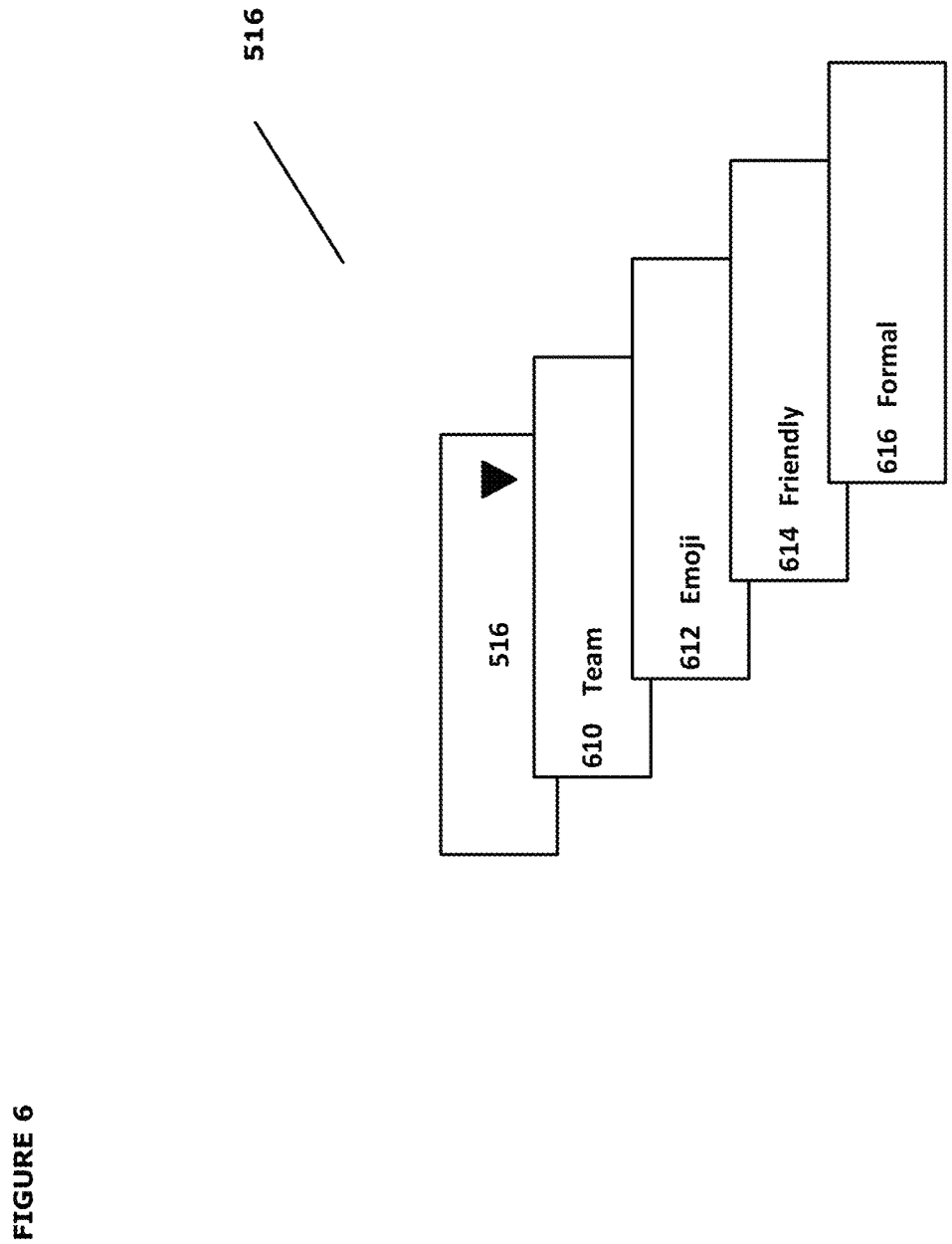
FIG. 6 illustrates an exemplary setting present in an exemplary user interface of a system provided by the invention.

FIG. 6 illustrates different tone settings referred to as element #516 of FIG. 5. The exemplary drop-down menu list includes a "team" tone setting, #610, which sets the system to generate messages between colleagues/co-employees, an "emoji" setting, #612, which favors the use of emojis as semantic elements (using any suitable setting, such as selection of initial training set data for the neural network(s) or selection engine to draw from, as noted in FIG. 5), a "friendly" tone setting, #614, using a more informal communication style, and a #616 "formal" tone setting, mimicking classic business-style communications. Readers will understand that this represents an exemplary list, which could alternatively reflect communication styles of different cultures (e.g., Latin American style vs. Asian style vs. American style vs. European style) or additional types of "tones" (e.g., inquisitive style, directive style, driving (results-oriented/commanding) style, supportive style (for audience members struggling with challenges), humorous style, and the like.

FIG. 7

FIG. 7 illustrates a selectable module providing multiple selectable prompt options, #550, in the illustrated case including different prompts each of two categories ("Name", #711, and "Company Facts", #715). In the exemplified Name module, meanings for a recipient's first name ("Len"), #712, and last name ("Smith"), #714 are presented and separately selectable by check box fields. In the Company Facts portion of the module/module, #715, different selectable prompts concerning a recipient-associated organization are presented, #716 and #718. Such content can be, for example, obtained by the system performing automatic searches of select internet site(s) or using top results of search engine searches in response to a selection of a module type by a user. Providing selectable prompt content typically, in a population of typical users, can speed up the message generation process, aid in uniformity in message generation across an organization (allowing for better measurements and system optimization), reduce errors, and provide other significant benefits.

FIG. 8

Figure 8:
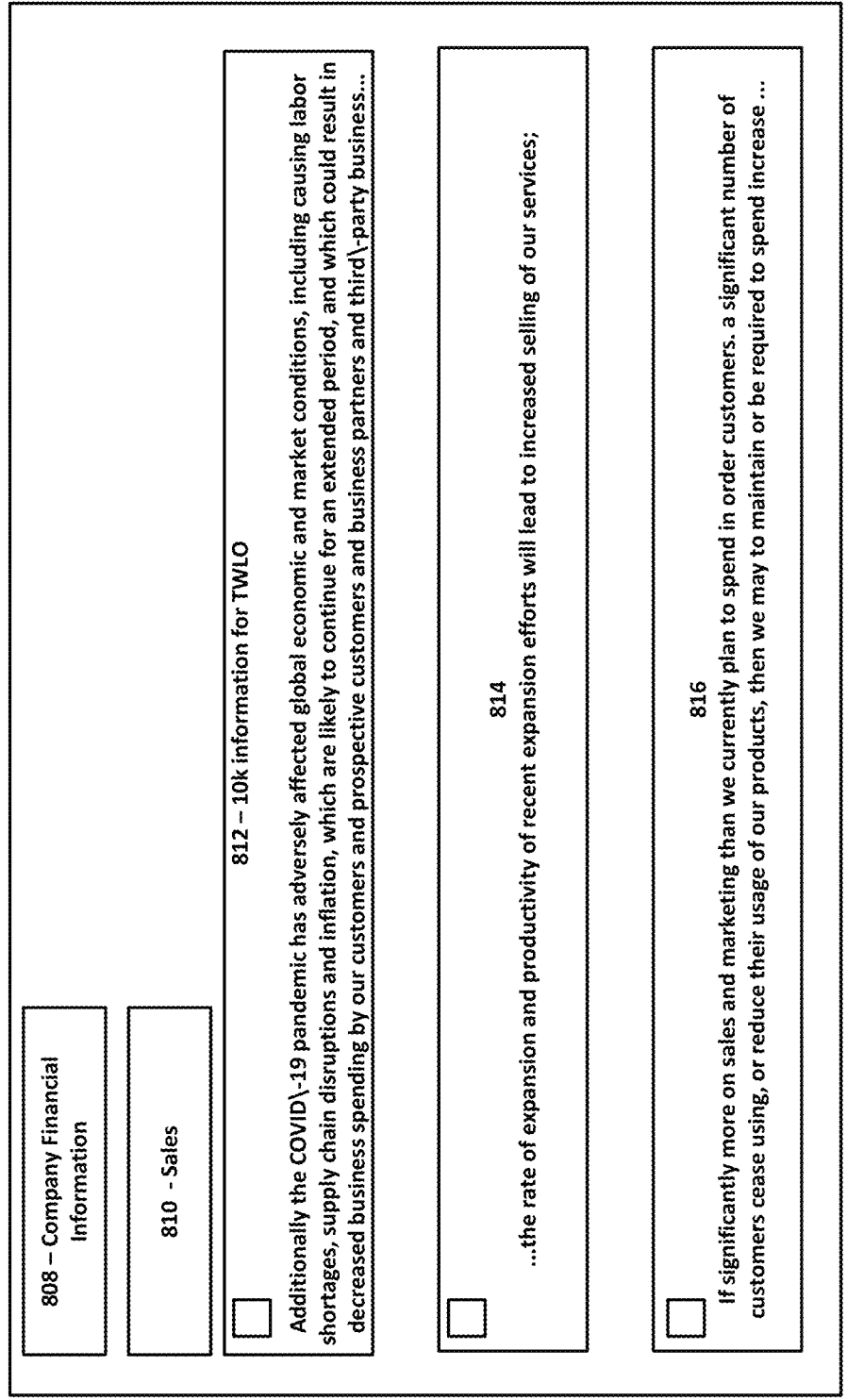
FIG. 8 illustrates an exemplary interface module identified in an exemplary user interface of a system provided by the invention.

FIG. 8 illustrates layout and content of another exemplary module includable in a user interface, such as the interface presented in FIG. 5. Specifically, in FIG. 8, module section, #556, includes an indicator of topic ("Company Financial Information," #808), which may reflect a selection made by the user in another part of the interface. A second indicator, #810 ("Sales") may reflect the use of a content filter. Here, the result is the presentation of three statements from the company's public company submission history (a US SEC 10 k, such as may be obtained from the US SEC's Edgar database online) (#812, #814, and #816, respectively), that relate to sales and related terms (e.g., "selling"), recognized by the system (either through the use of a natural language neural network or through application of a system thesaurus function or other known functions/methods such as term lemmatization, stemming, and the like). Such selectable content options, when selected by the user, can be used as context for the generation of system-generated emails, in accordance with various aspects of the invention.

FIG. 9

Figure 9:
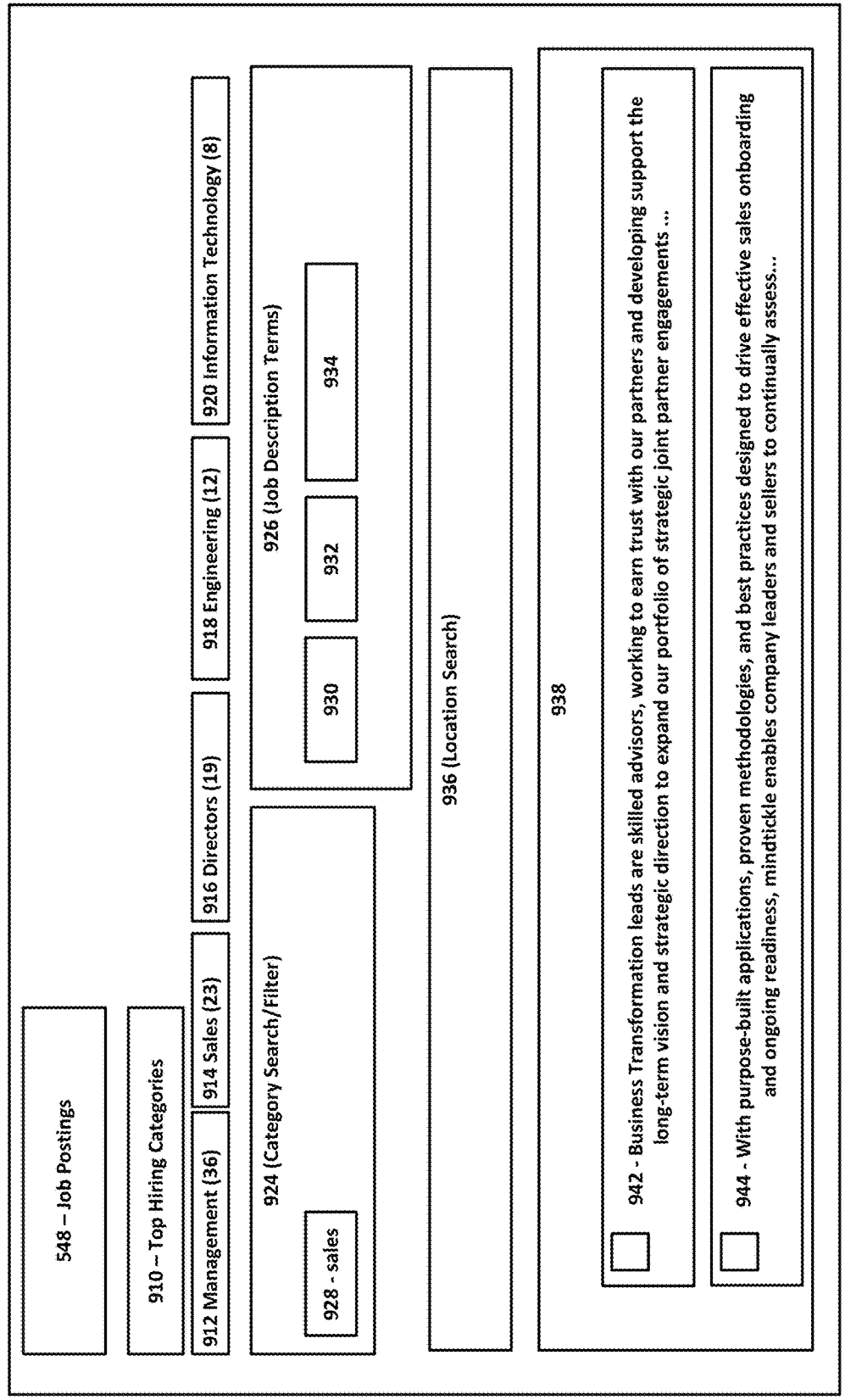
FIG. 9 illustrates an exemplary interface module identified in an exemplary user interface of a system provided by the invention.

FIG. 9 illustrates yet another exemplary module, #548, that can be presented and acted on via a user interface that serves as one source for controlling neural network prompts in generating draft messages through a system of the invention. In FIG. 9, the module, #548, presents a category of selectable job position-types ("Top Hiring Categories"), #910, which include management, sales, etc. (#912, #914, #916, #918, #920) (and frequency position therefore), which information can be, in aspects, automatically generated by the system using conventional web information-acquisition methods (e.g., automatically performing internet searches, searches of selected sites, downloads from databases, or downloads from selected sites, etc.), and can include other optional information such as number of positions posted (noted in parentheses in each of #912-920). Sub-module control, #924, reflects a keyword input selection (e.g., here the user has inputted the term "sales", #928). Sub-module control, #926 ("Job Description Terms") can, e.g., reflect the selection of the presented "Top Hiring Categories." Alternatively, job description terms can reflect words used in job descriptions (e.g., #930 can represent "engage", #932 can represent "outbound", and #934 can represent "outreach"). Sub-module control #936 offers a location search input, which, in aspects, can take various inputs or selections (e.g., searching by a location indicator, such as a government-issued indicator, e.g., a US zip code or a drop-down menu of various regions, states/provinces, major metropolitan area, etc.). Selectable prompt menu, #938, includes the content of selectable prompts, #942 and #944, generated automatically by the system based on such selections and inputs, using methods as described elsewhere, which, if selected, can provide instructional prompt context, situational prompt context, or both, for neural network(s) of the system.

FIG. 10

FIG. 10 illustrates still another exemplary module usable in an exemplary user interface of a system of the invention, such as the module shown in FIG. 5. In FIG. 10, the module, #552, includes a group of selectable prompts, based on facts about an inputted location (whether manually inputted or inputted automatically by the system based on facts about the recipient that are retrievable from various information sources, such as social media sites, personal information websites, internal databases/customer relationship management (CRM) tools, and the like). The reader should note that while module #552 is not specifically exemplified in the exemplary module interface illustrated in FIG. 5, module #552 (and any other one or more modules) could be present in such a module in addition to the module(s) illustrated therein or, e.g., in place of one or more module(s) illustrated therein. Exemplified are interesting/fun facts about the recipient's location (#1010, #1012, #1014, #1016, and #1018), which are each selectable, and which, if selected, can serve as prompt data for the generation of system-generated emails according to aspects of the invention.

FIG. 11

Figure 11:
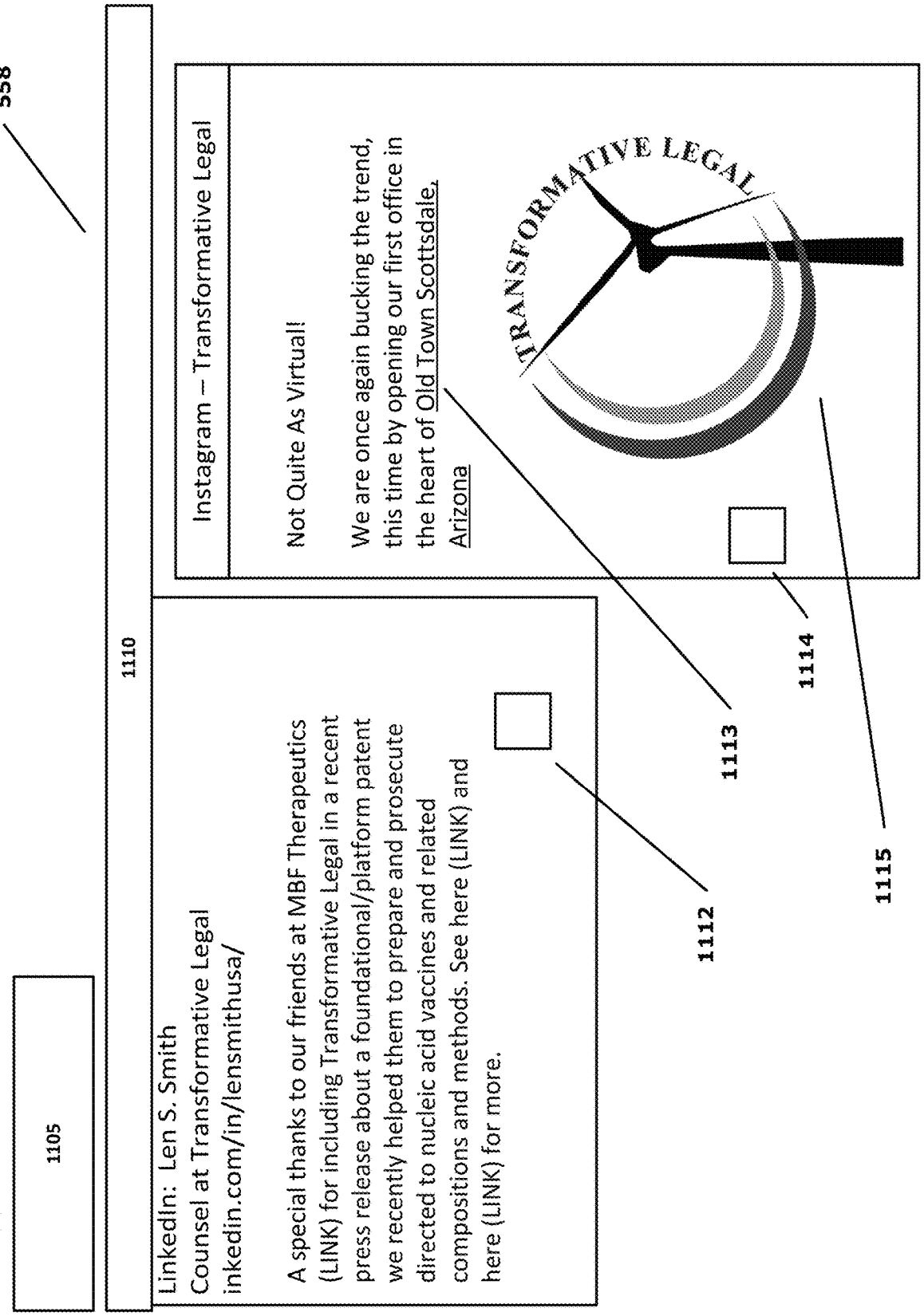
FIG. 11 illustrates an exemplary interface module identified in an exemplary user interface of a system provided by the invention.

FIG. 11 illustrates a further exemplary module that can be included in an exemplary user interface of a system of the invention, such as the interface illustrated in FIG. 5. Module, #558, includes a selection for various social media platforms (e.g., Twitter, Facebook, etc.), #1105, and keyword input/selection, #1110, which can include selection of a recipient, company, etc. (alternatively selection of one or both can be automatically made by the system). The reader should again note, as stated above, that while module #558 is not specifically exemplified in the exemplary user interface illustrated in FIG. 5, module #558 (and any other one or more modules) could be present in such an interface in addition to module(s) illustrated therein or, e.g., in place of such module(s) illustrated therein. System can automatically obtain recent content from such social media platforms and present it as selectable prompt inputs (#1112 and #1114). In aspects, additional information (e.g., location information, #1113, images, #1115, and other types of content such as status or event information (n.s.)) can be extracted from such content to suggest or generate specific inputs, to find even further related content that can also be recommended or added as inputs, or both. Neural network(s) or other system tools can be employed to understand content of social media content, such as relation to an upcoming event, recipient status, recent recipient/recipient-associated organization event, recipient current location, recipient interest, and the like, and such information can be used as prompts or used in prompt enhancement methods described herein.

FIG. 12A

Figure 12A:
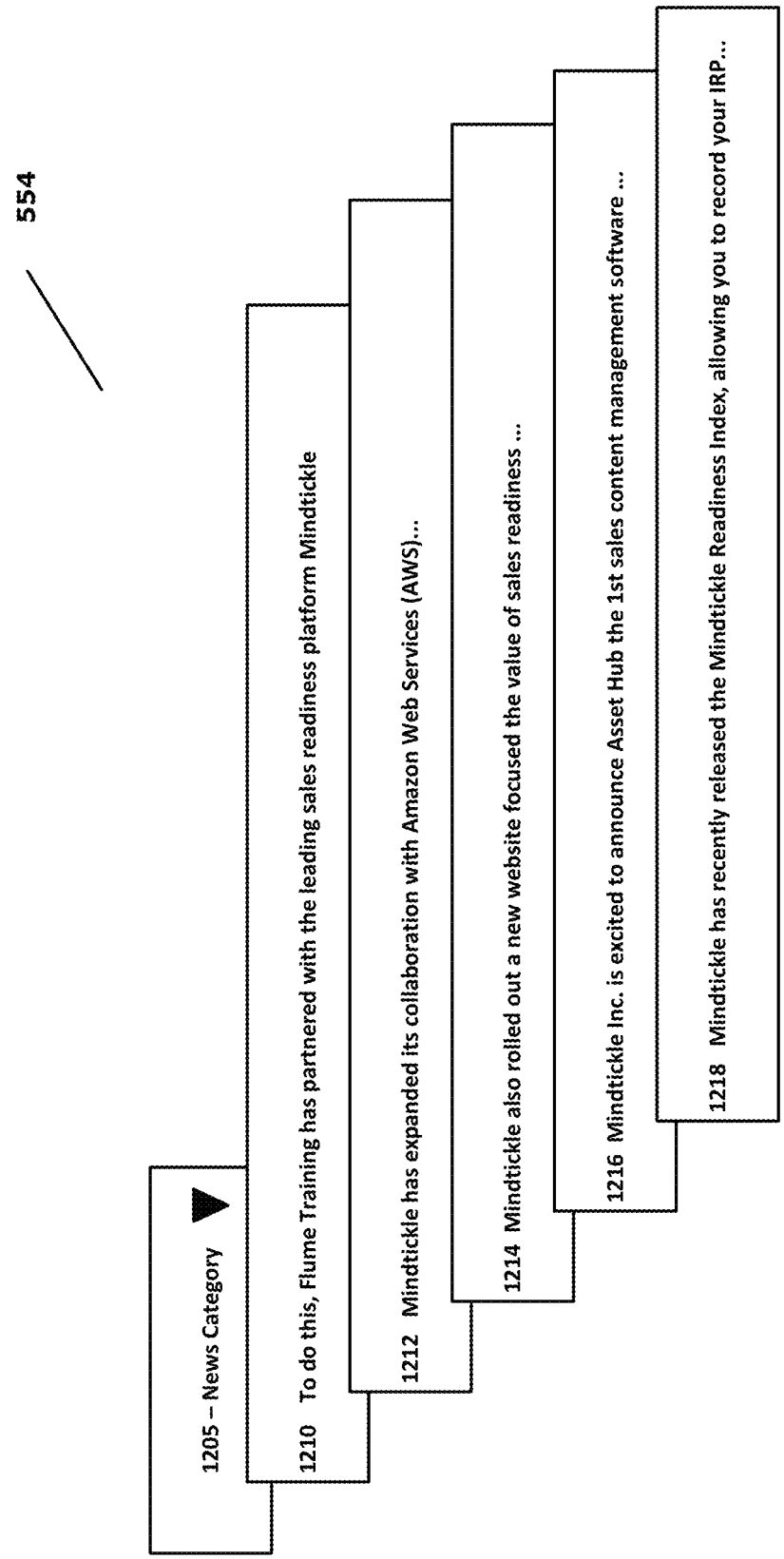
FIG. 12A illustrates an exemplary input selection in an exemplary user interface of a system provided by the invention, with a focus on recipient-associated organization news.

FIG. 12A illustrates an exemplary input selection usable in an exemplary user interface of a system of the invention, and incorporable as a module or part of a module, #554. In the exemplified selection input users can choose a news category about a recipient-associated entity, via, e.g., a drop-down menu, #1205 (e.g., concerning performance, personnel changes, etc.). Using this information, system can obtain, rank, and present a number of news stories regarding such aspect of the recipient-associated organization (e.g., from the internet generally, such as via a major search engine, or from specialized sites/databases, or other data sources, etc.). Here, a number of different article lead-ins or fragments are presented (#1210, #1212, #1214, #1216, and #1218), some number of (one, some, or all) can be used as additional instructional prompt input or situational prompt input for neural network(s) of systems/methods of the invention.

FIG. 12B

Figure 12B:
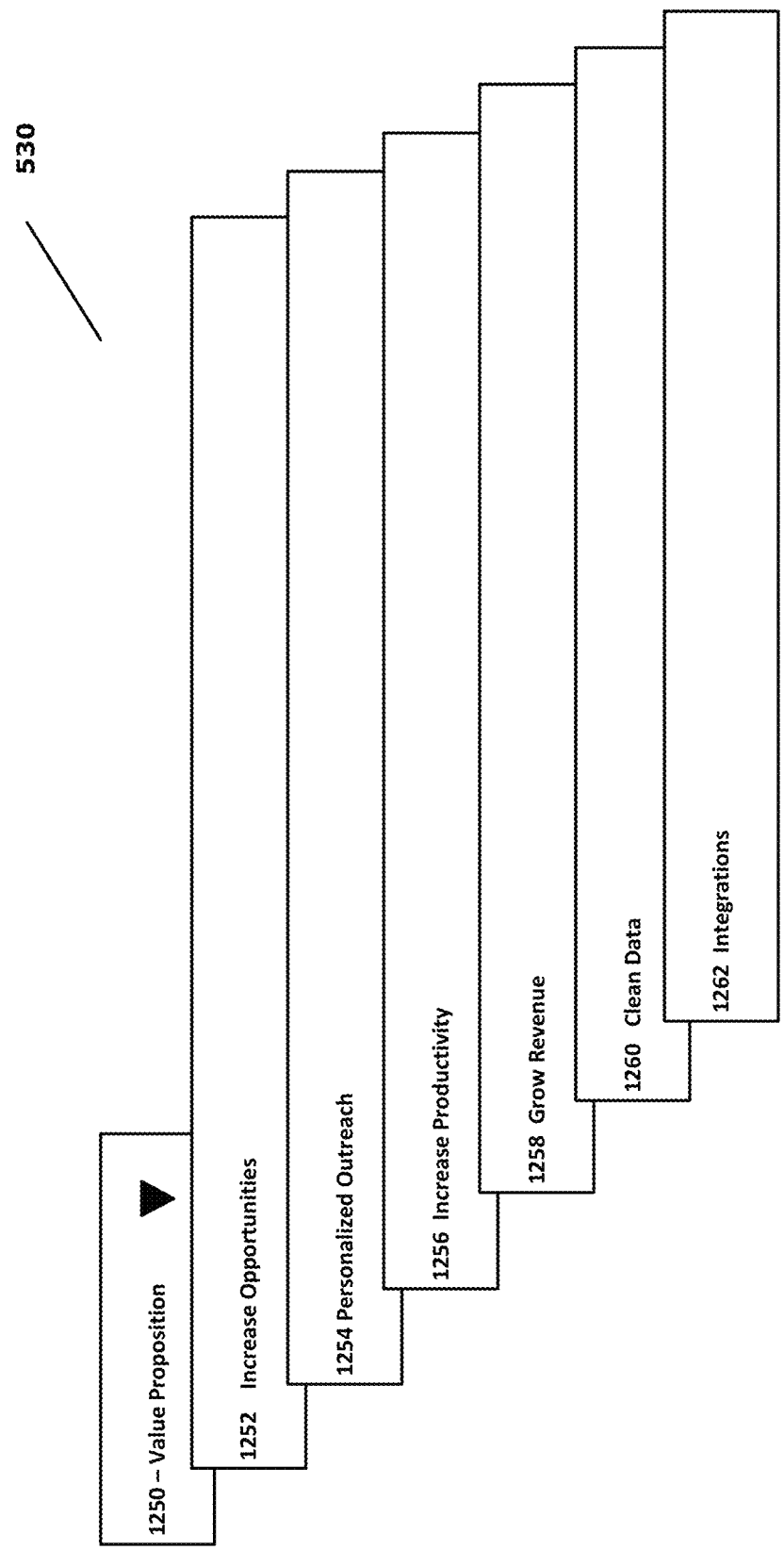
FIG. 12B illustrates an exemplary input selection of selectable instructional prompts (value propositions) in accordance with aspects of the invention.

FIG. 12B illustrates an additional exemplary input selection usable in an exemplary user interface of a system of the invention, and incorporable as a module or part of a module, #530. In this case, users can select one of a number of pre-programmed "value propositions," #1250, by, e.g., a pull-down/drop-down menu containing different value proposition types. A value proposition in this example reflects pre-programmed selectable value proposition categories (#1252, #1254, #1256, #1258, #1260, and #1262), and pre-programmed prompt content associated therewith, that neural network(s) of the system are trained to treat as instructional prompts. For example, the selectable valuable proposition category "increase opportunities," #1252, can represent the prompt "Most sales leaders we speak with are focused on making sure their outbound reps are able to keep their pipelines filled with high quality opportunities. We help reps prospect without interfering with revenue generating activities." In aspects, the content of some, most, or all of the prompt associated with any selectable category is presented to the user on request, on selection, or otherwise. As noted in the discussion of FIG. 5, in aspects such a selection can be associated with the option to include "case studies," which include additional prompt content, situational or instructional. The term value proposition is meant to be exemplary. Other similar categories of "key topic," "key message," and the like could alternatively be used. Such prompts are, in aspects, treated as instructional prompts as key elements of message focus.

FIG. 13

Figure 13:
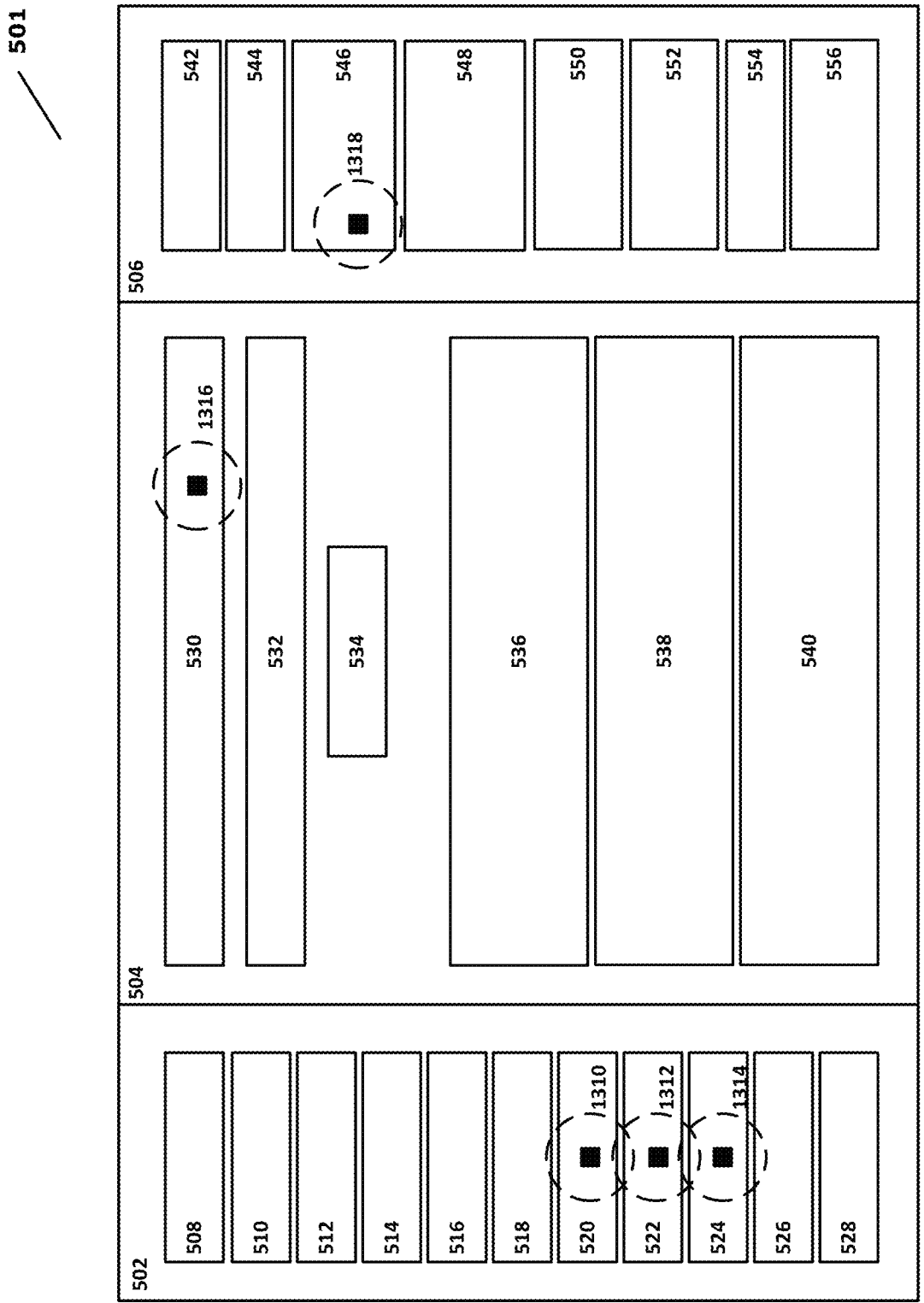
FIG. 13 illustrates specific setting(s), module(s), and input selection(s) having been selected in an exemplary user interface of a system provided by the invention.

FIG. 13 illustrates specific setting(s), module(s), and input selection(s) having been selected in an exemplary user interface, #501, similar to the user interface exemplified previously in FIG. 5, #500, of a system provided by the invention. FIG. 13 is similar to FIG. 5 but illustrates the selection of a number of specific exemplary settings, #502, including input of recipient email account, #520, input of recipient name, #522, and input of recipient-associated title, #524, as indicated by the dashed-circles (#1310), (#1312), and (#1314), respectively. Further, freeform module (#546) is shown as selected (dashed circle (#1318)). And, finally, FIG. 13 shows that the intent/purpose of the message to be sent (e.g., the value proposition) (#530) is selected (dashed circle (#1316)). Information display module #532 provides information summarizing the value proposition selection that is the focus/selection of drop-down menu, #530. Other elements/settings (e.g., #508, #510, #512, #514, #516, #518, #526, and #528), and other elements/modules (e.g., #542, #544, #548, #550, #552, #554, and #556) remain unselected. Further, setting button, #534, which, e.g., allows the user to opt to include a case study supporting the value proposition selection, #530, or not, remains unselected. System generated content, e.g., system generated emails, #536, #538, and #540, is shown as not yet presented in the user interface (as opposed to such content being illustrated as presented in the user interface in FIG. 14A). This figure exemplifies how the various types of selectable or input-able data types described in FIGS. 5-12B can be combined in use to provide remarkably tailored content for system message generation in a highly efficient manner, which can be critically important for professionals in high-stress professions such as sales and hiring, and other high-pressure fields such as equity trading, medical practice, and otherwise.

FIG. 14A

Figure 14A:
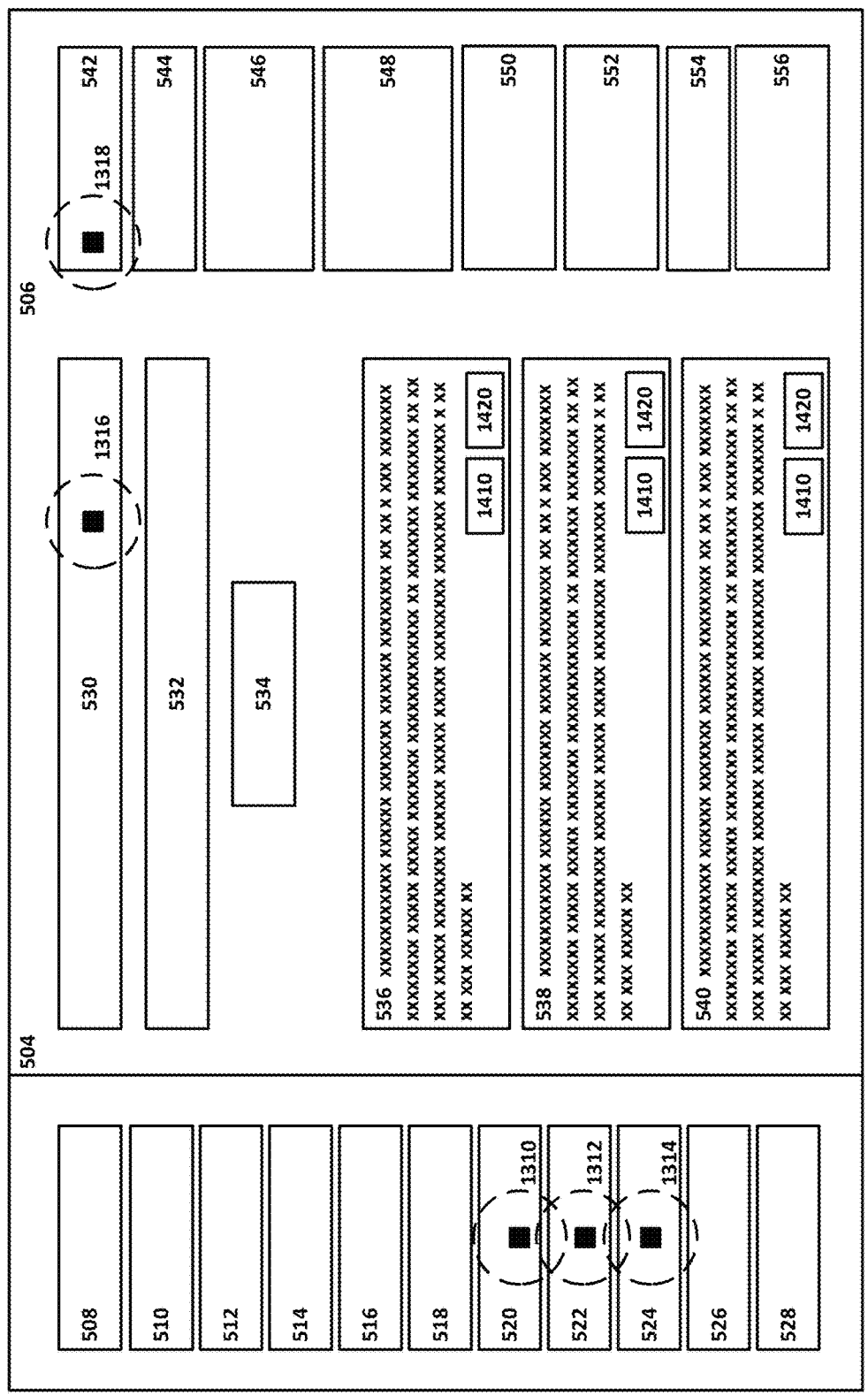
FIG. 14A illustrates output provided by an exemplary system of the invention upon selection of one or more specific setting(s), module(s), and/or input selection(s).

FIG. 14A illustrates output provided by an exemplary system of the invention upon selectin of one or more specific setting(s), module(s), and/or input selection(s). For simplicity, the same type of interface #501 as shown in FIG. 13 is also presented here, along with a number of setting selections, inputs, etc., as described in FIG. 13. Three exemplary messages, #536, #538, and #540, are generated by the system and presented to the system user. Each of the three exemplary messages are presented with options, #1410 and #1420, for the user to use to indicate to the system their evaluation of the messages, transmit the messages, or otherwise. Users in aspects also can directly edit such messages or a control can be added to allow a user to edit one or more message(s). Providing users with a limited number of selectable draft message options provides more options for finding messages that are effective in an efficient manner.

FIG. 14B

Figure 14B:
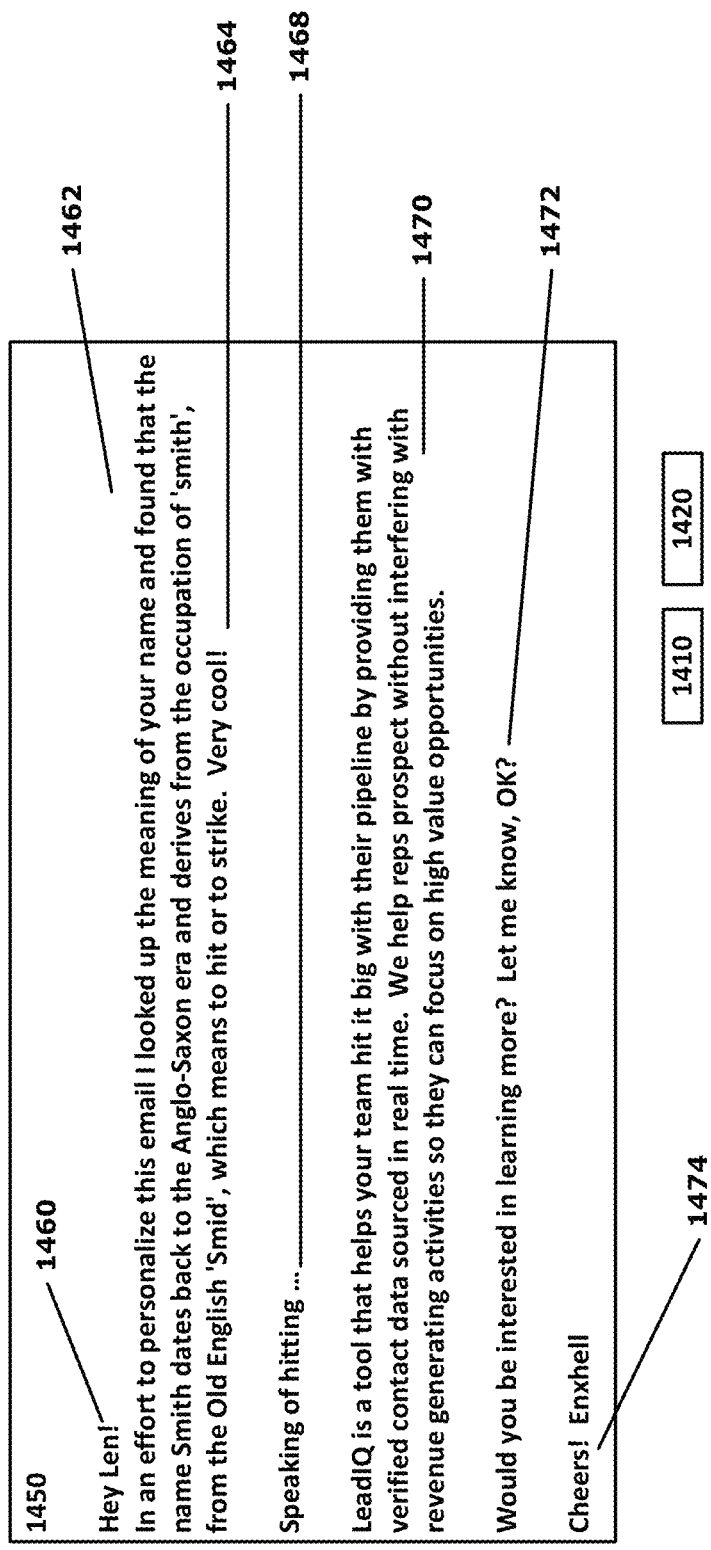
FIG. 14B depicts an exemplary draft message generated by a system.

FIG. 14B illustrates an exemplary draft message, #1450, of the type generated by systems of the invention. Message, #1450, includes a greeting/salutation, #1460, first multi-sentence paragraph #1462, and second multi-sentence paragraph, #1470, which are clearly directed to different topics/focuses/intents. The paragraphs are "linked" by an effective transition, #1468. The type of sentences included in the draft message include an exclamatory sentence, #1464, as well as inquisitive sentences, #1472. The draft message also includes a closing/regards statement, #1474. Message, #1450, is associated with use or rating buttons/controls, e.g., #1410 and #1420, of the type discussed elsewhere (e.g., discussions related to FIGS. 14A and 15.

FIG. 15

Figure 15:
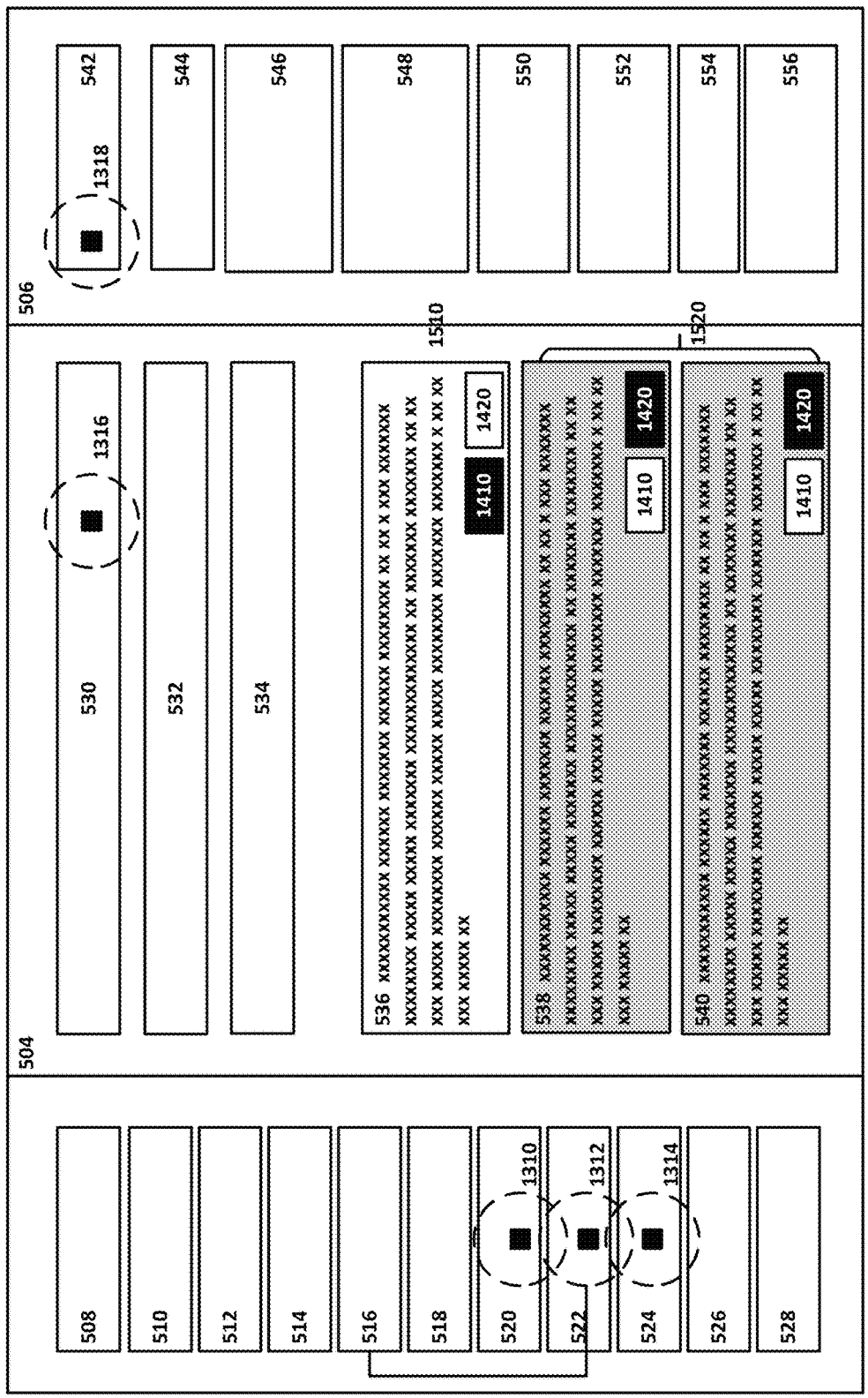
FIG. 15 illustrates user evaluation/selection of output provided in FIG. 14A.

FIG. 15 illustrates user evaluation/selection of system output provided in FIG. 14A (see the description of elements labeled in FIG. 14A but not of primary focus here within the discussion of, e.g., FIG. 13), but further illustrating how users can use the interface to make a section of messages to work with or rate, for application and for further training of the system. Two draft messages, #1520, are identified by a user as either disliked or not selected as indicated by shading (e.g., by using/selecting a rating indicator, #1420 for each message). One message, #1510 is selected for use (modification, transmission) or is rated as liked, e.g., using/selecting indicator/selector/control, #1410.

FIG. 16

Figure 16:
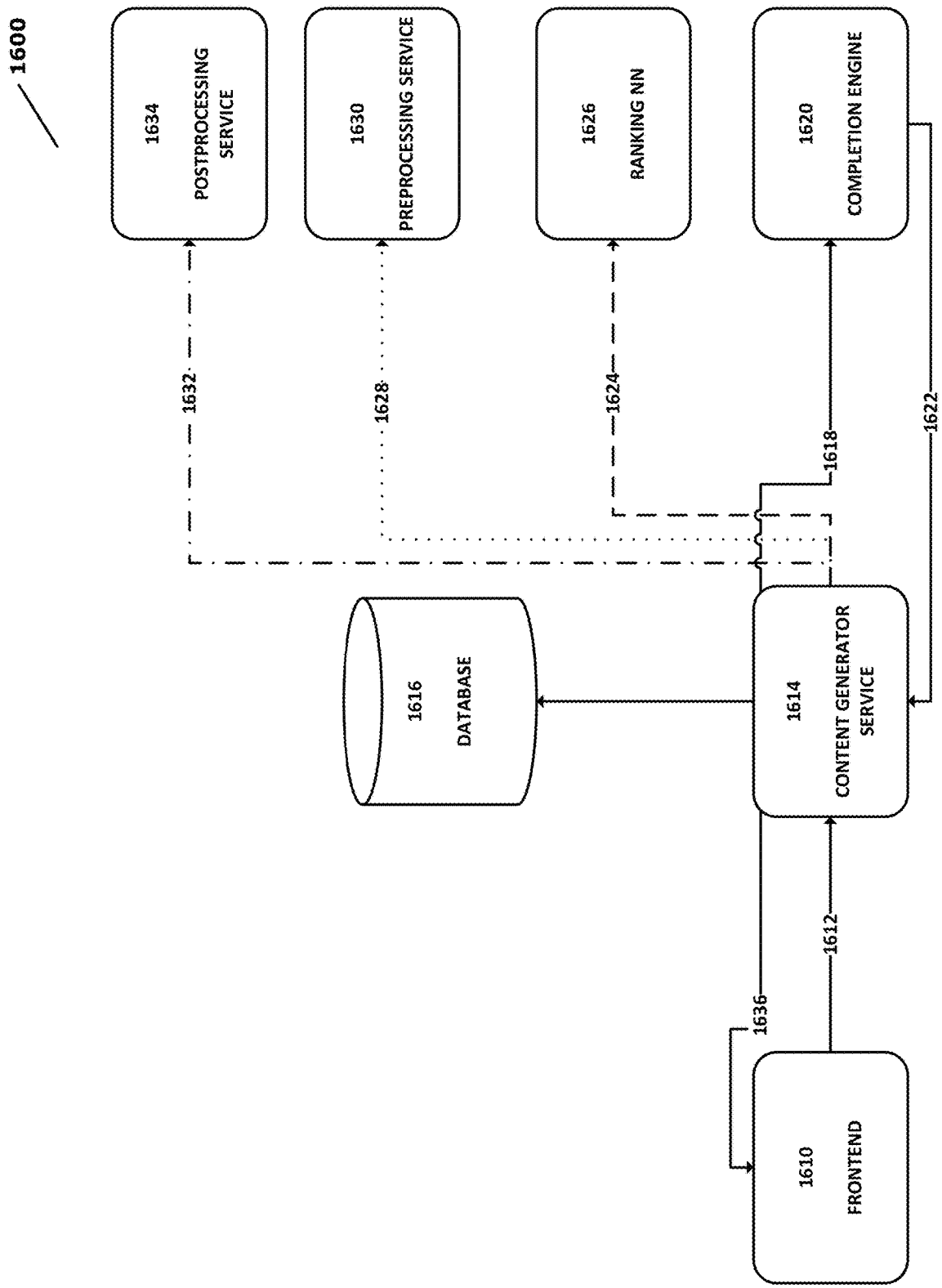
FIG. 16 illustrates an exemplary content generation process generated using an exemplary system of the invention.

FIG. 16 illustrates an exemplary content generation process used by another exemplary system of the invention, #1600. A "frontend" part of the system, #1610, receives data from an internal server, renders data, and sends request(s) to the server including the selected, inputted information, which the server then translates further to one or more prompts, and generates and replies back with messages. The frontend, #1610, also sends data to the server (comprising content generator service, #1614), e.g., via HTTPS, #1612, e.g., regarding any user interactions with presented options, settings, and messages, such as, e.g., user message edits, likes, etc. The frontend component, #1610, can comprise or employ known frontend services/frameworks (e.g., JavaScript frameworks for interface or application building/management), such as VueJS, React, Angular, or plain JS, which can facilitate building, presentation, or modification of interface(s).

Content generator service, #1614, which can represent or comprise, e.g., a Python based API (or similar API using an alternative programming language disclosed elsewhere) can deliver schema to the frontend, #1610, e.g., using a query/mutation language, e.g., GraphQL, REST, or the like. Content generator service, #1614, processes requests for message generation from the system/user, translating each such request to a prompt, facilitating the transformation of such prompts by the system. Each query object can be passed on to the completion engine, #1620, which returns a message or set of system-generated draft messages. System-generated draft messages can then be sent, #1624, to be ranked, #1626 by neural network(s) of the system, and/or sent, #1632, to be post processed by various system components, #1634 (e.g., modified, filtered out (e.g., removing less useful or harmful content)). Preprocessing service components/engines, #1630, can receive, #1628, process prompt content prior to presentation, use, or both. The content generator service, #1614, utilizes other neural network(s) for ranking the messages as indicated by, e.g., #1626. Messages are returned, #1636, to frontend, #1610. Content generator service, #1614, receives feedback when a user interacts with certain content.

Method outcome data and other generated data, stored messages, and the like can be stored in database, #1616, for further use/application. Database, #1616, can be any suitable database. In aspects, database, #1616, can be/comprise a database classifiable a SQL database, a NoSQL database, or both, such as a MongoDB database, of the type known in the art.

Content generator service, #1614, communicates data, #1618, to completion engine, #1620. Completion engine, #1620, converts prompt content/context inputs into a message or set of messages. Completion engine, #1620, hosts a trained/trainable model which gives probability distributions of semantic elements as discussed elsewhere. Feeding prompt inputs to the model and using a sampling strategy, the completion engine, #1620, completes message(s) and returns the message or set of messages back, #1622, to the content generator service, #1614. The completion engine, #1620, contains, as an example, standard sampling settings such as temperature, top k, presence/frequency penalty, maximum tokens to sample, beam search size, etc., such as are known in connection with sampling engine/neural network natural language processing system controls, which provide users, associated users, administrators, or a combination thereof with control over aspects of the system message generation process.

FIG. 17

Figure 17:
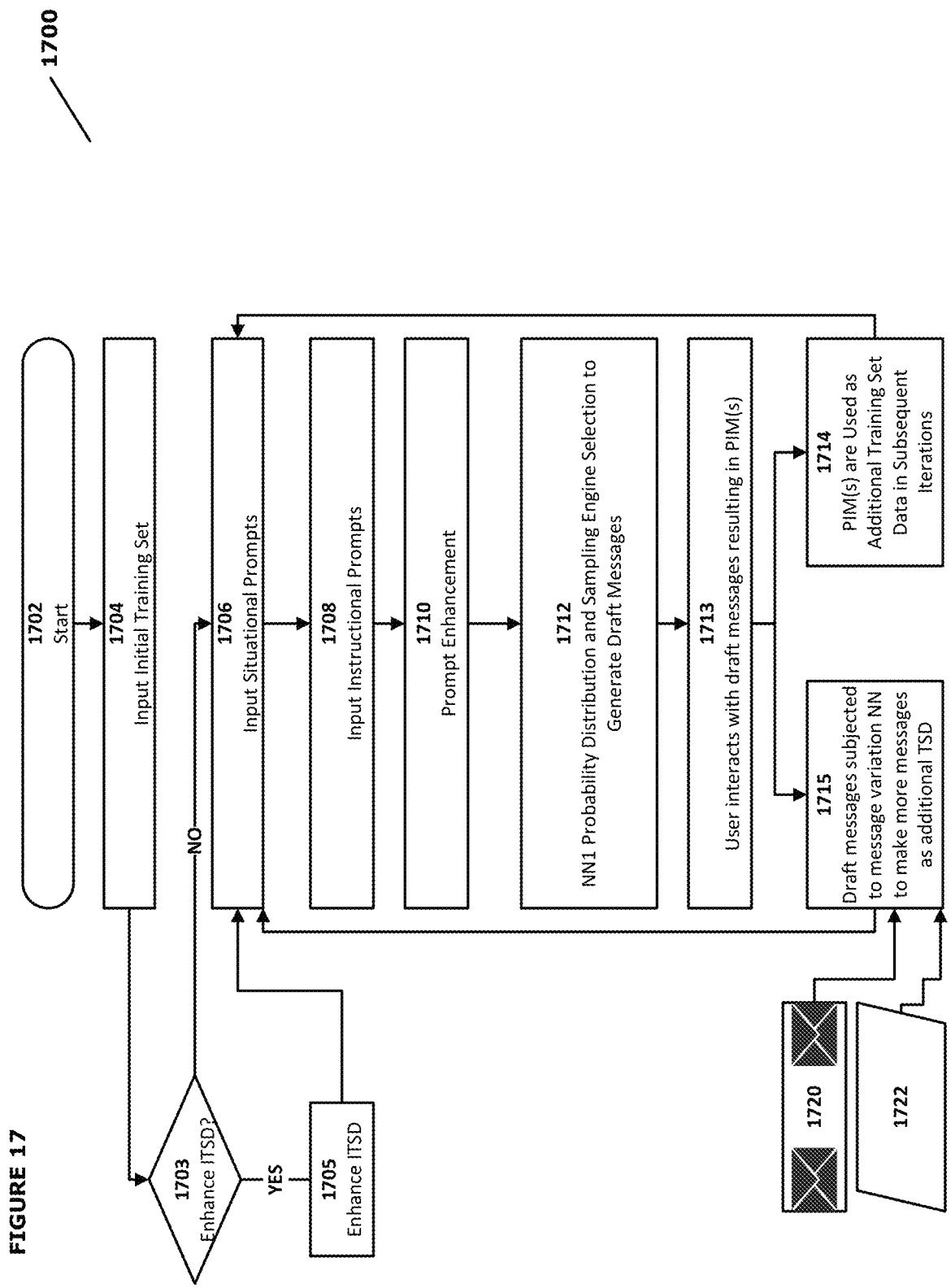
FIG. 17 is a flowchart demonstrating exemplary use of system-generated messages to load a training set for use in a method of the invention.

FIG. 17 is a flowchart demonstrating a process, #1700, for inputting prompt data in an exemplary method of the invention to increase the speed of training of a system. Following initiation of the method, #1702, the system is provided an initial training set, #1704. Initial training set input, #1704, can represent pre-training of neural network(s) using multiple messages of the type relevant to the desired output of the method (e.g., sales-related emails). Some initial training set input, #1704, also can be provided as an active in-process upload/entry near in time to the entry of prompt data. An evaluation, #1703, occurs regarding whether the input initial training set data, #1704, requires enhancement or other modification. If no enhancement of initial training set data is required upon evaluation, #1703, the initially inputted ITSD, #1704, is used and situational prompts are then inputted, #1706, followed by the other steps of the illustrated method. If enhancement of initial training set data is determined to be required/called for, #1703, the initial training set data is enhanced/modified, #1705, and the modified ITSD (MITSD) is used by the system, with the method continuing with the input of situational prompts, #1706 and further steps shown in the Figure. E.g., in either case, the input of situational prompts, #1706, is followed by then input of instructional prompts, #1708. While prompt data can be inputted in either order, or in an alternating or mixed manner, input of most, generally all, substantially all, or all of the situational prompt data before instructional prompt data can, in aspects, lead to improved performance of the system/method. In aspects, at least some of the prompts are then enhanced by the system, #1710 (or TSD, or both, n.s.), via any of the various means described herein (e.g., use of automatic internet searches by the system to obtain data related to the prompt input according to system algorithms, engines, protocols, etc.).

First neural network or neural network(s) of the first group (NN1) (EPDNN(s)) generate a probability distribution of semantic element options, as described elsewhere, and sampling engine selection is employed to select such elements and complete each of the draft messages, #1712. User is then permitted, via the interface, to interact with automatically displayed message drafts, #1713, typically/ideally resulting in identification of one or more positive interaction messages (PIMs) (via transmission, storage, editing, rating, or combination of any or all thereof). These steps are similar to those described above and can be used in various methods of the invention.

In the illustrated method, the system includes a further step of using initially system-generated messages (aka, artificial intelligence-generated messages) as additional training set data in at least near-term subsequent iterations of the method, #1714. Also, or alternatively, system-generated messages are subjected to analysis by further neural network(s) of a system. E.g., as shown in the Figure, messages can be subject to a message-variation/message optimization neural network, #1715, which generates messages from system-generated messages, which can be used as, e.g., additional TSD. In an exemplary embodiment of such a system, additional TSD message pairs, #1720, are used to train the MVNN/MONN, #1715, and considered in addition to PIMs or other system-generated messages, #1722, in generating more messages to serve as TSD for further iterations of the method/use of the system.

A variety of other NN(s) not shown can be employed in such processes or in any of the processes described here (and, accordingly, can form component(s) of any one or more of the systems described herein). An example of such a NN is a style copier NN ("SCNN"), similar to the MVNN described above (n.s.), but which uses prompt data, plus system-generated messages, particular PIMs, with the result that the SCNN(s) of the system/method generate messages that imitate/reflect the style of PIMs but maintain adherence/similar to the initial prompts. In aspects, SCNN(s) are trained with combination of prompt/message pairs (e.g., prompt 1+message 1, prompt 2+message 2), to generate additional messages, and such SCNN-generated messages thereafter subject to further supervision (by human supervised learning, by operation of NN(s), by operation of other system component(s), or a combination of any or all thereof). Such a system can be desired to optimally create some variability in messages but maintaining the style of messages employed in PIMs. Such prompt/message combination training can be used with any NN(s) that similarly generate element predictions herein, such as EPDNN(s). In aspects, prompt/message pair training of an SCNN (training with message/pair tuples) of training data (as described above), using message selected either manually or by operation of system elements (or both), and, thereafter, in operation (in so-called inference mode) only thereafter provides the SCNN/model the prompt (e.g., situational prompt context), typically with instruction to adhere to other rules, such as honoring the instructional prompts, and, in aspects, at least initial operational uses of the model (SCNN) are subjected to further supervision (human, neural network, or both) regarding SCNN predictions/outputs. The SCNN is given the instruction to follow the style of the TSD (e.g., the earlier used message/training pairs) and supervision, if provided, focuses on, i.a., adherence to such style. Again, similar approaches can be used with other NN(s) of the invention but adapted to the circumstances thereto/thereof. Typically, the messages in the training tuples (message+prompt pairs) for an SCNN or other NN are consistent in style in terms of the desired output (e.g., in the case of an SCNN in desired style of the messages). Also, the prompts and message used to train the system are consistent/similar (represented by context 1+prompt 1) to effectively train such a system. In aspects, a series of initial messages written by a user in response to system prompts, an initial series of PIMs, an initial series of messages inputted/uploaded by a user, or any combination thereof are used as input to copy the style of the user. Readers will understand that an EPDNN also will perform some amount of style imitation, but, in aspects, inclusion of an SCNN in methods/systems, detectably enhances the level of style imitation, increases the speed of style imitation proficiency, or both, e.g., as determined by comparative analysis of messages, audience member surveys of the nature described elsewhere, or both.

In another aspect, a second EPDNN or EPDNN instance is also or alternatively employed to generate messages with similar, but varied content, as a MVNN, as shown in the Figure. In aspects, as shown, pair of messages, combined with data, e.g., a single prompt associated with each of the pair of messages, is used as training data for the MVNN. Messages generated by an MVNN can be subject to supervised learning/human review (in any case where supervised learning is mentioned herein it provides support for human analysis/review of a function and vice versa, such human methods generally being overlapping). Also or alternatively system rules, heuristics, or operation of other NN(s) can be employed in the review of such MVNN/MONN-generated messages.

Another variation of such methods also or alternative can include using an NN like an EPDNN that uses message(s) (e.g., a message), instruction(s) (e.g., an instruction), and generated message(s) by following the instruction using the message as TSD (which can be considered an instruction-based message modifying-NN (IBMMNN)). For example, a user can select, or input, or both, an instruction with respect to a system-generated message, edited message/other PIM, etc., with system-recognized direction (instruction) to perform function(s) on the message, such as, e.g., changing transition information or other statements in a message (e.g., to use a particular transition, such as a transition that ties recipient characteristics to another fact, person, event, organization, or the like). Again, this component and method can be combined with another aspect herein.

This method can be used to rapidly generate a variety of training set data that is at least somewhat similar in tone and content to the initial training set messages, instructional prompts, and situational prompts if relevant, providing better training for the neural network(s) of the system as well as providing more relevant content for generating more accurate messages, and messages that more closely mimic the tone of the user/sender, in a faster time frame.

FIG. 18

FIG. 18 a flowchart illustrating a method that can be used to prime/initiate a system for use with a new user (to efficiently get a system to an initial "ready state" for use by a new user/to "onboard" a new user in the system), #1800. Due to the nature of the systems/methods of the invention, such systems/methods, unlike methods in the prior art, generally improve in their ability to generate accurate messages over time both in terms of message accuracy/truthfulness to the prompts and in terms of mimicking the style/tone of a user.

At initiation, #1802, a user (typically a new user to the system or a prior user approaching a new type of audience, a new type of message, etc.) is prompted to select training set data for onboarding input, #1804. For example, such training set data can include messages drafted by the user previously (e.g., user emails stored in a CRM such as in a SalesForce CRM, user emails saved in Microsoft Outlook or other email platform, or the like). Selected initial training input also or alternatively can include training set data from others, such as company suggested content, content of message leaders/experts (e.g., sales leaders), and the like. Concurrently or alternatively, the user and/or associated user selects/inputs contextual prompts, #1806. Next, the user and/or associated user input or select instructional prompts, #1808, e.g., comprising a value proposition message or other key content/message inputs as described above. The system uses the training set input and prompt data to generate draft messages and present them to the user, as described above, #1810. The user is then permitted to interact with messages as described above (e.g., rating messages, editing messages, etc.) (n.s.).

The system then evaluates, #1812, if the user's interaction with messages or other user behavior is indicative of system readiness for use or requires more intensive training before the system can be considered "ready" for the new user or new audience/message type, etc. Such an evaluation can be based on, i.a., e.g., preprogrammed standards, operation of another neural network trained to evaluate system readiness, human evaluation, etc. If user behavior or input indicates satisfaction, either the system can automatically transmit a message or allow the user to now opt to selectively transmit messages from the system, #1816, and the onboarding process is considered complete, #1818. However, if user behavior or input does not indicate sufficient readiness or satisfaction with the then-current system performance, the prompts (situational, instructional, or both) can be improved by supervised learning, application of one or more additional neural networks (e.g., a second content analysis neural network (CANN), human supervision, or both, #1814). The method can thereafter or concurrently continue (through additional iteration(s) of steps of the method, #1815) by also having the user submit additional training set content (e.g., uploading/submitting additional emails drafted by the user) (n.s.), adding additional prompts, or reviewing/optionally manually editing prompts, etc., and thereafter generating and presenting subsequent messages, etc., and eventually reevaluating system readiness (e.g., through user interaction or satisfaction with draft messages). Alternatively, if a sufficient amount of TSD is determined to be present or is not available, modified prompt data is fed into the system without further training data, #1817, and the method continues with the input of any additional or modified instructional prompts, #1808, followed by the other steps of the illustrated method. Additionally, such a method could include automatic prompt enhancement or further prompt modification using methods described elsewhere, expanding inputs to the NN(s).

FIG. 19

FIG. 19 provides another flowchart of exemplary steps of methods of the invention/system operation, in accordance with certain aspects of the invention, #1900. Pre-initiation training set data, #1902, is provided to the system, and includes both messages, #1904, and message records having additional associated context information, #1906. This information, along with prompts inputted by the user, system, or associated user(s), is used to generate draft messages, as described elsewhere, #1908, resulting in user selection of messages after review, and possible editing/rating, etc., #1910. According to the exemplary illustrated embodiment, user can then select the format of message output, and the system then automatically converts, #1912, the selected message to the desired output form, such as a video file, #1914 (e.g., a video file in which an avatar movie file reads the generated messages), an audio file, #1916, or a different type of message format from the types of messages mostly, generally only, or only used in the initial training set, #1918 (e.g., a call script for a sales person made from a training set mostly made up of sales-related emails).

FIG. 20

FIG. 20 provides a hybrid system/process map, #2000, of an exemplary system/method of the invention employing multiple neural networks trained and focused on various aspects of improving message generation in accordance with certain aspects. User or associated user provides input via an interface presented on a computer device, #2002, that is permitted to network with the system, e.g., over a web portal/application (although presented as a laptop such a device might be a smartphone, tablet, etc.). Via the interface, the user inputs prompt data (and optionally some initial training set data), via selection, direct input, etc., #2004, optionally along with other input elements such as tone settings, word variability settings, or other inputs described elsewhere (n.s.), which is delivered to the base system, #2005, which includes a system processor encoded with various engine(s), API(s), and contains memory/database(s), etc., #2006, as well as at least an EPDNN, #2008. Although other NNs and engine(s) are illustrated as outside of the base system in this Figure, this is done for convenience of presentation only, and all of the elements presented and described here could form part of the system integrated system (albeit that such a system can include various distributed resources, such as cloud-based memory and/or processing platform components, available through Microsoft Azure, AWS, etc.). User input can be subjected to correction, enhancement, or other modification, e.g., through application of web services, as described elsewhere, #2010 (e.g., obtaining internet site content based upon the user input and adding some or selected parts of such data to training data, prompts, or both) or through use of an input trained/focused NN, #2012, which can, e.g., evaluate if there are errors in the user input that should be corrected (which can range from typographical errors to use of strategies that are not in line with user-associated organization's policies, etc.). In either or both cases, the output can be enhanced inputs, #2014, e.g., enhanced ITSD, enhanced prompts, or both.

The base system components work together, as described elsewhere, to generate draft messages, #2020, which are presented to the user, #2022, via an interface (which can be the same interface or a different interface as the one used for collection of input). Draft message content is interpreted by a content analysis NN (CANN), #2024, to generate modified prompts, #2025, which are fed back into the system, #2005, for use in further iterations of the system, #2005.

User interactions with the draft messages, #2020, via interface, #2022, are tracked by the system and evaluated by a ranking NN, #2030, which focuses on learning the best selectable prompts to present, order/manner of presenting prompts, or similar selectable presentation-related function, #2031, in the input interface, #2002, in subsequent iterations, or to indirectly change the weights of the EPDNN by providing additional training to the EPDNN(s) of the system (n.s.). E.g., a message-content-grading NN can provide feedback to EPDNN(s), which is used to training the EPDNN(s) and, thereby, indirectly change weights of the EPDNN(s) and associated functioning thereof. Also or alternatively, a content grader NN, #2052, a selectable element interaction NN, #2053, or both, operate on data generated in the method. Content grader NN(s), #2052, can focus on learning the best content presented to a user and optimizing such content (e.g., different information modules presented to a user). Selectable element interaction NN(s), #2053, can focus on suggesting optimal selectable prompt elements for users. Each can operate on various user interaction data, such as which prompts are selected, which prompt selections correlate with PIM generation, and the like. Such NN(s) can operate by any suitable manner and can be combined with any other system or method aspect of the invention descried herein. In an exemplary aspect, a content grader NN (CGNN) analyses message(s) (e.g., system-generated email(s)) and outputs a ranking/rating (grade) based on standards, rules, modeling, etc. The grade can serve as an indicator/proxy for user preferences/tastes. The grader output can be used to train EPDNN(s), e.g., separately or in addition to typical EPDNN training with message training sets and prompts. Such CGNN-associated training can comprise the EPDNN being trained to maximize a reward (reinforcement learning), reduce a penalty, or both, associated with output from the CGNN. E.g., such training can comprise providing the EPDNN(s) prompt data, permitting the EPDNN(s) to generate messages therefrom, and generating feedback (e.g., rewards) from the CGNN(s) analysis of the messages, which are then fed back to the EPDNN(s) to provide training. CGNN(s) can be trained by, e.g., user reaction data, e.g., positive rating (likes, high scores, etc.) and negative ratings (dislikes, low scores, etc.) provided by a user in response to a message, or other types of URD. CGNNs also or alternatively can serve as ranking models and also or alternatively take into account other elements of message processing, such as order of messages. E.g., a message liked/ranked as position 2 of presented messages, implicitly means that the message at position 1 was better than 2 (however, a message liked at position 1 does not entail the same for position 2). In such and other respects, a CGNN can act as a ranking model. Other ranking models and the design and operation thereof are known in the field/art. Alternatively, instead of taking into account the likes/dislikes CGNN(s) and other such NN(s) (e.g., ranking NN(s)) can use other metric(s) (e.g., prediction(s) as to whether a message going to get a reply or generate another response from recipient(s)). As with any other method herein, such analyses, where appropriate, also can be expanded to population-based data for systems used by a number of users working on similar types of message generation tasks.

User interactions with data also can be evaluated by interaction engine(s), #2040 or other interaction NN(s), #2042 (e.g., NN(s) trained to and focused on evaluate user interactions, such as rating/evaluation of messages, modification of messages, etc.), which, in aspects, can lead to training of NN(s) and, indirectly result in training and, indirectly, modification of the weights of the EPDNN (e.g., #2039), or provide recommendations for changes in system setting(s), operating parameter(s), change order of messages presented, etc. (n.s.). A prompt recommendation model can, e.g., suggest prompts based on messages/prompt content that is working (e.g., what the user is liking, what messages are being effective/getting replies, or combination thereof). Such model(s), as with other model(s) described herein, can take into account other information, such as recipient/prospect information (e.g., the title, role, or industry of the recipient), and any currently available triggers, and using such information rank the triggers appropriately. A prompt recommendation model can also or alternatively suggest combinations of triggers that work better or best in generating messages (e.g., a prompt recommendation model may determine that a particular value proposition works best with a specific news article, specific financial snippet, or both). Such a model can operate using, e.g., a transformer NN or RNN, which at each step predicts the next best trigger to select and outputs "end" when it thinks it has arrived at the best sequence of triggers for recommendation to a user. Such methods also can be adapted, where appropriate, to prompt modification methods described herein.

User transmission of data, #2034, to recipients, #2036, and recipient responses thereto, #2037, can be tracked by the system, and evaluated, e.g., by engine(s), or by the use of an outcome focused NN, #2038, which is trained to use responses, replies, etc., as a basis for amending of prompts, changing weights of the EPDNN or other NN(s) of the system, etc.

FIGS. 21-23

FIGS. 21-23 are described in the section of this disclosure entitled Examples of Embodiments/Application.

EXAMPLES OF APPLICATION/EXPERIMENTAL WORK AND DATA

The following examples of application/experimental work and data is intended to demonstrate the application of principles of the invention according to certain aspects and thereby assist readers in further understanding principles related to the nature of the invention. This disclosure is only intended to further illustrate aspects of the invention, without limitation.

Example 1 (Name Meaning Prompt Input)

A system designed and operated in accordance with principles described herein (e.g., in accordance with FIGS. 1 and 16, and descriptions thereof), including a neural network with a general natural language training model and further trained with sales-related email messages including a greeting, multiple paragraphs, and a transition between such paragraphs, was used to generate a message with the following prompt input—

Value Proposition Situational Prompt Content

LeadIQ eliminates the most annoying parts of prospecting, helping sales reps get new deals with less work. The average sales rep only spends ¼ of their time actually prospecting. That's because reps spend their days looking up prospects in Salesforce, researching them on the web, finding lead contact info, and doing manual data entry. With millions of emails, phone numbers, titles, and accounts, LeadIQ makes it easy to focus on your pitch and build relationships, without sacrificing a clean Salesforce.

(Prompt Separator)

To: Billy Blair
Title: VP of Sales
Company: Mindtickle

Value Proposition Selected

Increase Opportunities
  Most Sales Leaders we speak with are focused on making sure their outbound reps are able to keep their pipelines filled with high quality opportunities. We help reps prospect without interfering with revenue generating activities.

Context (Further Instructional Prompt Content)

1. <FIRST_NAME> First name meaning: From the Old High German name, Willahelm, from wil, meaning "will, desire" and helm, meaning "helmet, protector". The name in total means "resolute protector". Those with the number 6 are mature and sensible. </FIRST_NAME>

The resulting message generated by the system was as follows—

Hey Billy—Looked up the meaning of your name and found that Billy is an Old High German name meaning "resolute protector". Very cool!

As a VP of Sales, I'm sure you remember that prospecting can be a bit of a battle.

LeadIQ helps your reps shield themselves from wasted time and effort by providing them with verified contact data sourced in real time and syncing it with your tech stack in one click. That way they can focus on revenue generating activities.

Any interest to learn how we can help your team be more resolute?

This Example demonstrates how a limited amount of instructional prompt and situational prompt data (which can reflect, e.g., the amount of user-inputted prompt data of a use/method), can be effectively utilized by systems and associated methods of the invention to generate engaging, applicable, and useful communication messages.

Example 2 (Job Posting Data Prompt Input)

This Example was performed using the same system described in Example 1 but with the following prompt input—

Value Proposition Situational Prompt Content

LeadIQ eliminates the most annoying parts of prospecting, helping sales reps get new deals with less work. The average sales rep only spends ¼ of their time actually prospecting. That's because reps spend their days looking up prospects in Salesforce, researching them on the web, finding lead contact info, and doing manual data entry. With millions of emails, phone numbers, titles, and accounts, LeadIQ makes it easy to focus on your pitch and build relationships, without sacrificing a clean Salesforce.

(Instructional Prompt Indicator)

To: Billy Blair
Title: VP of Sales
Company: Mindtickle

Value Proposition Selected

Increase Opportunities
  Most Sales Leaders we speak with are focused on making sure their outbound reps are able to keep their pipelines filled with high quality opportunities. We help reps prospect without interfering with revenue generating activities.

Context (Further Instructional Prompt Content)

1. <JOB_POSTING> Mindtickle is hiring a Manager, Business Development in Utah, United States at this URL: https://jobs.lever.co/mindtickle/205ac4aa-27f6-449f-9c9d-37e2b1948578. Keywords: Salesforce, Growth, Social Media, Business Development, MindTickle, Lever, Amazon Web Services. The job body mentions: +Experience with inbound and outbound (ABM) processes. </JOB_POST- ING> & <JOB_POSTING> Mindtickle is hiring a Manager, Business Development in San Francisco, Calif., United States at this URL: https://jobs.lever.co/mindtickle/5605ff84-910f-4451-a727-54c328276459. Keywords: Microsoft, Salesforce, Growth, Social Media, Business Development, .NET, C#, Back-End, ASP.NET, Microsoft SQL Server, MindTickle, Lever, Amazon Web Services. </JOB_POSTING>

The resulting message generated by the system was as follows—

Hi Billy—Noticed Mindtickle is hiring for a new role—the Business Development Manager. Seems like you're expanding your outbound efforts, which is great!

As a VP of Sales, I'm sure you know that outbound prospecting is key to growing revenue. But with so many responsibilities, how can sales leaders ensure their teams are efficiently prospecting?

LeadIQ helps your reps prospect without interfering with revenue generating activities by providing them with verified contact information and syncing it to your tech stack in one click. This way your team can focus on revenue generating activities and growing pipeline.

Interested in learning more about how LeadIQ can help your team at Mindtickle?

This Example provides a demonstration of how systems of the invention can be used to effectively generate messages with a variety of different types of prompt data. It is worth noting that the system used here was the same as described in connection with Example 1, i.e., the same neural network, trained with the same pre-training initial training set was able to process messages directed to different contexts (hiring vs. name) and efficiently generate messages in both cases.

Example 3 (Location Prompt Input)

The system described in Example 1 was provided the same input as described in Examples 1 and 2, but with the following further instructional prompt content in place of the further instructional prompt content described in Example 1 and Example 2:

Context

1. <LOCATION> Location: Fun fact about London: The Tower of London houses six ravens . . . . </LOCATION>

This input resulted in the following message being generated by the system—

Hi Billy—Saw you're based in London. Did you know that the Tower of London houses six ravens? It's true!

Sales reps who use LeadIQ are like the ravens of the Tower of London—they're always finding new opportunities to grow their pipeline.

LeadIQ helps them prospect without interfering with revenue generating activities so they can hit their quota and exceed expectations.

Would you be interested in learning more?

This Example again demonstrates the utility of systems and associated methods of the invention in generating messages using a variety of different types of contexts.

Example 4 (News Prompt Input)

The system used in Example 1 was provided with the same input, except for the following substitution in terms of "Context" input—

Context:

1. <NEWS> A news article about Mindtickle was published last month at this URL: https://finance.yahoo.com/news/mindtickle-unveils-sales-coaching-rooms-140000218.html—Mindtickle, the leader in sales readiness technology, today announced the launch of Sales Coaching Rooms, a new product that empowers front-line managers to offer impactful feedback to their teams quickly and effectively within the flow of their day. </NEWS>

This input resulted in the following system-generated message:

Hi Billy—Saw the article about Mindtickle launching Sales Coaching Rooms. Seems like a great way to help front-line managers offer impactful feedback to their teams quickly and effectively within the flow of their day.

Similarly, LeadIQ is a tool that helps reps get feedback from their prospects quickly and effectively within the flow of their day. We help them prospect without interfering with revenue generating activities so they can focus on high value activities.

Would you be interested in learning more?

This Example once again shows how systems and related methods of the invention can be used to generate effective and linguistically complex communication-initiating messages using a relatively small amount of input from a user, thereby increasing communication effectiveness and efficiency. However, readers will understand that the content of the context/prompt provided to an EPDNN in such a method, here or in similar methods described herein, actually can include a significant amount of content, but that, in aspects, most, generally all, or substantially a user does not input all of that content. E.g., in aspects, a user makes a selection of a category, a small segment of information (e.g., a title of the information, a preview of the information, etc.), or both, or the system directly adds such information to prompts.

Example 5 (Independence of Message Element Order with Respect to Prompt Input Order)

A further two examples of the system were performed. The first case (Case 1) prompts and resulting message are provided, followed by the Case 2 prompts and message.

Case 1 Prompts

LeadIQ eliminates the most annoying parts of prospecting, helping sales reps get new deals with less work. The average sales rep only spends ¼ of their time actually prospecting. That's because reps spend their days looking up prospects in Salesforce, researching them on the web, finding lead contact info, and doing manual data entry. With millions of emails, phone numbers, titles, and accounts, LeadIQ makes it easy to focus on your pitch and build relationships, without sacrificing a clean Salesforce.

To: Billy Blair
Title: VP of Sales
Company: Mindtickle
Value proposition:
Increase Opportunities
Most Sales Leaders we speak with are focused on making sure their outbound reps are able to keep their pipelines filled with high quality opportunities. We help reps prospect without interfering with revenue generating activities.
Context:
1. <JOB_POSTING> Mindtickle is hiring a Sales Readiness Manager in United States at this URL:

https://jobs.lever.co/mindtickle/99b6ba50-8950-43d5-a3f4-c8421192569d. Keywords: Growth, Sales Enablement, MindTickle, Lever, Amazon Web Services. </JOB_POSTING>
2. <NEWS> A news article about Mindtickle was published 2 months ago at this URL: https://flumetraining.com/drive-real-results-from-sales-training-in-2022-why-the-traditional-model-doesnt-work/—To do this, Flume Training has partnered with the leading sales readiness platform Mindtickle </NEWS>

===

Message 1 Generated
Hi Billy—Noticed you are hiring for a new role, the Sales Readiness Manager. Seems like Mindtickle is looking to expand its sales team and ensure they have the tools they need to be successful.
As a VP of Sales, I'm sure you know that having the right tools can make all the difference.
LeadIQ helps your reps prospect without interfering with revenue generating activities by providing them with verified contact data sourced in real time and syncing it with your CRM and outreach tools in one click. With LeadIQ, your team can focus on revenue generating activities instead of administrative ones.
Also saw an article about how Flume Training is partnering with Mindtickle to drive real results from sales training in 2022. Seems like Mindtickle is a company that's always looking to improve and expand its offerings.
Would you be interested in learning more?

Case 2 Prompts

LeadIQ eliminates the most annoying parts of prospecting, helping sales reps get new deals with less work. The average sales rep only spends ¼ of their time actually prospecting. That's because reps spend their days looking up prospects in Salesforce, researching them on the web, finding lead contact info, and doing manual data entry. With millions of emails, phone numbers, titles, and accounts, LeadIQ makes it easy to focus on your pitch and build relationships, without sacrificing a clean Salesforce.

   To: Billy Blair
   Title: VP of Sales
   Company: Twilio
   Value proposition:
     Increase Opportunities
     Most Sales Leaders we speak with are focused on making sure their outbound reps are able to keep their pipelines filled with high quality opportunities. We help reps prospect without interfering with revenue generating activities.
     Context:
1. <FINANCE_REPORT> Twilio published a 10-k report on sales—"the rate of expansion and productivity of our sales force, including our enterprise sales force, which has been a focus of our recent expansion efforts; "</FINANCE_REPORT>
2. <NEWS> A news article about Twilio was published last month at this URL: https://www.nojitter.com/contact-center-customer-experience/no-jitter-roll-recap-ping-contact-centers-news-ec22—In addition to the new API, Twilio announced several updates to its Flex platform. </NEWS>

===

Message 2
Hi Billy—Saw that Twilio's sales force has been a focus of your recent expansion efforts. It's great to see a company with such a strong reputation in the sales space expanding its sales team and offering new tools for its reps.
I also noticed that you published a report on sales. This part stood out to me: "The rate of expansion and productivity of our sales force, including our enterprise sales force, which has been a focus of our recent expansion efforts."
LeadIQ helps your reps expand their pipeline by providing them with real-time data and insights into their prospecting efforts. We help reps prospect without interfering with revenue generating activities so they can focus on high value activities.
Would you be interested in learning more?

This Example demonstrates the ability of systems/methods of the invention to generate relevant, effective, and highly personalized messages, even where multiple contexts are provided and employed in the generation of such messages.

As exemplified in other examples, the contextual prompts include meta tags (e.g., "<FINANCE_REPORT>") which identify a type of context/category of prompt provided to the system which, can, i.a., facilitate editing of the prompt and/or other programming functions performed on or by the system's data. The prompts used here also use prompt category separators in at least some cases (e.g., ###), which also can facilitate administrator work, system recognition of content type, or both.

Significantly, the prompts used in this Example (i.e., in both Case 1 and Case 2) include both situational (sometimes called contextual) prompts (e.g., name, title, etc., as well as information about the sender's organization, LeadIQ, and the contexts) and instructional prompts (the value proposition). Significant portions of the situational prompts were not included in the messages. However, given the presence of the situational prompts, it is likely that in a multi-draft message iteration of the method, this additional prompt content would lend to a variety of effective messages for the user to consider and select from. It is also noteworthy that the order of input of the prompts was independent of the order of output of the messages generated. In other words, the system did not require a specific order of prompt input in order to generate an effective message. Overall, this Example demonstrates how systems of the invention exhibit a level of flexibility and intelligence in both input and output that has not been observed in previously disclosed message-generating systems.

Example 6 (Impact of Message Corruption on Message Quality)

After experimenting with various neural network-associated message generating systems, the inventors designed a message-generation system having the features described herein (e.g., in accordance with the disclosure provided in and associated with FIGS. 1 and 16). The inventors had previously observed that general language model neural network message generation systems can become corrupted after iterations of message generation without prompt management methods, such as those provided by the present invention (leading to deletion of content, addition of content, or modification of content, with respect to the prompt content/training set data provided to the neural network) (i.e., such messages lack truthfulness). As noted elsewhere, a lack of truthfulness (or corruption) means that message(s) (e.g., a significant number of messages or some, most, generally all, substantially all or all messages) do not follow instructional prompts, either by addition of information (more than the statements/content of the instructional prompts), deletion of information (not including the statements of the instructional prompt), or both.

To demonstrate the effect of neural network model/prompt corruption on message quality the following experiment was performed under the direction of some of the inventors hereto (the experiment designers).

Thirty-six message prompts were selected for use in this experiment. The lead experiment designer generated a script to make modifications in the content of training set messages used in the experiment to generate "corrupt" counterparts of training set data messages. The researchers determined that the level of modification introduced by the script is similar to what the lead designer observed after a number of iterations of neural network message generating systems lacking any method for ensuring prompt/message consistency in iterative uses of a neural network. In other words, this experimental model was desired to reflect typical corruption that can arise, e.g., due to user's deleting content, editing content, or both, or through erroneous operation of an EPDNN. The second designer confirmed that the level of corruption was typical for what would be expected to be seen in such systems.

Eight test subjects agreed to participate in the study. Each test subject was presented 72 messages generated by the system. One half of the 72 messages generated and presented to each user (36 messages) were uncorrupted (uncorrupted model messages) and the other half of the messages generated and presented to each user (36 messages) were corrupted messages, generated by application of the random corruption script applied to the content of training set/prompt (trigger) data, as described in the following paragraphs.

The training set data used to train each model included 300 messages. The uncorrupted model contained 300 uncorrupted messages for training and the corrupted model contained corrupted prompts for those exact messages, again, as described below.

Corrupted messages that were fed into the corrupted model (used as training set data), specifically, had:

(1) One or more triggers (statements (sentences/clauses other than the value proposition)) less than what was mentioned in the corresponding uncorrupted training set/prompt data. For example, if an email used for training set in the uncorrupted model mentioned a new hire, such data might be removed from the instructional prompt in the counterpart corrupt model. In short, this reflects the case where there are less prompts than what appear in the message, which can happen when a message is modified such that prompt information is removed from the message or if the model/AI does not include such content in the message;

(2) One or more instructional prompt elements (triggers) more than what was mentioned in the uncorrupted training set. For example, in the corrupted model a training set/prompt input email mentioned a new hire, but such a new hire mention was not contained in the uncorrupted training set/prompt email. The designers included such corruption because they envisioned that, e.g., such issues/errors could arise when the user modifies the message to add additional information or when AI/model adds more information than what exists in the prompt.

(3) One or more statements which was/were altered in the corrupt model input with respect to the training set/prompts. For instance, a training set email in the corrupt model could include a different value proposition than what was selected by the user in the uncorrupt model or where name was used as a prompt the corrupted input email was modified to include a different name meaning than the one selected by the user. The designers believed that inclusion of such corruption could reflect what might frequently happen, without the methods of the invention to modify the prompts in iterative use, if the user alters the message, or the model transforms the prompt incorrectly.

The specific distribution of probabilities of such modifications in the corrupted training set messages occurring, based on operation of the training set-modifying script was as follows—
  Remove all triggers—3/28
  Replace all selected triggers with 1 new trigger—9/28
  Replace selected value proposition with new value proposition—3/28
  Drop partial information in all selected triggers—6/28
  Add one additional trigger that is not selected—7/28

As can be seen from this distribution, not all elements/statements in messages in the corrupt set would were corrupted.

As noted, the total dataset size used in this experiment was 300 messages. The distribution of number of triggers that were modified in the corrupted training set data followed the following distribution—
  Messages with 0 triggers: 1
  Messages with 1 trigger: 256
  Messages with 2 triggers: 42
  Messages with 3 triggers: 1.

Corruption levels were, accordingly, based on modification of only 1 or 2 triggers in messages.

The uncorrupted and corrupted training set messages were inputted into the system. The correctness of the uncorrupted training set data was validated by or at the direction of the designers.

The designers concluded that this model reflects the impact of early-stage iterations of a model of the invention, or a model at any stage of evolution/development, in which a significant amount of user editing of messages has occurred, either where a step/function/element is employed to ensure consistency between prompts and PIM(s) (e.g., where a CANN or other NN interprets content of messages and makes prompt modifications based thereon, ensuring that messages remain uncorrupted over time) or not (i.e., where such consistency measures are not employed, thereby allowing for detectably or significantly greater inconsistency in messages and prompts, and message corruption/lack of truthfulness).

The users were presented messages without any indication of which model was used to generate the message and asked to evaluate the truthfulness of each evaluated message on a 1-5 scale. A summary of the evaluation of the corrupted model messages and uncorrupted model messages for each user is presented in FIG. 21.

As can be seen clearly in FIG. 21, for each of the participants in the study the uncorrupted model messages clearly outperformed the corrupted model messages in terms of truthfulness.

FIG. 22 presents the uncorrupted model truthfulness rating distributions for all participants in the study. As can be seen in FIG. 22, the number of messages rated with a "5" (indicating high truthfulness with respect to the input) was markedly higher than that of any other score measured.

FIG. 23, in turn, presents the corrupted model truthfulness ratings distribution for all of the study participants combined. As can be seen in FIG. 23, the highest rating was a "1" (a score seen at very low levels in the uncorrupted model ratings) and corrupted model message truthfulness ratings were generally more distributed across all scores (e.g., 5 point ratings were still the second highest rating, reflecting the fact that general language neural networks can generate useful messages even using corrupted prompts, albeit far less consistently and reliably than is possible with an uncorrupted prompt/trigger model).

The difference in scores/ratings obtained in this experiment is statistically significant as measured by the Wilcoxon signed-rank test with p-value of 1.7e-34 (****).

Prior work by the inventors and others has demonstrated that without method(s)/system components for managing/curating prompts in a neural network message-generation model, the model will eventually become at least slightly corrupted, due to deletions, additions, or changes in model input over time, e.g., where a user is permitted to edit messages without a check on if such modifications causes subsequent messages to be at risk of overall corruption of intent and key content. The results of the experiment described in this Example indicate that corruption of prompts/triggers results in a product which is unreliable in terms of message generation. It is worth noting that even with the uncorrupted model, the method/system still reflects a degree of untruthfulness (the overall rating of messages generated by the model with no corrupted data gets 4.3/5, not 5/5). This reflects the importance of other elements of the inventive method, too, such as the presentation of multiple messages for selection editing by the user and prioritization of instructional prompts, in additional to employment of method(s)/component(s) for ensuring that prompts/triggers are edited to remain consistent with original intent by the system (e.g., by employing a second content analyzing and prompt editing neural network as described in aspects). The result is surprising in that, i.a., most, if not all, natural language neural network message generating systems available today and described in leading research literature do not employ such prompt curation methods and the fact that even very small variations in the content of messages can result in such significant differences in terms of the usability of the system for the effective generation of messages.

Example 7 (Comparative Performance of System with a CANN)

A subsequent experiment can be performed using a system designed and operated in accordance with principles of the invention, notably in including a content analyzing and prompt-editing neural network, which evaluates the content of messages drafted by the system and uses such content to amend instructional prompts (or both instructional prompts and situational prompts) prior to subsequent iterations of the method as compared to a system that lacks this feature. Such a second neural network may work with other system components in performing the editing of prompts/triggers.

Such a method may be performed over a few or a large number of iterations and the experiment can evaluate messages generated by the inventive system vs. a comparator system after a few or several iterations at one or more points.

The inventors anticipate that when a group of study participants evaluates messages generated by such two systems, the system of the invention including the content analysis and prompt-editing neural network will demonstrate a significantly improved truthfulness over the comparator model.

What is claimed is:

1. A method for efficiently generating effective linguistically complex messages comprising:
(1) providing a user with access to an internet-connected computer system that comprises one or more neural networks, the one or more neural networks comprising at least one element prediction distribution neural network that operates as an effective general language modeling engine in at least one natural language;
(2) providing the user, through automatic operation of the system, with a human-system interface that receives input from the user and relays output to the user;
(3) training the at least one element prediction distribution neural network with an initial training set, the initial training set comprising a plurality of training set message records, each training set message record comprising data corresponding to a natural language message, each initial training set message comprising (a) a salutation and (b) two or more paragraphs, each paragraph of the two or more paragraphs comprising (I) at least one sentence, each sentence being composed of (A) a collection of semantic elements and (B) at least one punctuation element or other delimiter, wherein a semantic element is a word, number, or a symbol representing one or more words in one or more natural languages and in a collection of semantic elements at least most of the semantic elements are words, symbols that represent words other than mathematical functions, or a combination thereof;
(4) causing the user or an associated user to submit input to the system, by direct input via the interface, by selection of one or more selectable elements presented to the user via the interface, or both, the input comprising (a) one or more system-recognized instructional prompts, training set data that the system uses to automatically generate one or more system-recognized instructional prompts, or both, and (b) optionally one or more system-recognized situational prompts, one or more system-recognized structural prompts, or both;
(5) by automatic operation of the system, generating a plurality of draft messages, each draft message generated by a process comprising
   (a) initiating composition of the message;
   (b) until the system determines that at least most of the message is complete, adding semantic elements to the message by steps comprising
      (I) the at least one element prediction distribution neural network automatically evaluating the content of the instructional prompts and any provided situational prompts and generating a distribution of semantic element options for each semantic element that the system determines to add to the message before determining that at least most of the message is complete, wherein the distribution of semantic element options is based at least in part on an evaluation of message context, wherein message context comprises
         (A) the content of the initial training set,
         (B) the content of the situational prompts, if any, and
         (C) the content of the instructional prompts,
      (II) wherein the at least one element prediction distribution neural network treats the content of situational prompts, if present, as a priority context in generating the distribution of semantic element options if the at least one element prediction distribution neural network determines that such content of the situational prompts is sufficiently related to content of the initial training set, instructional prompts, or a combination thereof, and
      (III) wherein the at least one element prediction distribution neural network treats the instructional prompts as a priority content source in generating the distribution of semantic element options;
(c) by automatic operation of the system, employing a sampling engine of the system to select one semantic element from each distribution of semantic element options and, directly or indirectly, causing the system to incorporate each selected semantic element into the draft message, wherein the sampling engine's selection of a semantic element from each distribution varies based on one or more programmable and selectable word variation settings that are either pre-programmed into the system or set, directly or indirectly, by the user or an associated user; and
(d) stopping the addition of semantic elements selected from distributions of semantic element options to the message, wherein the determination to stop the addition of semantic elements is based on a recommendation of the at least one element prediction distribution neural networks, preprogrammed system message rules, or both;
(6) by automatic operation of the system, presenting at least a plurality of the draft messages to the user, via the interface;
(7) via the interface, permitting the user to (a) modify the content of at least one selected message to generate one or more modified messages, (b) transmit at least one selected message to the intended audience as one or more transmitted messages, (c) input an evaluation of at least one selected message to the system thereby identifying the at least one selected message as one or more evaluated messages, (d) store at least one message as a stored message for later use, or (e) perform a combination of any or all of (a)-(d);
(8) automatically by operation of the system (a) recording user response data comprising information regarding (I) the user's editing of one or more messages, (II) the user's transmission of one or more transmitted messages, (III) the user's evaluation of one or more messages, (IV) the user's storage of one or more messages, or (V) a combination of any or all of (I)-(IV); and
(9) for each subsequent iteration of the method, by automatic operation of the system, (a) analyzing (I) the content of one or more transmitted messages, positively evaluated messages, stored messages, or modified messages, or a combination of any or all of any such positive interaction messages or (II) analyzing the user response data; (b) based on such analysis evaluating (I) the current instructional prompts, situational prompts, or both, (II) evaluating the compliance of one or more draft messages to one or more message standards, or (III) performing both (I) and (II); and (c) if the evaluation determines a change in operation of the system would generate improved messages, automatically prior to a subsequent iteration of the method (I) changing the instructional prompts, situational prompts, or both, (II) providing performance feedback to the at least one element prediction distribution neural networks, or (III) performing both steps (I) and (II).

2. The method of claim 1, wherein the method requires the user, an associated user, the system, or a combination of some or all thereof, to input at least one situational prompt for the at least one element prediction neural network to use as priority context in generating draft messages.

3. The method of claim 2, wherein the training set message records comprise communication-initiating messages and draft messages that are usable as communication-initiating messages, wherein a communication-initiating message is a message that is not in reply to an earlier message from a recipient and the method does not comprise using a prior message from a recipient as training set data or a neural network prompt.

4. The method of claim 1, wherein step (9) of the method is performed by a method comprising (1) providing a second neural network or second group of neural networks, and (2) by automatic operation of the second neural network or second group of neural networks (a) analyzing the analyzed messages against preprogrammed message grading standards and (b) providing one or more element prediction distribution neural networks of the at least one element prediction neural networks with performance training feedback based on the grading score.

5. The method of claim 1, wherein step (9) of the method is performed by a method comprising (1) providing a second neural network or second group of neural networks, (2) by automatic operation of the second neural network or second group of neural networks (a) analyzing one or more analyzed messages to identify the contents of the one or more analyzed messages, and (b) where there is a are significant difference in the content of one or more analyzed messages and the prior instructional prompts is identified in the analysis, changing the content of at least some of the instructional prompts prior to the next iteration of the method based on the content of the analyzed messages.

6. The method of claim 5, wherein the method further comprises (1) providing and employing a third neural network or one or more neural networks in a third group of neural networks, to evaluate editing of draft messages, transmission of draft messages, rating of draft messages, or a combination of any or all thereof to predict user preference for draft messages generated by the system and (2) the system automatically presenting draft messages in subsequent iterations of the method based on such prediction of user preference.

7. The method of claim 5, wherein the method further comprises providing the user with the option to change the form of the message output from the form at least most messages in the initial training set to a different form of message.

8. The method of claim 5, wherein the system automatically generates or modifies one or more instructional prompts by subjecting the content of user submitted training set data to analysis with a neural network that makes changes to the instructional prompts based on such analysis when the neural network determines such changes will improve system performance.

9. The method of claim 5, wherein the method comprises tracking recipient responses to messages generated by the method and subjecting such recipient response data to a neural network that analyzes such data and makes or recommends changes to the instructional prompts, situational prompts, or both based on such recipient response data.

10. The method of claim 1, wherein the method comprises the system automatically presenting 2-5 selectable prompt options for the user to select and when one or more of such selectable prompt options are selected, to act as neural network prompts for the at least one element prediction distribution neural network.

11. The method of claim 1, wherein at least most of the draft messages are between 300-1500 characters in length.

12. The method of claim 1, wherein the system automatically obtains content related to at least one situational prompt, at least one instructional prompt, or both, from one or more internet sources and (1) adds such related content to an instructional prompt, situational prompt, or both, or (2)

recommends the user add such related content to an instructional prompt, situational prompt, or both.

13. The method of claim 1, wherein the method comprises providing the user with one or more setting controls through the interface that change the word variation settings.

14. The method of claim 1, wherein the system automatically generates or modifies one or more instructional prompts by subjecting the content of user submitted training set data to analysis with a neural network that makes changes to the instructional prompts based on such analysis when the neural network determines such changes will improve system performance.

15. The method of claim 1, wherein the method further comprises employing a style copier neural network of the system to automatically analyze the content of positive interaction messages and use such analysis to copy the style of the user.

16. The method of claim 1, wherein the method further comprises employing a ranking neural network of the network that automatically analyzes user response data and uses such analysis to, directly or indirectly, change the presentation of draft messages in subsequent iterations of the method.

17. The method of claim 1, wherein the method comprises subjecting user response data, positive interaction message data, or both, to analysis with a selectable element interaction neural network, which automatically uses such analysis to, directly or indirectly, change the presentation of selectable elements presented to the user in subsequent iterations of the method.

18. The method of claim 1, wherein the method comprises tracking recipient responses to messages generated by the method and subjecting such recipient response data to a neural network that analyzes such data and makes or recommends changes to the instructional prompts, situational prompts, or both based on such recipient response data.

19. The method of claim 1, wherein the method comprises onboarding a new user by performing repeated user submissions of training set data, generation of draft messages, and evaluation of draft messages until a determination that the system is ready for ordinary operational use is made by the user or system.

20. The method of claim 1, wherein the system automatically or selectively integrates with a customer relationship management system and automatically or selectively obtains information from the customer relationship management system to use as instructional prompts, situational prompts, or both.

\* \* \* \* \*